United States Patent
Bronicki

(10) Patent No.: US 11,354,693 B2
(45) Date of Patent: Jun. 7, 2022

(54) SELECTING AVAILABLE ASSIGNMENTS FOR USERS BASED ON MOBILE COMPUTING DEVICES OF THE USERS

(71) Applicant: Trax Technology Solutions Pte Ltd., Singapore (SG)

(72) Inventor: Youval Bronicki, Los Altos, CA (US)

(73) Assignee: Trax Technology Solutions Pte Ltd., Singapore (SG)

( * ) Notice: Subject to any disclaimer, the term of this patent is extended or adjusted under 35 U.S.C. 154(b) by 0 days.

(21) Appl. No.: 17/357,554

(22) Filed: Jun. 24, 2021

(65) Prior Publication Data
US 2021/0374763 A1    Dec. 2, 2021

Related U.S. Application Data

(63) Continuation of application No. PCT/US2021/034885, filed on May 28, 2021.
(Continued)

(51) Int. Cl.
*G06K 9/00* (2022.01)
*G06Q 30/02* (2012.01)
(Continued)

(52) U.S. Cl.
CPC ...... *G06Q 30/0208* (2013.01); *A47L 11/4011* (2013.01); *G01C 21/206* (2013.01);
(Continued)

(58) Field of Classification Search
CPC ......... G06Q 30/016; G06Q 10/063114; G06Q 10/087; G06Q 30/02; G06Q 20/20;
(Continued)

(56) References Cited

U.S. PATENT DOCUMENTS

| 2013/0018701 A1* | 1/2013 | Dusig ............... G06Q 30/0203 705/7.32 |
| 2015/0121387 A1* | 4/2015 | Chang ................ G06F 9/4881 718/103 |
| 2015/0199641 A1* | 7/2015 | Napoli .......... G06Q 10/063114 705/7.15 |

FOREIGN PATENT DOCUMENTS

| WO | WO 2018/002709 A3 | 1/2018 |
| WO | WO 2019/048924 A1 | 3/2019 |
| WO | WO 2019/140091 A1 | 7/2019 |

OTHER PUBLICATIONS

Search Report in PCT Application No. PCT/US2021/034885 dated Nov. 12, 2021 (17 pages).

* cited by examiner

*Primary Examiner* — Alex Kok S Liew
(74) *Attorney, Agent, or Firm* — Finnegan, Henderson, Farabow, Garrett & Dunner, LLP

(57) ABSTRACT

A non-transitory computer-readable medium includes instructions that when executed by a processor cause the processor to perform a method for selecting available assignments for users based on mobile computing devices of the user. The method includes receiving an indication of at least one parameter of a mobile computing device associated with a user; accessing a plurality of available assignments, each assignment of the plurality of available assignments involving use of at least one mobile computing device; based on the at least one parameter of the mobile computing device associated with the user, selecting a subset of the plurality of available assignments; and offering the selected subset of the plurality of available assignments to the user.

19 Claims, 62 Drawing Sheets

Related U.S. Application Data

(60) Provisional application No. 63/113,490, filed on Nov. 13, 2020, provisional application No. 63/091,009, filed on Oct. 13, 2020, provisional application No. 63/084,086, filed on Sep. 28, 2020, provisional application No. 63/033,055, filed on Jun. 1, 2020.

(51) Int. Cl.

| | | |
|---|---|---|
| *G06Q 10/06* | (2012.01) | |
| *G06T 7/80* | (2017.01) | |
| *G06T 7/70* | (2017.01) | |
| *H04W 4/024* | (2018.01) | |
| *H04W 4/029* | (2018.01) | |
| *G01C 21/20* | (2006.01) | |
| *G06Q 30/06* | (2012.01) | |
| *G06T 7/73* | (2017.01) | |
| *G06N 20/00* | (2019.01) | |
| *G06K 9/62* | (2022.01) | |
| *G06N 5/04* | (2006.01) | |
| *A47L 11/40* | (2006.01) | |
| *G05D 1/02* | (2020.01) | |
| *G01G 19/52* | (2006.01) | |
| *G06T 7/50* | (2017.01) | |
| *G06T 7/00* | (2017.01) | |
| *G06Q 30/00* | (2012.01) | |
| *H04L 67/303* | (2022.01) | |
| *G06V 10/40* | (2022.01) | |
| *G06V 10/22* | (2022.01) | |
| *G06V 20/00* | (2022.01) | |
| *G06V 20/10* | (2022.01) | |
| *G06V 20/20* | (2022.01) | |
| *G06V 20/52* | (2022.01) | |
| *G06Q 10/08* | (2012.01) | |
| *H04N 7/18* | (2006.01) | |
| *G01G 19/14* | (2006.01) | |
| *G01G 23/18* | (2006.01) | |
| *G01J 1/42* | (2006.01) | |
| *G01L 1/00* | (2006.01) | |

(52) U.S. Cl.
CPC ........... *G01G 19/52* (2013.01); *G05D 1/0219* (2013.01); *G05D 1/0246* (2013.01); *G06K 9/628* (2013.01); *G06K 9/629* (2013.01); *G06K 9/6227* (2013.01); *G06N 5/04* (2013.01); *G06N 20/00* (2019.01); *G06Q 10/0639* (2013.01); *G06Q 10/06311* (2013.01); *G06Q 10/06315* (2013.01); *G06Q 10/06375* (2013.01); *G06Q 10/06395* (2013.01); *G06Q 30/018* (2013.01); *G06Q 30/0201* (2013.01); *G06Q 30/0281* (2013.01); *G06Q 30/0601* (2013.01); *G06Q 30/0609* (2013.01); *G06Q 30/0623* (2013.01); *G06Q 30/0639* (2013.01); *G06Q 30/0643* (2013.01); *G06T 7/0002* (2013.01); *G06T 7/50* (2017.01); *G06T 7/70* (2017.01); *G06T 7/73* (2017.01); *G06T 7/80* (2017.01); *G06T 7/97* (2017.01); *G06V 10/225* (2022.01); *G06V 10/40* (2022.01); *G06V 20/00* (2022.01); *G06V 20/10* (2022.01); *G06V 20/20* (2022.01); *G06V 20/52* (2022.01); *H04L 67/303* (2013.01); *H04W 4/024* (2018.02); *H04W 4/029* (2018.02); *A47L 2201/04* (2013.01); *G01G 19/14* (2013.01); *G01G 23/18* (2013.01); *G01J 1/4204* (2013.01); *G01L 1/00* (2013.01); *G05D 2201/0203* (2013.01); *G06Q 10/087* (2013.01); *G06Q 30/0633* (2013.01); *G06T 2207/30242* (2013.01); *G06V 2201/09* (2022.01); *H04N 7/188* (2013.01)

(58) Field of Classification Search
CPC ............... G06Q 20/202; G06Q 20/203; G06Q 30/0261; G06Q 30/0269; G06Q 30/01; G06Q 30/0281; G06Q 20/3224; G06Q 30/00; G06Q 10/06312; G06Q 30/0201; G06Q 30/0222; G06Q 30/06; H04W 4/029; H04W 4/33; H04W 4/025; H04W 4/80
See application file for complete search history.

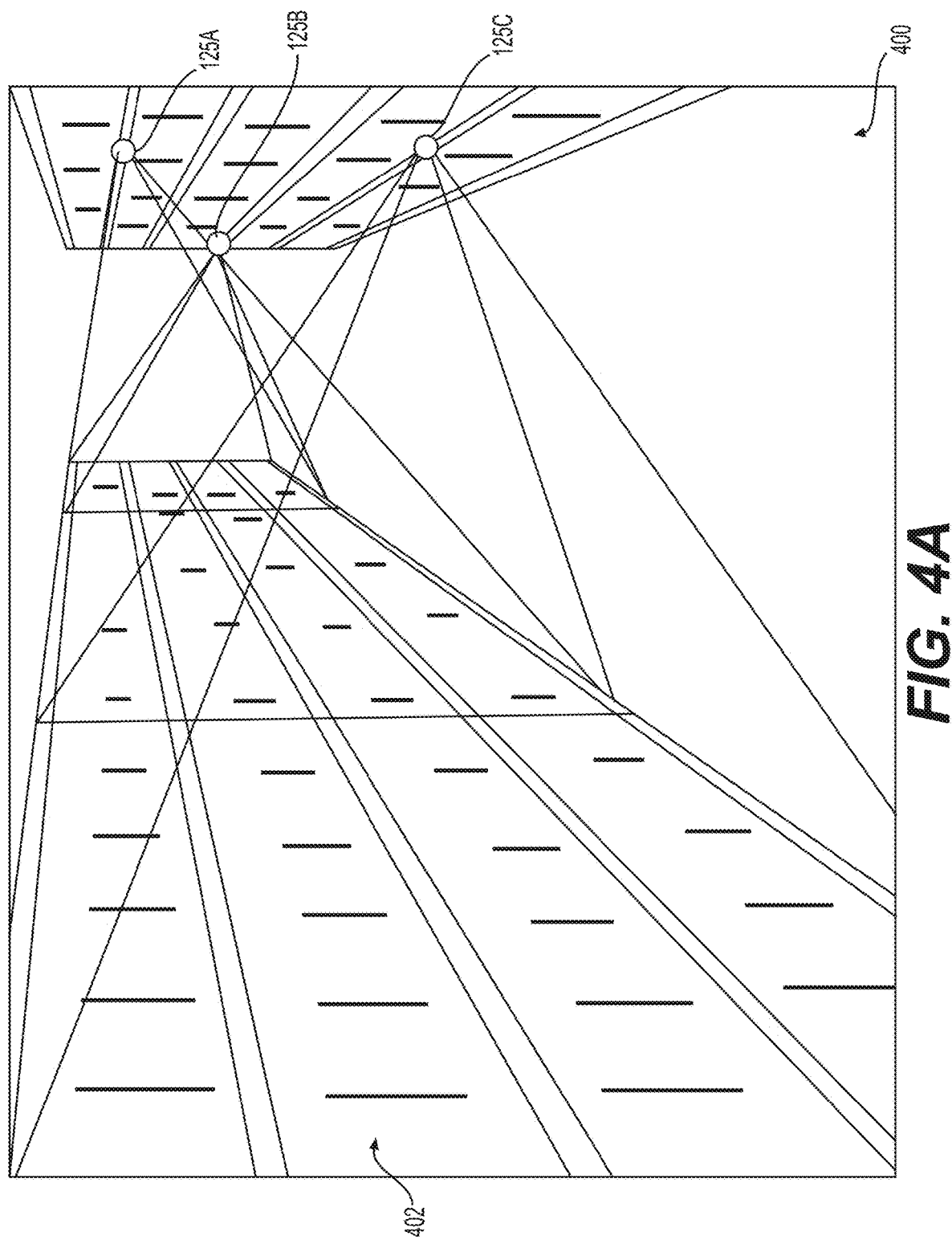

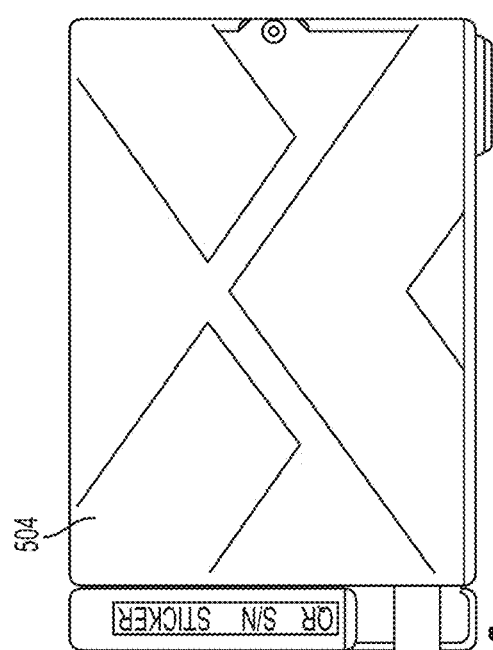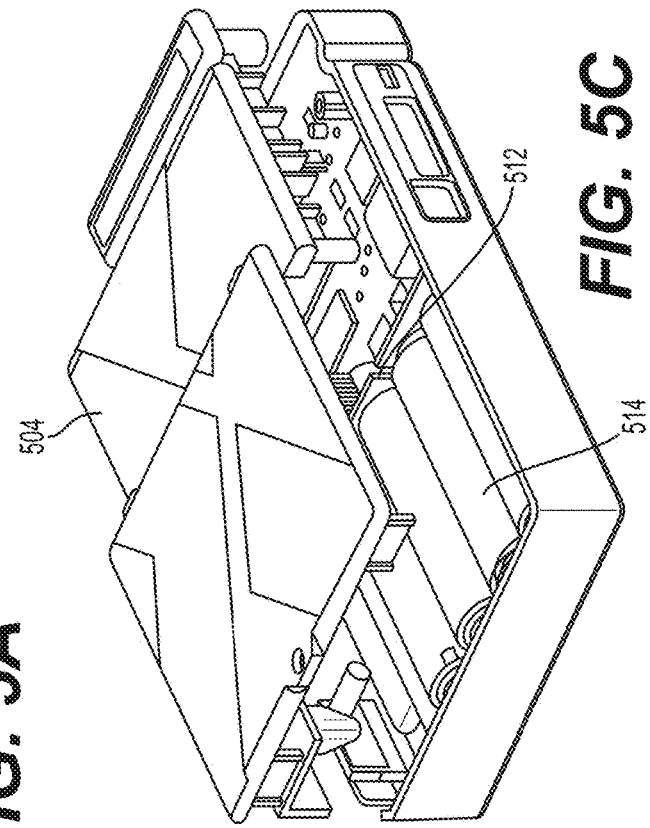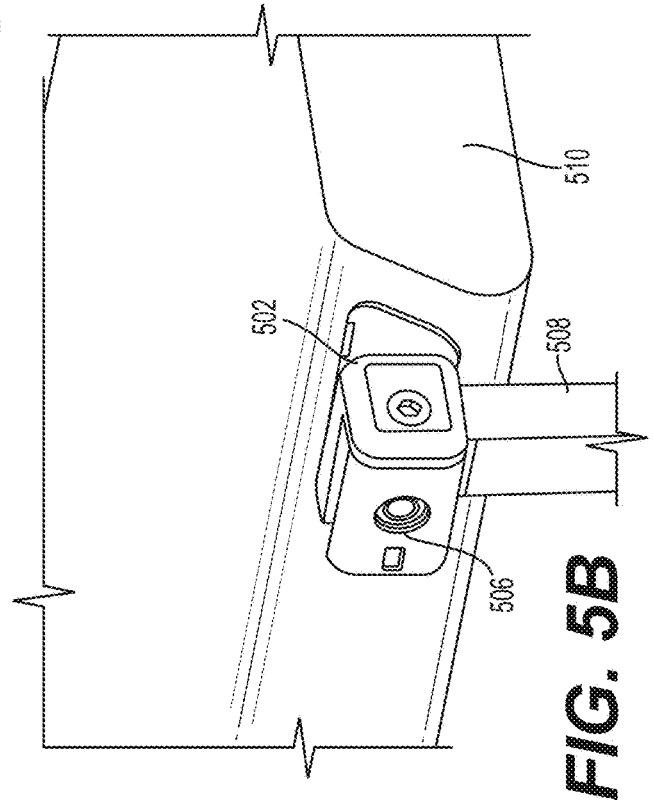
FIG. 5A
FIG. 5B
FIG. 5C

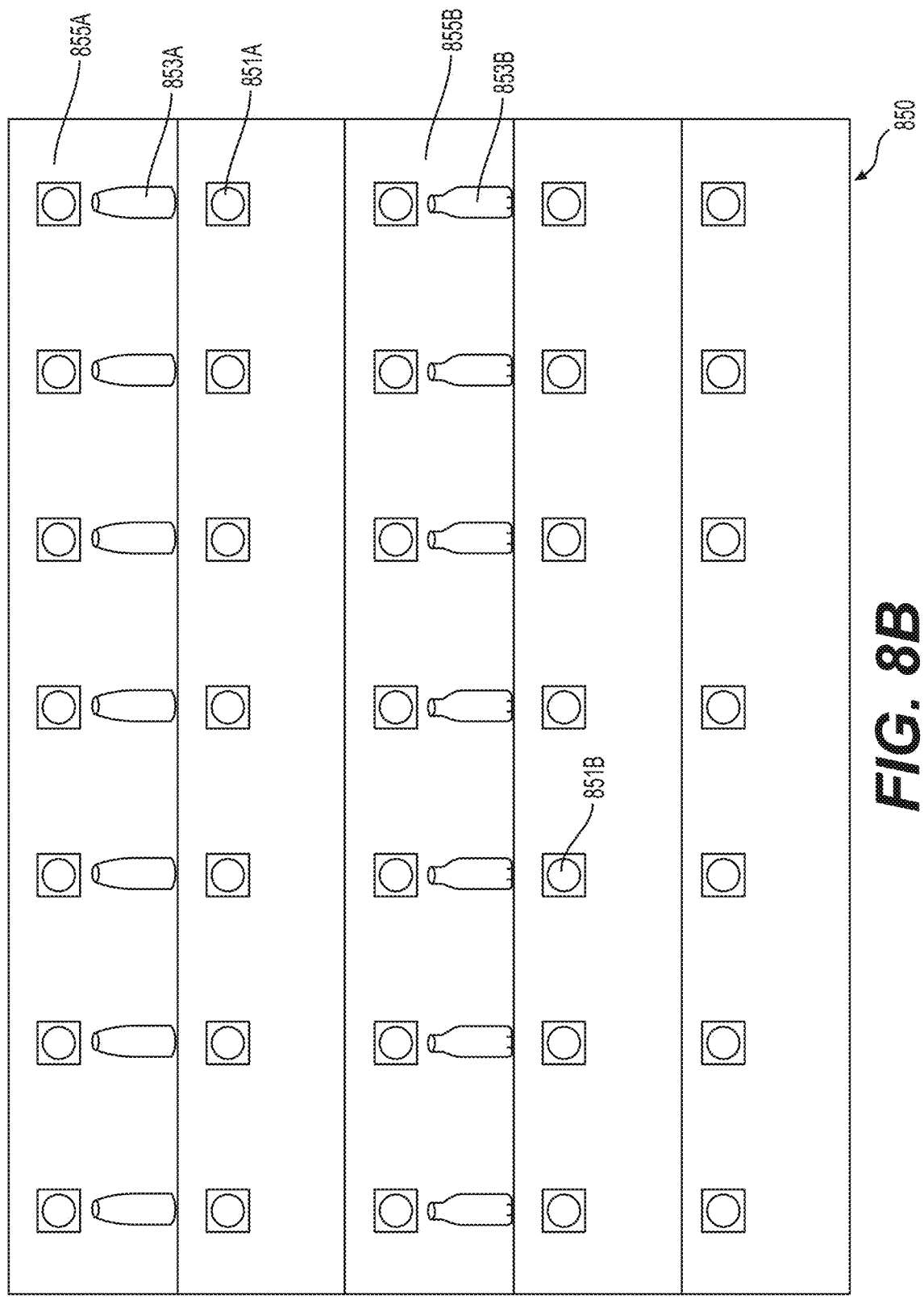

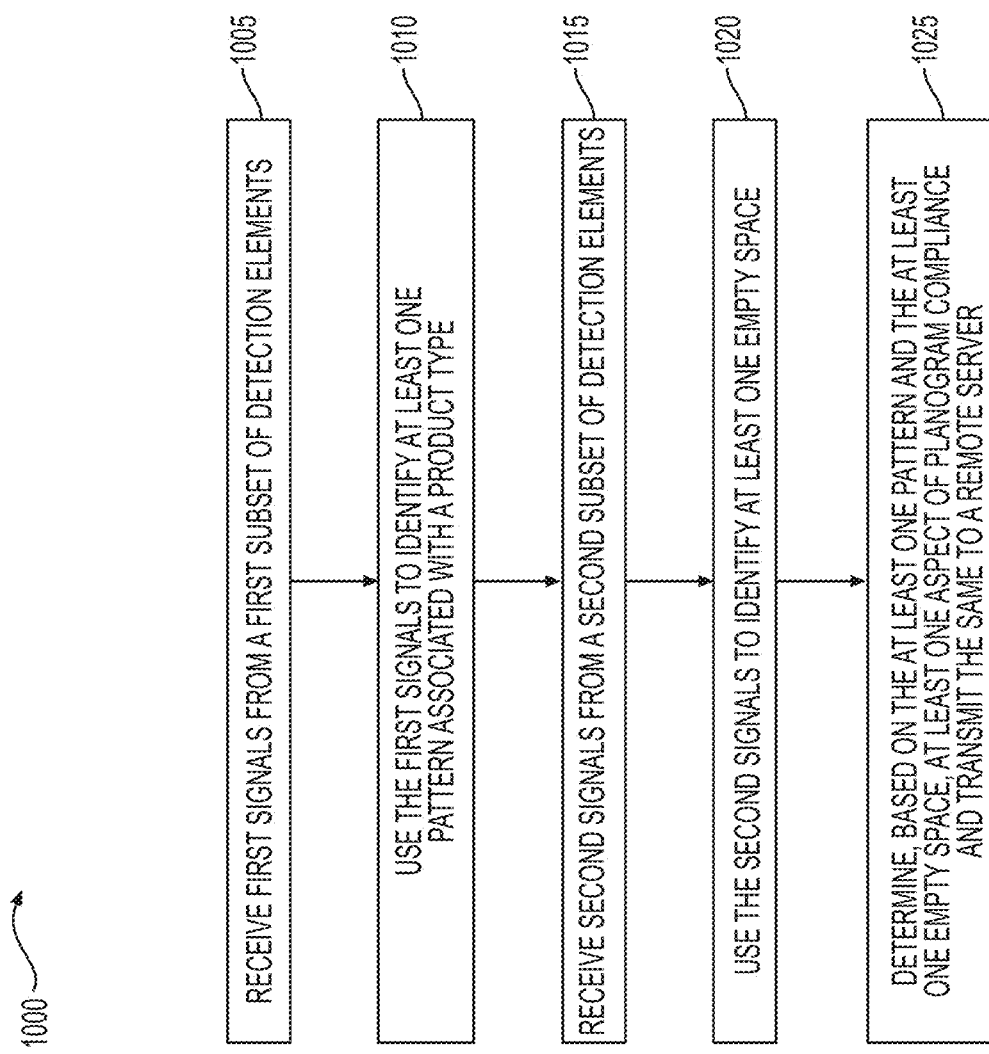

1710

```
RECEIVE AN INDICATION OF AT LEAST ONE STORE SHELF OF A RETAIL
STORE
1711
```

↓

```
CAUSE A FIRST ADJUSTMENT TO A CLEANING ROBOT ROUTE OF A
CLEANING ROBOT WITHIN THE RETAIL STORE BASED ON AT LEAST
ONE LOCATION WITHIN THE RETAIL STORE CORRESPONDING TO THE
AT LEAST ONE STORE SHELF
1712
```

↓

```
RECEIVE, FROM THE IMAGE SENSOR ASSOCIATED WITH THE
CLEANING ROBOT, A FIRST IMAGE ACQUIRED BY THE IMAGE SENSOR
ASSOCIATED WITH THE CLEANING ROBOT
1713
```

↓

```
ANALYZE THE IMAGE TO DETERMINE A NEED FOR A SECOND IMAGE
OF THE AT LEAST ONE PORTION OF THE AT LEAST ONE STORE SHELF
1714
```

↓

```
IN RESPONSE TO THE DETERMINED NEED, CAUSE A SECOND
ADJUSTMENT TO THE CLEANING ROBOT ROUTE WITHIN THE RETAIL
STORE
1715
```

FIG. 17B

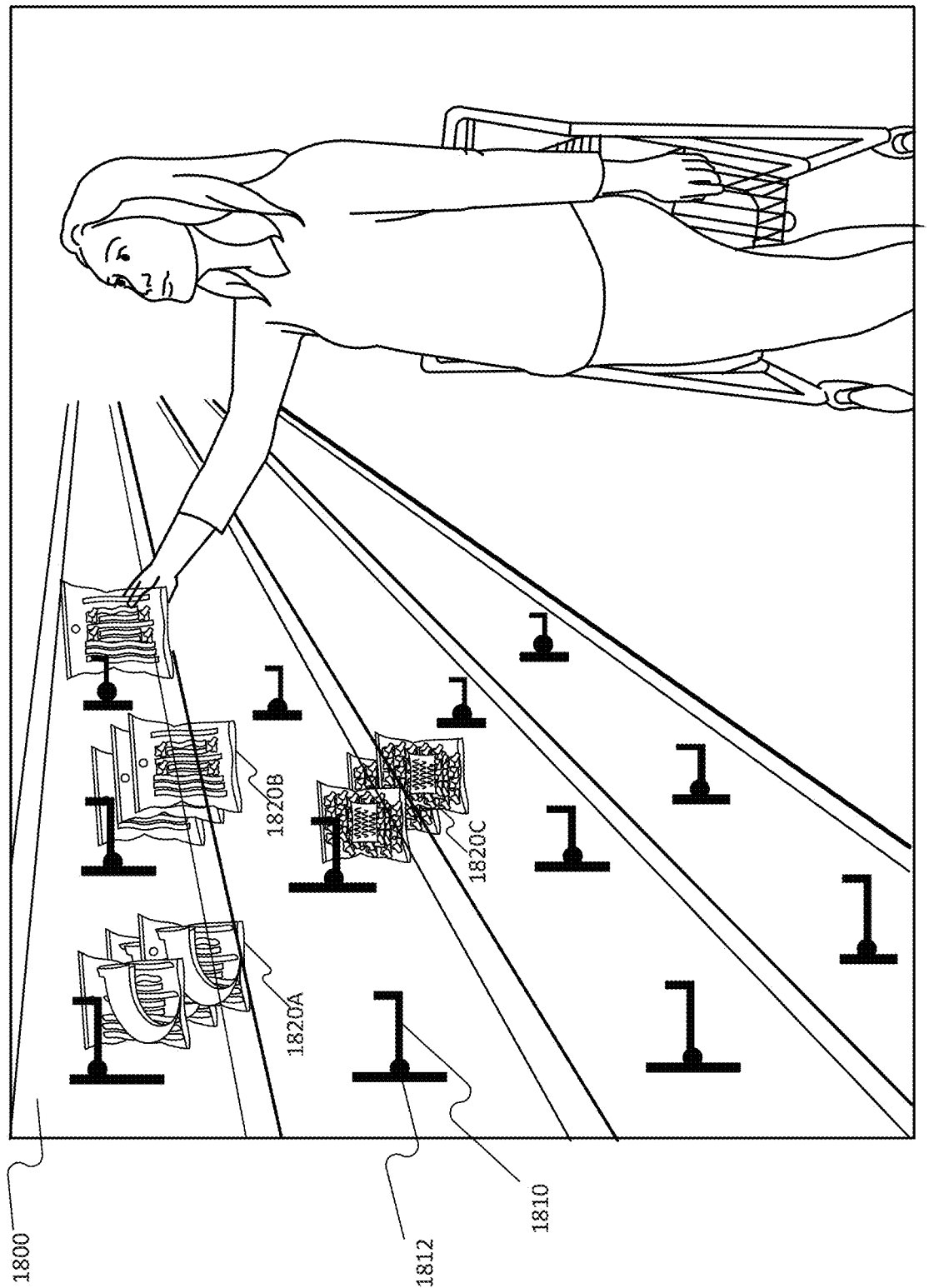

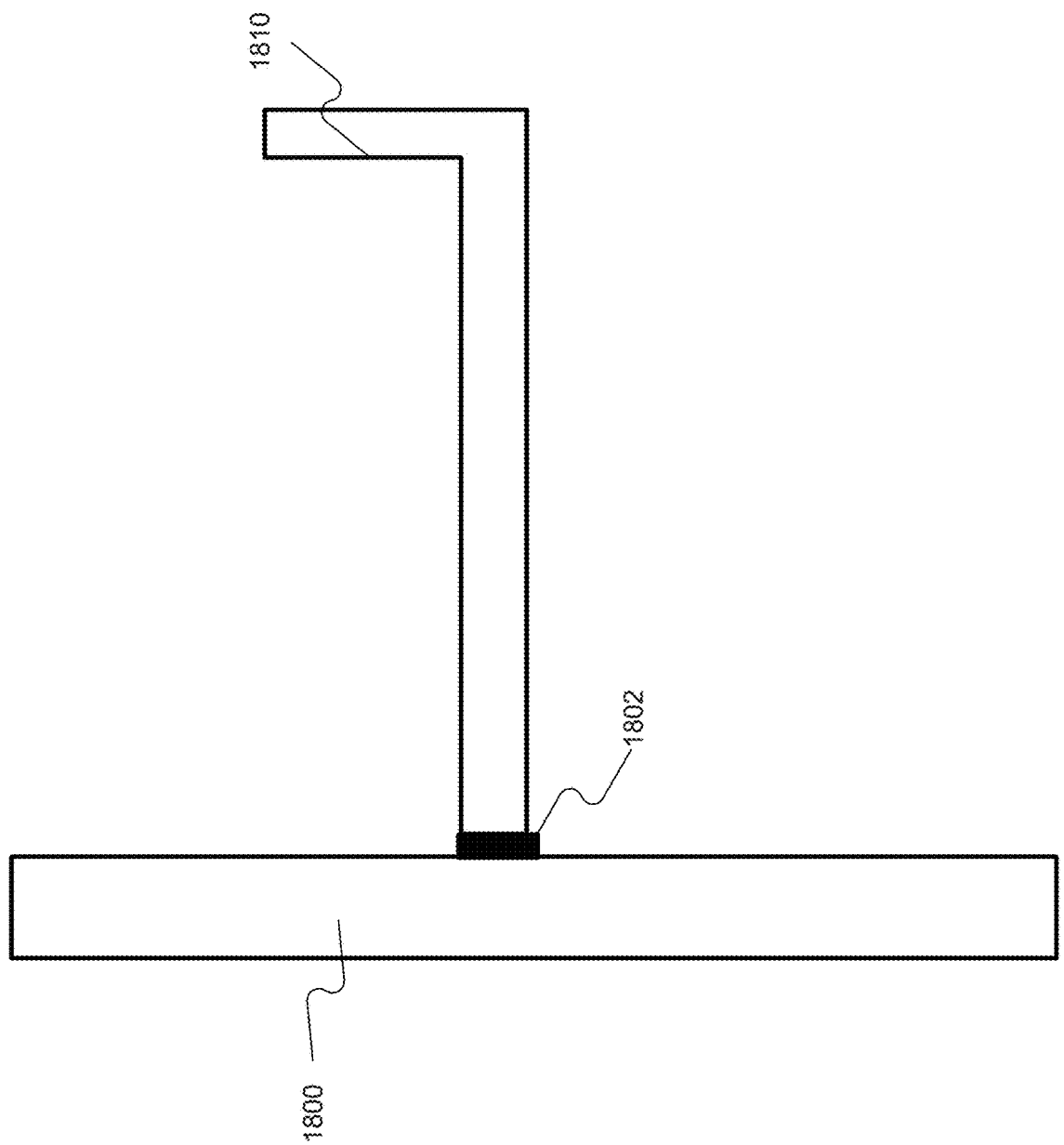

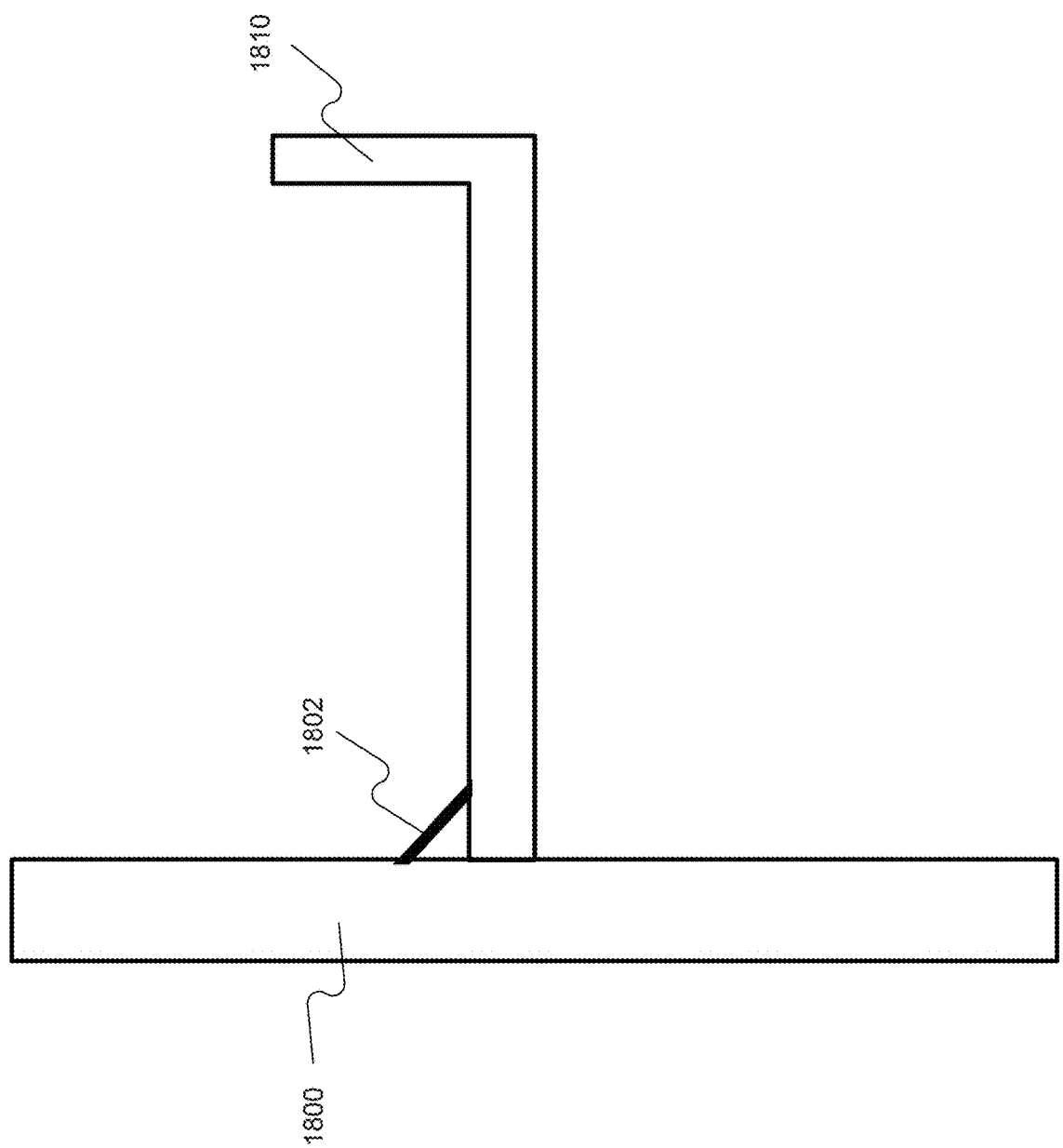

SELECTING AVAILABLE ASSIGNMENTS FOR USERS BASED ON MOBILE COMPUTING DEVICES OF THE USERS

CROSS REFERENCES TO RELATED APPLICATIONS

This application is a continuation of International Application No. PCT/US2021/034885, filed May 28, 2021. International Application No. PCT/US2021/034885 claims the benefit of priority of U.S. Provisional Application No. 63/033,055, filed on Jun. 1, 2020; U.S. Provisional Application No. 63/084,086, filed on Sep. 28, 2020; U.S. Provisional Application No. 63/091,009, filed on Oct. 13, 2020; and U.S. Provisional Application No. 63/113,490, filed on Nov. 13, 2020. The foregoing applications are incorporated herein by reference in their entirety.

BACKGROUND

I. Technical Field

The present disclosure relates generally to systems, methods, and devices for identifying products in retail stores, and more specifically to systems, methods, and devices for capturing, collecting, and automatically analyzing images of products displayed in retail stores for purposes of providing one or more functions associated with the identified products.

II. Background Information

Shopping in stores is a prevalent part of modern daily life. Store owners (also known as "retailers") stock a wide variety of products on store shelves and add associated labels and promotions to the store shelves. Typically, retailers have a set of processes and instructions for organizing products on the store shelves. The source of some of these instructions may include contractual obligations and other preferences related to the retailer methodology for placement of products on the store shelves. Nowadays, many retailers and suppliers send people to stores to personally monitor compliance with the desired product placement. Such a monitoring technique, however, may be inefficient and may result in nonuniform compliance among retailers relative to various product-related guidelines. This technique may also result in significant gaps in compliance, as it does not allow for continuous monitoring of dynamically changing product displays. To increase productivity, among other potential benefits, there is a technological need to provide a dynamic solution that will automatically monitor retail spaces. Such a solution, for example and among other features, may automatically determine whether a disparity exists between a desired product placement and an actual product placement.

The disclosed devices and methods are directed to providing new ways for monitoring retail establishments using image processing and supporting sensors.

SUMMARY

Embodiments consistent with the present disclosure provide systems, methods, and devices for capturing, collecting, and analyzing images of products displayed in retail stores. For example, consistent with the disclosed embodiments, an example system may receive an image depicting a store shelf having products displayed thereon, identify the products on the store shelf, and trigger an alert when disparity exists between the desired product placement and the actual product placement.

Another aspect of the present disclosure is directed to a computer program product for identifying products and monitoring planogram compliance using analysis of image data embodied in a non-transitory computer-readable medium and executable by at least one processor, the computer program product including instructions for causing the at least one processor to execute the method described above.

In an embodiment, a non-transitory computer-readable medium including instructions that when executed by a processor cause the processor to perform a method for planning deployment of image sensors. The method may include determining a location of a store shelf within a retail store and obtaining a first coverage parameter corresponding to a first product type and a second coverage parameter corresponding to a second product type. The method may also include accessing a database to determine a first height of products of the first product type and a second height of products of the second product type. The method may further include determining a position for placing a camera configured to capture images of at least a portion of the store shelf by analyzing the location of the store shelf, the first coverage parameter, the second coverage parameter, the first height, and the second height. The method may also include providing, to a user interface of a user device, information relating to the determined position of the camera.

In an embodiment, a system for planning deployment of image sensors may include at least one processor programmed to determine a location of a store shelf within a retail store. The at least one processor may also programmed to obtain a first coverage parameter corresponding to a first product type and a second coverage parameter corresponding to a second product type. The at least one processor may further programmed to access a database to determine a first height of products of the first product type and a second height of products of the second product type. The at least one processor may also programmed to determine a position for placing a camera configured to capture images of at least a portion of the store shelf by analyzing the location of the store shelf, the first coverage parameter, the second coverage parameter, the first height, and the second height. The at least one processor may further programmed to provide, to a user interface of a user device, information relating to the determined position of the camera.

In an embodiment, a method for planning deployment of image sensors may include determining a location of a store shelf within a retail store. The method may also include obtaining a first coverage parameter corresponding to a first product type and a second coverage parameter corresponding to a second product type. The method may further include accessing a database to determine a first height of products of the first product type and a second height of products of the second product type. The method may also include determining a position for placing a camera configured to capture images of at least a portion of the store shelf by analyzing the location of the store shelf, the first coverage parameter, the second coverage parameter, the first height, and the second height. The method may further include providing, to a user interface of a user device, information relating to the determined position of the camera.

In an embodiment, a non-transitory computer-readable medium including instructions that when executed by a processor cause the processor to perform a method for routing a cleaning robot. The method may include receiving an indication of at least one store shelf of a retail store. The method may also include causing a first adjustment to a cleaning robot route of the cleaning robot within the retail store based on at least one location within the retail store corresponding to the at least one store shelf. The first adjustment may be configured to enable an image sensor associated with the cleaning robot to capture one or more images of at least one portion of the at least one store shelf. The method may further include receiving a first image acquired by the image sensor associated with the cleaning robot. The first image may include a representation of the at least one portion of the at least one store shelf. The method may also include analyzing the first image to determine a need for a second image of the at least one portion of the at least one store shelf. The method may further include causing a second adjustment to the cleaning robot route within the retail store, in response to the determined need. The second adjustment may be configured to enable the image sensor to capture the second image of the at least one portion of the at least one store shelf.

In an embodiment, a system for planning deployment of image sensors may include at least one processor programmed to receive an indication of at least one store shelf of a retail. The at least one processor may also programmed to cause a first adjustment to a cleaning robot route of the cleaning robot within the retail store based on at least one location within the retail store corresponding to the at least one store shelf. The first adjustment may be configured to enable an image sensor associated with the cleaning robot to capture one or more images of at least one portion of the at least one store shelf. The at least one processor may further programmed to receive a first image acquired by the image sensor associated with the cleaning robot. The first image may include a representation of the at least one portion of the at least one store shelf. The at least one processor may also programmed to analyze the first image to determine a need for a second image of the at least one portion of the at least one store shelf. The at least one processor may further programmed to cause a second adjustment to the cleaning robot route within the retail store, in response to the determined need. The second adjustment may be configured to enable the image sensor to capture the second image of the at least one portion of the at least one store shelf.

In an embodiment, a method for routing a cleaning robot may include receiving an indication of at least one store shelf of a retail store. The method may also include causing a first adjustment to a cleaning robot route of the cleaning robot within the retail store based on at least one location within the retail store corresponding to the at least one store shelf. The first adjustment may be configured to enable an image sensor associated with the cleaning robot to capture one or more images of at least one portion of the at least one store shelf. The method may further include receiving a first image acquired by the image sensor associated with the cleaning robot. The first image may include a representation of the at least one portion of the at least one store shelf. The method may also include analyzing the first image to determine a need for a second image of the at least one portion of the at least one store shelf. The method may further include causing a second adjustment to the cleaning robot route within the retail store, in response to the determined need. The second adjustment may be configured to enable the image sensor to capture the second image of the at least one portion of the at least one store shelf.

In an embodiment, a non-transitory computer-readable medium includes instructions that when executed by a processor cause the processor to perform a method for reacting to changes of items hanging on peg-hooks connected to pegboards. The method may include receiving a first indication indicative of a change of items hanging on a first peg-hook connected to a pegboard; receiving a second indication indicative of a change of items hanging on a second peg-hook connected to the pegboard; in response to the first indication, causing an action related to a first product type; and in response to the second indication, causing an action related to a second product type, the second product type differing from the first product type.

In an embodiment, a method for reacting to changes of items hanging on peg-hooks connected to pegboards may include receiving a first indication indicative of a change of items hanging on a first peg-hook connected to a pegboard; receiving a second indication indicative of a change of items hanging on a second peg-hook connected to the pegboard; in response to the first indication, causing an action related to a first product type; and in response to the second indication, causing an action related to a second product type, the second product type differs from the first product type.

In an embodiment, a system for reacting to changes of items hanging on peg-hooks connected to pegboards may include at least one processor programmed to receive a first indication indicative of a change of items hanging on a first peg-hook connected to a pegboard; receive a second indication indicative of a change of items hanging on a second peg-hook connected to the pegboard; in response to the first indication, cause an action related to a first product type; and in response to the second indication, cause an action related to a second product type, the second product type differs from the first product type.

In an embodiment, a non-transitory computer-readable medium includes instructions that when executed by a processor cause the processor to perform a method for identifying products from on-shelf sensor data and image data. The method may include receiving data captured using a plurality of sensors positioned between at least part of a retail shelf and one or more products placed on the at least part of the retail shelf; receiving an image of the at least part of the retail shelf and at least one of the one or more products; and analyzing the captured data and the image to determine a product type of the one or more products.

In an embodiment, a method for identifying products from on-shelf sensor data and image data may include receiving data captured using a plurality of sensors positioned between at least part of a retail shelf and one or more products placed on the at least part of the retail shelf; receiving an image of the at least part of the retail shelf and at least one of the one or more products; and analyzing the captured data and the image to determine a product type of the one or more products.

In an embodiment, a system for identifying products from on-shelf sensor data and image data may include at least one processor programmed to receive data captured using a plurality of sensors positioned between at least part of a retail shelf and one or more products placed on the at least part of the retail shelf; receive an image of the at least part of the retail shelf and at least one of the one or more products; and analyze the captured data and the image to determine a product type of the one or more products.

In an embodiment, a method for providing visual navigation assistance in retail stores may comprise receiving a first indoor location of a user within a retail store; receiving a target destination within the retail store; providing first navigation data to the user through a first visual interface; after providing the first navigation data, receiving a second indoor location of the user within the retail store; determining that the second indoor location is within a selected area around the target destination, the selected area not including the first indoor location; and in response to the determination that the second indoor location is within the selected area around the target destination, providing second navigation data to the user through a second visual interface, the second visual interface differing from the first visual interface.

In an embodiment, a computer program product may identify products and monitoring planogram compliance using analysis of image data embodied in a non-transitory computer-readable medium and executable by at least one processor. The computer program product may include instructions for causing the at least one processor to execute the method described above.

In an embodiment, a method for making gradual adjustments to planograms is disclosed. The method may comprise receiving a first image of at least part of a shelf; analyzing the first image to determine a first placement of products on the at least part of the shelf; based on the determined first placement of products, determining a planned first adjustment to the determined first placement of products on the at least part of the shelf; and based on the planned first adjustment to the determined first placement of products, providing first information, the first information being configured to cause the planned first adjustment to the determined first placement of products. The method may further comprise receiving a second image of the at least part of the shelf captured after the first information was provided; analyzing the second image to determine a second placement of products on the at least part of the shelf; based on the determined second placement of products, determining a planned second adjustment to the determined second placement of products on the at least part of the shelf; and based on the planned second adjustment to the determined second placement of products, providing second information, the second information being configured to cause the planned second adjustment to the determined second placement of products.

In an embodiment, a system for making gradual adjustments to planograms comprise at least one processor. The at least one processor may be programmed to receive a first image of at least part of a shelf; analyze the first image to determine a first placement of products on the at least part of the shelf; based on the determined first placement of products, determine a planned first adjustment to a determined first placement of products on the at least part of the shelf; and based on the planned first adjustment to the determined first placement of products, provide first information, the first information being configured to cause the planned first adjustment to the determined first placement of products. The processor may further be programmed to receive a second image of the at least part of the shelf captured after the first information was provided; analyze the second image to determine a second placement of products on the at least part of the shelf; based on the determined second placement of products, determine a planned second adjustment to the determined second placement of products on the at least part of the shelf; and based on the planned second adjustment to the determined second placement of products, provide second information, the second information being configured to cause the planned second adjustment to the determined second placement of products.

In an embodiment, a method for testing of planograms is disclosed. The method may comprise receiving a first image of at least part of a shelf; analyzing the first image to determine a first placement of products on the at least part of the shelf; based on the first placement of products, determining a planned adjustment to the first placement of products on the at least part of the shelf; and generating first instructions to implement the planned first adjustment. The method may further comprise receiving a second image of the at least part of the shelf captured after the first instructions were generated; analyzing the second image to determine a second placement of products on the at least part of the shelf, the second placement of products resulting from the planned first adjustment; receiving an indication of an impact of the second placement of products; determining a planned second adjustment to the second placement of products on the at least part of the shelf, the planned second adjustment being determined based on the impact; and generating second instructions to implement the planned second adjustment.

In an embodiment, a system for testing of planograms may comprise at least one processor. The at least one processor may be programmed to receive a first image of at least part of a shelf; analyze the first image to determine a first placement of products on the at least part of the shelf; based on the first placement of products, determine a planned first adjustment to the first placement of products on the at least part of the shelf; and generate first instructions to implement the planned first adjustment to the first placement of products. The at least one processor may further be programmed to receive a second image of the at least part of the shelf captured after the first instructions were generated; analyze the second image to determine a second placement of products on the at least part of the shelf, the second placement of products resulting from the planned first adjustment; receive an indication of an impact of the second placement of products; determine a planned second adjustment to the second placement of products on the at least part of the shelf, the planned second adjustment being determined based on the impact; and generate second instructions to implement the planned second adjustment.

In an embodiment, a method for assessing quality of tasks performed by persons in retail stores may comprise receiving an indication that a person completed a task corresponding to at least one shelf in a retail store; receiving at least one image of the at least one shelf captured using an image sensor after the completion of the task; analyzing the at least one image to determine at least one property associated with performing the task; and using the at least one property to determine a reward for performing the task.

In an embodiment, a system for assessing quality of tasks performed by persons in retail stores include at least one processor; and a non-transitory computer-readable medium containing instructions that, when executed by the at least one processor, cause the at least one processor to: receive an indication that a person completed a task corresponding to at least one shelf in a retail store; receive at least one image of the at least one shelf captured using an image sensor after the completion of the task; analyze the at least one image to determine at least one property of associated with performing the task; and use the at least one property to determine a reward for performing the task.

In an embodiment, a computer program product may assess quality of tasks performed by persons in retail stores embodied in a non-transitory computer-readable medium and executable by at least one processor. The computer program product may include instructions for causing the at least one processor to execute the method described above.

In some embodiments, an indication that a person completed a task corresponding to at least one shelf in a retail store may be received, and at least one image of the at least one shelf may be received, the at least one image being captured using an image sensor after the completion of the task. The at least one image may be analyzed to determine at least one property associated with performing the task, and the at least one property may be used to determine a reward for performing the task. For example, the indication that the person completed the task may be based on an input from the person, may be based on an analysis of the at least one image, and so forth. In one example, the at least one property associated with performing the task may include a quality indication of at least one aspect of performing the task, and the determination of the reward may be based on the quality indication. In one example, the at least one image may be at least one image captured by at least one of the person or an image sensor mounted to a shelf. In one example, the at least one image may be analyzed to determine a property of the person, and the determination of the reward may be based on the property of the person. In one example, the task may include at least one of a restocking of a product associated with the at least one shelf, a correction of product facings at the at least one shelf, removing a product from the at least one shelf, changing a price of at least one product, and changing an orientation of at least one product on the at least one shelf In one example, the at least one image may be analyzed to determine at least one additional available task corresponding to the at least one shelf in the retail store, and an indication of the additional available task may be provided to the person. In one example, the at least one image may be analyzed to determine that the person performed a positive action corresponding to the at least one shelf in the retail store (the positive action may not be included in the task), and the determination of the reward may be based on the positive action. In one example, an impact of the performed task may be determined, and the determination of the reward may be based on the impact. In one example, the task may include at least one of positioning or removing a promotional sign at the at least one shelf. In one example, the at least one image may be analyzed to determine at least one aspect lacking in the performance of the task, an indication of the at least one aspect may be provided to the person, at least one additional image of the at least one shelf may be received (the at least one image may be at least one image being captured using the image sensor after the indication of the at least one aspect is provided), and the at least one additional image may be analyzed to determine the reward for performing the task. In one example, the reward may include a monetary reward, and the determination of the reward may include a determination of an amount associated with the monetary reward. In one example, input from at least one pressure sensor positioned on the at least one shelf may be received, and the determination of the at least one property may be based on an analysis of the received input. In one example, input from at least one touch sensor positioned on the at least one shelf may be received, and the determination of the at least one property may be based on an analysis of the received input. In one example, input from at least one weight sensor positioned on the at least one shelf may be received, and the determination of the at least one property may be based on an analysis of the received input. In one example, input from at least one light sensor positioned on the at least one shelf may be received, and the determination of the at least one property may be based on an analysis the received input. In one example, analyzing the at least one image to determine the at least one property may comprise identifying at least one visual indicator in the at least one image (the visual indicator may comprise at least one of: a color, a brightness, a character, and a shape), comparing the at least one visual indicator to a reference visual indicator, and determining a degree of similarity between the identified at least one visual indicator and the reference visual indicator.

In an embodiment, a non-transitory computer-readable medium may include instructions that when executed by a processor cause the processor to perform a method for selecting available assignments for users based on mobile computing devices of the users, the method comprising: receiving an indication of at least one parameter of a mobile computing device associated with a user; accessing a plurality of available assignments, each assignment of the plurality of available assignments involving use of at least one mobile computing device; based on the at least one parameter of the mobile computing device associated with the user, selecting a subset of the plurality of available assignments; and offering the selected subset of the plurality of available assignments to the user.

In an embodiment, a method for selecting available assignments for users based on mobile computing devices of the users may include receiving an indication of at least one parameter of a mobile computing device associated with a user; accessing a plurality of available assignments, each assignment of the plurality of available assignments involving use of at least one mobile computing device; based on the at least one parameter of the mobile computing device associated with the user, selecting a subset of the plurality of available assignments; and offering the selected subset of the plurality of available assignments to the user.

In an embodiment, a system for selecting available assignments for users based on mobile computing devices of the users may include at least one processor programmed to: receive an indication of at least one parameter of a mobile computing device associated with a user; access a plurality of available assignments, each assignment of the plurality of available assignments involving use of at least one mobile computing device; based on the at least one parameter of the mobile computing device associated with the user, select a subset of the plurality of available assignments; and offer the selected subset of the plurality of available assignments to the user.

In an embodiment, a non-transitory computer-readable medium may include instructions that when executed by a processor cause the processor to perform a method for selecting available assignments, the method comprising: receiving an indication of an external assignment, wherein the external assignment is associated with one or more locations external to a plurality of retail stores; based on the indication of the external assignment, selecting a retail store among the plurality of retail stores; based on the selected retail store, selecting at least one available assignment in the selected retail store; and offering the selected at least one available assignment in the selected retail store to a user.

In an embodiment, a method for selecting available assignments may include receiving an indication of an external assignment, wherein the external assignment is associated with one or more locations external to a plurality of retail stores; based on the indication of the external assignment, selecting a retail store among the plurality of retail stores; based on the selected retail store, selecting at least one available assignment in the selected retail store; and offering the selected at least one available assignment in the selected retail store to a user.

In an embodiment, a system for selecting available assignments in retail stores for users based on external assignments may include: at least one processor programmed to: receive an indication of an external assignment, wherein the external assignment is associated with one or more locations external to a plurality of retail stores; based on the indication of the external assignment, select a retail store among the plurality of retail stores; based on the selected retail store, select at least one available assignment in the selected retail store; and offering the selected at least one available assignment in the selected retail store to a user.

Consistent with other disclosed embodiments, non-transitory computer-readable storage media may store program instructions, which are executed by at least one processing device and perform any of the methods described herein.

The foregoing general description and the following detailed description are exemplary and explanatory only and are not restrictive of the claims.

BRIEF DESCRIPTION OF THE DRAWINGS

The accompanying drawings, which are incorporated in and constitute a part of this disclosure, illustrate various disclosed embodiments. In the drawings:

FIG. 4A is a schematic illustration of an example configuration for capturing image data in a retail store, consistent with the present disclosure.

FIG. 5A is an illustration of an example system for acquiring images of products in a retail store, consistent with the present disclosure.

FIG. 5B is an illustration of a shelf-mounted camera unit included in a first housing of the example system of FIG. 5A, consistent with the present disclosure.

FIG. 5C is an exploded view illustration of a processing unit included in a second housing of the example system of FIG. 5A, consistent with the present disclosure.

FIG. 8B is a schematic illustration of another example configuration for detecting products and empty spaces on a store shelf, consistent with the present disclosure.

FIG. 10A illustrates an exemplary method for monitoring planogram compliance on a store shelf, consistent with the present disclosure.

FIG. 17B provides an exemplary process for navigating a cleaning robot, consistent with the present disclosure.

FIG. 18A is an illustration of an example pegboard having a plurality of peg-hooks for hanging items, consistent with the present disclosure.

FIG. 18D is an illustration of another example sensor for sensing items hanging on a peg-hook, consistent with the present disclosure.

FIG. 18E is an illustration of another example sensor for sensing items hanging on a peg-hook, consistent with the present disclosure.

DETAILED DESCRIPTION

Figure 1:
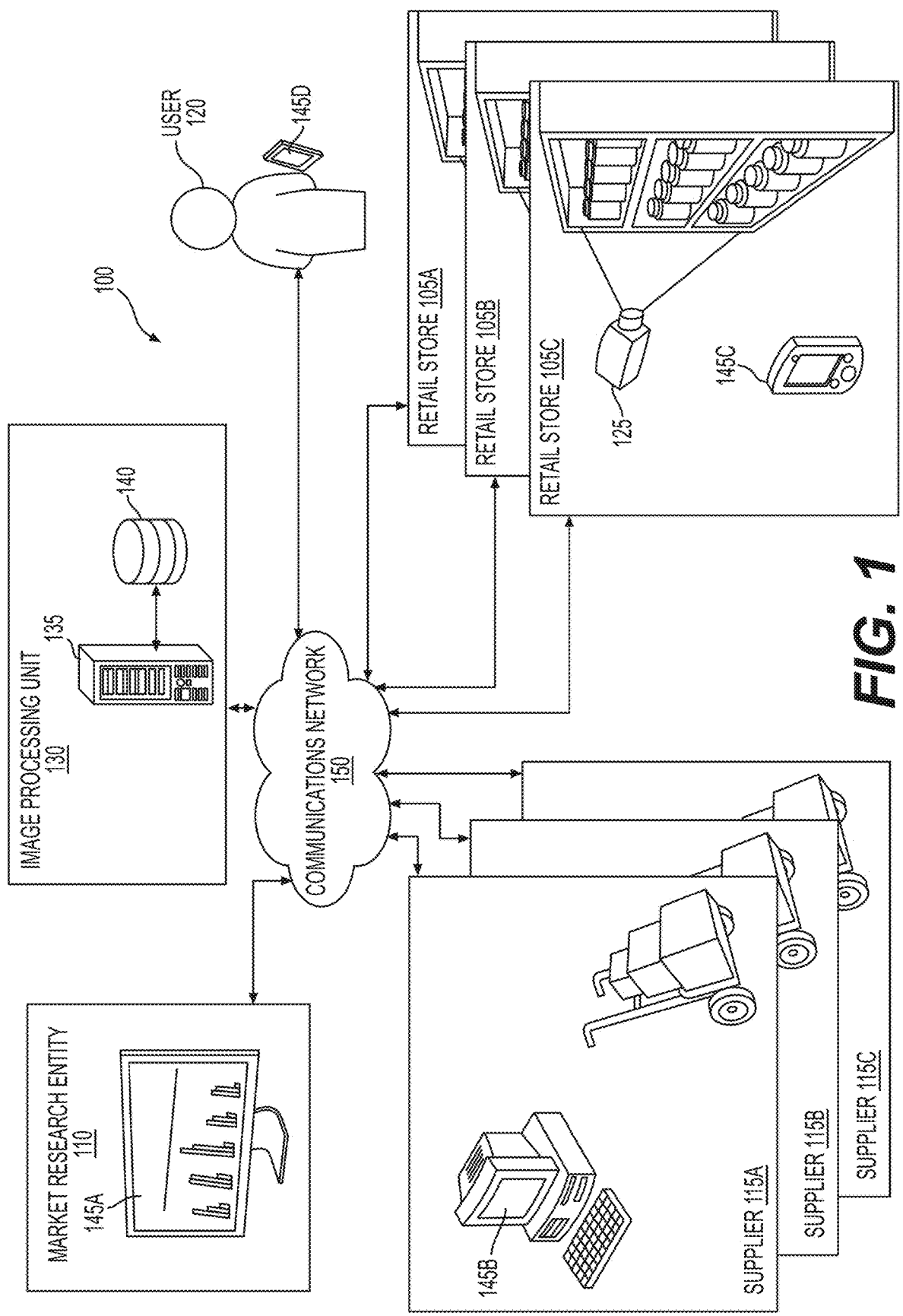
FIG. 1 is an illustration of an exemplary system for analyzing information collected from a retail store.

The following detailed description refers to the accompanying drawings. Wherever possible, the same reference numbers are used in the drawings and the following description to refer to the same or similar parts. While several illustrative embodiments are described herein, modifications, adaptations and other implementations are possible. For example, substitutions, additions, or modifications may be made to the components illustrated in the drawings, and the illustrative methods described herein may be modified by substituting, reordering, removing, or adding steps to the disclosed methods. Accordingly, the following detailed description is not limited to the disclosed embodiments and examples. Instead, the proper scope is defined by the appended claims.

The present disclosure is directed to systems and methods for processing images captured in a retail store. As used herein, the term "retail store" or simply "store" refers to an establishment offering products for sale by direct selection by customers physically or virtually shopping within the establishment. The retail store may be an establishment operated by a single retailer (e.g., supermarket) or an establishment that includes stores operated by multiple retailers (e.g., a shopping mall). Embodiments of the present disclosure include receiving an image depicting a store shelf having at least one product displayed thereon. As used herein, the term "store shelf" or simply "shelf" refers to any suitable physical structure which may be used for displaying products in a retail environment. In one embodiment the store shelf may be part of a shelving unit including a number of individual store shelves. In another embodiment, the store shelf may include a display unit having a single-level or multi-level surfaces.

Consistent with the present disclosure, the system may process images and image data acquired by a capturing device to determine information associated with products displayed in the retail store. The term "capturing device" refers to any device configured to acquire image data representative of products displayed in the retail store. Examples of capturing devices may include a digital camera, a time-of-flight camera, a stereo camera, an active stereo camera, a depth camera, a Lidar system, a laser scanner, CCD based devices, or any other sensor based system capable of converting received light into electric signals. The term "image data" refers to any form of data generated based on optical signals in the near-infrared, infrared, visible, and ultraviolet spectrums (or any other suitable radiation frequency range). Consistent with the present disclosure, the image data may include pixel data streams, digital images, digital video streams, data derived from captured images, and data that may be used to construct a 3D image. The image data acquired by a capturing device may be transmitted by wired or wireless transmission to a remote server. In one embodiment, the capturing device may include a stationary camera with communication layers (e.g., a dedicated camera fixed to a store shelf, a security camera, etc.). Such an embodiment is described in greater detail below with reference to FIG. 4A. In another embodiment, the capturing device may include a handheld device (e.g., a smartphone, a tablet, a mobile station, a personal digital assistant, a laptop, and more) or a wearable device (e.g., smart glasses, a smartwatch, a clip-on camera). Such an embodiment is described in greater detail below with reference to FIG. 4B. In another embodiment, the capturing device may include a robotic device with one or more cameras operated remotely or autonomously (e.g., an autonomous robotic device, a drone, a robot on a track, and more). Such an embodiment is described in greater detail below with reference to FIG. 4C.

In some embodiments, the capturing device may include one or more image sensors. The term "image sensor" refers to a device capable of detecting and converting optical signals in the near-infrared, infrared, visible, and ultraviolet spectrums into electrical signals. The electrical signals may be used to form image data (e.g., an image or a video stream) based on the detected signal. Examples of image sensors may include semiconductor charge-coupled devices (CCD), active pixel sensors in complementary metal-oxide-semiconductor (CMOS), or N-type metal-oxide-semiconductors (NMOS, Live MOS). In some cases, the image sensor may be part of a camera included in the capturing device.

Embodiments of the present disclosure further include analyzing images to detect and identify different products. As used herein, the term "detecting a product" may broadly refer to determining an existence of the product. For example, the system may determine the existence of a plurality of distinct products displayed on a store shelf. By detecting the plurality of products, the system may acquire different details relative to the plurality of products (e.g., how many products on a store shelf are associated with a same product type), but it does not necessarily gain knowledge of the type of product. In contrast, the term "identifying a product" may refer to determining a unique identifier associated with a specific type of product that allows inventory managers to uniquely refer to each product type in a product catalogue. Additionally or alternatively, the term "identifying a product" may refer to determining a unique identifier associated with a specific brand of products that allows inventory managers to uniquely refer to products, e.g., based on a specific brand in a product catalogue. Additionally or alternatively, the term "identifying a product" may refer to determining a unique identifier associated with a specific category of products that allows inventory managers to uniquely refer to products, e.g., based on a specific category in a product catalogue. In some embodiments, the identification may be made based at least in part on visual characteristics of the product (e.g., size, shape, logo, text, color, etc.). The unique identifier may include any codes that may be used to search a catalog, such as a series of digits, letters, symbols, or any combinations of digits, letters, and symbols. Consistent with the present disclosure, the terms "determining a type of a product" and "determining a product type" may also be used interchangeably in this disclosure with reference to the term "identifying a product."

Embodiments of the present disclosure further include determining at least one characteristic of the product for determining the type of the product. As used herein, the term "characteristic of the product" refers to one or more visually discernable features attributed to the product. Consistent with the present disclosure, the characteristic of the product may assist in classifying and identifying the product. For example, the characteristic of the product may be associated with the ornamental design of the product, the size of the product, the shape of the product, the colors of the product, the brand of the product, a logo or text associated with the product (e.g., on a product label), and more. In addition, embodiments of the present disclosure further include determining a confidence level associated with the determined type of the product. The term "confidence level" refers to any indication, numeric or otherwise, of a level (e.g., within a predetermined range) indicative of an amount of confidence the system has that the determined type of the product is the actual type of the product. For example, the confidence level may have a value between 1 and 10, alternatively, the confidence level may be expressed as a percentage.

In some cases, the system may compare the confidence level to a threshold. The term "threshold" as used herein denotes a reference value, a level, a point, or a range of values, for which, when the confidence level is above it (or below it depending on a particular use case), the system may follow a first course of action and, when the confidence level is below it (or above it depending on a particular use case), the system may follow a second course of action. The value of the threshold may be predetermined for each type of product or may be dynamically selected based on different considerations. In one embodiment, when the confidence level associated with a certain product is below a threshold, the system may obtain contextual information to increase the confidence level. As used herein, the term "contextual information" (or "context") refers to any information having a direct or indirect relationship with a product displayed on a store shelf. In some embodiments, the system may retrieve different types of contextual information from captured image data and/or from other data sources. In some cases, contextual information may include recognized types of products adjacent to the product under examination. In other cases, contextual information may include text appearing on the product, especially where that text may be recognized (e.g., via OCR) and associated with a particular meaning. Other examples of types of contextual information may include logos appearing on the product, a location of the product in the retail store, a brand name of the product, a price of the product, product information collected from multiple retail stores, product information retrieved from a catalog associated with a retail store, etc.

Reference is now made to FIG. 1, which shows an example of a system 100 for analyzing information collected from retail stores 105 (for example, retail store 105A, retail store 105B, and retail store 105C). In one embodiment, system 100 may represent a computer-based system that may include computer system components, desktop computers, workstations, tablets, handheld computing devices, memory devices, and/or internal network(s) connecting the components. System 100 may include or be connected to various network computing resources (e.g., servers, routers, switches, network connections, storage devices, etc.) necessary to support the services provided by system 100. In one embodiment, system 100 may enable identification of products in retail stores 105 based on analysis of captured images. In another embodiment, system 100 may enable a supply of information based on analysis of captured images to a market research entity 110 and to different suppliers 115 of the identified products in retail stores 105 (for example, supplier 115A, supplier 115B, and supplier 115C). In another embodiment, system 100 may communicate with a user 120 (sometimes referred to herein as a customer, but which may include individuals associated with a retail environment other than customers, such as store associates, data collection agent, etc.) about different products in retail stores 105. In one example, system 100 may receive images of products captured by user 120. In another example, system 100 may provide to user 120 information determined based on automatic machine analysis of images captured by one or more capturing devices 125 associated with retail stores 105.

System 100 may also include an image processing unit 130 to execute the analysis of images captured by the one or more capturing devices 125. Image processing unit 130 may include a server 135 operatively connected to a database 140. Image processing unit 130 may include one or more servers connected by a communication network, a cloud platform, and so forth. Consistent with the present disclosure, image processing unit 130 may receive raw or processed data from capturing device 125 via respective communication links, and provide information to different system components using a network 150. Specifically, image processing unit 130 may use any suitable image analysis technique including, for example, object recognition, object detection, image segmentation, feature extraction, optical character recognition (OCR), object-based image analysis, shape region techniques, edge detection techniques, pixel-based detection, artificial neural networks, convolutional neural networks, etc. In addition, image processing unit 130 may use classification algorithms to distinguish between the different products in the retail store. In some embodiments, image processing unit 130 may utilize suitably trained machine learning algorithms and models to perform the product identification. Network 150 may facilitate communications and data exchange between different system components when these components are coupled to network 150 to enable output of data derived from the images captured by the one or more capturing devices 125. In some examples, the types of outputs that image processing unit 130 may generate may include identification of products, indicators of product quantity, indicators of planogram compliance, indicators of service-improvement events (e.g., a cleaning event, a restocking event, a rearrangement event, etc.), and various reports indicative of the performances of retail stores 105. Additional examples of the different outputs enabled by image processing unit 130 are described below with reference to FIGS. 11A-11E and throughout the disclosure.

Consistent with the present disclosure, network 150 may be any type of network (including infrastructure) that provides communications, exchanges information, and/or facilitates the exchange of information between the components of system 100. For example, network 150 may include or be part of the Internet, a Local Area Network, wireless network (e.g., a Wi-Fi/302.11 network), or other suitable connections. In other embodiments, one or more components of system 100 may communicate directly through dedicated communication links, such as, for example, a telephone network, an extranet, an intranet, the Internet, satellite communications, off-line communications, wireless communications, transponder communications, a local area network (LAN), a wide area network (WAN), a virtual private network (VPN), and so forth.

In one example configuration, server 135 may be a cloud server that processes images received directly (or indirectly) from one or more capturing device 125 and processes the images to detect and/or identify at least some of the plurality of products in the image based on visual characteristics of the plurality of products. The term "cloud server" refers to a computer platform that provides services via a network, such as the Internet. In this example configuration, server 135 may use virtual machines that may not correspond to individual hardware. For example, computational and/or storage capabilities may be implemented by allocating appropriate portions of desirable computation/storage power from a scalable repository, such as a data center or a distributed computing environment. In one example, server 135 may implement the methods described herein using customized hard-wired logic, one or more Application Specific Integrated Circuits (ASICs) or Field Programmable Gate Arrays (FPGAs), firmware, and/or program logic which, in combination with the computer system, cause server 135 to be a special-purpose machine.

In another example configuration, server 135 may be part of a system associated with a retail store that communicates with capturing device 125 using a wireless local area network (WLAN) and may provide similar functionality as a cloud server. In this example configuration, server 135 may communicate with an associated cloud server (not shown) and cloud database (not shown). The communications between the store server and the cloud server may be used in a quality enforcement process, for upgrading the recognition engine and the software from time to time, for extracting information from the store level to other data users, and so forth. Consistent with another embodiment, the communications between the store server and the cloud server may be discontinuous (purposely or unintentional) and the store server may be configured to operate independently from the cloud server. For example, the store server may be configured to generate a record indicative of changes in product placement that occurred when there was a limited connection (or no connection) between the store server and the cloud server, and to forward the record to the cloud server once connection is reestablished.

As depicted in FIG. 1, server 135 may be coupled to one or more physical or virtual storage devices such as database 140. Server 135 may access database 140 to detect and/or identify products. The detection may occur through analysis of features in the image using an algorithm and stored data. The identification may occur through analysis of product features in the image according to stored product models. Consistent with the present embodiment, the term "product model" refers to any type of algorithm or stored product data that a processor may access or execute to enable the identification of a particular product associated with the product model. For example, the product model may include a description of visual and contextual properties of the particular product (e.g., the shape, the size, the colors, the texture, the brand name, the price, the logo, text appearing on the particular product, the shelf associated with the particular product, adjacent products in a planogram, the location within the retail store, etc.). In some embodiments, a single product model may be used by server 135 to identify more than one type of products, such as, when two or more product models are used in combination to enable identification of a product. For example, in some cases, a first product model may be used by server 135 to identify a product category (such models may apply to multiple product types, e.g., shampoo, soft drinks, etc.), and a second product model may be used by server 135 to identify the product type, product identity, or other characteristics associated with a product. In some cases, such product models may be applied together (e.g., in series, in parallel, in a cascade fashion, in a decision tree fashion, etc.) to reach a product identification. In other embodiments, a single product model may be used by server 135 to identify a particular product type (e.g., 6-pack of 16 oz Coca-Cola Zero).

Database 140 may be included on a volatile or non-volatile, magnetic, semiconductor, tape, optical, removable, non-removable, or other type of storage device or tangible or non-transitory computer-readable medium. Database 140 may also be part of server 135 or separate from server 135. When database 140 is not part of server 135, server 135 may exchange data with database 140 via a communication link. Database 140 may include one or more memory devices that store data and instructions used to perform one or more features of the disclosed embodiments. In one embodiment, database 140 may include any suitable databases, ranging from small databases hosted on a work station to large databases distributed among data centers. Database 140 may also include any combination of one or more databases controlled by memory controller devices (e.g., server(s), etc.) or software. For example, database 140 may include document management systems, Microsoft SQL databases, SharePoint databases, Oracle™ databases, Sybase™ databases, other relational databases, or non-relational databases, such as mongo and others.

Consistent with the present disclosure, image processing unit 130 may communicate with output devices 145 to present information derived based on processing of image data acquired by capturing devices 125. The term "output device" is intended to include all possible types of devices capable of outputting information from server 135 to users or other computer systems (e.g., a display screen, a speaker, a desktop computer, a laptop computer, mobile device, tablet, a PDA, etc.), such as 145A, 145B, 145C and 145D. In one embodiment each of the different system components (i.e., retail stores 105, market research entity 110, suppliers 115, and users 120) may be associated with an output device 145, and each system component may be configured to present different information on the output device 145. In one example, server 135 may analyze acquired images including representations of shelf spaces. Based on this analysis, server 135 may compare shelf spaces associated with different products, and output device 145A may present market research entity 110 with information about the shelf spaces associated with different products. The shelf spaces may also be compared with sales data, expired products data, and more. Consistent with the present disclosure, market research entity 110 may be a part of (or may work with) supplier 115. In another example, server 135 may determine product compliance to a predetermined planogram, and output device 145B may present to supplier 115 information about the level of product compliance at one or more retail stores 105 (for example in a specific retail store 105, in a group of retail stores 105 associated with supplier 115, in all retail stores 105, and so forth). The predetermined planogram may be associated with contractual obligations and/or other preferences related to the retailer methodology for placement of products on the store shelves. In another example, server 135 may determine that a specific store shelf has a type of fault in the product placement, and output device 145C may present to a manager of retail store 105 a user-notification that may include information about a correct display location of a misplaced product, information about a store shelf associated with the misplaced product, information about a type of the misplaced product, and/or a visual depiction of the misplaced product. In another example, server 135 may identify which products are available on the shelf and output device 145D may present to user 120 an updated list of products.

The components and arrangements shown in FIG. 1 are not intended to limit the disclosed embodiments, as the system components used to implement the disclosed processes and features may vary. In one embodiment, system 100 may include multiple servers 135, and each server 135 may host a certain type of service. For example, a first server may process images received from capturing devices 125 to identify at least some of the plurality of products in the image, and a second server may determine from the identified products in retail stores 105 compliance with contractual obligations between retail stores 105 and suppliers 115. In another embodiment, system 100 may include multiple servers 135, a first type of servers 135 that may process information from specific capturing devices 125 (e.g., handheld devices of data collection agents) or from specific retail stores 105 (e.g., a server dedicated to a specific retail store 105 may be placed in or near the store). System 100 may further include a second type of servers 135 that collect and process information from the first type of servers 135.

Figure 2:
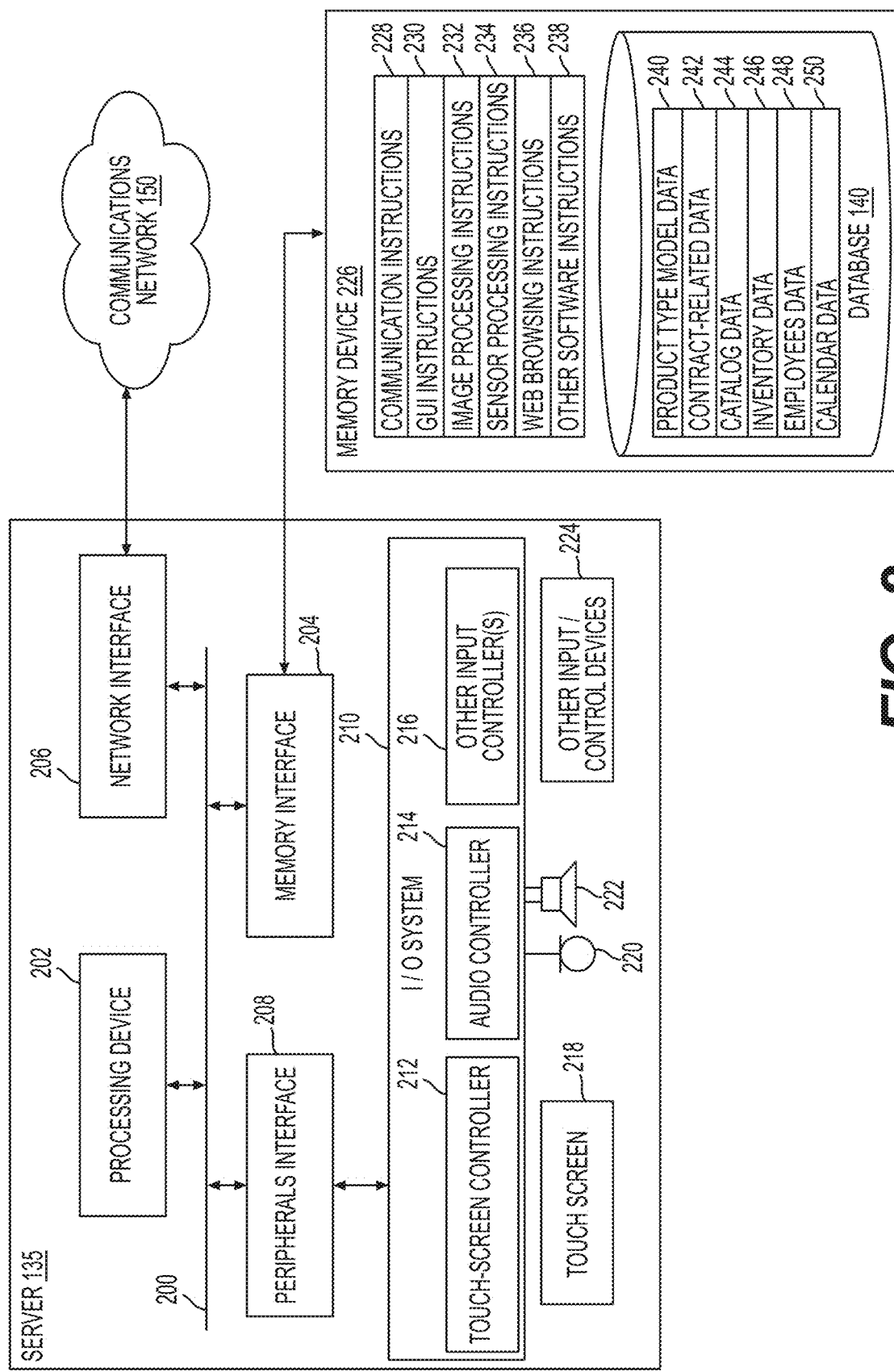
FIG. 2 is a block diagram that illustrates some of the components of an image processing system, consistent with the present disclosure.

FIG. 2 is a block diagram representative of an example configuration of server 135. In one embodiment, server 135 may include a bus 200 (or any other communication mechanism) that interconnects subsystems and components for transferring information within server 135. For example, bus 200 may interconnect a processing device 202, a memory interface 204, a network interface 206, and a peripherals interface 208 connected to an I/O system 210.

Processing device 202, shown in FIG. 2, may include at least one processor configured to execute computer programs, applications, methods, processes, or other software to execute particular instructions associated with embodiments described in the present disclosure. The term "processing device" refers to any physical device having an electric circuit that performs a logic operation. For example, processing device 202 may include one or more processors, integrated circuits, microchips, microcontrollers, microprocessors, all or part of a central processing unit (CPU), graphics processing unit (GPU), digital signal processor (DSP), field programmable gate array (FPGA), or other circuits suitable for executing instructions or performing logic operations. Processing device 202 may include at least one processor configured to perform functions of the disclosed methods such as a microprocessor manufactured by Intel™, Nvidia™, manufactured by AMD™, and so forth. Processing device 202 may include a single core or multiple core processors executing parallel processes simultaneously. In one example, processing device 202 may be a single core processor configured with virtual processing technologies. Processing device 202 may implement virtual machine technologies or other technologies to provide the ability to execute, control, run, manipulate, store, etc., multiple software processes, applications, programs, etc. In another example, processing device 202 may include a multiple-core processor arrangement (e.g., dual, quad core, etc.) configured to provide parallel processing functionalities to allow a device associated with processing device 202 to execute multiple processes simultaneously. It is appreciated that other types of processor arrangements could be implemented to provide the capabilities disclosed herein.

Consistent with the present disclosure, the methods and processes disclosed herein may be performed by server 135 as a result of processing device 202 executing one or more sequences of one or more instructions contained in a non-transitory computer-readable storage medium. As used herein, a non-transitory computer-readable storage medium refers to any type of physical memory on which information or data readable by at least one processor may be stored. Examples include random access memory (RAM), read-only memory (ROM), volatile memory, nonvolatile memory, hard drives, CD ROMs, DVDs, flash drives, disks, any other optical data storage medium, any physical medium with patterns of holes, a RAM, a PROM, an EPROM, a FLASH-EPROM or any other flash memory, NVRAM, a cache, a register, any other memory chip or cartridge, and networked versions of the same. The terms "memory" and "computer-readable storage medium" may refer to multiple structures, such as a plurality of memories or computer-readable storage mediums located within server 135, or at a remote location. Additionally, one or more computer-readable storage mediums may be utilized in implementing a computer-implemented method. The term "computer-readable storage medium" should be understood to include tangible items and exclude carrier waves and transient signals.

According to one embodiment, server 135 may include network interface 206 (which may also be any communications interface) coupled to bus 200. Network interface 206 may provide one-way or two-way data communication to a local network, such as network 150. Network interface 206 may include an integrated services digital network (ISDN) card, cable modem, satellite modem, or a modem to provide a data communication connection to a corresponding type of telephone line. As another example, network interface 206 may include a local area network (LAN) card to provide a data communication connection to a compatible LAN. In another embodiment, network interface 206 may include an Ethernet port connected to radio frequency receivers and transmitters and/or optical (e.g., infrared) receivers and transmitters. The specific design and implementation of network interface 206 depends on the communications network(s) over which server 135 is intended to operate. As described above, server 135 may be a cloud server or a local server associated with retail store 105. In any such implementation, network interface 206 may be configured to send and receive electrical, electromagnetic, or optical signals, through wires or wirelessly, that may carry analog or digital data streams representing various types of information. In another example, the implementation of network interface 206 may be similar or identical to the implementation described below for network interface 306.

Server 135 may also include peripherals interface 208 coupled to bus 200. Peripherals interface 208 may be connected to sensors, devices, and subsystems to facilitate multiple functionalities. In one embodiment, peripherals interface 208 may be connected to I/O system 210 configured to receive signals or input from devices and provide signals or output to one or more devices that allow data to be received and/or transmitted by server 135. In one embodiment I/O system 210 may include or be associated with output device 145. For example, I/O system 210 may include a touch screen controller 212, an audio controller 214, and/or other input controller(s) 216. Touch screen controller 212 may be coupled to a touch screen 218. Touch screen 218 and touch screen controller 212 can, for example, detect contact, movement, or break thereof using any of a plurality of touch sensitivity technologies, including but not limited to capacitive, resistive, infrared, and surface acoustic wave technologies as well as other proximity sensor arrays or other elements for determining one or more points of contact with touch screen 218. Touch screen 218 may also, for example, be used to implement virtual or soft buttons and/or a keyboard. In addition to or instead of touch screen 218, I/O system 210 may include a display screen (e.g., CRT, LCD, etc.), virtual reality device, augmented reality device, and so forth. Specifically, touch screen controller 212 (or display screen controller) and touch screen 218 (or any of the alternatives mentioned above) may facilitate visual output from server 135. Audio controller 214 may be coupled to a microphone 220 and a speaker 222 to facilitate voice-enabled functions, such as voice recognition, voice replication, digital recording, and telephony functions. Specifically, audio controller 214 and speaker 222 may facilitate audio output from server 135. The other input controller(s) 216 may be coupled to other input/control devices 224, such as one or more buttons, keyboards, rocker switches, thumb-wheel, infrared port, USB port, image sensors, motion sensors, depth sensors, and/or a pointer device such as a computer mouse or a stylus.

In some embodiments, processing device 202 may use memory interface 204 to access data and a software product stored on a memory device 226. Memory device 226 may include operating system programs for server 135 that perform operating system functions when executed by the processing device. By way of example, the operating system programs may include Microsoft Windows™, Unix™ Linux™, Apple™ operating systems, personal digital assistant (PDA) type operating systems such as Apple iOS, Google Android, Blackberry OS, or other types of operating systems.

Memory device 226 may also store communication instructions 228 to facilitate communicating with one or more additional devices (e.g., capturing device 125), one or more computers (e.g., output devices 145A-145D) and/or one or more servers. Memory device 226 may include graphical user interface instructions 230 to facilitate graphic user interface processing; image processing instructions 232 to facilitate image data processing-related processes and functions; sensor processing instructions 234 to facilitate sensor-related processing and functions; web browsing instructions 236 to facilitate web browsing-related processes and functions; and other software instructions 238 to facilitate other processes and functions. Each of the above identified instructions and applications may correspond to a set of instructions for performing one or more functions described above. These instructions need not be implemented as separate software programs, procedures, or modules. Memory device 226 may include additional instructions or fewer instructions. Furthermore, various functions of server 135 may be implemented in hardware and/or in software, including in one or more signal processing and/or application specific integrated circuits. For example, server 135 may execute an image processing algorithm to identify in received images one or more products and/or obstacles, such as shopping carts, people, and more.

In one embodiment, memory device 226 may store database 140. Database 140 may include product type model data 240 (e.g., an image representation, a list of features, a model obtained by training machine learning algorithm using training examples, an artificial neural network, and more) that may be used to identify products in received images; contract-related data 242 (e.g., planograms, promotions data, etc.) that may be used to determine if the placement of products on the store shelves and/or the promotion execution are consistent with obligations of retail store 105; catalog data 244 (e.g., retail store chain's catalog, retail store's master file, etc.) that may be used to check if all product types that should be offered in retail store 105 are in fact in the store, if the correct price is displayed next to an identified product, etc.; inventory data 246 that may be used to determine if additional products should be ordered from suppliers 115; employee data 248 (e.g., attendance data, records of training provided, evaluation and other performance-related communications, productivity information, etc.) that may be used to assign specific store associates to certain tasks; and calendar data 250 (e.g., holidays, national days, international events, etc.) that may be used to determine if a possible change in a product model is associated with a certain event. In other embodiments of the disclosure, database 140 may store additional types of data or fewer types of data. Furthermore, various types of data may be stored in one or more memory devices other than memory device 226.

The components and arrangements shown in FIG. 2 are not intended to limit the disclosed embodiments. As will be appreciated by a person skilled in the art having the benefit of this disclosure, numerous variations and/or modifications may be made to the depicted configuration of server 135. For example, not all components may be essential for the operation of server 135 in all cases. Any component may be located in any appropriate part of server 135, and the components may be rearranged into a variety of configurations while providing the functionality of the disclosed embodiments. For example, some servers may not include some of the elements shown in I/O system 215.

Figure 3:
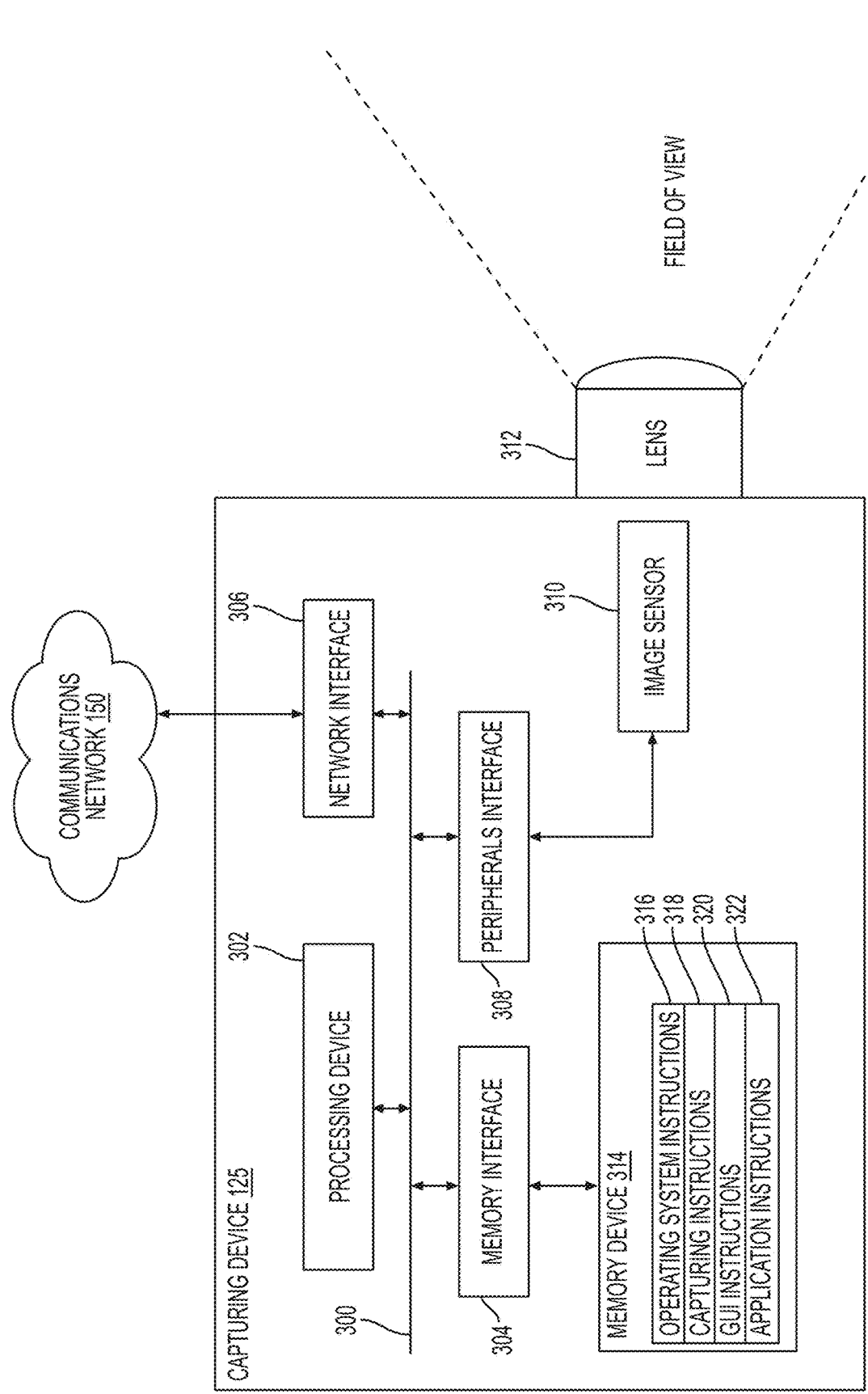
FIG. 3 is a block diagram that illustrates an exemplary embodiment of a capturing device, consistent with the present disclosure.

FIG. 3 is a block diagram representation of an example configuration of capturing device 125. In one embodiment, capturing device 125 may include a processing device 302, a memory interface 304, a network interface 306, and a peripherals interface 308 connected to image sensor 310. These components may be separated or may be integrated in one or more integrated circuits. The various components in capturing device 125 may be coupled by one or more communication buses or signal lines (e.g., bus 300). Different aspects of the functionalities of the various components in capturing device 125 may be understood from the description above regarding components of server 135 having similar functionality.

According to one embodiment, network interface 306 may be used to facilitate communication with server 135. Network interface 306 may be an Ethernet port connected to radio frequency receivers and transmitters and/or optical receivers and transmitters. The specific design and implementation of network interface 306 depends on the communications network(s) over which capturing device 125 is intended to operate. For example, in some embodiments, capturing device 125 may include a network interface 306 designed to operate over a GSM network, a GPRS network, an EDGE network, a Wi-Fi or WiMax network, a Bluetooth® network, etc. In another example, the implementation of network interface 306 may be similar or identical to the implementation described above for network interface 206.

In the example illustrated in FIG. 3, peripherals interface 308 of capturing device 125 may be connected to at least one image sensor 310 associated with at least one lens 312 for capturing image data in an associated field of view. In some configurations, capturing device 125 may include a plurality of image sensors associated with a plurality of lenses 312. In other configurations, image sensor 310 may be part of a camera included in capturing device 125. According to some embodiments, peripherals interface 308 may also be connected to other sensors (not shown), such as a motion sensor, a light sensor, infrared sensor, sound sensor, a proximity sensor, a temperature sensor, a biometric sensor, or other sensing devices to facilitate related functionalities. In addition, a positioning sensor may also be integrated with, or connected to, capturing device 125. For example, such positioning sensor may be implemented using one of the following technologies: Global Positioning System (GPS), GLObal NAvigation Satellite System (GLONASS), Galileo global navigation system, BeiDou navigation system, other Global Navigation Satellite Systems (GNSS), Indian Regional Navigation Satellite System (IRNSS), Local Positioning Systems (LPS), Real-Time Location Systems (RTLS), Indoor Positioning System (IPS), Wi-Fi based positioning systems, cellular triangulation, and so forth. For example, the positioning sensor may be built into mobile capturing device 125, such as smartphone devices. In another example, position software may allow mobile capturing devices to use internal or external positioning sensors (e.g., connecting via a serial port or Bluetooth).

Consistent with the present disclosure, capturing device 125 may include digital components that collect data from image sensor 310, transform it into an image, and store the image on a memory device 314 and/or transmit the image using network interface 306. In one embodiment, capturing device 125 may be fixedly mountable to a store shelf or to other objects in the retail store (such as walls, ceilings, floors, refrigerators, checkout stations, displays, dispensers, rods which may be connected to other objects in the retail store, and so forth). In one embodiment, capturing device 125 may be split into at least two housings such that only image sensor 310 and lens 312 may be visible on the store shelf, and the rest of the digital components may be located in a separate housing. An example of this type of capturing device is described below with reference to FIGS. 5-7.

Consistent with the present disclosure, capturing device 125 may use memory interface 304 to access memory device 314. Memory device 314 may include high-speed, random access memory and/or non-volatile memory such as one or more magnetic disk storage devices, one or more optical storage devices, and/or flash memory (e.g., NAND, NOR) to store captured image data. Memory device 314 may store operating system instructions 316, such as DARWIN, RTXC, LINUX, iOS, UNIX, LINUX, OS X, WINDOWS, or an embedded operating system such as VXWorkS. Operating system 316 may include instructions for handling basic system services and for performing hardware dependent tasks. In some implementations, operating system 316 may include a kernel (e.g., UNIX kernel, LINUX kernel, etc.). In addition, memory device 314 may store capturing instructions 318 to facilitate processes and functions related to image sensor 310; graphical user interface instructions 320 that enables a user associated with capturing device 125 to control the capturing device and/or to acquire images of an area-of-interest in a retail establishment; and application instructions 322 to facilitate a process for monitoring compliance of product placement or other processes.

The components and arrangements shown in FIG. 3 are not intended to limit the disclosed embodiments. As will be appreciated by a person skilled in the art having the benefit of this disclosure, numerous variations and/or modifications may be made to the depicted configuration of capturing device 125. For example, not all components are essential for the operation of capturing device 125 in all cases. Any component may be located in any appropriate part of capturing device 125, and the components may be rearranged into a variety of configurations while providing the functionality of the disclosed embodiments. For example, some capturing devices may not have lenses, and other capturing devices may include an external memory device instead of memory device 314.

In some embodiments, machine learning algorithms (also referred to as machine learning models in the present disclosure) may be trained using training examples, for example in the cases described below. Some non-limiting examples of such machine learning algorithms may include classification algorithms, data regressions algorithms, image segmentation algorithms, visual detection algorithms (such as object detectors, face detectors, person detectors, motion detectors, edge detectors, etc.), visual recognition algorithms (such as face recognition, person recognition, object recognition, etc.), speech recognition algorithms, mathematical embedding algorithms, natural language processing algorithms, support vector machines, random forests, nearest neighbors algorithms, deep learning algorithms, artificial neural network algorithms, convolutional neural network algorithms, recurrent neural network algorithms, linear machine learning models, non-linear machine learning models, ensemble algorithms, and so forth. For example, a trained machine learning algorithm may comprise an inference model, such as a predictive model, a classification model, a data regression model, a clustering model, a segmentation model, an artificial neural network (such as a deep neural network, a convolutional neural network, a recurrent neural network, etc.), a random forest, a support vector machine, and so forth. In some examples, the training examples may include example inputs together with the desired outputs corresponding to the example inputs. Further, in some examples, training machine learning algorithms using the training examples may generate a trained machine learning algorithm, and the trained machine learning algorithm may be used to estimate outputs for inputs not included in the training examples. In some examples, engineers, scientists, processes and machines that train machine learning algorithms may further use validation examples and/or test examples. For example, validation examples and/or test examples may include example inputs together with the desired outputs corresponding to the example inputs, a trained machine learning algorithm and/or an intermediately trained machine learning algorithm may be used to estimate outputs for the example inputs of the validation examples and/or test examples, the estimated outputs may be compared to the corresponding desired outputs, and the trained machine learning algorithm and/or the intermediately trained machine learning algorithm may be evaluated based on a result of the comparison. In some examples, a machine learning algorithm may have parameters and hyper parameters, where the hyper parameters may be set manually by a person or automatically by a process external to the machine learning algorithm (such as a hyper parameter search algorithm), and the parameters of the machine learning algorithm may be set by the machine learning algorithm based on the training examples. In some implementations, the hyper-parameters may be set based on the training examples and the validation examples, and the parameters may be set based on the training examples and the selected hyper-parameters. For example, given the hyper-parameters, the parameters may be conditionally independent of the validation examples.

In some embodiments, trained machine learning algorithms (also referred to as machine learning models and trained machine learning models in the present disclosure) may be used to analyze inputs and generate outputs, for example in the cases described below. In some examples, a trained machine learning algorithm may be used as an inference model that when provided with an input generates an inferred output. For example, a trained machine learning algorithm may include a classification algorithm, the input may include a sample, and the inferred output may include a classification of the sample (such as an inferred label, an inferred tag, and so forth). In another example, a trained machine learning algorithm may include a regression model, the input may include a sample, and the inferred output may include an inferred value corresponding to the sample. In yet another example, a trained machine learning algorithm may include a clustering model, the input may include a sample, and the inferred output may include an assignment of the sample to at least one cluster. In an additional example, a trained machine learning algorithm may include a classification algorithm, the input may include an image, and the inferred output may include a classification of an item depicted in the image. In yet another example, a trained machine learning algorithm may include a regression model, the input may include an image, and the inferred output may include an inferred value corresponding to an item depicted in the image (such as an estimated property of the item, such as size, volume, age of a person depicted in the image, cost of a product depicted in the image, and so forth). In an additional example, a trained machine learning algorithm may include an image segmentation model, the input may include an image, and the inferred output may include a segmentation of the image. In yet another example, a trained machine learning algorithm may include an object detector, the input may include an image, and the inferred output may include one or more detected objects in the image and/or one or more locations of objects within the image. In some examples, the trained machine learning algorithm may include one or more formulas and/or one or more functions and/or one or more rules and/or one or more procedures, the input may be used as input to the formulas and/or functions and/or rules and/or procedures, and the inferred output may be based on the outputs of the formulas and/or functions and/or rules and/or procedures (for example, selecting one of the outputs of the formulas and/or functions and/or rules and/or procedures, using a statistical measure of the outputs of the formulas and/or functions and/or rules and/or procedures, and so forth).

In some embodiments, artificial neural networks may be configured to analyze inputs and generate corresponding outputs, for example in the cases described below. Some non-limiting examples of such artificial neural networks may comprise shallow artificial neural networks, deep artificial neural networks, feedback artificial neural networks, feed forward artificial neural networks, autoencoder artificial neural networks, probabilistic artificial neural networks, time delay artificial neural networks, convolutional artificial neural networks, recurrent artificial neural networks, long short term memory artificial neural networks, and so forth. In some examples, an artificial neural network may be configured manually. For example, a structure of the artificial neural network may be selected manually, a type of an artificial neuron of the artificial neural network may be selected manually, a parameter of the artificial neural network (such as a parameter of an artificial neuron of the artificial neural network) may be selected manually, and so forth. In some examples, an artificial neural network may be configured using a machine learning algorithm. For example, a user may select hyper-parameters for the artificial neural network and/or the machine learning algorithm, and the machine learning algorithm may use the hyper-parameters and training examples to determine the parameters of the artificial neural network, for example using back propagation, using gradient descent, using stochastic gradient descent, using mini-batch gradient descent, and so forth. In some examples, an artificial neural network may be created from two or more other artificial neural networks by combining the two or more other artificial neural networks into a single artificial neural network.

Some non-limiting examples of image data may include images, grayscale images, color images, 2D images, 3D images, videos, 2D videos, 3D videos, frames, footages, data derived from other image data, and so forth. In some embodiments, analyzing image data (for example by the methods, steps and modules described herein) may comprise analyzing the image data to obtain a preprocessed image data, and subsequently analyzing the image data and/or the preprocessed image data to obtain the desired outcome. One of ordinary skill in the art will recognize that the following embodiments are provided by way of example, and that the image data may be preprocessed using other kinds of preprocessing methods. In some examples, the image data may be preprocessed by transforming the image data using a transformation function to obtain a transformed image data, and the preprocessed image data may comprise the transformed image data. For example, the transformed image data may comprise one or more convolutions of the image data. For example, the transformation function may comprise one or more image filters, such as low-pass filters, high-pass filters, band-pass filters, all-pass filters, and so forth. In some examples, the transformation function may comprise a nonlinear function. In some examples, the image data may be preprocessed by smoothing at least parts of the image data, for example using Gaussian convolution, using a median filter, and so forth. In some examples, the image data may be preprocessed to obtain a different representation of the image data. For example, the preprocessed image data may comprise: a representation of at least part of the image data in a frequency domain; a Discrete Fourier Transform of at least part of the image data; a Discrete Wavelet Transform of at least part of the image data; a time/frequency representation of at least part of the image data; a representation of at least part of the image data in a lower dimension; a lossy representation of at least part of the image data; a lossless representation of at least part of the image data; a time ordered series of any of the above; any combination of the above; and so forth. In some examples, the image data may be preprocessed to extract edges, and the preprocessed image data may comprise information based on and/or related to the extracted edges. In some examples, the image data may be preprocessed to extract image features from the image data. Some non-limiting examples of such image features may comprise information based on and/or related to: edges; corners; blobs; ridges; Scale Invariant Feature Transform (SIFT) features; temporal features; and so forth. In some examples, analyzing the image data may include calculating at least one convolution of at least a portion of the image data, and using the calculated at least one convolution to calculate at least one resulting value and/or to make determinations, identifications, recognitions, classifications, and so forth.

In some embodiments, analyzing image data (for example by the methods, steps and modules described herein) may comprise analyzing the image data and/or the preprocessed image data using one or more rules, functions, procedures, artificial neural networks, object detection algorithms, face detection algorithms, visual event detection algorithms, action detection algorithms, motion detection algorithms, background subtraction algorithms, inference models, and so forth. Some non-limiting examples of such inference models may include: an inference model preprogrammed manually; a classification model; a regression model; a result of training algorithms, such as machine learning algorithms and/or deep learning algorithms, on training examples, where the training examples may include examples of data instances, and in some cases, a data instance may be labeled with a corresponding desired label and/or result; and so forth. In some embodiments, analyzing image data (for example by the methods, steps and modules described herein) may comprise analyzing pixels, voxels, point cloud, range data, etc. included in the image data.

Figure 4B:
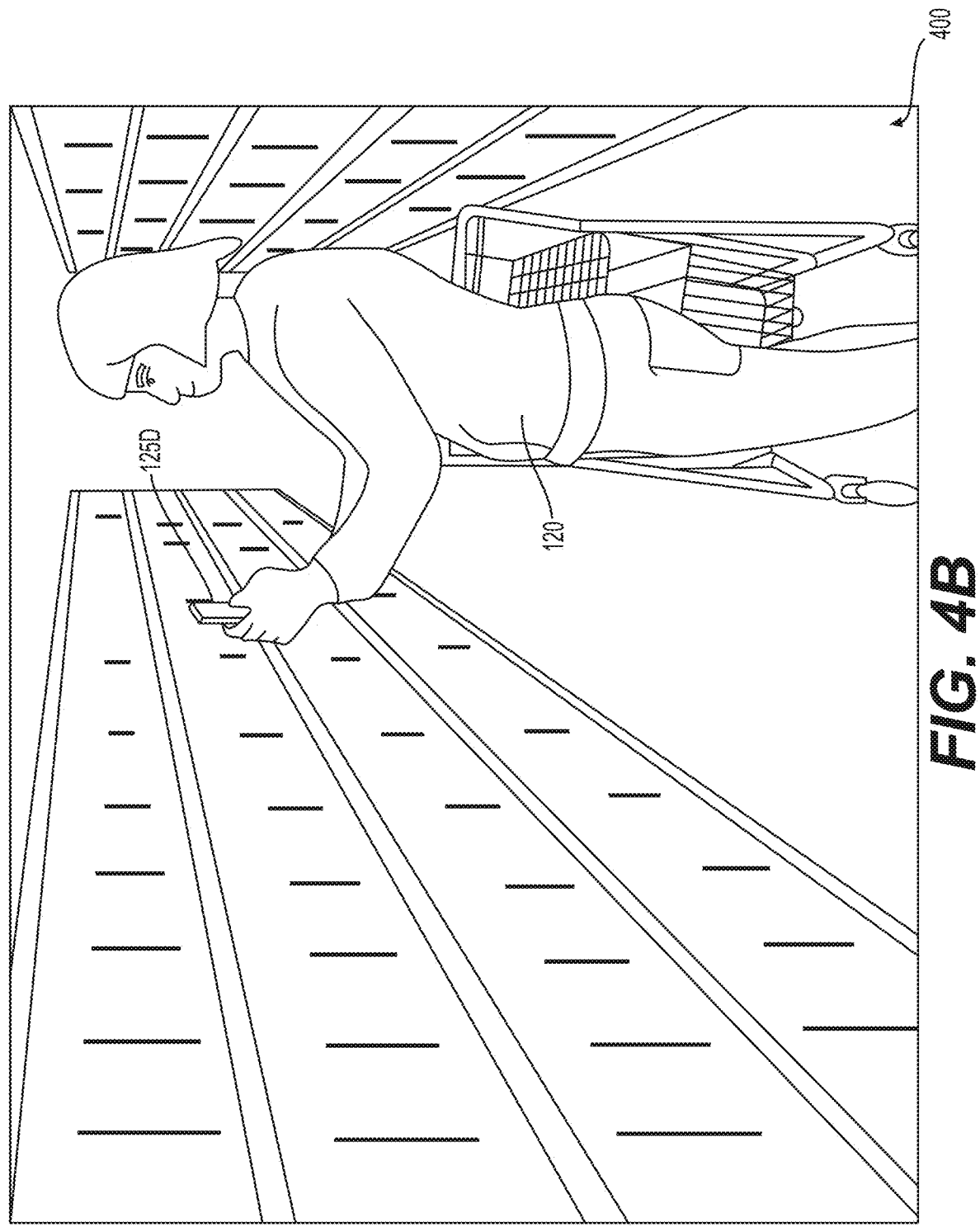
FIG. 4B is a schematic illustration of another example configuration for capturing image data in a retail store, consistent with the present disclosure.
Figure 4C:
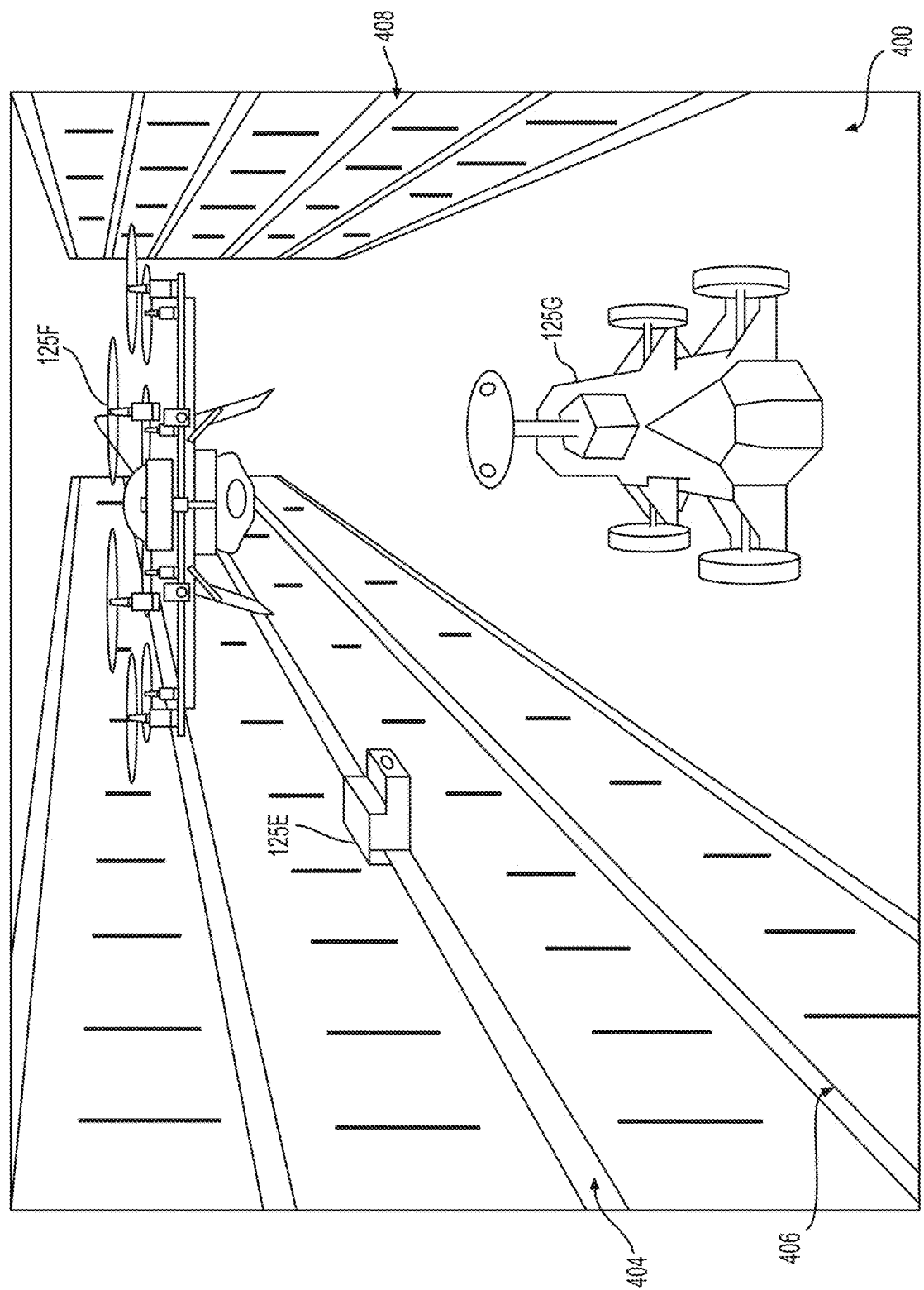
FIG. 4C is a schematic illustration of another example configuration for capturing image data in a retail store, consistent with the present disclosure.

FIGS. 4A-4C illustrate example configurations for capturing image data in retail store 105 according to disclosed embodiments. FIG. 4A illustrates how an aisle 400 of retail store 105 may be imaged using a plurality of capturing devices 125 fixedly connected to store shelves. FIG. 4B illustrates how aisle 400 of retail store 105 may be imaged using a handheld communication device. FIG. 4C illustrates how aisle 400 of retail store 105 may be imaged by robotic devices equipped with cameras.

With reference to FIG. 4A and consistent with the present disclosure, retail store 105 may include a plurality of capturing devices 125 fixedly mounted (for example, to store shelves, walls, ceilings, floors, refrigerators, checkout stations, displays, dispensers, rods which may be connected to other objects in the retail store, and so forth) and configured to collect image data. As depicted, one side of an aisle 400 may include a plurality of capturing devices 125 (e.g., 125A, 125B, and 125C) fixedly mounted thereon and directed such that they may capture images of an opposing side of aisle 400. The plurality of capturing devices 125 may be connected to an associated mobile power source (e.g., one or more batteries), to an external power supply (e.g., a power grid), obtain electrical power from a wireless power transmission system, and so forth. As depicted in FIG. 4A, the plurality of capturing devices 125 may be placed at different heights and at least their vertical fields of view may be adjustable. Generally, both sides of aisle 400 may include capturing devices 125 in order to cover both sides of aisle 400.

Differing numbers of capturing devices 125 may be used to cover shelving unit 402. In addition, there may be an overlap region in the horizontal field of views of some of capturing devices 125. For example, the horizontal fields of view of capturing devices (e.g., adjacent capturing devices) may at least partially overlap with one another. In another example, one capturing device may have a lower field of view than the field of view of a second capturing device, and the two capturing devices may have at least partially overlapping fields of view. According to one embodiment, each capturing device 125 may be equipped with network interface 306 for communicating with server 135. In one embodiment, the plurality of capturing devices 125 in retail store 105 may be connected to server 135 via a single WLAN. Network interface 306 may transmit information associated with a plurality of images captured by the plurality of capturing devices 125 for analysis purposes. In one example, server 135 may determine an existence of an occlusion event (such as, by a person, by store equipment, such as a ladder, cart, etc.) and may provide a notification to resolve the occlusion event. In another example, server 135 may determine if a disparity exists between at least one contractual obligation and product placement as determined based on automatic analysis of the plurality of images. The transmitted information may include raw images, cropped images, processed image data, data about products identified in the images, and so forth. Network interface 306 may also transmit information identifying the location of the plurality capturing devices 125 in retail store 105.

With reference to FIG. 4B and consistent with the present disclosure, server 135 may receive image data captured by users 120. In a first embodiment, server 135 may receive image data acquired by store associates. In one implementation, a handheld device of a store associate (e.g., capturing device 125D) may display a real-time video stream captured by the image sensor of the handheld device. The real-time video stream may be augmented with markings identifying to the store associate an area-of-interest that needs manual capturing of images. One of the situations in which manual image capture may be desirable may occur where the area-of-interest is outside the fields of view of a plurality of cameras fixedly connected to store shelves in aisle 400. In other situations, manual capturing of images of an area-of-interest may be desirable when a current set of acquired images is out of date (e.g., obsolete in at least one respect) or of poor quality (e.g., lacking focus, obstacles, lesser resolution, lack of light, etc.). Additional details of this embodiment are described in Applicant's International Patent Application No. PCT/IB2018/001107, which is incorporated herein by reference.

In a second embodiment, server 135 may receive image data acquired by crowd sourcing. In one exemplary implementation, server 135 may provide a request to a detected mobile device for an updated image of the area-of-interest in aisle 400. The request may include an incentive (e.g., $2 discount) to user 120 for acquiring the image. In response to the request, user 120 may acquire and transmit an up-to-date image of the area-of-interest. After receiving the image from user 120, server 135 may transmit the accepted incentive or agreed upon reward to user 120. The incentive may comprise a text notification and a redeemable coupon. In some embodiments, the incentive may include a redeemable coupon for a product associated with the area-of-interest. Server 135 may generate image-related data based on aggregation of data from images received from crowd sourcing and from images received from a plurality of cameras fixedly connected to store shelves. Additional details of this embodiment are described in Applicant's International Patent Application No. PCT/IB2017/000919, which is incorporated herein by reference.

With reference to FIG. 4C and consistent with the present disclosure, server 135 may receive image data captured by robotic devices with cameras traversing in aisle 400. The present disclosure is not limited to the type of robotic devices used to capture images of retail store 105. In some embodiments, the robotic devices may include a robot on a track (e.g., a Cartesian robot configured to move along an edge of a shelf or in parallel to a shelf, such as capturing device 125E), a drone (e.g., capturing device 125F), and/or a robot that may move on the floor of the retail store (e.g., a wheeled robot such as capturing device 125G, a legged robot, a snake-like robot, etc.). The robotic devices may be controlled by server 135 and may be operated remotely or autonomously. In one example, server 135 may instruct capturing device 125E to perform periodic scans at times when no customers or other obstructions are identified in aisle 400. Specifically, capturing device 125E may be configured to move along store shelf 404 and to capture images of products placed on store shelf 404, products placed on store shelf 406, or products located on shelves opposite store shelf (e.g., store shelf 408). In another example, server 135 may instruct capturing device 125F to perform a scan of all the area of retail store 105 before the opening hour. In another example, server 135 may instruct capturing device 125G to capture a specific area-of-interest, similar as described above with reference to receiving images acquired by the store associates. In some embodiments, robotic capturing devices (such as 125F and 125G) may include an internal processing unit that may allow them to navigate autonomously within retail store 105. For example, the robotic capturing devices may use input from sensors (e.g., image sensors, depth sensors, proximity sensors, etc.), to avoid collision with objects or people, and to complete the scan of the desired area of retail store 105.

As discussed above with reference to FIG. 4A, the image data representative of products displayed on store shelves may be acquired by a plurality of stationary capturing devices 125 fixedly mounted in the retail store. One advantage of having stationary image capturing devices spread throughout retail store 105 is the potential for acquiring product images from set locations and on an ongoing basis such that up-to-date product status may be determined for products throughout a retail store at any desired periodicity (e.g., in contrast to a moving camera system that may acquire product images more infrequently). However, there may be certain challenges in this approach. The distances and angles of the image capturing devices relative to the captured products should be selected such as to enable adequate product identification, especially when considered in view of image sensor resolution and/or optics specifications. For example, a capturing device placed on the ceiling of retail store 105 may have sufficient resolutions and optics to enable identification of large products (e.g., a pack of toilet paper), but may be insufficient for identifying smaller products (e.g., deodorant packages). The image capturing devices should not occupy shelf space that is reserved for products for sale. The image capturing devices should not be positioned in places where there is a likelihood that their fields of view will be regularly blocked by different objects. The image capturing devices should be able to function for long periods of time with minimum maintenance. For example, a requirement for frequent replacement of batteries may render certain image acquisition systems cumbersome to use, especially where many image acquisition devices are in use throughout multiple locations in a retail store and across multiple retail stores. The image capturing devices should also include processing capabilities and transmission capabilities for providing real time or near real time image data about products. The disclosed image acquisition systems address these challenges.

FIG. 5A illustrates an example of a system 500 for acquiring images of products in retail store 105. Throughout the disclosure, capturing device 125 may refer to a system, such as system 500 shown in FIG. 5A. As shown, system 500 may include a first housing 502 configured for location on a retail shelving unit (e.g., as illustrated in FIG. 5B), and a second housing 504 configured for location on the retail shelving unit separate from first housing 502. The first and the second housing may be configured for mounting on the retail shelving unit in any suitable way (e.g., screws, bolts, clamps, adhesives, magnets, mechanical means, chemical means, etc.). In some embodiments, first housing 502 may include an image capture device 506 (e.g., a camera module that may include image sensor 310) and second housing 504 may include at least one processor (e.g., processing device 302) configured to control image capture device 506 and also to control a network interface (e.g., network interface 306) for communicating with a remote server (e.g., server 135).

System 500 may also include a data conduit 508 extending between first housing 502 and second housing 504. Data conduit 508 may be configured to enable transfer of control signals from the at least one processor to image capture device 506 and to enable collection of image data acquired by image capture device 506 for transmission by the network interface. Consistent with the present disclosure, the term "data conduit" may refer to a communications channel that may include either a physical transmission medium such as a wire or a logical connection over a multiplexed medium such as a radio channel In some embodiments, data conduit 508 may be used for conveying image data from image capture device 506 to at least one processor located in second housing 504. Consistent with one implementation of system 500, data conduit 508 may include flexible printed circuits and may have a length of at least about 5 cm, at least about 10 cm, at least about 15 cm, etc. The length of data conduit 508 may be adjustable to enable placement of first housing 502 separately from second housing 504. For example, in some embodiments, data conduit may be retractable within second housing 504 such that the length of data conduit exposed between first housing 502 and second housing 504 may be selectively adjusted.

In one embodiment, the length of data conduit 508 may enable first housing 502 to be mounted on a first side of a horizontal store shelf facing the aisle (e.g., store shelf 510 illustrated in FIG. 5B) and second housing 504 to be mounted on a second side of store shelf 510 that faces the direction of the ground (e.g., an underside of a store shelf). In this embodiment, data conduit 508 may be configured to bend around an edge of store shelf 510 or otherwise adhere/follow contours of the shelving unit. For example, a first portion of data conduit 508 may be configured for location on the first side of store shelf 510 (e.g., a side facing an opposing retail shelving unit across an aisle) and a second portion of data conduit 508 may be configured for location on a second side of store shelf 510 (e.g., an underside of the shelf, which in some cases may be orthogonal to the first side). The second portion of data conduit 508 may be longer than the first portion of data conduit 508. Consistent with another embodiment, data conduit 508 may be configured for location within an envelope of a store shelf. For example, the envelope may include the outer boundaries of a channel located within a store shelf, a region on an underside of an L-shaped store shelf, a region between two store shelves, etc. Consistent with another implementation of system 500 discussed below, data conduit 508 may include a virtual conduit associated with a wireless communications link between first housing 502 and second housing 504.

FIG. 5B illustrates an exemplary configuration for mounting first housing 502 on store shelf 510. Consistent with the present disclosure, first housing 502 may be placed on store shelf 510, next to or embedded in a plastic cover that may be used for displaying prices. Alternatively, first housing 502 may be placed or mounted on any other location in retail store 105. For example, first housing 502 may be placed or mounted on the walls, on the ceiling, on refrigerator units, on display units, and more. The location and/or orientation of first housing 502 may be selected such that a field of view of image capture device 506 may cover at least a portion of an opposing retail shelving unit. Consistent with the present disclosure, image capture device 506 may have a view angle of between 50 and 80 degrees, about 62 degrees, about 67 degrees, or about 75 degrees. Consistent with the present disclosure, image capture device 506 may include an image sensor having sufficient image resolution to enable detection of text associated with labels on an opposing retail shelving unit. In one embodiment, the image sensor may include m*n pixels. For example, image capture device 506 may have an 8 MP image sensor that includes an array of 3280*2464 pixels. Each pixel may include at least one photo-voltaic cell that converts the photons of the incident light to an electric signal. The electrical signal may be converted to digital data by an A/D converter and processed by the image processor (ISP). In one embodiment, the image sensor of image capture device 506 may be associated with a pixel size of between $1.1\times1.1$ um$^2$ and $1.7\times1.7$ um$^2$, for example, $1.4\times1.4$ um$^2$.

Figure 6A:
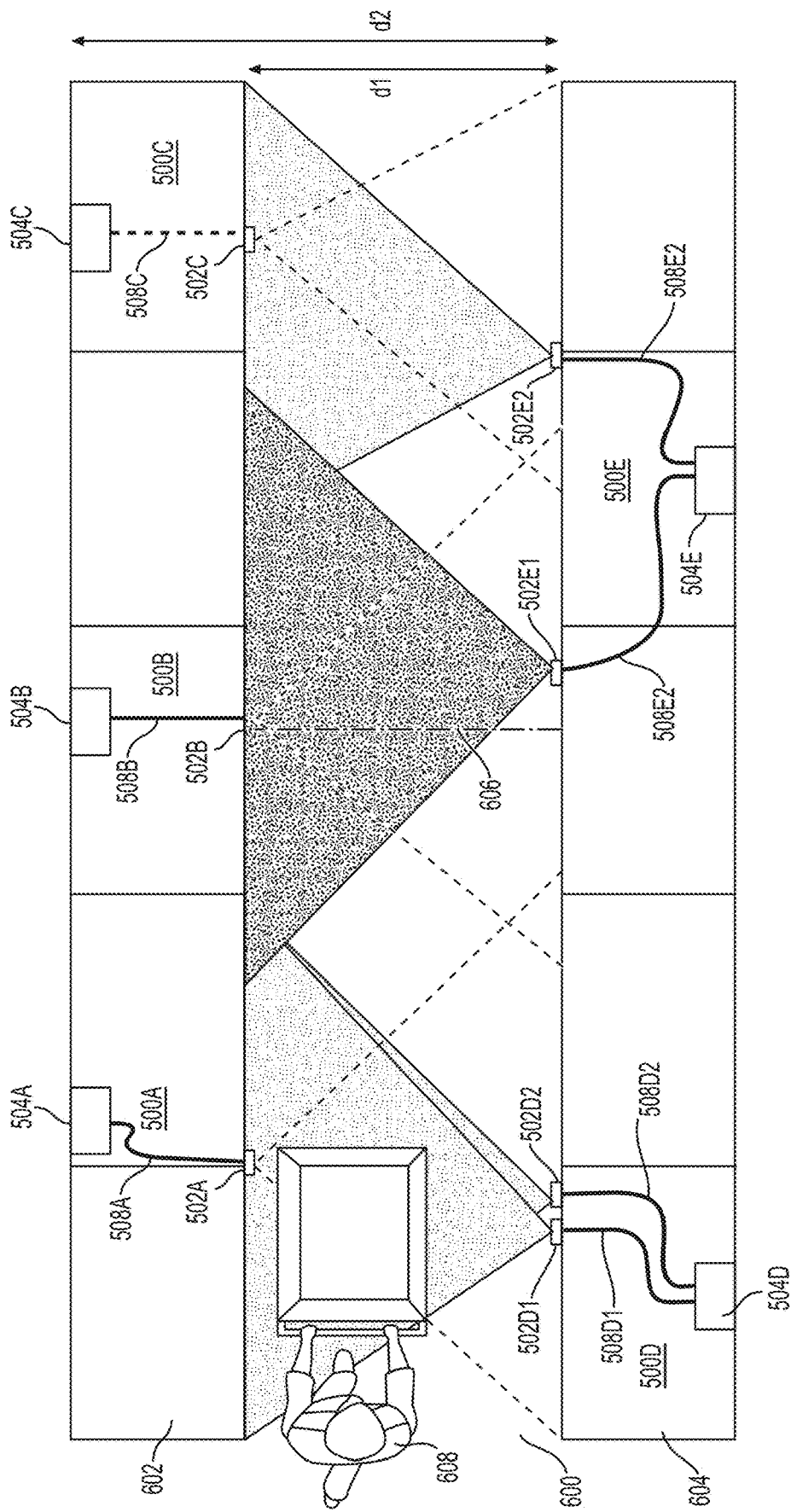
FIG. 6A is a top view representation of an aisle in a retail store with multiple image acquisition systems deployed thereon for acquiring images of products, consistent with the present disclosure.

Consistent with the present disclosure, image capture device 506 may be associated with a lens (e.g., lens 312) having a fixed focal length selected according to a distance expected to be encountered between retail shelving units on opposite sides of an aisle (e.g., distance d1 shown in FIG. 6A) and/or according to a distance expected to be encountered between a side of a shelving unit facing the aisle on one side of an aisle and a side of a shelving unit facing away of the aisle on the other side of the aisle (e.g., distance d2 shown in FIG. 6A). The focal length may also be based on any other expected distance between the image acquisition device and products to be imaged. As used herein, the term "focal length" refers to the distance from the optical center of the lens to a point where objects located at the point are substantially brought into focus. In contrast to zoom lenses, in fixed lenses the focus is not adjustable. The focus is typically set at the time of lens design and remains fixed. In one embodiment, the focal length of lens 312 may be selected based on the distance between two sides of aisles in the retail store (e.g., distance d1, distance d2, and so forth). In some embodiments, image capture device 506 may include a lens with a fixed focal length having a fixed value between 2.5 mm and 4.5 mm, such as about 3.1 mm, about 3.4 mm, about 3.7 mm. For example, when distance d1 between two opposing retail shelving units is about 2 meters, the focal length of the lens may be about 3.6 mm. Unless indicated otherwise, the term "about" with regards to a numeric value is defined as a variance of up to 5% with respect to the stated value. Of course, image capture devices having non-fixed focal lengths may also be used depending on the requirements of certain imaging environments, the power and space resources available, etc.

FIG. 5C illustrates an exploded view of second housing 504. In some embodiments, the network interface located in second housing 504 (e.g., network interface 306) may be configured to transmit to server 135 information associated with a plurality of images captured by image capture device 506. For example, the transmitted information may be used to determine if a disparity exists between at least one contractual obligation (e.g. planogram) and product placement. In one example, the network interface may support transmission speeds of 0.5 Mb/s, 1 Mb/s, 5 Mb/s, or more. Consistent with the present disclosure, the network interface may allow different modes of operations to be selected, such as: high-speed, slope-control, or standby. In high-speed mode, associated output drivers may have fast output rise and fall times to support high-speed bus rates; in slope-control, the electromagnetic interference may be reduced and the slope (i.e., the change of voltage per unit of time) may be proportional to the current output; and in standby mode, the transmitter may be switched off and the receiver may operate at a lower current.

Figure 6B:
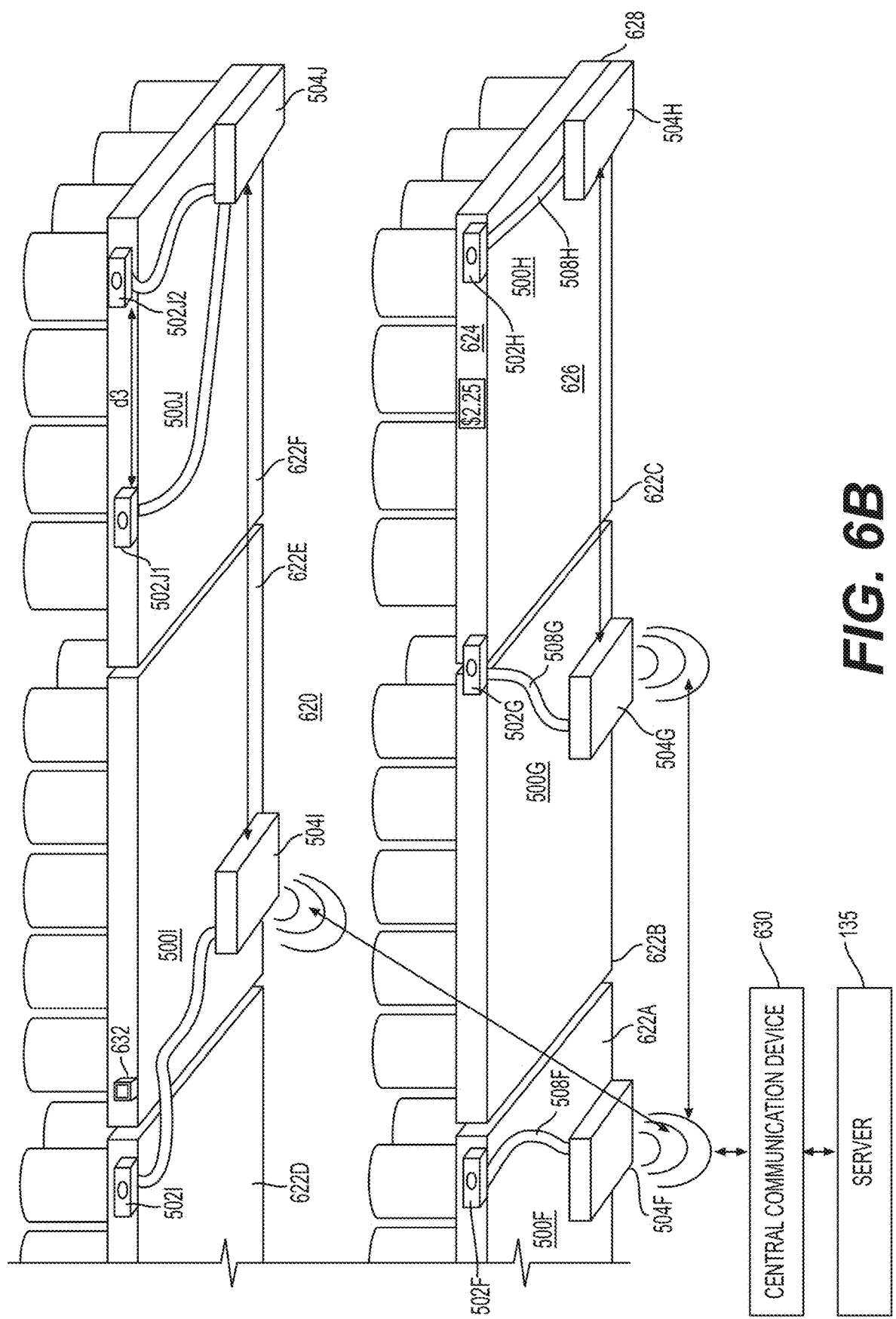
FIG. 6B is a perspective view representation of part of a retail shelving unit with multiple image acquisition systems deployed thereon for acquiring images of products, consistent with the present disclosure.

Consistent with the present disclosure, second housing 504 may include a power port 512 for conveying energy from a power source to first housing 502. In one embodiment, second housing 504 may include a section for at least one mobile power source 514 (e.g., in the depicted configuration the section is configured to house four batteries). The at least one mobile power source may provide sufficient power to enable image capture device 506 to acquire more than 1,000 pictures, more than 5,000 pictures, more than 10,000 pictures, or more than 15,000 pictures, and to transmit them to server 135. In one embodiment, mobile power source 514 located in a single second housing 504 may power two or more image capture devices 506 mounted on the store shelf. For example, as depicted in FIGS. 6A and 6B, a single second housing 504 may be connected to a plurality of first housings 502 with a plurality of image capture devices 506 covering different (overlapping or non-overlapping) fields of view. Accordingly, the two or more image capture devices 506 may be powered by a single mobile power source 514 and/or the data captured by two or more image capture devices 506 may be processed to generate a panoramic image by a single processing device located in second housing 504. In addition to mobile power source 514 or as an alternative to mobile power source 514, second housing 504 may also be connected to an external power source. For example, second housing 504 may be mounted to a store shelf and connected to an electric power grid. In this example, power port 512 may be connected to the store shelf through a wire for providing electrical power to image capture device 506. In another example, a retail shelving unit or retail store 105 may include a wireless power transmission system, and power port 512 may be connected to a device configured to obtain electrical power from the wireless power transmission system. In addition, as discussed below, system 500 may use power management policies to reduce the power consumption. For example, system 500 may use selective image capturing and/or selective transmission of images to reduce the power consumption or conserve power.

FIG. 6A illustrates a schematic diagram of a top view of aisle 600 in retail store 105 with multiple image acquisition systems 500 (e.g., 500A, 500B, 500C, 500D, and 500E) deployed thereon for acquiring images of products. Aisle 600 may include a first retail shelving unit 602 and a second retail shelving unit 604 that opposes first retail shelving unit 602. In some embodiments, different numbers of systems 500 may be mounted on opposing retail shelving units. For example, system 500A (including first housing 502A, second housing 504A, and data conduit 508A), system 500B (including first housing 502B second housing 504B, and data conduit 508B), and system 500C (including first housing 502C, second housing 504C, and data conduit 508C) may be mounted on first retail shelving unit 602; and system 500D (including first housing 502D1, first housing 502D2, second housing 504D, and data conduits 508D1 and 508D2) and system 500E (including first housing 502E1, first housing 502E2, second housing 504E, and data conduits 508E1 and 508E2) may be mounted on second retail shelving unit 604. Consistent with the present disclosure, image capture device 506 may be configured relative to first housing 502 such that an optical axis of image capture device 506 is directed toward an opposing retail shelving unit when first housing 502 is fixedly mounted on a retail shelving unit. For example, optical axis 606 of the image capture device associated with first housing 502B may be directed towards second retail shelving unit 604 when first housing 502B is fixedly mounted on first retail shelving unit 602. A single retail shelving unit may hold a number of systems 500 that include a plurality of image capturing devices. Each of the image capturing devices may be associated with a different field of view directed toward the opposing retail shelving unit. Different vantage points of differently located image capture devices may enable image acquisition relative to different sections of a retail shelf. For example, at least some of the plurality of image capturing devices may be fixedly mounted on shelves at different heights. Examples of such a deployment are illustrated in FIGS. 4A and 6B.

As shown in FIG. 6A each first housing 502 may be associated with a data conduit 508 that enables exchanging of information (e.g., image data, control signals, etc.) between the at least one processor located in second housing 504 and image capture device 506 located in first housing 502. In some embodiments, data conduit 508 may include a wired connection that supports data-transfer and may be used to power image capture device 506 (e.g., data conduit 508A, data conduit 508B, data conduit 508D1, data conduit 508D2, data conduit 508E1, and data conduit 508E2). Consistent with these embodiments, data conduit 508 may comply with a wired standard such as USB, Micro-USB, HDMI, Micro-HDMI, Firewire, Apple, etc. In other embodiments, data conduit 508 may be a wireless connection, such as a dedicated communications channel between the at least one processor located in second housing 504 and image capture device 506 located in first housing 502 (e.g., data conduit 508C). In one example, the communications channel may be established by two Near Field Communication (NFC) transceivers. In other examples, first housing 502 and second housing 504 may include interface circuits that comply with other short-range wireless standards such as Bluetooth, WiFi, ZigBee, etc.

In some embodiments of the disclosure, the at least one processor of system 500 may cause at least one image capture device 506 to periodically capture images of products located on an opposing retail shelving unit (e.g., images of products located on a shelf across an aisle from the shelf on which first housing 502 is mounted). The term "periodically capturing images" includes capturing an image or images at predetermined time intervals (e.g., every minute, every 30 minutes, every 150 minutes, every 300 minutes, etc.), capturing video, capturing an image every time a status request is received, and/or capturing an image subsequent to receiving input from an additional sensor, for example, an associated proximity sensor. Images may also be captured based on various other triggers or in response to various other detected events. In some embodiments, system 500 may receive an output signal from at least one sensor located on an opposing retail shelving unit. For example, system 500B may receive output signals from a sensing system located on second retail shelving unit 604. The output signals may be indicative of a sensed lifting of a product from second retail shelving unit 604 or a sensed positioning of a product on second retail shelving unit 604. In response to receiving the output signal from the at least one sensor located on second retail shelving unit 604, system 500B may cause image capture device 506 to capture one or more images of second retail shelving unit 604. Additional details on a sensing system, including the at least one sensor that generates output signals indicative of a sensed lifting of a product from an opposing retail shelving unit, is discussed below with reference to FIGS. 8-10.

Consistent with embodiments of the disclosure, system 500 may detect an object 608 in a selected area between first retail shelving unit 602 and second retail shelving unit 604. Such detection may be based on the output of one or more dedicated sensors (e.g., motion detectors, etc.) and/or may be based on image analysis of one or more images acquired by an image acquisition device. Such images, for example, may include a representation of a person or other object recognizable through various image analysis techniques (e.g., trained neural networks, Fourier transform analysis, edge detection, filters, face recognition, etc.). The selected area may be associated with distance d1 between first retail shelving unit 602 and second retail shelving unit 604. The selected area may be within the field of view of image capture device 506 or an area where the object causes an occlusion of a region of interest (such as a shelf, a portion of a shelf being monitored, and more). Upon detecting object 608, system 500 may cause image capture device 506 to forgo image acquisition while object 608 is within the selected area. In one example, object 608 may be an individual, such as a customer or a store associate. In another example, detected object 608 may be an inanimate object, such as a cart, box, carton, one or more products, cleaning robots, etc. In the example illustrated in FIG. 6A, system 500A may detect that object 608 has entered into its associated field of view (e.g., using a proximity sensor) and may instruct image capturing device 506 to forgo image acquisition. In alternative embodiments, system 500 may analyze a plurality of images acquired by image capture device 506 and identify at least one image of the plurality of images that includes a representation of object 608. Thereafter, system 500 may avoid transmission of at least part of the at least one identified image and/or information based on the at least one identified image to server 135.

As shown in FIG. 6A, the at least one processor contained in a second housing 504 may control a plurality of image capture devices 506 contained in a plurality of first housings 502 (e.g., systems 500D and 500E). Controlling image capturing device 506 may include instructing image capturing device 506 to capture an image and/or transmit captured images to a remote server (e.g., server 135). In some cases, each of the plurality of image capture devices 506 may have a field of view that at least partially overlaps with a field of view of at least one other image capture device 506 from among plurality of image capture devices 506. In one embodiment, the plurality of image capture devices 506 may be configured for location on one or more horizontal shelves and may be directed to substantially different areas of the opposing first retail shelving unit. In this embodiment, the at least one processor may control the plurality of image capture devices such that each of the plurality of image capture devices may capture an image at a different time. For example, system 500E may have a second housing 504E with at least one processor that may instruct a first image capturing device contained in first housing 502E1 to capture an image at a first time and may instruct a second image capturing device contained in first housing 502E2 to capture an image at a second time which differs from the first time. Capturing images in different times (or forwarding them to the at least one processor at different times) may assist in processing the images and writing the images in the memory associated with the at least one processor.

FIG. 6B illustrates a perspective view assembly diagram depicting a portion of a retail shelving unit 620 with multiple systems 500 (e.g., 500F, 500G, 500H, 500I, and 500J) deployed thereon for acquiring images of products. Retail shelving unit 620 may include horizontal shelves at different heights. For example, horizontal shelves 622A, 622B, and 622C are located below horizontal shelves 622D, 622E, and 622F. In some embodiments, a different number of systems 500 may be mounted on shelves at different heights. For example, system 500F (including first housing 502F and second housing 504F), system 500G (including first housing 502G and second housing 504G), and system 500H (including first housing 502H and second housing 504H) may be mounted on horizontal shelves associated with a first height; and system 500I (including first housing 502I, second housing 504I, and a projector 632) and system 500J (including first housing 502J1, first housing 502J2, and second housing 504J) may be mounted on horizontal shelves associated with a second height. In some embodiments, retail shelving unit 620 may include a horizontal shelf with at least one designated place (not shown) for mounting a housing of image capturing device 506. The at least one designated place may be associated with connectors such that first housing 502 may be fixedly mounted on a side of horizontal shelf 622 facing an opposing retail shelving unit using the connectors.

Consistent with the present disclosure, system 500 may be mounted on a retail shelving unit that includes at least two adjacent horizontal shelves (e.g., shelves 622A and 622B) forming a substantially continuous surface for product placement. The store shelves may include standard store shelves or customized store shelves. A length of each store shelf 622 may be at least 50 cm, less than 200 cm, or between 75 cm to 175 cm. In one embodiment, first housing 502 may be fixedly mounted on the retail shelving unit in a slit between two adjacent horizontal shelves. For example, first housing 502G may be fixedly mounted on retail shelving unit 620 in a slit between horizontal shelf 622B and horizontal shelf 622C. In another embodiment, first housing 502 may be fixedly mounted on a first shelf and second housing 504 may be fixedly mounted on a second shelf. For example, first housing 502I may be mounted on horizontal shelf 622D and second housing 504I may be mounted on horizontal shelf 622E. In another embodiment, first housing 502 may be fixedly mounted on a retail shelving unit on a first side of a horizontal shelf facing the opposing retail shelving unit and second housing 504 may be fixedly mounted on retail shelving unit 620 on a second side of the horizontal shelf orthogonal to the first side. For example, first housing 502H may mounted on a first side 624 of horizontal shelf 622C next to a label and second housing 504H may be mounted on a second side 626 of horizontal shelf 622C that faces down (e.g., towards the ground or towards a lower shelf). In another embodiment, second housing 504 may be mounted closer to the back of the horizontal shelf than to the front of the horizontal shelf. For example, second housing 504H may be fixedly mounted on horizontal shelf 622C on second side 626 closer to third side 628 of the horizontal shelf 622C than to first side 624. Third side 628 may be parallel to first side 624. As mentioned above, data conduit 508 (e.g., data conduit 508H) may have an adjustable or selectable length for extending between first housing 502 and second housing 504. In one embodiment, when first housing 502H is fixedly mounted on first side 624, the length of data conduit 508H may enable second housing 604H to be fixedly mounted on second side 626 closer to third side 628 than to first side 624.

As mentioned above, at least one processor contained in a single second housing 504 may control a plurality of image capture devices 506 contained in a plurality of first housings 502 (e.g., system 500J). In some embodiments, the plurality of image capture devices 506 may be configured for location on a single horizontal shelf and may be directed to substantially the same area of the opposing first retail shelving unit (e.g., system 500D in FIG. 6A). In these embodiments, the image data acquired by the first image capture device and the second image capture device may enable a calculation of depth information (e.g., based on image parallax information) associated with at least one product positioned on an opposing retail shelving unit. For example, system 500J may have single second housing 504J with at least one processor that may control a first image capturing device contained in first housing 502J1 and a second image capturing device contained in first housing 502J2. The distance d3 between the first image capture device contained in first housing 502J1 and the second image capture device contained in first housing 502J2 may be selected based on the distance between retail shelving unit 620 and the opposing retail shelving unit (e.g., similar to d1 and/or d2). For example, distance d3 may be at least 5 cm, at least 10 cm, at least 15 cm, less than 40 cm, less than 30 cm, between about 5 cm to about 20 cm, or between about 10 cm to about 15 cm. In another example, d3 may be a function of d1 and/or d2, a linear function of d1 and/or d2, a function of $d1*\log(d1)$ and/or $d2*\log(d2)$ such as $a1*d1*\log(d1)$ for some constant a1, and so forth. The data from the first image capturing device contained in first housing 502J1 and the second image capturing device contained in first housing 502J2 may be used to estimate the number of products on a store shelf of retail shelving unit 602. In related embodiments, system 500 may control a projector (e.g., projector 632) and image capture device 506 that are configured for location on a single store shelf or on two separate store shelves. For example, projector 632 may be mounted on horizontal shelf 622E and image capture device 506I may be mounted on horizontal shelf 622D. The image data acquired by image capture device 506 (e.g., included in first housing 502I) may include reflections of light patterns projected from projector 632 on the at least one product and/or the opposing retail shelving unit and may enable a calculation of depth information associated with at least one product positioned on the opposing retail shelving unit. The distance between projector 632 and the image capture device contained in first housing 502I may be selected based on the distance between retail shelving unit 620 and the opposing retail shelving unit (e.g., similar to d1 and/or d2). For example, the distance between the projector and the image capture device may be at least 5 cm, at least 10 cm, at least 15 cm, less than 40 cm, less than 30 cm, between about 5 cm to about 20 cm, or between about 10 cm to about 15 cm. In another example, the distance between the projector and the image capture device may be a function of d1 and/or d2, a linear function of d1 and/or d2, a function of $d1*\log(d1)$ and/or $d2*\log(d2)$ such as $a1*d1*\log(d1)$ for some constant a1, and so forth.

Consistent with the present disclosure, a central communication device 630 may be located in retail store 105 and may be configured to communicate with server 135 (e.g., via an Internet connection). The central communication device may also communicate with a plurality of systems 500 (for example, less than ten, ten, eleven, twelve, more than twelve, and so forth). In some cases, at least one system of the plurality of systems 500 may be located in proximity to central communication device 630. In the illustrated example, system 500F may be located in proximity to central communication device 630. In some embodiments, at least some of systems 500 may communicate directly with at least one other system 500. The communications between some of the plurality of systems 500 may happen via a wired connection, such as the communications between system 500J and system 500I and the communications between system 500H and system 500G. Additionally or alternatively, the communications between some of the plurality of systems 500 may occur via a wireless connection, such as the communications between system 500G and system 500F and the communications between system 500I and system 500F. In some examples, at least one system 500 may be configured to transmit captured image data (or information derived from the captured image data) to central communication device 630 via at least two mediating systems 500, at least three mediating systems 500, at least four mediating systems 500, or more. For example, system 500J may convey captured image data to central communication device 630 via system 500I and system 500F.

Consistent with the present disclosure, two (or more) systems 500 may share information to improve image acquisition. For example, system 500J may be configured to receive from a neighboring system 500I information associated with an event that system 500I had identified, and control image capture device 506 based on the received information. For example, system 500J may forgo image acquisition based on an indication from system 500I that an object has entered or is about to enter its field of view. Systems 500I and 500J may have overlapping fields of view or non-overlapping fields of view. In addition, system 500J may also receive (from system 500I) information that originates from central communication device 630 and control image capture device 506 based on the received information. For example, system 500I may receive instructions from central communication device 630 to capture an image when suppler 115 inquiries about a specific product that is placed in a retail unit opposing system 500I. In some embodiments, a plurality of systems 500 may communicate with central communication device 630. In order to reduce or avoid network congestion, each system 500 may identify an available transmission time slot. Thereafter, each system 500 may determine a default time slot for future transmissions based on the identified transmission time slot.

Figure 6C:
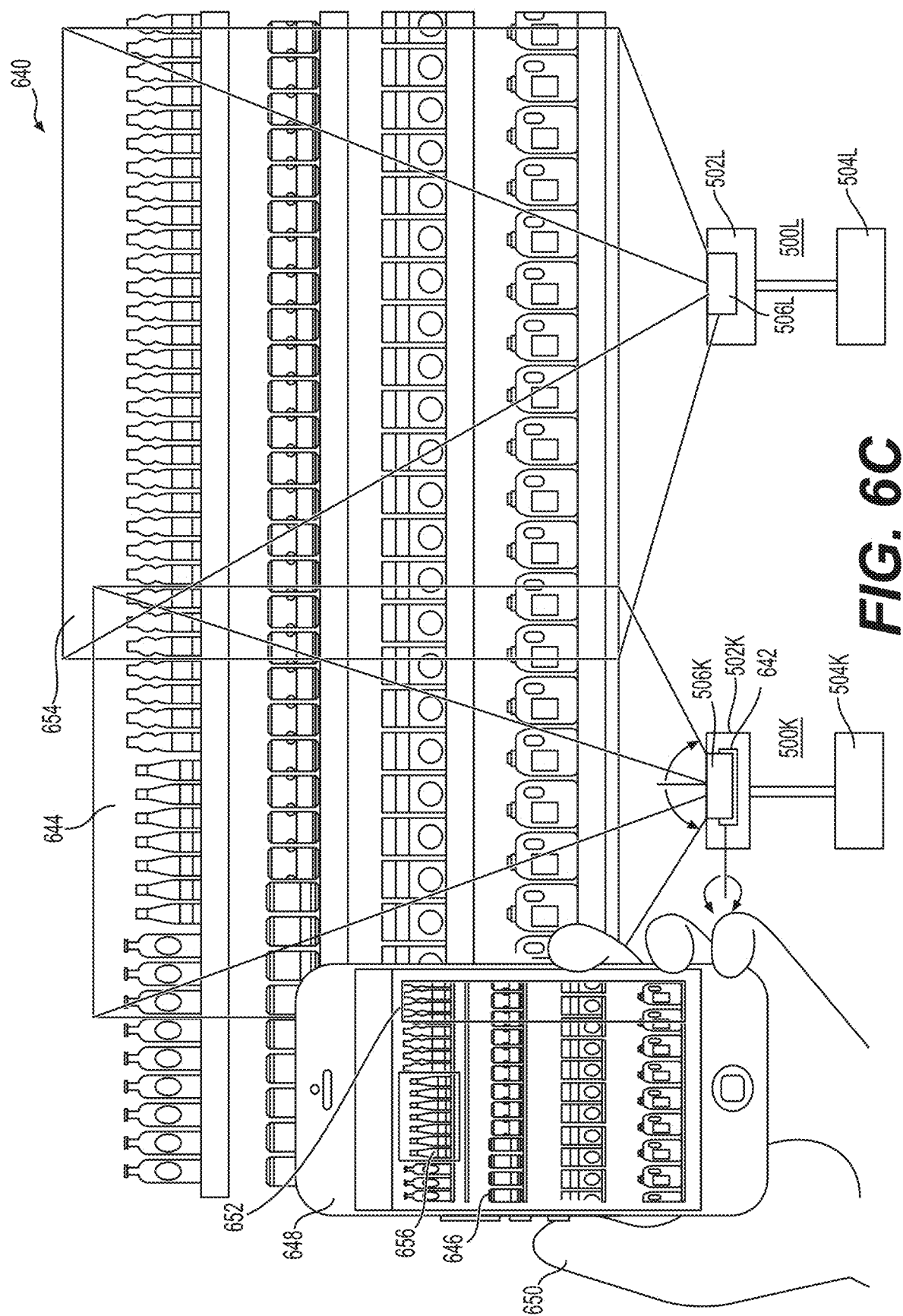
FIG. 6C provides a diagrammatic representation of how the exemplary disclosed image acquisition systems may be positioned relative to retail shelving to acquire product images, consistent with the present disclosure.

FIG. 6C provides a diagrammatic representation of a retail shelving unit 640 being captured by multiple systems 500 (e.g., system 500K and system 500L) deployed on an opposing retail shelving unit (not shown). FIG. 6C illustrates embodiments associated with the process of installing systems 500 in retail store 105. To facilitate the installation of system 500, each first housing 502 (e.g., first housing 502K) may include an adjustment mechanism 642 for setting a field of view 644 of image capture device 506K such that the field of view 644 will at least partially encompass products placed both on a bottom shelf of retail shelving unit 640 and on a top shelf of retail shelving unit 640. For example, adjustment mechanism 642 may enable setting the position of image capture device 506K relative to first housing 502K. Adjustment mechanism 642 may have at least two degrees of freedom to separately adjust manually (or automatically) the vertical field of view and the horizontal field of view of image capture device 506K. In one embodiment, the angle of image capture device 506K may be measured using position sensors associated with adjustment mechanism 642, and the measured orientation may be used to determine if image capture device 506K is positioned in the right direction. In one example, the output of the position sensors may be displayed on a handheld device of a store associate installing image capturing device 506K. Such an arrangement may provide the store associate/installer with real time visual feedback representative of the field of view of an image acquisition device being installed.

In addition to adjustment mechanism 642, first housing 502 may include a first physical adapter (not shown) configured to operate with multiple types of image capture device 506 and a second physical adapter (not shown) configured to operate with multiple types of lenses. During installation, the first physical adapter may be used to connect a suitable image capture device 506 to system 500 according to the level of recognition requested (e.g., detecting a barcode from products, detecting text and price from labels, detecting different categories of products, etc.). Similarly, during installation, the second physical adapter may be used to associate a suitable lens to image capture device 506 according to the physical conditions at the store (e.g., the distance between the aisles, the horizontal field of view required from image capture device 506, and/or the vertical field of view required from image capture device 506). The second physical adapter provides the store associate/installer the ability to select the focal length of lens 312 during installation according to the distance between retail shelving units on opposite sides of an aisle (e.g., distance d1 and/or distance d2 shown in FIG. 6A). In some embodiments, adjustment mechanism 642 may include a locking mechanism to reduce the likelihood of unintentional changes in the field of view of image capture device 506. Additionally or alternatively, the at least one processor contained in second housing 504 may detect changes in the field of view of image capture device 506 and issue a warning when a change is detected, when a change larger than a selected threshold is detected, when a change is detected for a duration longer than a selected threshold, and so forth.

In addition to adjustment mechanism 642 and the different physical adapters, system 500 may modify the image data acquired by image capture device 506 based on at least one attribute associated with opposing retail shelving unit 640. Consistent with the present disclosure, the at least one attribute associated with retail shelving unit 640 may include a lighting condition, the dimensions of opposing retail shelving unit 640, the size of products displayed on opposing retail shelving unit 640, the type of labels used on opposing retail shelving unit 640, and more. In some embodiments, the attribute may be determined, based on analysis of one or more acquired images, by at least one processor contained in second housing 504. Alternatively, the attribute may be automatically sensed and conveyed to the at least one processor contained in second housing 504. In one example, the at least one processor may change the brightness of captured images based on the detected light conditions. In another example, the at least one processor may modify the image data by cropping the image such that it will include only the products on retail shelving unit (e.g., not to include the floor or the ceiling), only area of the shelving unit relevant to a selected task (such as planogram compliance check), and so forth.

Consistent with the present disclosure, during installation, system 500 may enable real-time display 646 of field of view 644 on a handheld device 648 of a user 650 installing image capturing device 506K. In one embodiment, real-time display 646 of field of view 644 may include augmented markings 652 indicating a location of a field of view 654 of an adjacent image capture device 506L. In another embodiment, real-time display 646 of field of view 644 may include augmented markings 656 indicating a region of interest in opposing retail shelving unit 640. The region of interest may be determined based on a planogram, identified product type, and/or part of retail shelving unit 640. For example, the region of interest may include products with a greater likelihood of planogram incompliance. In addition, system 500K may analyze acquired images to determine if field of view 644 includes the area that image capturing device 506K is supposed to monitor (for example, from labels on opposing retail shelving unit 640, products on opposing retail shelving unit 640, images captured from other image capturing devices that may capture other parts of opposing retail shelving unit 640 or capture the same part of opposing retail shelving unit 640 but in a lower resolution or at a lower frequency, and so forth). In additional embodiments, system 500 may further comprise an indoor location sensor which may help determine if the system 500 is positioned at the right location in retail store 105.

In some embodiments, an anti-theft device may be located in at least one of first housing 502 and second housing 504. For example, the anti-theft device may include a specific RF label or a pin-tag radio-frequency identification device, which may be the same or similar to a type of anti-theft device that is used by retail store 105 in which system 500 is located. The RF label or the pin-tag may be incorporated within the body of first housing 502 and second housing 504 and may not be visible. In another example, the anti-theft device may include a motion sensor whose output may be used to trigger an alarm in the case of motion or disturbance, in case of motion that is above a selected threshold, and so forth.

Figure 7A:
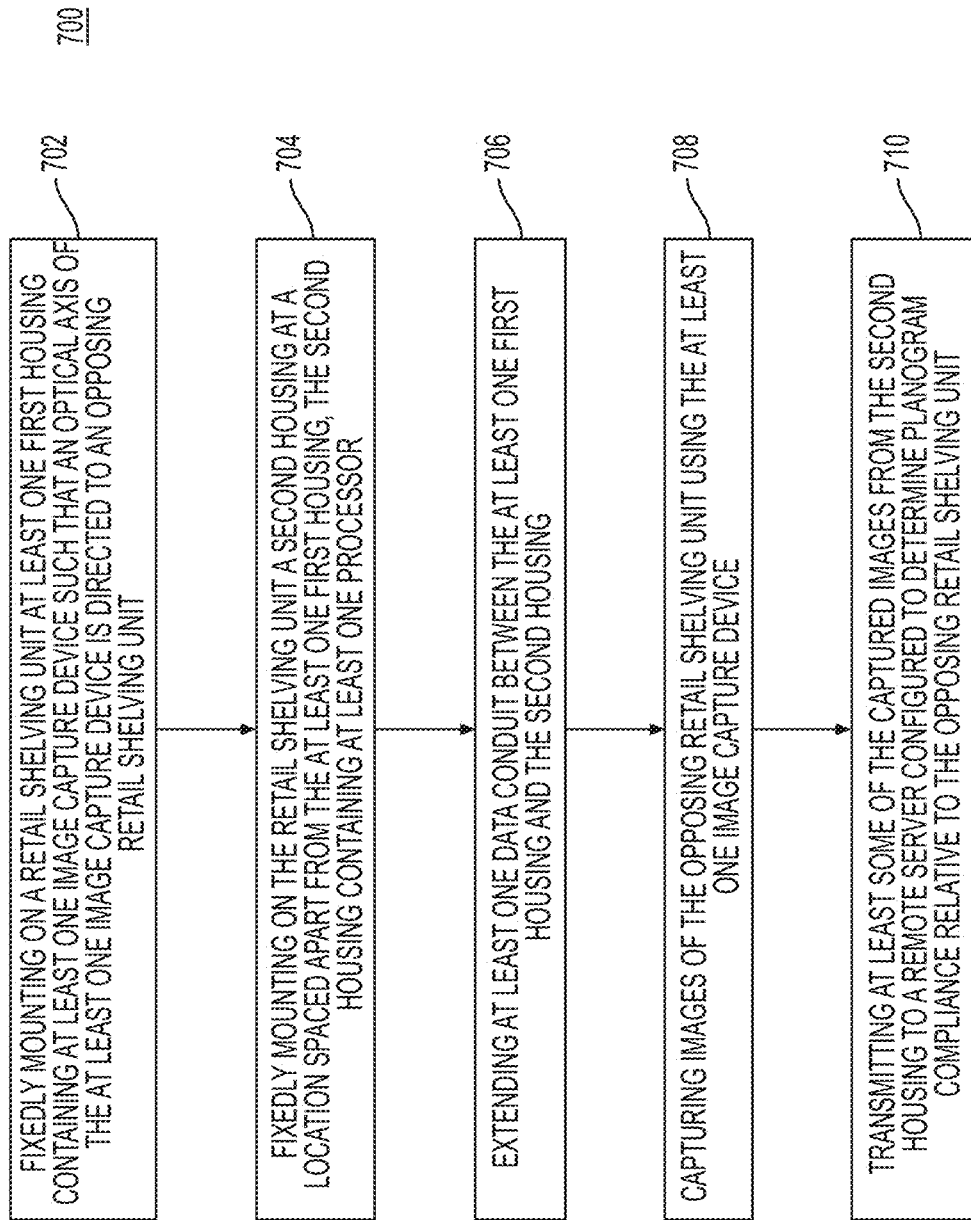
FIG. 7A provides a flowchart of an exemplary method for acquiring images of products in retail store, consistent with the present disclosure.

FIG. 7A includes a flowchart representing an exemplary method 700 for acquiring images of products in retail store 105 in accordance with example embodiments of the present disclosure. For purposes of illustration, in the following description, reference is made to certain components of system 500 as deployed in the configuration depicted in FIG. 6A. It will be appreciated, however, that other implementations are possible and that other configurations may be utilized to implement the exemplary method. It will also be readily appreciated that the illustrated method can be altered to modify the order of steps, delete steps, or further include additional steps.

At step 702, the method includes fixedly mounting on first retail shelving unit 602 at least one first housing 502 containing at least one image capture device 506 such that an optical axis (e.g., optical axis 606) of at least one image capture device 506 is directed to second retail shelving unit 604. In one embodiment, fixedly mounting first housing 502 on first retail shelving unit 602 may include placing first housing 502 on a side of store shelf 622 facing second retail shelving unit 604. In another embodiment, fixedly mounting first housing 502 on retail shelving unit 602 may include placing first housing 502 in a slit between two adjacent horizontal shelves. In some embodiments, the method may further include fixedly mounting on first retail shelving unit 602 at least one projector (such as projector 632) such that light patterns projected by the at least one projector are directed to second retail shelving unit 604. In one embodiment, the method may include mounting the at least one projector to first retail shelving unit 602 at a selected distance to first housing 502 with image capture device 506. In one embodiment, the selected distance may be at least 5 cm, at least 10 cm, at least 15 cm, less than 40 cm, less than 30 cm, between about 5 cm to about 20 cm, or between about 10 cm to about 15 cm. In one embodiment, the selected distance may be calculated according to a distance between to first retail shelving unit 602 and second retail shelving unit 604, such as d1 and/or d2, for example selecting the distance to be a function of d1 and/or d2, a linear function of d1 and/or d2, a function of $d1*\log(d1)$ and/or $d2*\log(d2)$ such as $a1*d1*\log(d1)$ for some constant a1, and so forth.

At step 704, the method includes fixedly mounting on first retail shelving unit 602 second housing 504 at a location spaced apart from the at least one first housing 502, second housing 504 may include at least one processor (e.g., processing device 302). In one embodiment, fixedly mounting second housing 504 on the retail shelving unit may include placing second housing 504 on a different side of store shelf 622 than the side first housing 502 is mounted on.

At step 706, the method includes extending at least one data conduit 508 between at least one first housing 502 and second housing 504. In one embodiment, extending at least one data conduit 508 between at least one first housing 502 and second housing 504 may include adjusting the length of data conduit 508 to enable first housing 502 to be mounted separately from second housing 504. At step 708, the method includes capturing images of second retail shelving unit 604 using at least one image capture device 506 contained in at least one first housing 502 (e.g., first housing 502A, first housing 502B, or first housing 502C). In one embodiment, the method further includes periodically capturing images of products located on second retail shelving unit 604. In another embodiment the method includes capturing images of second retail shelving unit 604 after receiving a trigger from at least one additional sensor in communication with system 500 (wireless or wired).

At step 710, the method includes transmitting at least some of the captured images from second housing 504 to a remote server (e.g., server 135) configured to determine planogram compliance relative to second retail shelving unit 604. In some embodiments, determining planogram compliance relative to second retail shelving unit 604 may include determining at least one characteristic of planogram compliance based on detected differences between the at least one planogram and the actual placement of the plurality of product types on second retail shelving unit 604. Consistent with the present disclosure, the characteristic of planogram compliance may include at least one of: product facing, product placement, planogram compatibility, price correlation, promotion execution, product homogeneity, restocking rate, and planogram compliance of adjacent products.

Figure 7B:
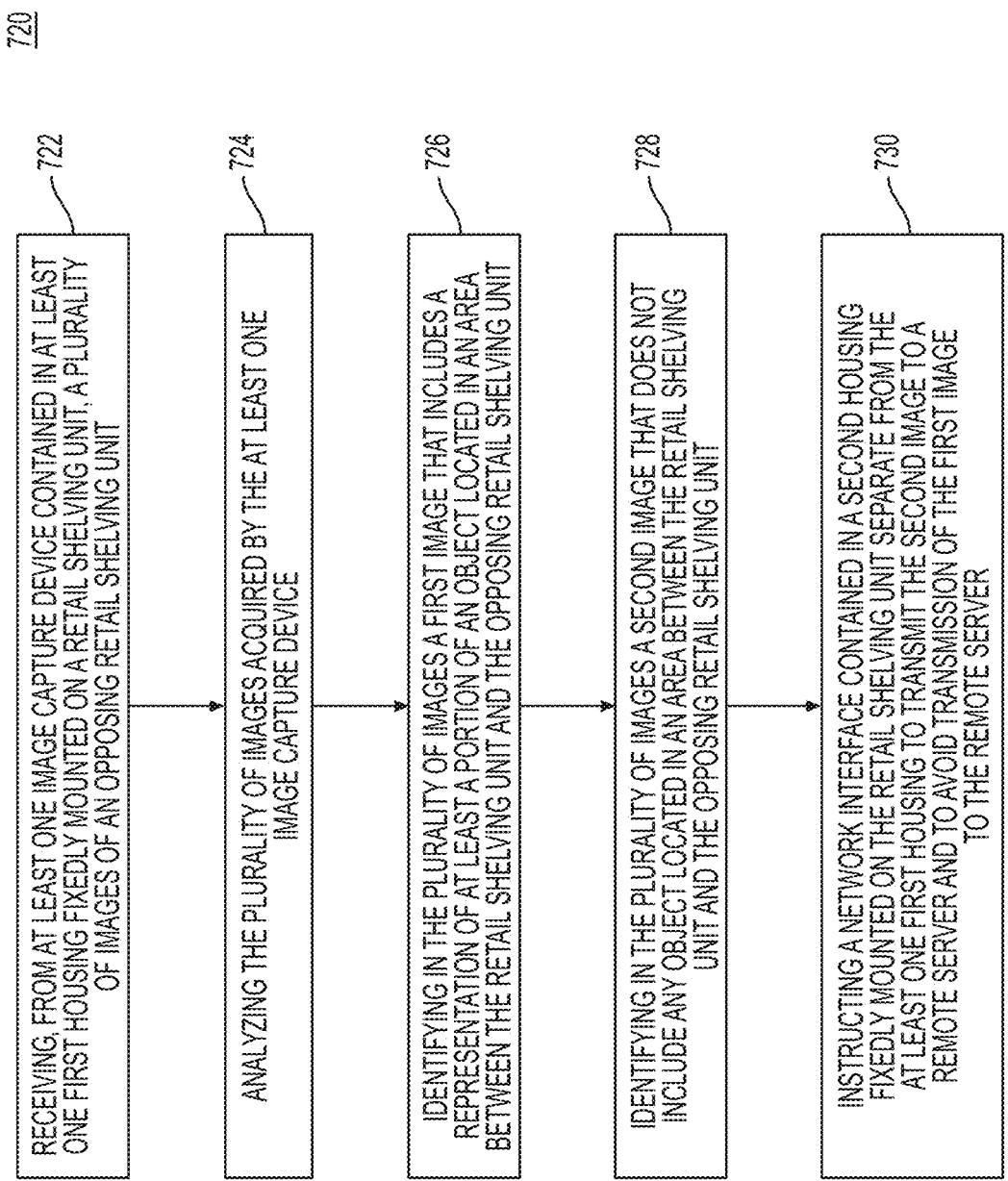
FIG. 7B provides a flowchart of a method for acquiring images of products in retail store, consistent with the present disclosure.

FIG. 7B provides a flowchart representing an exemplary method 720 for acquiring images of products in retail store 105, in accordance with example embodiments of the present disclosure. For purposes of illustration, in the following description, reference is made to certain components of system 500 as deployed in the configuration depicted in FIG. 6A. It will be appreciated, however, that other implementations are possible and that other configurations may be utilized to implement the exemplary method. It will also be readily appreciated that the illustrated method can be altered to modify the order of steps, delete steps, or further include additional steps.

At step 722, at least one processor contained in a second housing may receive from at least one image capture device contained in at least one first housing fixedly mounted on a retail shelving unit a plurality of images of an opposing retail shelving unit. For example, at least one processor contained in second housing 504A may receive from at least one image capture device 506 contained in first housing 502A (fixedly mounted on first retail shelving unit 602) a plurality of images of second retail shelving unit 604. The plurality of images may be captured and collected during a period of time (e.g., a minute, an hour, six hours, a day, a week, or more).

At step 724, the at least one processor contained in the second housing may analyze the plurality of images acquired by the at least one image capture device. In one embodiment, at least one processor contained in second housing 504A may use any suitable image analysis technique (for example, object recognition, object detection, image segmentation, feature extraction, optical character recognition (OCR), object-based image analysis, shape region techniques, edge detection techniques, pixel-based detection, artificial neural networks, convolutional neural networks, etc.) to identify objects in the plurality of images. In one example, the at least one processor contained in second housing 504A may determine the number of products located in second retail shelving unit 604. In another example, the at least one processor contained in second housing 504A may detect one or more objects in an area between first retail shelving unit 602 and second retail shelving unit 604.

At step 726, the at least one processor contained in the second housing may identify in the plurality of images a first image that includes a representation of at least a portion of an object located in an area between the retail shelving unit and the opposing retail shelving unit. In step 728, the at least one processor contained in the second housing may identify in the plurality of images a second image that does not include any object located in an area between the retail shelving unit and the opposing retail shelving unit. In one example, the object in the first image may be an individual, such as a customer or a store associate. In another example, the object in the first image may be an inanimate object, such as carts, boxes, products, etc.

At step 730, the at least one processor contained in the second housing may instruct a network interface contained in the second housing, fixedly mounted on the retail shelving unit separate from the at least one first housing, to transmit the second image to a remote server and to avoid transmission of the first image to the remote server. In addition, the at least one processor may issue a notification when an object blocks the field of view of the image capturing device for more than a predefined period of time (e.g., at least 30 minutes, at least 75 minutes, at least 150 minutes).

Embodiments of the present disclosure may automatically assess compliance of one or more store shelves with a planogram. For example, embodiments of the present disclosure may use signals from one or more sensors to determine placement of one or more products on store shelves. The disclosed embodiments may also use one or more sensors to determine empty spaces on the store shelves. The placements and empty spaces may be automatically assessed against a digitally encoded planogram. A planogram refers to any data structure or specification that defines at least one product characteristic relative to a display structure associated with a retail environment (such as store shelf or area of one or more shelves). Such product characteristics may include, among other things, quantities of products with respect to areas of the shelves, product configurations or product shapes with respect to areas of the shelves, product arrangements with respect to areas of the shelves, product density with respect to areas of the shelves, product combinations with respect to areas of the shelves, etc. Although described with reference to store shelves, embodiments of the present disclosure may also be applied to end caps or other displays; bins, shelves, or other organizers associated with a refrigerator or freezer units; or any other display structure associated with a retail environment.

The embodiments disclosed herein may use any sensors configured to detect one or more parameters associated with products (or a lack thereof). For example, embodiments may use one or more of pressure sensors, weight sensors, light sensors, resistive sensors, capacitive sensors, inductive sensors, vacuum pressure sensors, high pressure sensors, conductive pressure sensors, infrared sensors, photo-resistor sensors, photo-transistor sensors, photo-diodes sensors, ultrasonic sensors, or the like. Some embodiments may use a plurality of different kinds of sensors, for example, associated with the same or overlapping areas of the shelves and/or associated with different areas of the shelves. Some embodiments may use a plurality of sensors configured to be placed adjacent a store shelf, configured for location on the store shelf, configured to be attached to, or configured to be integrated with the store shelf. In some cases, at least part of the plurality of sensors may be configured to be placed next to a surface of a store shelf configured to hold products. For example, the at least part of the plurality of sensors may be configured to be placed relative to a part of a store shelf such that the at least part of the plurality of sensors may be positioned between the part of a store shelf and products placed on the part of the shelf. In another embodiment, the at least part of the plurality of sensors may be configured to be placed above and/or within and/or under the part of the shelf.

In one example, the plurality of sensors may include light detectors configured to be located such that a product placed on the part of the shelf may block at least some of the ambient light from reaching the light detectors. The data received from the light detectors may be analyzed to detect a product or to identify a product based on the shape of a product placed on the part of the shelf. In one example, the system may identify the product placed above the light detectors based on data received from the light detectors that may be indicative of at least part of the ambient light being blocked from reaching the light detectors. Further, the data received from the light detectors may be analyzed to detect vacant spaces on the store shelf. For example, the system may detect vacant spaces on the store shelf based on the received data that may be indicative of no product being placed on a part of the shelf. In another example, the plurality of sensors may include pressure sensors configured to be located such that a product placed on the part of the shelf may apply detectable pressure on the pressure sensors. Further, the data received from the pressure sensors may be analyzed to detect a product or to identify a product based on the shape of a product placed on the part of the shelf. In one example, the system may identify the product placed above the pressure sensors based on data received from the pressure sensors being indicative of pressure being applied on the pressure sensors. In addition, the data from the pressure sensors may be analyzed to detect vacant spaces on the store shelf, for example based on the readings being indicative of no product being placed on a part of the shelf, for example, when the pressure readings are below a selected threshold. Consistent with the present disclosure, inputs from different types of sensors (such as pressure sensors, light detectors, etc.) may be combined and analyzed together, for example to detect products placed on a store shelf, to identify shapes of products placed on a store shelf, to identify types of products placed on a store shelf, to identify vacant spaces on a store shelf, and so forth.

Figure 8A:
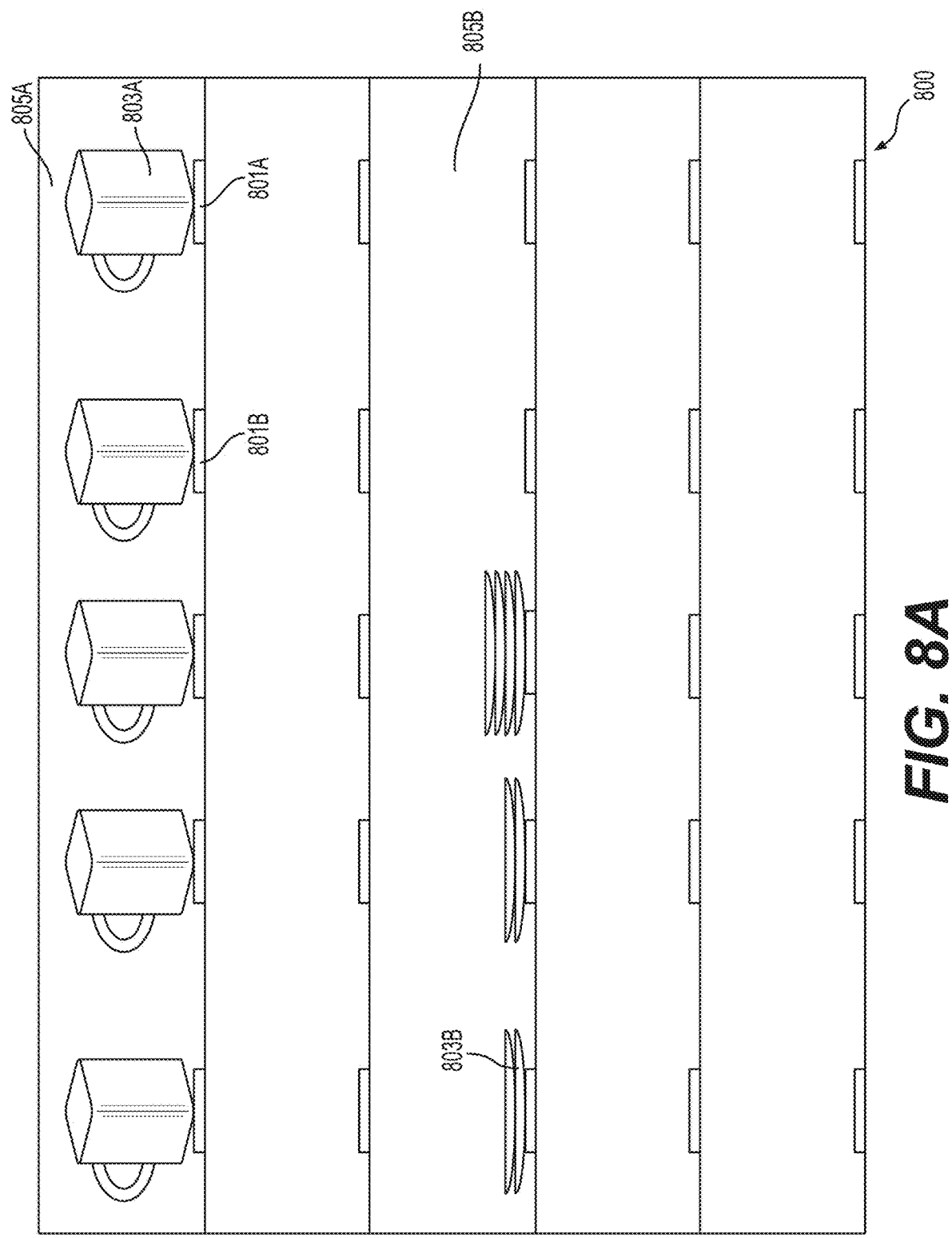
FIG. 8A is a schematic illustration of an example configuration for detecting products and empty spaces on a store shelf, consistent with the present disclosure.

With reference to FIG. 8A and consistent with the present disclosure, a store shelf 800 may include a plurality of detection elements, e.g., detection elements 801A and 801B. In the example of FIG. 8A, detection elements 801A and 801B may comprise pressure sensors and/or other type of sensors for measuring one or more parameters (such as resistance, capacitance, or the like) based on physical contact (or lack thereof) with products, e.g., product 803A and product 803B. Additionally or alternatively, detection elements configured to measure one or more parameters (such as current induction, magnetic induction, visual or other electromagnetic reflectance, visual or other electromagnetic emittance, or the like) may be included to detect products based on physical proximity (or lack thereof) to products. Consistent with the present disclosure, the plurality of detection elements may be configured for location on shelf 800. The plurality of detection elements may be configured to detect placement of products when the products are placed above at least part of the plurality of detection elements. Some embodiments of the disclosure, however, may be performed when at least some of the detection elements may be located next to shelf 800 (e.g., for magnetometers or the like), across from shelf 800 (e.g., for image sensors or other light sensors, light detection and ranging (LIDAR) sensors, radio detection and ranging (RADAR) sensors, or the like), above shelf 800 (e.g., for acoustic sensors or the like), below shelf 800 (e.g., for pressure sensors or the like), or any other appropriate spatial arrangement. Although depicted as standalone units in the example of FIG. 8A, the plurality of detection elements may form part of a fabric (e.g., a smart fabric or the like), and the fabric may be positioned on a shelf to take measurements. For example, two or more detection elements may be integrated together into a single structure (e.g., disposed within a common housing, integrated together within a fabric or mat, etc.). In some examples, detection elements (such as detection elements 801A and 801B) may be placed adjacent to (or placed on) store shelves as described above. Some examples of detection elements may include pressure sensors and/or light detectors configured to be placed above and/or within and/or under a store shelf as described above.

Detection elements associated with shelf 800 may be associated with different areas of shelf 800. For example, detection elements 801A and 801B are associated with area 805A while other detection elements are associated with area 805B. Although depicted as rows, areas 805A and 805B may comprise any areas of shelf 800, whether contiguous (e.g., a square, a rectangular, or other regular or irregular shape) or not (e.g., a plurality of rectangles or other regular and/or irregular shapes). Such areas may also include horizontal regions between shelves (as shown in FIG. 8A) or may include vertical regions that include area of multiple different shelves (e.g., columnar regions spanning over several different horizontally arranged shelves). In some examples, the areas may be part of a single plane. In some examples, each area may be part of a different plane. In some examples, a single area may be part of a single plane or be divided across multiple planes.

One or more processors (e.g., processing device 202) configured to communicate with the detection elements (e.g., detection elements 801A and 801B) may detect first signals associated with a first area (e.g., areas 805A and/or 805B) and second signals associated with a second area. In some embodiments, the first area may, in part, overlap with the second area. For example, one or more detection elements may be associated with the first area as well as the second area and/or one or more detection elements of a first type may be associated with the first area while one or more detection elements of a second type may be associated with the second area overlapping, at least in part, the first area. In other embodiments, the first area and the second area may be spatially separate from each other.

The one or more processors may, using the first and second signals, determine that one or more products have been placed in the first area while the second area includes at least one empty area. For example, if the detection elements include pressure sensors, the first signals may include weight signals that match profiles of particular products (such as the mugs or plates depicted in the example of FIG. 8A), and the second signals may include weight signals indicative of the absence of products (e.g., by being equal to or within a threshold of a default value such as atmospheric pressure or the like). The disclosed weight signals may be representative of actual weight values associated with a particular product type or, alternatively, may be associated with a relative weight value sufficient to identify the product and/or to identify the presence of a product. In some cases, the weight signal may be suitable for verifying the presence of a product regardless of whether the signal is also sufficient for product identification. In another example, if the detection elements include light detectors (as described above), the first signals may include light signals that match profiles of particular products (such as the mugs or plates depicted in the example of FIG. 8A), and the second signals may include light signals indicative of the absence of products (e.g., by being equal to or within a threshold of a default value such as values corresponding to ambient light or the like). For example, the first light signals may be indicative of ambient light being blocked by particular products, while the second light signals may be indicative of no product blocking the ambient light. The disclosed light signals may be representative of actual light patterns associated with a particular product type or, alternatively, may be associated with light patterns sufficient to identify the product and/or to identify the presence of a product.

The one or more processors may similarly process signals from other types of sensors. For example, if the detection elements include resistive or inductive sensors, the first signals may include resistances, voltages, and/or currents that match profiles of particular products (such as the mugs or plates depicted in the example of FIG. 8A or elements associated with the products, such as tags, etc.), and the second signals may include resistances, voltages, and/or currents indicative of the absence of products (e.g., by being equal to or within a threshold of a default value such as atmospheric resistance, a default voltage, a default current, corresponding to ambient light, or the like). In another example, if the detection elements include acoustics, LIDAR, RADAR, or other reflective sensors, the first signals may include patterns of returning waves (whether sound, visible light, infrared light, radio, or the like) that match profiles of particular products (such as the mugs or plates depicted in the example of FIG. 8A), and the second signals may include patterns of returning waves (whether sound, visible light, infrared light, radio, or the like) indicative of the absence of products (e.g., by being equal to or within a threshold of a pattern associated with an empty shelf or the like).

Any of the profile matching described above may include direct matching of a subject to a threshold. For example, direct matching may include testing one or more measured values against the profile value(s) within a margin of error; mapping a received pattern onto a profile pattern with a residual having a maximum, minimum, integral, or the like within the margin of error; performing an autocorrelation, Fourier transform, convolution, or other operation on received measurements or a received pattern and comparing the resultant values or function against the profile within a margin of error; or the like. Additionally or alternatively, profile matching may include fuzzy matching between measured values and/or patterns and a database of profiles such that a profile with a highest level of confidence according to the fuzzy search. Moreover, as depicted in the example of FIG. 8A, products, such as product 803B, may be stacked and thus associated with a different profile when stacked than when standalone.

Any of the profile matching described above may include use of one or more machine learning techniques. For example, one or more artificial neural networks, random forest models, or other models trained on measurements annotated with product identifiers may process the measurements from the detection elements and identify products therefrom. In such embodiments, the one or more models may use additional or alternative input, such as images of the shelf (e.g., from capturing devices 125 of FIGS. 4A-4C explained above) or the like.

Based on detected products and/or empty spaces, determined using the first signals and second signals, the one or more processors may determine one or more aspects of planogram compliance. For example, the one or more processors may identify products and their locations on the shelves, determine quantities of products within particular areas (e.g., identifying stacked or clustered products), identify facing directions associated with the products (e.g., whether a product is outward facing, inward facing, askew, or the like), or the like. Identification of the products may include identifying a product type (e.g., a bottle of soda, a loaf of broad, a notepad, or the like) and/or a product brand (e.g., a Coca-Cola® bottle instead of a Sprite® bottle, a Starbucks® coffee tumbler instead of a Tervis® coffee tumbler, or the like). Product facing direction and/or orientation, for example, may be determined based on a detected orientation of an asymmetric shape of a product base using pressure sensitive pads, detected density of products, etc. For example, the product facing may be determined based on locations of detected product bases relative to certain areas of a shelf (e.g., along a front edge of a shelf), etc. Product facing may also be determined using image sensors, light sensors, or any other sensor suitable for detecting product orientation.

The one or more processors may generate one or more indicators of the one or more aspects of planogram compliance. For example, an indicator may comprise a data packet, a data file, or any other data structure indicating any variations from a planogram, e.g., with respect to product placement such as encoding intended coordinates of a product and actual coordinates on the shelf, with respect to product facing direction and/or orientation such as encoding indicators of locations that have products not facing a correct direction and/or in an undesired orientation, or the like.

In addition to or as an alternative to determining planogram compliance, the one or more processors may detect a change in measurements from one or more detection elements. Such measurement changes may trigger a response. For example, a change of a first type may trigger capture of at least one image of the shelf (e.g., using capturing devices 125 of FIGS. 4A-4C explained above) while a detected change of a second type may cause the at least one processor to forgo such capture. A first type of change may, for example, indicate the moving of a product from one location on the shelf to another location such that planogram compliance may be implicated. In such cases, it may be desired to capture an image of the product rearrangement in order to assess or reassess product planogram compliance. In another example, a first type of change may indicate the removal of a product from the shelf, e.g., by a store associate due to damage, by a customer to purchase, or the like. On the other hand, a second type of change may, for example, indicate the removal and replacement of a product to the same (within a margin of error) location on the shelf, e.g., by a customer to inspect the item. In cases where products are removed from a shelf, but then replaced on the shelf (e.g., within a particular time window), the system may forgo a new image capture, especially if the replaced product is detected in a location similar to or the same as its recent, original position.

With reference to FIG. 8B and consistent with the present disclosure, a store shelf 850 may include a plurality of detection elements, e.g., detection elements 851A and 851B. In the example of FIG. 8B, detection elements 851A and 851B may comprise light sensors and/or other sensors measuring one or more parameters (such as visual or other electromagnetic reflectance, visual or other electromagnetic emittance, or the like) based on electromagnetic waves from products, e.g., product 853A and product 853B. Additionally or alternatively, as explained above with respect to FIG. 8B, detection elements 851A and 851B may comprise pressure sensors, other sensors measuring one or more parameters (such as resistance, capacitance, or the like) based on physical contact (or lack thereof) with the products, and/or other sensors that measure one or more parameters (such as current induction, magnetic induction, visual or other electromagnetic reflectance, visual or other electromagnetic emittance, or the like) based on physical proximity (or lack thereof) to products.

Moreover, although depicted as located on shelf 850, some detection elements may be located next to shelf 850 (e.g., for magnetometers or the like), across from shelf 850 (e.g., for image sensors or other light sensors, light detection and ranging (LIDAR) sensors, radio detection and ranging (RADAR) sensors, or the like), above shelf 850 (e.g., for acoustic sensors or the like), below shelf 850 (e.g., for pressure sensors, light detectors, or the like), or any other appropriate spatial arrangement. Further, although depicted as standalone in the example of FIG. 8B, the plurality of detection elements may form part of a fabric (e.g., a smart fabric or the like), and the fabric may be positioned on a shelf to take measurements.

Detection elements associated with shelf 850 may be associated with different areas of shelf 850, e.g., area 855A, area 855B, or the like. Although depicted as rows, areas 855A and 855B may comprise any areas of shelf 850, whether contiguous (e.g., a square, a rectangular, or other regular or irregular shape) or not (e.g., a plurality of rectangles or other regular and/or irregular shapes).

One or more processors (e.g., processing device 202) in communication with the detection elements (e.g., detection elements 851A and 851B) may detect first signals associated with a first area and second signals associated with a second area. Any of the processing of the first and second signals described above with respect to FIG. 8A may similarly be performed for the configuration of FIG. 8B.

In both FIGS. 8A and 8B, the detection elements may be integral to the shelf, part of a fabric or other surface configured for positioning on the shelf, or the like. Power and/or data cables may form part of the shelf, the fabric, the surface, or be otherwise connected to the detection elements. Additionally or alternatively, as depicted in FIGS. 8A and 8B, individual sensors may be positioned on the shelf. For example, the power and/or data cables may be positioned under the shelf and connected through the shelf to the detection elements. In another example, power and/or data may be transmitted wirelessly to the detection elements (e.g., to wireless network interface controllers forming part of the detection elements). In yet another example, the detection elements may include internal power sources (such as batteries or fuel cells).

Figure 9:
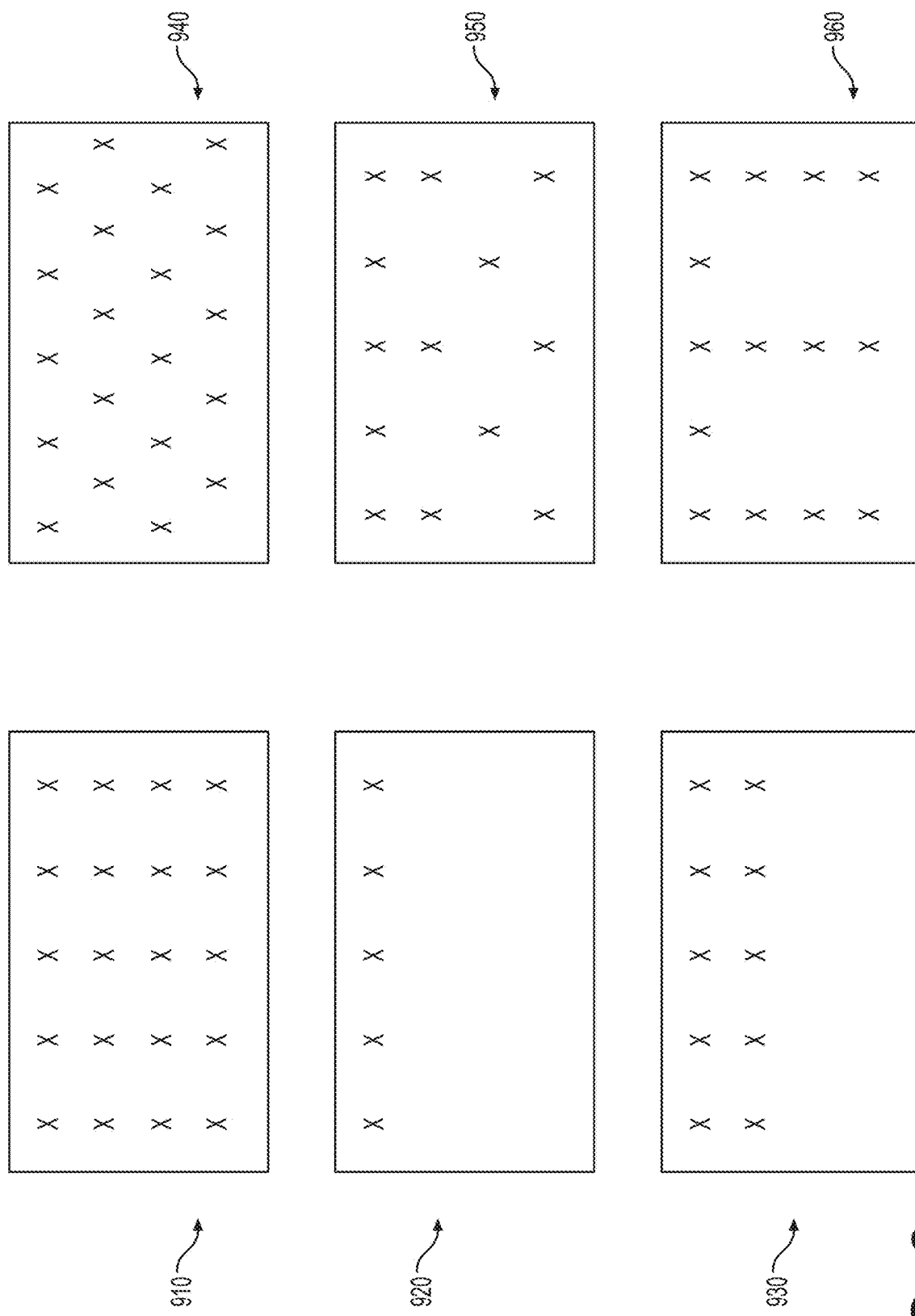
FIG. 9 is a schematic illustration of example configurations for detection elements on store shelves, consistent with the present disclosure.

With reference to FIG. 9 and consistent with the present disclosure, the detection elements described above with reference to FIGS. 8A and 8B may be arranged on rows of the shelf in any appropriate configuration. All of the arrangements of FIG. 9 are shown as a top-down view of a row (e.g., area 805A, area 805B, area 855A, area 855B, or the like) on the shelf. For example, arrangements 910 and 940 are both uniform distributions of detection elements within a row. However, arrangement 910 is also uniform throughout the depth of the row while arrangement 940 is staggered. Both arrangements may provide signals that represent products on the shelf in accordance with spatially uniform measurement locations. As further shown in FIG. 9, arrangements 920, 930, 950, and 960 cluster detection elements near the front (e.g., a facing portion) of the row. Arrangement 920 includes detection elements at a front portion while arrangement 930 includes defection elements in a larger portion of the front of the shelf. Such arrangements may save power and processing cycles by having fewer detection elements on a back portion of the shelf Arrangements 950 and 960 include some detection elements in a back portion of the shelf but these elements are arranged less dense than detection elements in the front. Such arrangements may allow for detections in the back of the shelf (e.g., a need to restock products, a disruption to products in the back by a customer or store associate, or the like) while still using less power and fewer processing cycles than arrangements 910 and 940. And, such arrangements may include a higher density of detection elements in regions of the shelf (e.g., a front edge of the shelf) where product turnover rates may be higher than in other regions (e.g., at areas deeper into a shelf), and/or in regions of the shelf where planogram compliance is especially important.

FIG. 10A is a flow chart, illustrating an exemplary method 1000 for monitoring planogram compliance on a store shelf, in accordance with the presently disclosed subject matter. It is contemplated that method 1000 may be used with any of the detection element arrays discussed above with reference to, for example, FIGS. 8A, 8B and 9. The order and arrangement of steps in method 1000 is provided for purposes of illustration. As will be appreciated from this disclosure, modifications may be made to process 1000, for example, adding, combining, removing, and/or rearranging one or more steps of process 1000.

Method 1000 may include a step 1005 of receiving first signals from a first subset of detection elements (e.g., detection elements 801A and 801B of FIG. 8A) from among the plurality of detection elements after one or more of a plurality of products (e.g., products 803A and 803B) are placed on at least one area of the store shelf associated with the first subset of detection elements. As explained above with respect to FIGS. 8A and 8B, the plurality of detection elements may be embedded into a fabric configured to be positioned on the store shelf Additionally or alternatively, the plurality of detection elements may be configured to be integrated with the store shelf. For example, an array of pressure sensitive elements (or any other type of detector) may be fabricated as part of the store shelf. In some examples, the plurality of detection elements may be configured to placed adjacent to (or located on) store shelves, as described above.

As described above with respect to arrangements 910 and 940 of FIG. 9, the plurality of detection elements may be substantially uniformly distributed across the store shelf. Alternatively, as described above with respect to arrangements 920, 930, 950, and 960 of FIG. 9, the plurality of detection elements may be distributed relative to the store shelf such that a first area of the store shelf has a higher density of detection elements than a second area of the store shelf. For example, the first area may comprise a front portion of the shelf, and the second area may comprise a back portion of the shelf.

In some embodiments, such as those including pressure sensors or other contact sensors as depicted in the example of FIG. 8A, step 1005 may include receiving the first signals from the first subset of detection elements as the plurality of products are placed above the first subset of detection elements. In some embodiments where the plurality of detection elements includes pressure detectors, the first signals may be indicative of pressure levels detected by pressure detectors corresponding to the first subset of detection elements after one or more of the plurality of products are placed on the at least one area of the store shelf associated with the first subset of detection elements. For example, the first signals may be indicative of pressure levels detected by pressure detectors corresponding to the first subset of detection elements after stocking at least one additional product above a product previously positioned on the shelf, removal of a product from the shelf, or the like. In other embodiments where the plurality of detection elements includes light detectors, the first signals may be indicative of light measurements made with respect to one or more of the plurality of products placed on the at least one area of the store shelf associated with the first subset of detection elements. Specifically, the first signals may be indicative of at least part of the ambient light being blocked from reaching the light detectors by the one or more of the plurality of products.

In embodiments including proximity sensors as depicted in the example of FIG. 8B, step 1005 may include receiving the first signals from the first subset of detection elements as the plurality of products are placed below the first subset of detection elements. In embodiments where the plurality of detection elements include proximity detectors, the first signals may be indicative of proximity measurements made with respect to one or more of the plurality of products placed on the at least one area of the store shelf associated with the first subset of detection elements.

Method 1000 may include step 1010 of using the first signals to identify at least one pattern associated with a product type of the plurality of products. For example, any of the pattern matching techniques described above with respect to FIGS. 8A and 8B may be used for identification. A pattern associated with a product type may include a pattern (e.g., a continuous ring, a discontinuous ring of a certain number of points, a certain shape, etc.) associated with a base of a single product. The pattern associated with a product type may also be formed by a group of products. For example, a six pack of soda cans may be associated with a pattern including a 2×3 array of continuous rings associated with the six cans of that product type. Additionally, a grouping of two liter bottles may form a detectable pattern including an array (whether uniform, irregular, or random) of discontinuous rings of pressure points, where the rings have a diameter associated with a particular 2-liter product. Various other types of patterns may also be detected (e.g., patterns associated with different product types arranged adjacent to one another, patterns associated with solid shapes (such as a rectangle of a boxed product), etc.). In another example, an artificial neural network configured to recognize product types may be used to analyze the signals received by step 1005 (such as signals from pressure sensors, from light detectors, from contact sensors, and so forth) to determine product types associated with products placed on an area of a shelf (such as an area of a shelf associated with the first subset of detection elements). In yet another example, a machine learning algorithm trained using training examples to recognize product types may be used to analyze the signals received by step 1005 (such as signals from pressure sensors, from light detectors, from contact sensors, and so forth) to determine product types associated with products placed on an area of a shelf (such as an area of a shelf associated with the first subset of detection elements).

In some embodiments, step 1010 may further include accessing a memory storing data (e.g., memory device 226 of FIG. 2 and/or memory device 314 of FIG. 3A) associated with patterns of different types of products. In such embodiments, step 1010 may include using the first signals to identify at least one product of a first type using a first pattern (or a first product model) and at least one product of a second type using a second pattern (or a second product model). For example, the first type may include one brand (such as Coca-Cola® or Folgers®) while the second type may include another brand (such as Pepsi® or Maxwell House®). In this example, a size, shape, point spacing, weight, resistance or other property of the first brand may be different from that of the second brand such that the detection elements may differentiate the brands. Such characteristics may also be used to differentiate like-branded, but different products from one another (e.g., a 12-ounce can of Coca Cola, versus a 16 oz bottle of Coca Cola, versus a 2-liter bottle of Coca Cola). For example, a soda may have a base detectable by a pressure sensitive pad as a continuous ring. Further, the can of soda may be associated with a first weight signal having a value recognizable as associated with such a product. A 16 ounce bottle of soda may be associated with a base having four or five pressure points, which a pressure sensitive pad may detect as arranged in a pattern associated with a diameter typical of such a product. The 16 ounce bottle of soda may also be associated with a second weight signal having a value higher than the weight signal associated with the 12 ounce can of soda. Further still, a 2 liter bottle of soda may be associated with a base having a ring, four or five pressure points, etc. that a pressure sensitive pad may detect as arranged in a pattern associated with a diameter typical of such a product. The 2 liter bottle of soda may be associated with a weight signal having a value higher than the weight signal associated with the 12 ounce can of soda and 16 ounce bottle of soda.

In the example of FIG. 8B, the different bottoms of product 853A and product 853B may be used to differentiate the products from each other. For example, detection elements such as pressure sensitive pads may be used to detect a product base shape and size (e.g., ring, pattern of points, asymmetric shape, base dimensions, etc.). Such a base shape and size may be used (optionally, together with one or more weight signals) to identify a particular product. The signals may also be used to identify and/or distinguish product types from one another. For example, a first type may include one category of product (such as soda cans) while a second type may include a different category of product (such as notepads). In another example, detection elements such as light detectors may be used to detect a product based on a pattern of light readings indicative of a product blocking at least part of the ambient light from reaching the light detectors. Such pattern of light readings may be used to identify product type and/or product category and/or product shape. For example, products of a first type may block a first subset of light frequencies of the ambient light from reaching the light detectors, while products of a second type may block a second subset of light frequencies of the ambient light from reaching the light detectors (the first subset and second subset may differ). In this case the type of the products may be determined based on the light frequencies reaching the light detectors. In another example, products of a first type may have a first shape of shades and therefore may block ambient light from reaching light detectors arranged in one shape, while products of a second type may have a second shape of shades and therefore may block ambient light from reaching light detectors arranged in another shape. In this case the type of the products may be determined based on the shape of blocked ambient light. Any of the pattern matching techniques described above may be used for the identification.

Additionally or alternatively, step 1010 may include using the at least one pattern to determine a number of products placed on the at least one area of the store shelf associated with the first subset of detection elements. For example, any of the pattern matching techniques described above may be used to identify the presence of one or more product types and then to determine the number of products of each product type (e.g., by detecting a number of similarly sized and shaped product bases and optionally by detecting weight signals associated with each detected base). In another example, an artificial neural network configured to determine the number of products of selected product types may be used to analyze the signals received by step 1005 (such as signals from pressure sensors, from light detectors, from contact sensors, and so forth) to determine the number of products of selected product types placed on an area of a shelf (such as an area of a shelf associated with the first subset of detection elements). In yet another example, a machine learning algorithm trained using training examples to determine the number of products of selected product types may be used to analyze the signals received by step 1005 (such as signals from pressure sensors, from light detectors, from contact sensors, and so forth) to determine the number of products of selected product types placed on an area of a shelf (such as an area of a shelf associated with the first subset of detection elements). Additionally or alternatively, step 1010 may include extrapolating from a stored pattern associated with a single product (or type of product) to determine the number of products matching the first signals. In such embodiments, step 1010 may further include determining, for example based on product dimension data stored in a memory, a number of additional products that may be placed on the at least one area of the store shelf associated with the second subset of detection elements. For example, step 1010 may include extrapolating based on stored dimensions of each product and stored dimensions of the shelf area to determine an area and/or volume available for additional products. Step 1010 may further include extrapolation of the number of additional products based on the stored dimensions of each product and determined available area and/or volume.

Method 1000 may include step 1015 of receiving second signals from a second subset of detection elements (e.g., detection elements 851A and 851B of FIG. 8B) from among the plurality of detection elements, the second signals being indicative of no products being placed on at least one area of the store shelf associated with the second subset of detection elements. Using this information, method 1000 may include step 1020 of using the second signals to determine at least one empty space on the store shelf. For example, any of the pattern matching techniques described above may be used to determine that the second signals include default values or other values indicative of a lack of product in certain areas associated with a retail store shelf. A default value may be include, for example, a pressure signal associated with an un-loaded pressure sensor or pressure sensitive mat, indicating that no product is located in a certain region of a shelf In another example, a default value may include signals from light detectors corresponding to ambient light, indicating that no product is located in a certain region of a shelf.

Method 1000 may include step 1025 of determining, based on the at least one pattern associated with a detected product and the at least one empty space, at least one aspect of planogram compliance. As explained above with respect to FIGS. 8A and 8B, the aspect of planogram compliance may include the presence or absence of particular products (or brands), locations of products on the shelves, quantities of products within particular areas (e.g., identifying stacked or clustered products), facing directions associated with the products (e.g., whether a product is outward facing, inward facing, askew, or the like), or the like. A planogram compliance determination may be made, for example, by determining a number of empty spaces on a shelf and determining a location of the empty spaces on a shelf. The planogram determination may also include determining weight signal magnitudes associated with detected products at the various detected non-empty locations. This information may be used by the one or more processors in determining whether a product facing specification has been satisfied (e.g., whether a front edge of a shelf has a suitable number of products or suitable density of products), whether a specified stacking density has been achieved (e.g., by determining a pattern of detected products and weight signals of the detected products to determine how many products are stacked at each location), whether a product density specification has been achieved (e.g., by determining a ratio of empty locations to product-present locations), whether products of a selected product type are located in a selected area of the shelf, whether all products located in a selected area of the shelf are of a selected product type, whether a selected number of products (or a selected number of products of a selected product type) are located in a selected area of the shelf, whether products located in a selected area of a shelf are positioned in a selected orientation, or whether any other aspect of one or more planograms has been achieved.

For example, the at least one aspect may include product homogeneity, and step 1025 may further include counting occurrences where a product of the second type is placed on an area of the store shelf associated with the first type of product. For example, by accessing a memory including base patterns (or any other type of pattern associated with product types, such as product models), the at least one processor may detect different products and product types. A product of a first type may be recognized based on a first pattern, and product of a second type may be recognized based on a second, different pattern (optionally also based on weight signal information to aid in differentiating between products). Such information may be used, for example, to monitor whether a certain region of a shelf includes an appropriate or intended product or product type. Such information may also be useful in determining whether products or product types have been mixed (e.g., product homogeneity). Regarding planogram compliance, detection of different products and their relative locations on a shelf may aid in determining whether a product homogeneity value, ratio, etc. has been achieved. For example, the at least one processor may count occurrences where a product of a second type is placed on an area of the store shelf associated with a product of a first type.

Additionally or alternatively, the at least one aspect of planogram compliance may include a restocking rate, and step 1025 may further include determining the restocking rate based on a sensed rate at which products are added to the at least one area of the store shelf associated with the second subset of detection elements. Restocking rate may be determined, for example, by monitoring a rate at which detection element signals change as products are added to a shelf (e.g., when areas of a pressure sensitive pad change from a default value to a product-present value).

Additionally or alternatively, the at least one aspect of planogram compliance may include product facing, and step 1025 may further include determining the product facing based on a number of products determined to be placed on a selected area of the store shelf at a front of the store shelf. Such product facing may be determined by determining a number of products along a certain length of a front edge of a store shelf and determining whether the number of products complies with, for example, a specified density of products, a specified number of products, and so forth.

Step 1025 may further include transmitting an indicator of the at least one aspect of planogram compliance to a remote server. For example, as explained above with respect to FIGS. 8A and 8B, the indicator may comprise a data packet, a data file, or any other data structure indicating any variations from a planogram, e.g., with respect to product (or brand) placement, product facing direction, or the like. The remote server may include one or more computers associated with a retail store (e.g., so planogram compliance may be determined on a local basis within a particular store), one or more computers associated with a retail store evaluation body (e.g., so planogram compliance may be determined across a plurality of retail stores), one or more computers associated with a product manufacturer, one or more computers associated with a supplier (such as supplier 115), one or more computers associated with a market research entity (such as market research entity 110), etc.

Method 1000 may further include additional steps. For example, method 1000 may include identifying a change in at least one characteristic associated with one or more of the first signals (e.g., signals from a first group or type of detection elements), and in response to the identified change, triggering an acquisition of at least one image of the store shelf. The acquisition may be implemented by activating one or more of capturing devices 125 of FIGS. 4A-4C, as explained above. For example, the change in at least one characteristic associated with one or more of the first signals may be indicative of removal of at least one product from a location associated with the at least one area of the store shelf associated with the first subset of detection elements. Accordingly, method 1000 may include triggering the acquisition to determine whether restocking, reorganizing, or other intervention is required, e.g., to improve planogram compliance. Thus, method 1000 may include identifying a change in at least one characteristic associated with one or more of the first signals; and in response to the identified change, trigger a product-related task for a store associate of the retail store.

Additionally or alternatively, method 1000 may be combined with method 1050 of FIG. 10B, described below, such that step 1055 is performed any time after step 1005.

Figure 10B:
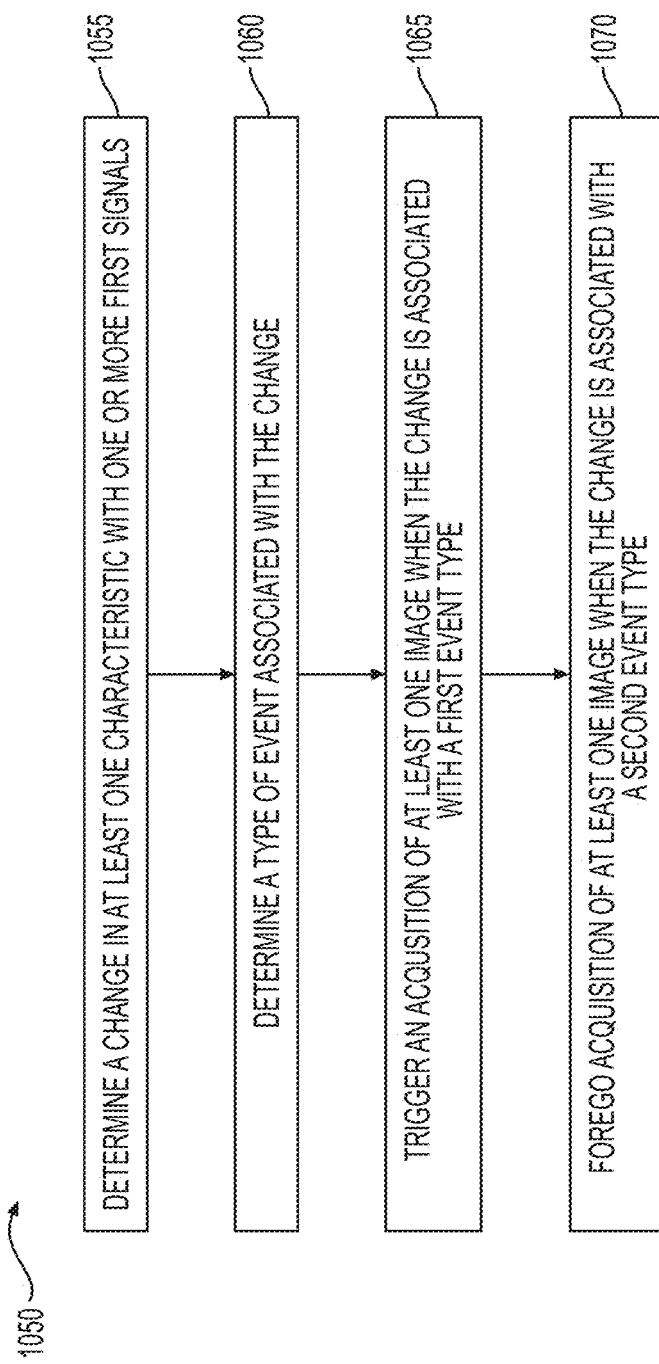
FIG. 10B is illustrates an exemplary method for triggering image acquisition based on product events on a store shelf, consistent with the present disclosure.

FIG. 10B is a flow chart, illustrating an exemplary method 1050 for triggering image capture of a store shelf, in accordance with the presently disclosed subject matter. It is contemplated that method 1050 may be used in conjunction with any of the detection element arrays discussed above with reference to, for example, FIGS. 8A, 8B and 9. The order and arrangement of steps in method 1050 is provided for purposes of illustration. As will be appreciated from this disclosure, modifications may be made to process 1050, for example, adding, combining, removing, and/or rearranging one or more steps of process 1050.

Method 1050 may include a step 1055 of determining a change in at least one characteristic associated with one or more first signals. For example, the first signals may have been captured as part of method 1000 of FIG. 10A, described above. For example, the first signals may include pressure readings when the plurality of detection elements includes pressure sensors, contact information when the plurality of detection elements includes contact sensors, light readings when the plurality of detection elements includes light detectors (for example, from light detectors configured to be placed adjacent to (or located on) a surface of a store shelf configured to hold products, as described above), and so forth.

Method 1050 may include step 1060 of using the first signals to identify at least one pattern associated with a product type of the plurality of products. For example, any of the pattern matching techniques described above with respect to FIGS. 8A, 8B, and step 1010 may be used for identification.

Method 1050 may include step 1065 of determining a type of event associated with the change. For example, a type of event may include a product removal, a product placement, movement of a product, or the like.

Method 1050 may include step 1070 of triggering an acquisition of at least one image of the store shelf when the change is associated with a first event type. For example, a first event type may include removal of a product, moving of a product, or the like, such that the first event type may trigger a product-related task for a store associate of the retail store depending on analysis of the at least one image. The acquisition may be implemented by activating one or more of capturing devices 125 of FIGS. 4A-4C, as explained above. In some examples, the triggered acquisition may include an activation of at least one projector (such as projector 632). In some examples, the triggered acquisition may include acquisition of color images, depth images, stereo images, active stereo images, time of flight images, LIDAR images, RADAR images, and so forth.

Method 1050 may include a step (not shown) of forgoing the acquisition of at least one image of the store shelf when the change is associated with a second event type. For example, a second event type may include replacement of a removed product by a customer, stocking of a shelf by a store associate, or the like. As another example, a second event type may include removal, placement, or movement of a product that is detected within a margin of error of the detection elements and/or detected within a threshold (e.g., removal of only one or two products; movement of a product by less than 5 cm, 20 cm, or the like; moving of a facing direction by less than 10 degrees; or the like), such that no image acquisition is required.

Figure 11A:
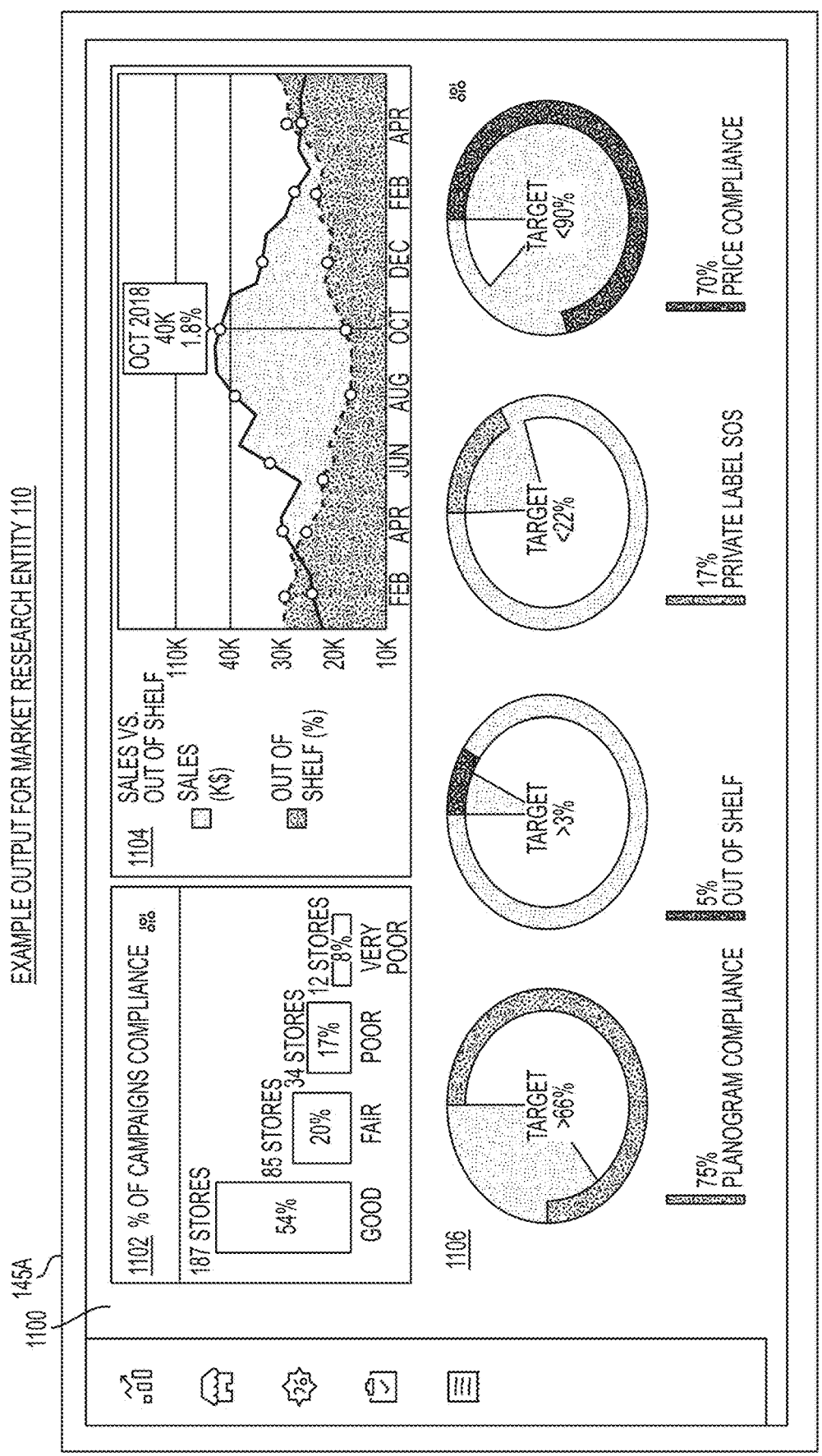
FIG. 11A is a schematic illustration of an example output for a market research entity associated with the retail store, consistent with the present disclosure.
Figure 11B:
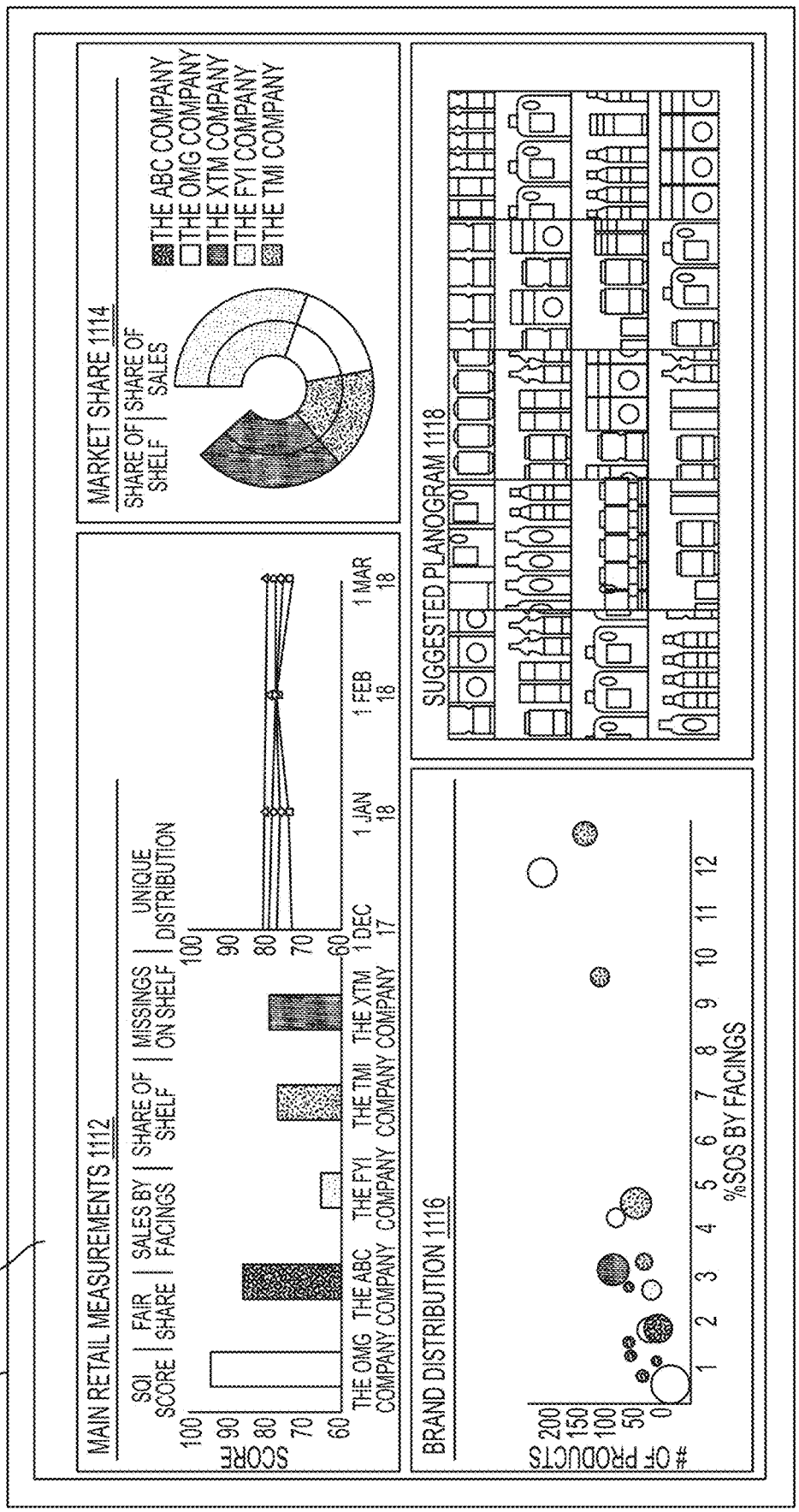
FIG. 11B is a schematic illustration of an example output for a supplier of the retail store, consistent with the present disclosure.
Figure 11C:
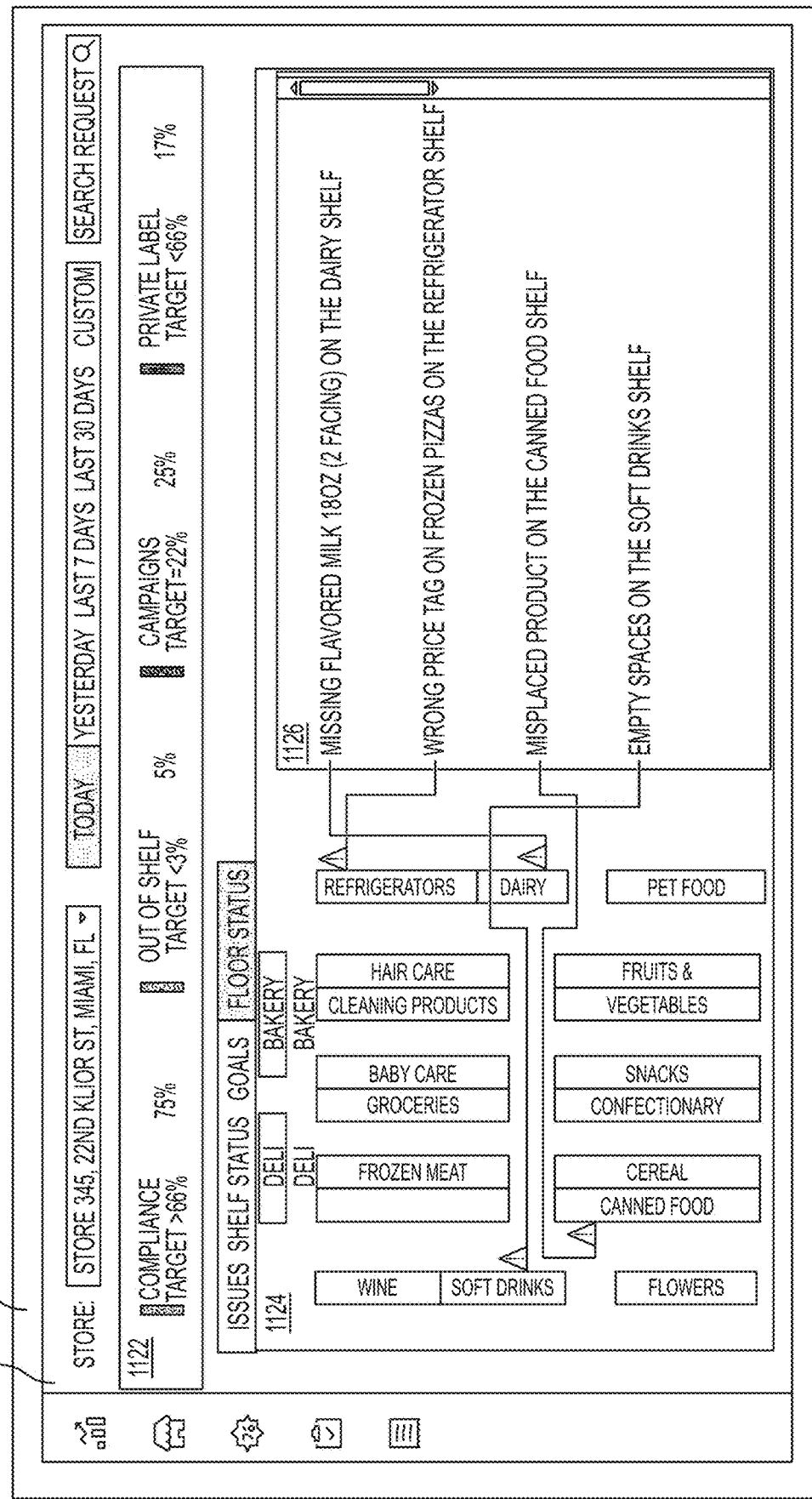
FIG. 11C is a schematic illustration of an example output for a manager of the retail store, consistent with the present disclosure.
Figure 11D:
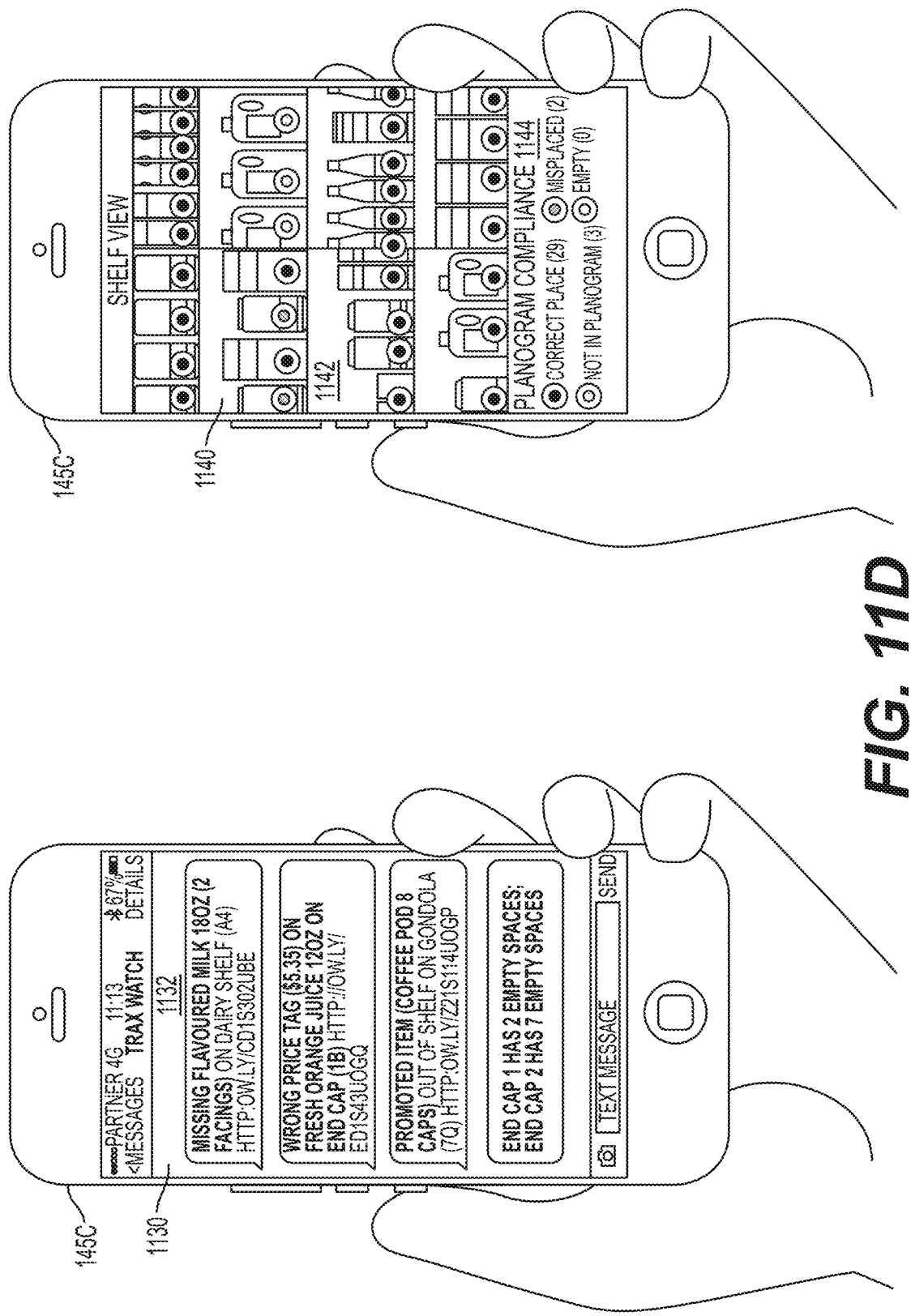
FIG. 11D is a schematic illustration of two examples outputs for a store associate of the retail store, consistent with the present disclosure.
Figure 11E:
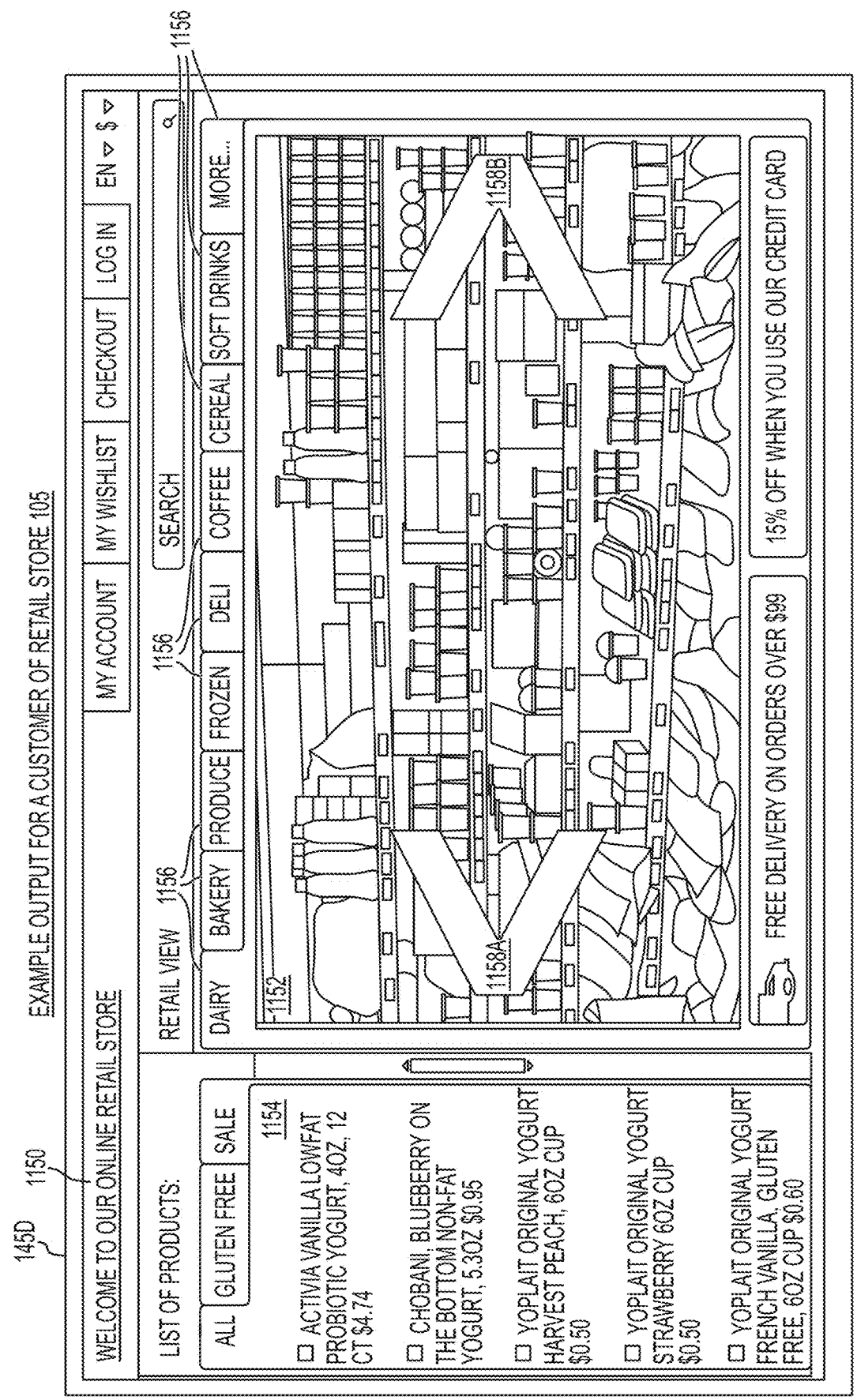
FIG. 11E is a schematic illustration of an example output for an online customer of the retail store, consistent with the present disclosure.

FIGS. 11A-11E illustrate example outputs based on data automatically derived from machine processing and analysis of images captured in retail store 105 according to disclosed embodiments. FIG. 11A illustrates an optional output for market research entity 110. FIG. 11B illustrates an optional output for supplier 115. FIGS. 11C and 11D illustrate optional outputs for store associates of retail store 105. And FIG. 11E illustrates optional outputs for user 120.

FIG. 11A illustrates an example graphical user interface (GUI) 500 for output device 145A, representative of a GUI that may be used by market research entity 110. Consistent with the present disclosure, market research entity 110 may assist supplier 115 and other stakeholders in identifying emerging trends, launching new products, and/or developing merchandising and distribution plans across a large number of retail stores 105. By doing so, market research entity 110 may assist supplier 115 in growing product presence and maximizing or increasing new product sales. As mentioned above, market research entity 110 may be separated from or part of supplier 115. To successfully launch a new product, supplier 115 may use information about what really happens in retail store 105. For example, supplier 115 may want to monitor how marketing plans are being executed and to learn what other competitors are doing relative to certain products or product types. Embodiments of the present disclosure may allow market research entity 110 and suppliers 115 to continuously monitor product-related activities at retail stores 105 (e.g., using system 100 to generate various metrics or information based on automated analysis of actual, timely images acquired from the retail stores). For example, in some embodiments, market research entity 110 may track how quickly or at what rate new products are introduced to retail store shelves, identify new products introduced by various entities, assess a supplier's brand presence across different retail stores 105, among many other potential metrics.

In some embodiments, server 135 may provide market research entity 110 with information including shelf organization, analysis of skew productivity trends, and various reports aggregating information on products appearing across large numbers of retail stores 105. For example, as shown in FIG. 11A, GUI 1100 may include a first display area 1102 for showing a percentage of promotion campaign compliance in different retail stores 105. GUI 1100 may also include a second display area 1104 showing a graph illustrating sales of a certain product relative to the percentage of out of shelf. GUI 1100 may also include a third display area 1106 showing actual measurements of different factors relative to target goals (e.g., planogram compliance, restocking rate, price compliance, and other metrics). The provided information may enable market research entity 110 to give supplier 115 informed shelving recommendations and fine-tune promotional strategies according to in-store marketing trends, to provide store managers with a comparison of store performances in comparison to a group of retail stores 105 or industry wide performances, and so forth.

FIG. 11B illustrates an example GUI 1110 for output device 145B used by supplier 115. Consistent with the present disclosure, server 135 may use data derived from images captured in a plurality of retail stores 105 to recommend a planogram, which often determines sales success of different products. Using various analytics and planogram productivity measures, server 135 may help supplier 115 to determine an effective planogram with assurances that most if not all retail stores 105 can execute the plan. For example, the determined planogram may increase the probability that inventory is available for each retail store 105 and may be designed to decrease costs or to keep costs within a budget (such as inventory costs, restocking costs, shelf space costs, etc.). Server 135 may also provide pricing recommendations based on the goals of supplier 115 and other factors. In other words, server 135 may help supplier 115 understand how much room to reserve for different products and how to make them available for favorable sales and profit impact (for example, by choosing the size of the shelf dedicated to a selected product, the location of the shelf, the height of the shelf, the neighboring products, and so forth). In addition, server 135 may monitor near real-time data from retail stores 105 to determine or confirm that retail stores 105 are compliant with the determined planogram of supplier 115. As used herein, the term "near real-time data," in the context of this disclosure, refers to data acquired or generated, etc., based on sensor readings and other inputs (such as data from image sensors, audio sensors, pressure sensors, checkout stations, etc.) from retail store 105 received by system 100 within a predefined period of time (such as time periods having durations of less than a second, less than a minute, less than an hour, less than a day, less than a week, etc.).

In some embodiments, server 135 may generate reports that summarize performance of the current assortment and the planogram compliance. These reports may advise supplier 115 of the category and the item performance based on individual Stock Keeping Unit (SKU), sub segments of the category, vendor, and region. In addition, server 135 may provide suggestions or information upon which decisions may be made regarding how or when to remove markdowns and when to replace underperforming products. For example, as shown in FIG. 11B, GUI 1110 may include a first display area 1112 for showing different scores of supplier 115 relative to scores associated with its competitors. GUI 1110 may also include a second display area 1114 showing the market share of each competitor. GUI 1110 may also include a third display area 1116 showing retail measurements and distribution of brands. GUI 1110 may also include a fourth display area 1118 showing a suggested planogram. The provided information may help supplier 115 to select preferred planograms based on projected or observed profitability, etc., and to ensure that retail stores 105 are following the determined planogram.

FIGS. 11C and 11D illustrate example GUIs for output devices 145C, which may be used by store associates of retail store 105. FIG. 11C depicts a GUI 1120 for a manager of retail store 105 designed for a desktop computer, and FIG. 11D depicts GUI 1130 and 1140 for store staff designed for a handheld device. In-store execution is one of the challenges retail stores 105 have in creating a positive customer experience. Typical in-store execution may involve dealing with ongoing service events, such as a cleaning event, a restocking event, a rearrangement event, and more. In some embodiments, system 100 may improve in-store execution by providing adequate visibility to ensure that the right products are located at preferred locations on the shelf. For example, using near real-time data (e.g., captured images of store shelves) server 135 may generate customized online reports. Store managers and regional managers, as well as other stakeholders, may access custom dashboards and online reports to see how in-store conditions (such as, planogram compliance, promotion compliance, price compliance, etc.) are affecting sales. This way, system 100 may enable managers of retail stores 105 to stay on top of burning issues across the floor and assign store associates to address issues that may negatively impact the customer experience.

In some embodiments, server 135 may cause real-time automated alerts when products are out of shelf (or near out of shelf), when pricing is inaccurate, when intended promotions are absent, and/or when there are issues with planogram compliance, among others. In the example shown in FIG. 11C, GUI 1120 may include a first display area 1122 for showing the average scores (for certain metrics) of a specific retail store 105 over a selected period of time. GUI 1120 may also include a second display area 1124 for showing a map of the specific retail store 105 with real-time indications of selected in-store execution events that require attention, and a third display area 1126 for showing a list of the selected in-store execution events that require attention. In another example, shown in FIG. 11D, GUI 1130 may include a first display area 1132 for showing a list of notifications or text messages indicating selected in-store execution events that require attention. The notifications or text messages may include a link to an image (or the image itself) of the specific aisle with the in-store execution event. In another example, shown in FIG. 11D, GUI 1140 may include a first display area 1142 for showing a display of a video stream captured by output device 145C (e.g., a real-time display or a near real-time display) with augmented markings indicting a status of planogram compliance for each product (e.g., correct place, misplaced, not in planogram, empty, and so forth). GUI 1140 may also include a second display area 1144 for showing a summary of the planogram compliance for all the products identified in the video stream captured by output device 145C. Consistent with the present disclosure, server 135 may generate within minutes actionable tasks to improve store execution. These tasks may help store associates of retail store 105 to quickly address situations that can negatively impact revenue and customer experience in the retail store 105.

FIG. 11E illustrates an example GUI 1150 for output device 145D used by an online customer of retail store 105. Traditional online shopping systems present online customers with a list of products. Products selected for purchase may be placed into a virtual shopping cart until the customers complete their virtual shopping trip. Virtual shopping carts may be examined at any time, and their contents may be edited or deleted. However, common problems of traditional online shopping systems arise when the list of products on the website does not correspond with the actual products on the shelf. For example, an online customer may order a favorite cookie brand without knowing that the cookie brand is out-of-stock. Consistent with some embodiments, system 100 may use image data acquired by capturing devices 125 to provide the online customer with a near real-time display of the retail store and a list of the actual products on the shelf based on near real-time data. In one embodiment, server 135 may select images without occlusions in the field of view (e.g., without other customers, carts, etc.) for the near real-time display. In one embodiment, server 135 may blur or erase depictions of customers and other people from the near real-time display. As used herein, the term "near real-time display," in the context of this disclosure, refers to image data captured in retail store 105 that was obtained by system 100 within a predefined period of time (such as less than a second, less than a minute, less than about 30 minutes, less than an hour, less than 3 hours, or less than 12 hours) from the time the image data was captured.

Consistent with the present disclosure, the near real-time display of retail store 105 may be presented to the online customer in a manner enabling easy virtual navigation in retail store 105. For example, as shown in FIG. 11E, GUI 1150 may include a first display area 1152 for showing the near real-time display and a second display area 1154 for showing a product list including products identified in the near real-time display. In some embodiments, first display area 1152 may include different GUI features (e.g., tabs 1156) associated with different locations or departments of retail store 105. By selecting each of the GUI features, the online customer may virtually jump to different locations or departments in retail store 105. For example, upon selecting the "bakery" tab, GUI 1150 may present a near real-time display of the bakery of retail store 105. In addition, first display area 1152 may include one or more navigational features (e.g., arrows 1158A and 1158B) for enabling the online customer to virtually move within a selected department and/or virtually walk through retail store 105. Server 135 may be configured to update the near real-time display and the product list upon determining that the online customer wants to virtually move within retail store 105. For example, after identifying a selection of arrow 1158B, server 135 may present a different section of the dairy department and may update the product list accordingly. In another example, server 135 may update the near-real time display and the product list in response to new captured images and new information received from retail store 105. Using GUI 1150, the online customer may have the closest shopping experience without actually being in retail store 105. For example, an online customer may visit the vegetable department and decide not to buy tomatoes after seeing that they are not ripe enough.

As explained elsewhere in this disclosure, many retailers and suppliers nowadays send people to stores to personally monitor compliance with desired product placement in the stores. However, this is inefficient and may result in non-uniform compliance among retailers relative to various product-related guidelines. Using cameras to monitor compliance may help monitor retail spaces more efficiently. The present disclosure provides systems and methods for planning deployment of one or more cameras within a retail store. In one embodiment, a server may obtain a store plan of a retail store and determine a location of a store shelf within the retail store based on the store plan. The server may also access a database to determine the height of products of a product type that are placed on the store shelf. The server may further determine a coverage parameter for the product type (e.g., a percentage of the captured portion of one product of the product type in an image to enable recognition). The server may also determine a position for placing a camera configured to capture one or more images of at least one portion of the store shelf and at least one portion of products of the product type placed on the store shelf based on the location of the store shelf, the height of the products of the product type, and the coverage parameter.

Figure 12A:
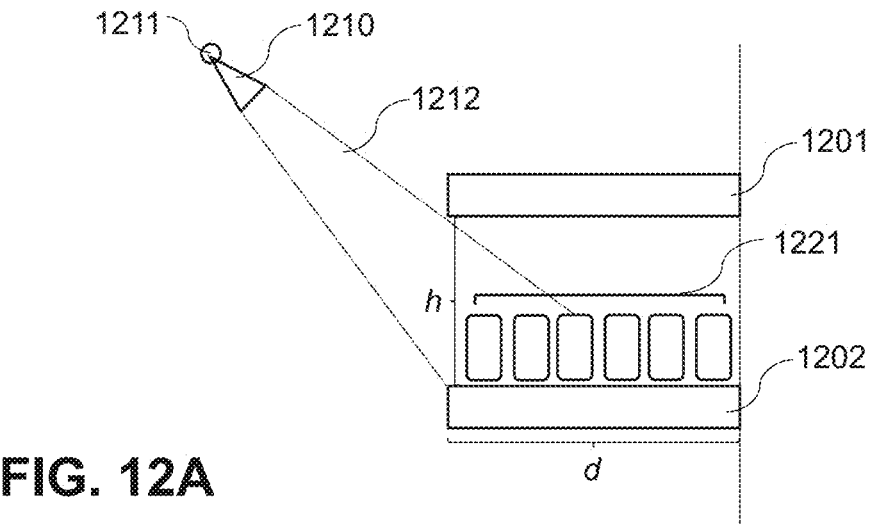
FIGS. 12A, 12B, and 12C are schematic illustration of exemplary positions of cameras relative to store shelves.

FIG. 12A is a schematic illustration of an exemplary camera at an exemplary position consistent with some embodiments of the present disclosure. As illustrated in FIG. 12A, a store shelves unit within a retail store may include a store shelf 1201 and a store shelf 1202. Store shelf 1202 may have a depth d. The height between store shelf 1201 and store shelf 1202 may be referred to as h. Products of a first product type 1221 may be placed on store shelf 1202. Camera 1210 may be placed at position 1211 such that camera 1210 may have a field of view 1212 and be configured to capture an image of at least a portion of store shelf 1202 and a portion of the products placed on store shelf 1202.

Figure 12B:
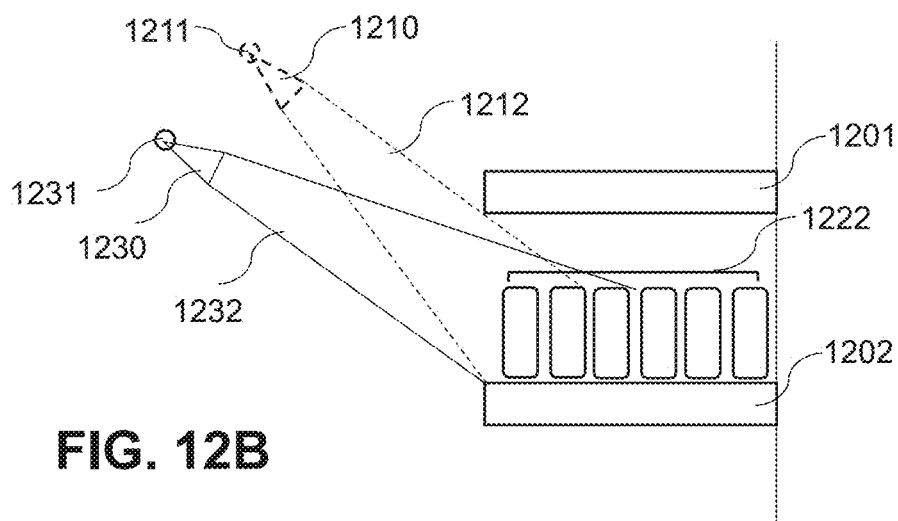
Figure 12C:
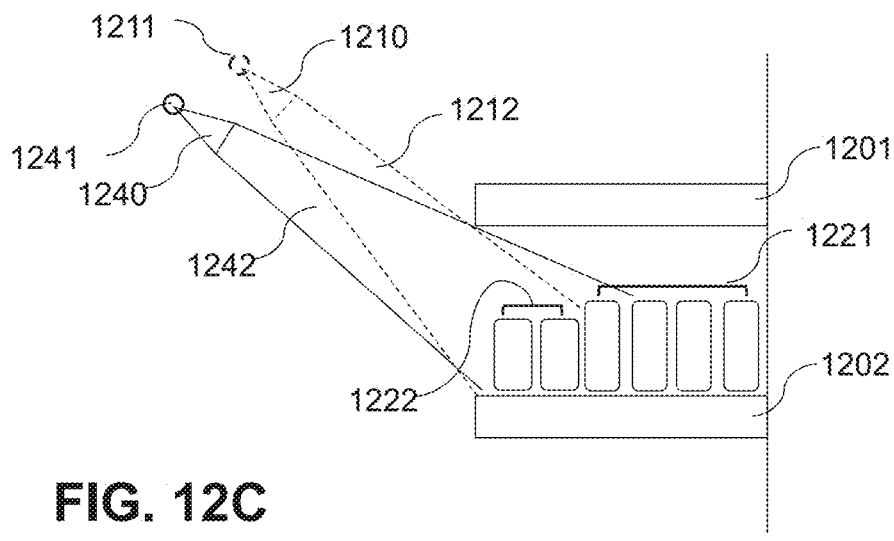

The position of the camera may be determined based on various factors (e.g., the location of a store shelf, one or more properties of products of one or more product types, one or more camera properties, coverage parameter corresponding to one or more product types, etc.). For example, as illustrated in FIG. 12B, products of second product type 1222 may be placed on store shelf 1202. Second product type 1222 may be higher than first product type 1221. Accordingly, camera 1230 may be placed at position 1231, which may be different from position 1211. Camera 1230 may be placed at position 1231 and may have a field of view 1232, which may cover more of products of second product type 1222 than those when camera 1230 is placed at position 1211. As another example, as illustrated in FIG. 12C, there may be products of two different product types (e.g., first product type 1221 and second product type 1222) placed on store shelf 1202. A camera 1240 may be placed at position 1241, which may have a field of view 1242, to capture at least one portion of products of first product type 1221 and at least one portion of products of second product type 1222. For example, in examples where camera 1240 is placed at position 1211, the image captured by camera 1240 may cover none or few of products of second product type 1222.

Figure 13:
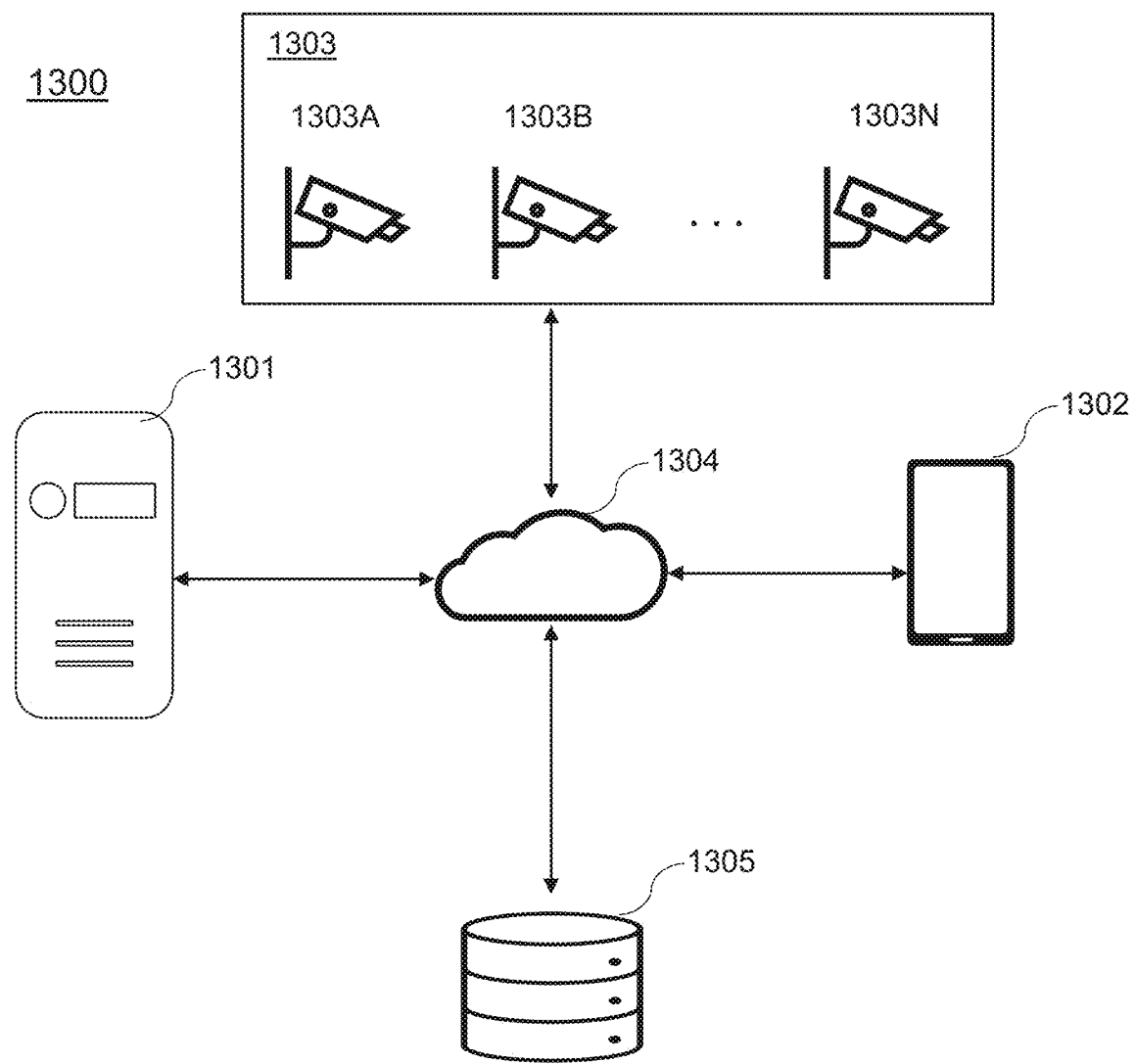
FIG. 13 is a block diagram of an exemplary system for planning deployment of image sensors.

FIG. 13 is a block diagram of an exemplary system 1300 for planning deployment of image sensors. As illustrated in system 1300 may include a server 1301, user device 1302, one or more cameras 1303 (e.g., 1303A, 1303B, . . . , 1303N), a digital communication network 1304, and a database 1305. Server 1301 may be configured to determine a position for placing a camera configured to capture images of a store shelf (or at least one portion thereof) within a retail store. User device 1302 may be configured to receive information relating to the position for placing the camera from server 1301 and display a user interface presenting the received information. Additionally or alternatively, system 1300 may include a robot configured to position a camera in the position determined by server 1301. Camera 1303 may be configured to capture one or more images at a determined position by server 1301 (and/or user device 1302). Digital communication network 1304 may be configured to facilitate communications among the components of system 1300. Database 1305 may be configured to store data that may be accessed by one or more components of system 1300.

In some embodiments, server 1301 may be configured to determine a position for placing a camera (e.g., camera 1303) configured to capture images of at least a portion of a store shelf in a retail store. For example, server 1301 may be configured to determine a position for placing camera 1303 based on the location of the store shelf, a first coverage parameter corresponding to a first product type, a second coverage parameter corresponding to a second product type, a first height of products of the first product type, and a second height of products of the second product type. Server 1301 may also be configured to transmit information relating to the determined position of the camera to user device 1302 or to another external device. Server 1301 may include at least one processor configured to perform one or more functions thereof. Server 1301 may also include memory configured to store instructions for the at least one processor. Server 1301 may further include at least one storage device configured to store data for the at least one processor.

In some embodiments, user device 1302 may be configured to present information and receive user input via a user interface. For example, user device 1302 may receive information relating to a position for placing the camera from server 1301. User device 1302 may also be configured to present the information relating to the position for placing the camera in a user interface. In some other examples, user device 1302 may be configured to provide the information relating to the position for placing the camera in an audible output, in a textual output, in a graphical output, in an overlay over an image, in an augmented reality system (for example by providing a visual indication of the position in the augmented reality system), or the like, or a combination thereof. In some embodiments, user device 1302 may be configured to receive input from the user via the user interface (and/or an input device associated with user device 1302). For example, user device 1302 may be configured to receive user input for modifying the position of the camera. User device 1302 may include at least one processor configured to perform one or more functions thereof. User device 1302 may also include memory configured to store instructions for the at least one processor. User device 1302 may further include at least one storage device configured to store data for the at least one processor. User device 1302 may include a mobile computing device, a personal computing device of a user, a mobile communication device, a personal communication device of a user, a smartphone, a tablet, a personal computer, a virtual reality system, an augmented reality system, or the like, or a combination thereof.

In some embodiments, at least one processor of server 1301 and/or user device 1302 may include a microprocessor, preprocessors (such as an image preprocessor), a graphics processing unit (GPU), a central processing unit (CPU), support circuits, digital signal processors, integrated circuits, memory, or any other types of devices suitable for running applications or performing a computing task. In some embodiments, the at least one processor may include any type of single or multi-core processor, mobile device microcontroller, central processing unit, etc. Various processing devices may be used, including, for example, processors available from manufacturers such as Intel®, AMD®, etc., or GPUs available from manufacturers such as NVIDIA®, ATI®, etc. and may include various architectures (e.g., x86 processor, ARM®, etc.). In other examples, server 1301 may be part of or implemented by a cloud platform. Any of the processing devices disclosed herein may be configured to perform certain functions. Configuring a processing device, such as any of the described processors or other controller or microprocessor, to perform certain functions may include programming of computer-executable instructions and making those instructions available to the processing device for execution during operation of the processing device. In some embodiments, configuring a processing device may include programming the processing device directly with architectural instructions. For example, processing devices such as field-programmable gate arrays (FPGAs), application-specific integrated circuits (ASICs), and the like may be configured using, for example, one or more hardware description languages (HDLs).

In some embodiments, camera 1303 may be configured to capture one or more images of at least a portion of a store shelf and/or one or more products placed on a store shelf Camera 1303 may include a digital camera, a color camera, a time-of-flight camera, a stereo camera, an active stereo camera, a depth camera, a Lidar system, a laser scanner, CCD based devices, or any other sensor based system capable of converting received light into electric signals. In some embodiments, camera 1303 may be configured to capture one or more images based on one or more capturing parameters configured by server 1301 and/or user device 1302. For example, server 1301 may transmit a capturing frequency (e.g., one image per hour) to camera 1303, which may be configured to capture images based on the capturing frequency. In some embodiments, camera 1303 may be configured to transmit one or more images to server 1301, user device 1302, and/or database 1305 via network 1304.

Digital communication network 1304 may be a public network or private network and may include, for example, a wired or wireless network, including, without limitation, a Local Area Network (LAN), a Wide Area Network (WAN), a Metropolitan Area Network, an IEEE 802.11 wireless network (e.g., "Wi-Fi"), a network of networks (e.g., the Internet), a land-line telephone network, or the like. Digital communication network 1304 may be connected to other networks (not depicted in FIG. 13) to connect the various system components to each other and/or to external systems or devices. In some embodiments, digital communication network 1304 may be a secure network and require a password to access the network.

Database 1305 may store information and data for the components of system 1300 (e.g., server 1301, user devices 1302, and/or one or more cameras 1303). In some embodiments, server 1301, user devices 1302, and/or one or more cameras 1303 may be configured to access database 1305, and obtain data stored from and/or upload data to database 1305 via digital communication network 1304. Database 1305 may include a cloud-based database or an on-premises database. Database 1305 may include images captured by one or more cameras 1303, simulated images generated by server 1301 and/or user device 1302, configuration data, expression data, datasets, model data (e.g., model parameters, training criteria, performance metrics, etc.), and/or other data, consistent with disclosed embodiments.

Figure 14:
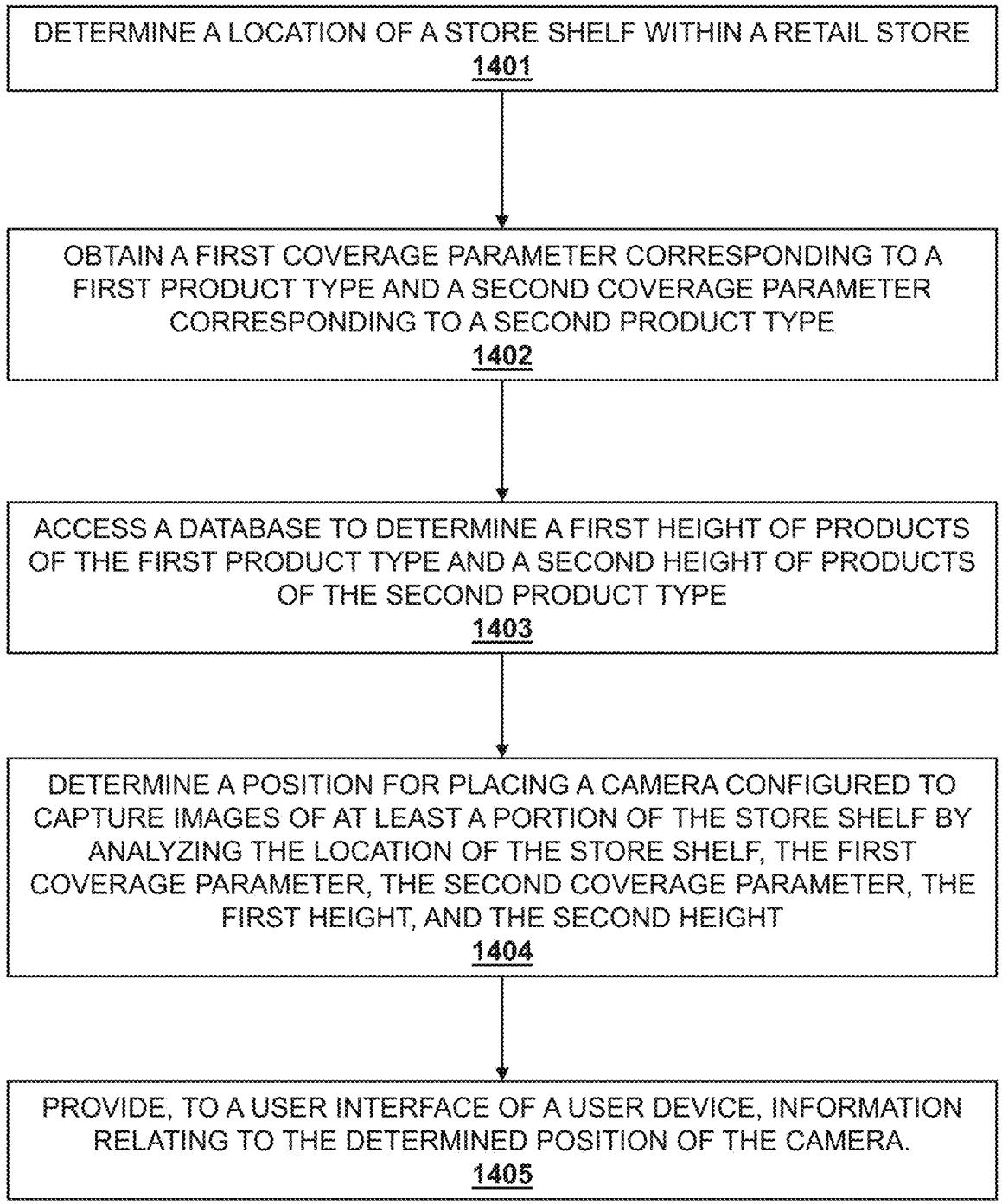
FIG. 14 provides a flowchart of an exemplary method for planning deployment of an image sensor.

FIG. 14 illustrates a flowchart of an exemplary process 1400 for determining a position for placing a camera consistent with some embodiments of the present disclosure.

At step 1401, at least one processor of server 1301 may determine a location of a store shelf within a retail store. The location of a store shelf may include the position of the store shelf in a store map, in a plan of the retail store, in a model of the retail store, in a coordinate system, or the like, or a combination thereof. Alternatively or additionally, the location of a store shelf may include the position of the store shelf in a larger component, for example, in a shelving unit, in a display unit, in an aisle, in a section of the store, or the like, or a combination thereof. Alternatively or additionally, the location of a store shelf may include the position of the store shelf relative to an object (e.g., a product, a door of the retail shelf, another store shelf, and so forth) or relative to a known position (e.g., to an entrance to the retail store, to an origin of a coordinate system, an aisle, or the like). For example, the location of the store shelf may include a distance (e.g., a height) of the store shelf relative to an object. By way of example, the height of the store shelf may include a height of the store shelf relative to the ground, the ceiling, another store shelf (e.g., a store shelf below or above the store shelf, a store shelf on the other side of the aisle), a side of a store shelves unit (e.g., the top, the bottom, etc.), a product of a first product type, or the like. In some embodiments, the store shelf may be indicated to hold (or support) one or more particular types of products (e.g., sodas, cereals, etc.). As another example, the location of the store shelf may be indicated by a direction (e.g., above, below, opposed, etc.) relative to another store shelf, relative to a fixture in a retail store (e.g., a lighting fixture), a cash register, a check-out lane, a particular product type, or the like, or a combination thereof. For example, the location of the store shelf may be above (or below) products of the first product type and products of the second product type or across an aisle from products of the first product type and products of the second product type.

In some embodiments, the at least one processor may obtain a store plan or a store map, and determine the location of the store shelf based on the store plan. A store plan may include a planogram, a realogram, a three-dimensional (3D) model of the retail store, or the like, or a combination thereof. A realogram may be a virtual copy of shelves in a store. In some embodiments, the store plan may be determined based on an analysis of images captured from the retail store to identify store shelves and products placed on the store shelves. For example, one or more cameras may be configured to capture images of one or more store shelves and products placed on the store shelves (e.g., images captured using a 3D camera (such as a stereo camera, an active stereo camera, a time-of-flight camera, a LiDAR camera, etc.)) The images may be used to construct a store plan representing at least one product characteristic relative to a display structure associated with a retail environment (such as a store shelf or area of one or more shelves). Exemplary product characteristics may include quantities of products with respect to areas of the shelves, product configurations or product shapes with respect to areas of the shelves, product arrangements with respect to areas of the shelves, product density with respect to areas of the shelves, product combinations with respect to areas of the shelves, etc. The at least one processor may determine a location of a particular store shelf based on the store plan (e.g., a height of the store shelf relative to products of a product type).

At step 1402, at least one processor of server 1301 may obtain a first coverage parameter corresponding to a first product type and a second coverage parameter corresponding to a second product type. The coverage parameter corresponding to a product type may include at least one of a depth within a shelf on which a plurality of products of the product type are planned to be placed, a percentage of the plurality of products of the product type that have been to be captured in an image to enable recognition, a percentage of the captured portion of one product in an image to enable recognition, a capturing resolution, or a capturing frequency. By way of example, referring to FIG. 12C, the at least one processor may be configured to determine a first coverage parameter corresponding to first product type 1221 and a second coverage parameter corresponding to second product type 1222. The first coverage parameter corresponding to first product type 1221 may include at least one of a first depth within a shelf on which a plurality of products of first product type 1221 are planned to be placed, a first percentage of the plurality of products of first product type 1221 that have been to be captured in an image to enable recognition, a first capturing resolution, or a second capturing frequency. The second coverage parameter corresponding to second product type 1222 may include at least one of a second depth within a shelf on which a plurality of products of second product type 1222 are planned to be placed, a second percentage of the plurality of products of second product type 1222 that have been to be captured in an image to enable recognition, a second capturing resolution, or a second capturing frequency. The first depth may be the same as or different from the second depth. The first percent may be the same as or different from the second percent. The first capturing resolution may be the same as or different from the second capturing resolution. The first capturing frequency may be the same as or different from the second capturing frequency.

In some embodiments, the at least one processor may determine a product type and determine a coverage parameter based on the product type. For example, the at least one processor may determine a particular product type based on a store plan, a store map, a planogram, a realogram, user input, one or more images of the store shelf supporting the products of the product type, or the like, or a combination thereof. The at least one processor may also determine a coverage parameter based on the product type by, for example, consulting a lookup table including a plurality of coverage parameters corresponding to a plurality of product types.

At step 1403, at least one processor of server 1301 may access a database to determine a first height of products of the first product type and a second height of products of the second product type. By way of example, referring to FIG. 12C, the at least one processor may access a database (e.g., a database in a local store device, database 1305, etc.), which may include the properties of one or more product types (e.g., the size, one or more dimensions, the weight, the volume, etc.). The at least one processor may also determine a first height of products of first product type 1221 and a second height of products of second product type 1222. In addition to or alternative to accessing the database, the at least one processor may analyze images of products of the first product type to determine the height of products of the first product type and/or may images of products of the second product type to determine the height of products of the second product type.

At step 1404, at least one processor of server 1301 may determine a position for placing a camera configured to capture images of at least a portion of the store shelf by analyzing the location of the store shelf, the first coverage parameter, the second coverage parameter, the first height, and the second height. By way of example, referring to FIG. 12C, as described above, the at least one processor may determine the location of store shelf 1202 (e.g., the height of store shelf 1202 relative to store shelf 1201), the first coverage parameter corresponding to first product type 1221, the second coverage parameter corresponding to second product type 1222, the first height of first product type 1221, and the second height of second product type 1222. The at least one processor may also determine position 1241 for placing camera 1240 configured images of at least a portion of store shelf 1202 based on the location of store shelf 1202, the first coverage parameter, the second coverage parameter, the first height, and the second height. In some embodiments, camera 1240 may be positioned such that one or more images captured by camera 1240 also include at least a portion of one product of first product type 1221 and at least a portion of one product of second product type 1222. In some embodiments, a machine learning model may be trained using training samples to determine positions for placing cameras from locations of the store shelves, coverage parameters, and/or heights of products. For example, a training example may include a sample location of a sample store shelf, a sample first coverage parameter, a sample second coverage parameter, a sample first height, a sample second height, and/or a label indicating a desired position for placing a sample camera. The at least one processor may use the trained machine learning model to analyze the location of the store shelf, the first coverage parameter, the second coverage parameter, and/or the first height and the second height to determine the position for placing the camera configured to capture images of at least the portion of the store shelf. Alternatively or additionally, the at least one processor may use an optimization algorithm to determine a position for placing the camera that maximizes a criterion function of a coverage of the camera while ensuring one or more desired minimal requirements.

In some embodiments, the at least one processor may also determine an orientation (or a pointing direction) of the camera. For example, the at least one processor may determine an orientation (or a pointing direction) of the camera base on the location of the store shelf, the first coverage parameter, the second coverage parameter, the first height, and the second height, such that at least a portion of one product of first product type 1221 and at least a portion of one product of second product type 1222 is within the field of view of camera 1240 (e.g., field of view 1242). In some embodiments, a machine learning model may be trained using training samples to determine the orientation of a camera from the location of a store shelf, one or more coverage parameters, and/or the height(s) of one or more products. A training sample may include a sample location of a sample store shelf, a sample first coverage parameter, a sample second coverage parameter, a sample first height, a sample second height, and/or a label indicating a desired orientation for a sample camera. The at least one processor may use the trained machine learning model to analyze the location of the store shelf, the first coverage parameter, the second coverage parameter, and/or the first height and the second height to determine the orientation of the camera configured to capture images of at least the portion of the store shelf. Alternatively or additionally, the at least one processor may use an optimization algorithm to determine an orientation the camera that maximizes a criterion function of a coverage of the camera while ensuring one or more desired minimal requirements.

In some embodiments, the at least one processor may determine a capturing frequency for the camera. The capturing frequency for the camera may include a frequency at which the camera is configured to capture an image of the store shelf (or a portion thereof) at the determined position. In some embodiments, the capturing frequency for the camera may be different from the maximal capturing frequency of the camera. For example, the camera may be used to capture one image of the store shelf (or a portion thereof) per hour, although the camera can be configured to capture six images per second at the maximum speed. The at least one processor may determine a capturing frequency for the camera based on at least one of the location of the store shelf, the first coverage parameter, the second coverage parameter, the first height, the second height, the first product type, the second product type, or the like, or a combination thereof. For example, the first product type and the second product type may be products that are taken off the store shelf by customers frequently. The at least one processor may determine a capturing frequency for the camera for these product types that may be higher than the capturing frequency for a product type that is less frequently taken off the store shelf.

In some embodiments, in determining the position for placing the camera, the at least one processor may take other factors into account. For example, the at least one processor may determine at least one dimension of the store shelf (e.g., a depth of the store shelf, a length of the store shelf, a thickness of the store shelf, etc.). The at least one processor may also determine the position for placing the camera configured to capture images of at least the portion of the store shelf by analyzing the location of the store shelf, the at least one dimension of the store shelf, the first coverage parameter, the second coverage parameter, the first height, and the second height. Alternatively or additionally, the at least one processor may determine (or receive) at least one property of the camera. Exemplary properties may include one or more pixel resolutions, a sensor dimension, a focal length, a range of focal lengths (e.g., for a camera having an adjustable focal length), an angle-of-view, a rotation range, a mounting constraints of the camera (e.g., whether it can be mounted to a shelf), a power requirement (e.g., requiring an external power supply or not), or the like, or a combination thereof. The at least one processor may determine the position for placing the camera based on the at least one property of the camera in addition to other factors described in this disclosure. Alternatively or additionally, in determining the position for placing the camera, the at least one processor may take another store shelf and/or the products placed thereon into account. For example, the at least one processor may determine the location of a second store shelf within the retail store (similar to step 1401). The second store shelf may be adjacent to the first store shelf (i.e., the store shelf referenced in connection with step 1401). Alternatively, the second store shelf may be above or below the first store shelf. For example, the second store shelf may be positioned above the products of the first product type and the products of the second product type and/or above the store shelf, which may be indicated by, for example, a store plan, a store map, a planogram, a realogram, an image of the first and second store shelves at the current state, or the like, or a combination thereof. The at least one processor may determine the position for placing the camera configured to capture images of at least the portion of the store shelf by analyzing the location of the first store shelf, the location of the second store shelf, the first coverage parameter, the second coverage parameter, the first height, and the second height.

At step 1405, at least one processor of server 1301 may provide, to a user interface of a user device, information relating to the determined position of the camera. For example, referring to FIG. 12C, the at least one processor may provide information relating to the determined position 1241 of camera 1240 to a user interface of user device 1302. By way of example, the provided information may include an indication of at least a portion of the store shelf in a field of view of the camera at the determined position (e.g., information relating to a particular product type corresponding to the at least portion of the store shelf). In some embodiments, the information relating to the determined position of the camera is provided through an augmented reality (AR) system. For example, user device 1302 (or an AR system associated with user device 1302) may display the camera (or a text or graphical representation thereof) at the determined position overlapping with the images captured from the environment of the store shelf. In some embodiments, the provided information may include an indication of a particular store shelf to which the camera is to be mounted at or near the determined position. For example, the at least one processor may determine a store shelf that is on the other side of the aisle and can mount the camera at or near the determined position (which may also be referred to herein as the mounting store shelf). The at least one processor may also cause the user interface of the user device to indicate (and/or display) the mounting store shelf. In some embodiments, the indication of a particular store shelf may also include information relating to one or more product types corresponding to the particular store shelf (e.g., one or more product types placed on, below, and/or above the particular store shelf).

In some embodiments, the at least one processor may be programmed to select a camera among a plurality of cameras as the camera configured to capture images of the at least a portion of the store shelf based on properties of each one of the plurality of alternative cameras, the location of the store shelf, the first coverage parameter, the second coverage parameter, the first height, and the second height. The selected camera may be different from at least one of the plurality of cameras in at least one property (one or more pixel resolutions, a sensor dimension, a focal length, a range of focal lengths (e.g., for a camera having an adjustable focal length), an angle-of-view, a rotation range, a mounting constraints of the camera (e.g., whether it can be mounted to a shelf), a power requirement (e.g., requiring an external power supply or not), or the like, or a combination thereof). For example, the at least one processor may select a camera having the greatest field of view among a plurality of cameras based on properties of each one of the plurality of alternative cameras, the location of the store shelf, the first coverage parameter, the second coverage parameter, the first height, and the second height. The at least one processor may also be programmed to provide an indication of the selected camera to the user via, for example, the user interface of user device 1302.

In some embodiments, the at least one processor may be programmed to generate a simulated image corresponding to a field of view of the camera. For example, the at least one processor may generate a simulated image that may resemble an image captured by the camera at the determined position corresponding to the field of view of the camera. By way of example, the at least one processor may generate a simulated image using a machine learning model (e.g., a model trained using a Generative Adversarial Network (GAN)). The at least one processor may enter various parameters (e.g., at least one of a camera property, the position of the camera, or the orientation of the camera, etc.) as input to the machine learning model, which may generate a simulated image as the output. In some embodiments, a simulated image may include illustrations of a least a portion of the store shelf, a first plurality of products of the first product type positioned on the store shelf, and a second plurality of products of the second product type positioned on the store shelf.

In some embodiments, the at least one processor may receive an updated position of the camera and determine an updated simulated image based on the updated position of the camera. For example, as described elsewhere in this disclosure, user device 1302 may display in a user interface an indication of the camera at a determined position. The user may modify the position of the camera via the user interface of user device 1302, which may transmit to server 1301 the user input for modifying the position of the camera (or data relating to the modified position of the camera). The at least one processor of server 1301 may generate an updated simulated image corresponding to the modified position of the camera.

In some embodiments, the at least one processor may update the position for placing the camera based on updated information relating to the store shelf. For example, the location of the store shelf may change due to an update of the position of the store shelf immediately above the store shelf. The at least one processor may receive the updated information, determine an updated to at least one of a position of the camera and/or an orientation of the camera based on the updated information, and provide information relating to the updated to at least one of the position of the camera and the orientation of the camera to the user interface of user device 1302 (similar to process 1400 described above). Alternatively or additionally, the at least one processor may update the position for placing the camera and/or the orientation of the camera based on an update in a product type associated with the store shelf. For example, the at least one processor may receive updated information relating to a product type associated with products placed on the store shelf (e.g., the first product type, the second product type, and/or another product type). By way of example, the second product type may not be placed on the store shelf, and products of a third product type may be placed on the store shelf. As another example, the placement of products of the first product type and products of the second product type may change (e.g., products of the first product type may occupy a larger area than before). The at least one processor may receive the updated information. The at least one processor may also be programmed to determine an updated position of the camera based on the updated information and provide an indication of the updated position in the user interface of user device 1302 (similar to process 1400 described above). Alternatively or additionally, the at least one processor may be programmed to determine an updated orientation of the camera at the originally determined position (similar to process 1400 described above).

While the description of process 1400 is provided using server 1301 as an example, one having ordinary skill in art would understand that user device 1302 may be configured to perform one or more steps of process 1400.

The present disclosure provides systems and methods for navigating one or more cleaning robots to capturing images of retail store shelves, which may monitor retail spaces more efficiently. In one embodiment, a server may receive a request for checking a store shelf in a retail store and direct a cleaning robot (or a vehicle) to a position at which an image sensor (e.g., a camera) associated with the cleaning robot may be configured to capture one or more images of at least one portion of the store shelf. The cleaning robot may transmit at least one captured image to the server via, for example, one or more networks. The server may be configured to analyze the image received from the cleaning robot to determine a need for another image of the store shelf (or a portion thereof). For example, the server may analyze the image and determine that the image does not capture a sufficient portion of the store shelf to recognize the product items placed on the store shelf, or that the image does not capture a particular portion of the store shelf at a sufficient quality (e.g., having an insufficient resolution, an insufficient sharpness, an inadequate angle, etc.) to recognize the product items placed on the particular portion of the store shelf. The server may direct the cleaning robot to move to a different position (and/or change the orientation of the camera) at which the camera may be configured to capture one or more images of at least a portion of the store shelf. The cleaning robot may also be configured to transmit the newly captured image(s) to the server.

Figure 15:
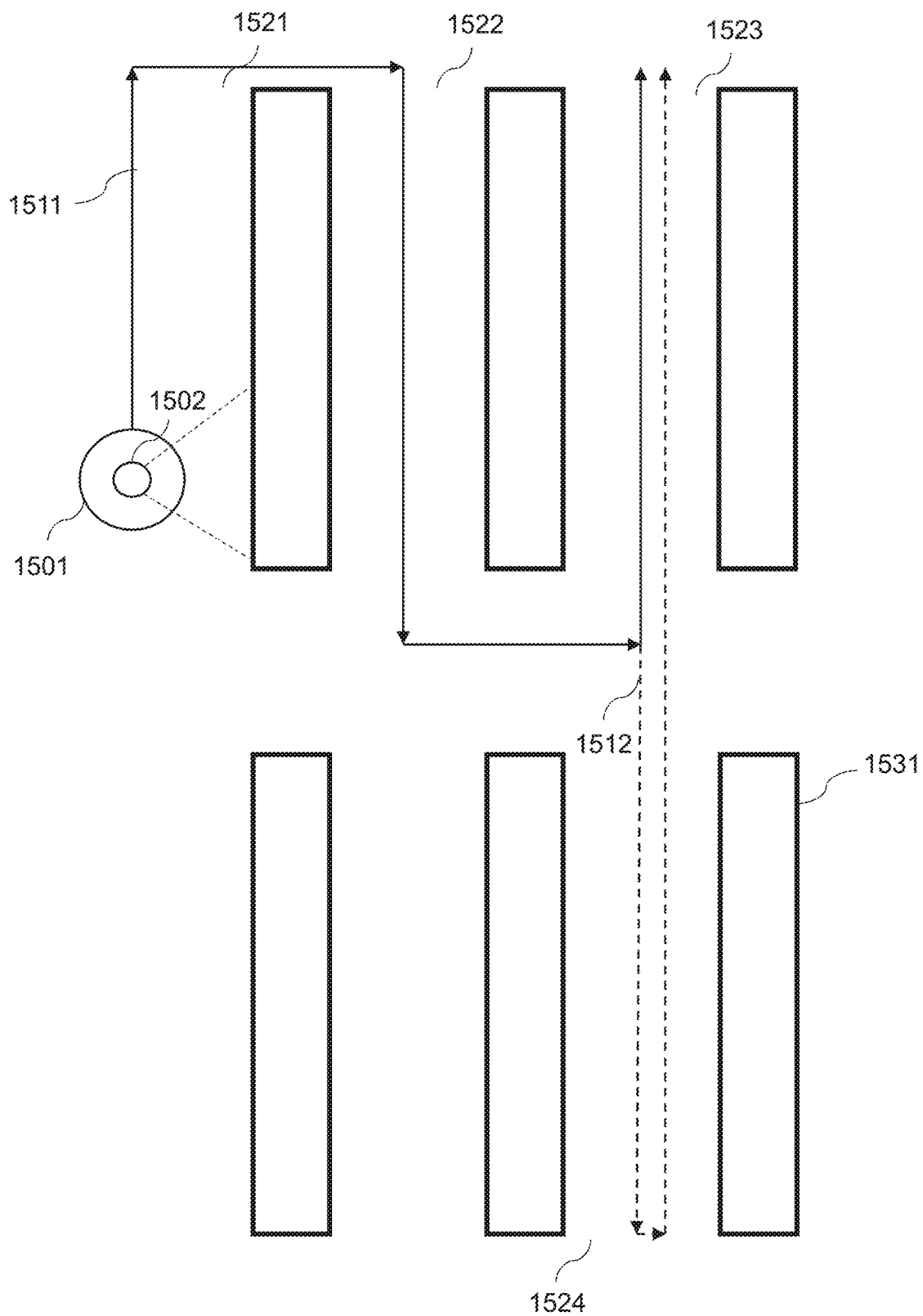
FIG. 15 is a schematic illustration of an example cleaning robot, consistent with the present disclosure.

FIG. 15 illustrates an exemplary process for navigating a cleaning robot 1501. As illustrated in FIG. 15, cleaning robot 1501 may initially navigate along a route 1511 through aisle 1521, aisle 1522, and aisle 1523, to clean areas along route 1511. In some embodiments, cleaning robot 1501 may also include a camera 1502 configured to capture one or more images from the environment of cleaning robot 1501, including, for example, at least one portion of a store shelf and/or one or more product items. In some embodiments, cleaning robot 1501 may include a plurality of cameras 1502 (e.g., two, three, four, five, six, etc.). For example, in some embodiments, cleaning robot 1501 may include a plurality of cameras 1502 to capture views facing in front, behind, and/or one or more sides of cleaning robot 1501. As another example, in some embodiments, one or more cameras 1502 included in cleaning robot 1501 may be configured to rotate in order to focus on a particular area without changing a facing direction of cleaning robot 1501. Cleaning robot 1501 may receive information relating to route 1511 from a server and/or a user device. The server (and/or a computing device external or internal to cleaning robot 1501) may receive an indication of store shelf 1531 and cause a first adjustment to route 1511 based on the indication of store shelf 1531. For example, the server may determine the first adjustment to route 1511 to cover store shelf 1531 or to cover a position in proximity of store shelf 1531. By way of example, as illustrated in FIG. 15, the server may determine a modified route 1512, which may include a detour to store shelf 1531 along aisle 1524 and then to aisle 1523. The server may also transmit the first adjustment to route 1511 (and/or modified route 1512) to cleaning robot 1501. Cleaning robot 1501 may follow modified route 1512 instead of original route 1511.

Figure 16:
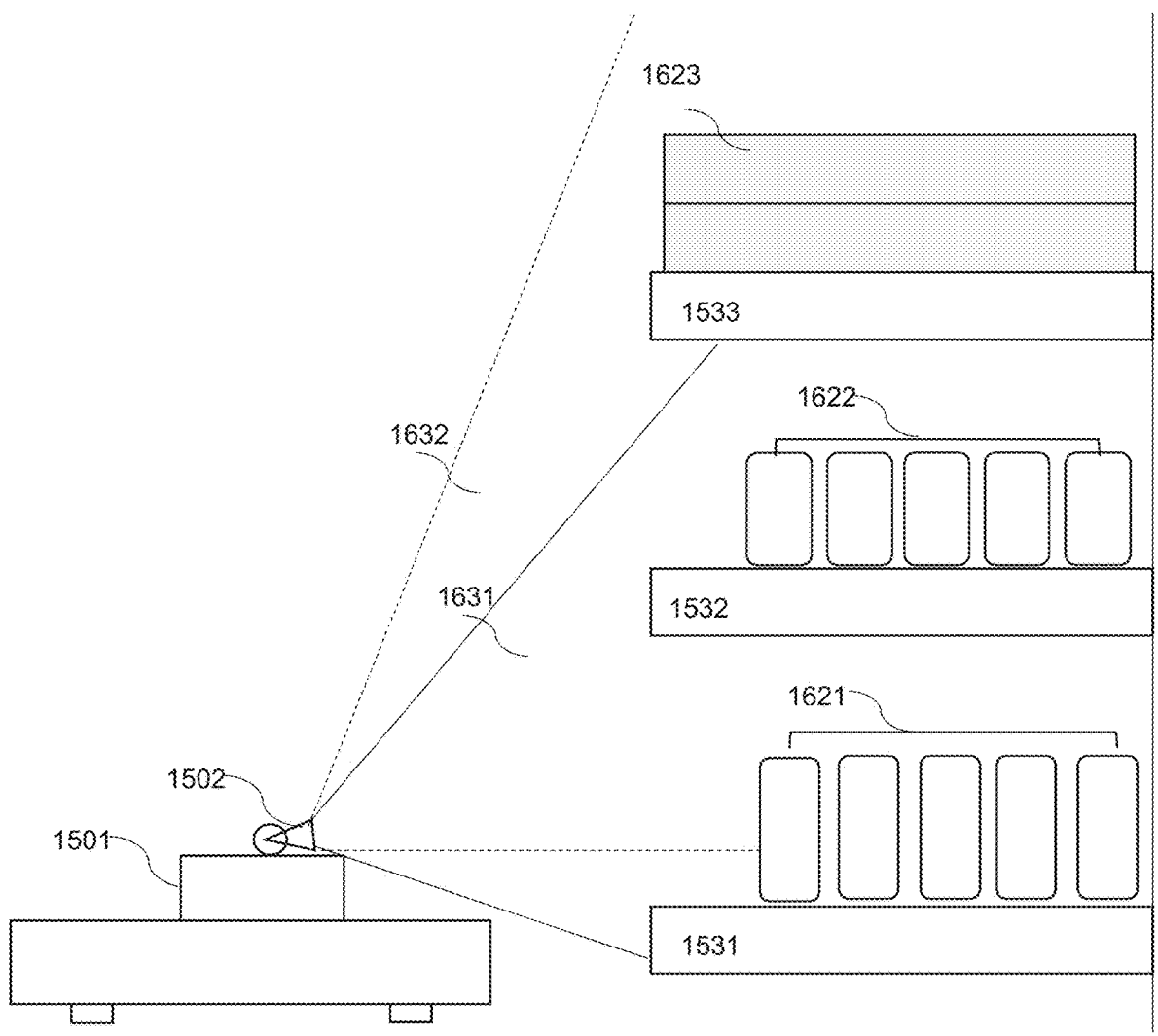
FIG. 16 is a schematic illustration of an example cleaning robot, consistent with the present disclosure.

FIG. 16 illustrates exemplary cleaning robot 1501 and exemplary store shelves 1531, 1532, and 1533. As described above, the server (and/or a user device) may direct cleaning robot 1501 to move to a position close to store shelf 1531 according to the first adjustment to cleaning robot 1501's route. Cleaning robot 1501 may arrive at a position in proximity of store shelf 1531. Camera 1502, which may be disposed on cleaning robot 1501, may be configured to capture one or more images of at least portion of store shelf 1531. For example, as illustrated in FIG. 16, camera 1502 may be configured to capture one or more images of the items within FOV 1631, which may include at least a portion of store shelf 1531 and one or more items of first product type 1621.

In some embodiments, camera 1502 and/or cleaning robot 1501 may be configured to change camera 1502's orientation, position, and/or field of view. For example, camera 1502 (and/or cleaning robot 1501) may be configured to change its orientation such that its field of view may change to FOV 1632 shown in FIG. 16 through one or more pan/tilt operations. Camera 1502 may be configured to capture one or more images of objects within FOV 1632, which may include representations of at least a portion of one or more items of first product type 1621, at least a portion of store shelf 1532, at least a portion of one or more items of second product type 1622, at least a portion of store shelf 1532, and at least a portion of one or more items of second product type 1623. Alternatively or additionally, camera 1502 and/or cleaning robot 1501 may be configured to change the height of camera 1502 such that camera 1502 may be configured to capture one or more images at a higher position (e.g., to capture one or more images of items placed on store shelf 1533 at a height close to the horizontal level of store shelf 1532).

Figure 17A:
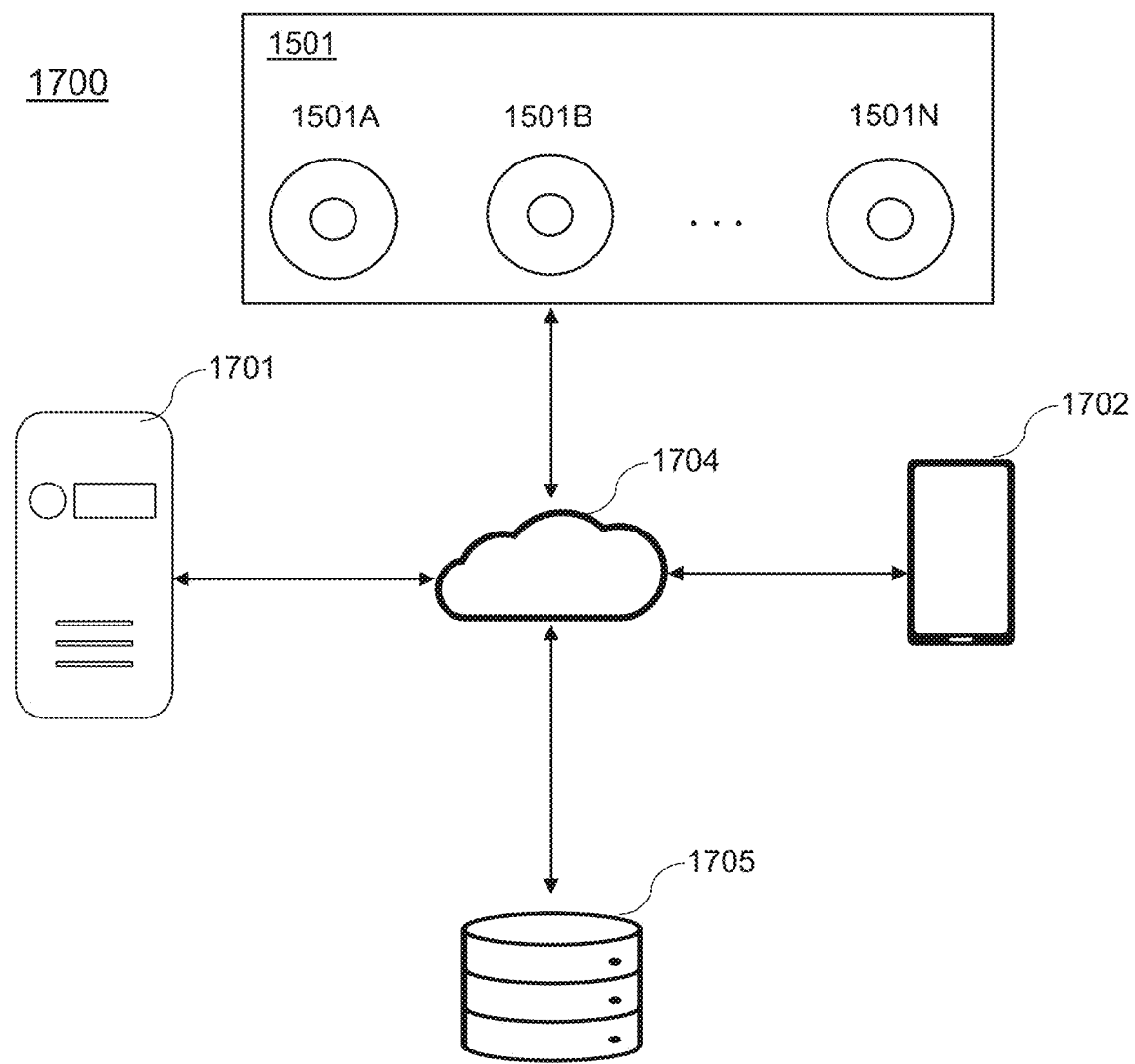
FIG. 17A is a block diagram of an example system for navigating a cleaning robot, consistent with the present disclosure.

FIG. 17A is a block diagram of an example system 1700 for navigating a cleaning robot. As illustrated in FIG. 17A, system 1700 may include a server 1701, user device 1702, one or more cleaning robots 1501 (e.g., 1501A, 1501B, . . . , 1501N), a network 1704, and a database 1705. Server 1701 may be configured to determine a route and/or one or more adjustments to a route for cleaning robot 1501. In one example, server 1701 may be external to cleaning robots 1501. In another example, server 1701 may be internal to at least one of cleaning robots 1501. In yet another example, server 1701 may be internal to user device 1702. In an additional example, server 1701 may be external to user device 1702. User device 1702 may be configured to receive information relating to one or more store shelves and/or cleaning robot 1501, and present the received information to one or more individuals (e.g., a worker, a store associate, etc.). For example, user device 1702 may receive a request for restocking items associated with a store shelf from server 1701 and/or cleaning robot 1501. Cleaning robot 1501 may be configured to clean a surface along a route in the retail store. In some embodiments, cleaning robot 1501 may include a camera configured to capture one or more images from the environment of cleaning robot 1501. Network 1704 may be configured to facilitate communications among the components of system 1700. Database 1705 may be configured to store data that may be accessed by one or more components of system 1700.

In some embodiments, server 1701 and/or user device 1702 may be configured to receive a first image acquired by the camera associated with cleaning robot 1501. The first image may include a representation of at least one portion of a particular store shelf. Server 1701 and/or user device 1702 may also be configured to analyze the first image to determine a need for a second image of the at least one portion of the at least one store shelf. Server 1701 and/or user device 1702 may further be configured to cause a second adjustment to the route of cleaning robot 1501 within the retail store in response to the determined need.

Server 1701 may include at least one processor configured to perform one or more functions thereof. Server 1701 may also include memory configured to store instructions for the at least one processor. Server 1701 may further include at least one storage device configured to store data for the at least one processor.

In some embodiments, user device 1702 may be configured to present information and receive user input via a user interface. For example, user device 1702 may receive an instruction to restock items associated with a particular store shelf. User device 1702 may also be configured to present the instruction to the user in a user interface. In some embodiments, user device 1702 may be configured to receive input from the user via the user interface (and/or an input device associated with user device 1702). For example, user device 1702 may be configured to receive user input to confirm that a restocking task associated with a store shelf has been completed. User device 1702 may also transmit a notification indicating the completed restocking task to server 1701 via network 1704. In one example, user device 1702 may receive at least part of an image captured using camera 1502 and/or cleaning robot 1501, and may present information based on the received at least part of an image (for example, presenting the at least part of the image, information based on an analysis of the at least part of the image, or the like, or a combination thereof).

User device 1702 may include at least one processor configured to perform one or more functions thereof. User device 1702 may also include memory configured to store instructions for the at least one processor. User device 1702 may further include at least one storage device configured to store data for the at least one processor.

In some embodiments, at least one processor of server 1701 and/or user device 1702 may include a microprocessor, preprocessors (such as an image preprocessor), a graphics processing unit (GPU), a central processing unit (CPU), support circuits, digital signal processors, integrated circuits, memory, or any other types of devices suitable for running applications or performing a computing task. In some embodiments, the at least one processor may include any type of single or multi-core processor, mobile device microcontroller, central processing unit, etc. Various processing devices may be used, including, for example, processors available from manufacturers such as Intel®, AMD®, etc., or GPUs available from manufacturers such as NVIDIA®, ATI®, etc. and may include various architectures (e.g., x86 processor, ARM®, etc.). Any of the processing devices disclosed herein may be configured to perform certain functions. Configuring a processing device, such as any of the described processors or other controller or microprocessor, to perform certain functions may include programming of computer-executable instructions and making those instructions available to the processing device for execution during operation of the processing device. In some embodiments, configuring a processing device may include programming the processing device directly with architectural instructions. For example, processing devices such as field-programmable gate arrays (FPGAs), application-specific integrated circuits (ASICs), and the like may be configured using, for example, one or more hardware description languages (HDLs).

In some embodiments, cleaning robot 1501 may be configured to clean, sweep, and/or scrub a surface autonomously or semi-autonomously. Cleaning robot 1501 may include an electronics system configured to perform and/or execute a set of instructions to control at least one of a drive system, a cleaning assembly, a vacuum source, a pump, a motor, or the like, or a combination thereof based on one or more signals associated with an operational condition of cleaning robot 1501 and/or one or more environmental conditions associated with the area to be cleaned. In some embodiments, cleaning robot 1501 may include one or more sensors configured to determine its position (e.g., a global position or a local position relative to an object) and/or detect one or more environment conditions. For example, cleaning robot 1501 may include one or more of a camera, a light emitting and/or sensing device (e.g., visible light, infrared light, etc.), a radio and/or sound wave emitter (e.g., sonar), a global positioning system (GPS) device, a proximity sensor, a LIDAR device, or the like, or a combination thereof.

In some embodiments, a camera associated with cleaning robot 1501 may be configured to capture one or more images from the environment of cleaning robot 1501. For example, the camera may be configured to capture one or more images including a representation of at least a portion of a store shelf and/or one or more products placed on a store shelf. The camera may include a digital camera, a time-of-flight camera, a stereo camera, an active stereo camera, a depth camera, a Lidar system, a laser scanner, CCD based devices, or any other sensor based system capable of converting received light into electric signals. In some embodiments, the camera may be configured to capture one or more images based on one or more capturing parameters configured by server 1701 and/or user device 1702. For example, server 1701 may transmit to the camera a resolution parameter specifying a resolution at which an image to be captured. The camera may be configured to capture one or more images at the specified resolution. In some embodiments, the camera may be configured to transmit one or more images to server 1701, user device 1702, and/or database 1705 via network 1704 (or through cleaning robot 1501).

Network 1704 may be a public network or private network and may include, for example, a wired or wireless network, including, without limitation, a Local Area Network (LAN), a Wide Area Network (WAN), a Metropolitan Area Network, an IEEE 802.11 wireless network (e.g., "Wi-Fi"), a network of networks (e.g., the Internet), a land-line telephone network, or the like. Network 1704 may be connected to other networks (not depicted in FIG. 17) to connect the various system components to each other and/or to external systems or devices. In some embodiments, network 1704 may be a secure network and require a password to access the network.

Database 1705 may store information and data for the components of system 1700 (e.g., server 1701, user devices 1702, one or more cleaning robots 1501, and/or one or more cameras associated with cleaning robots 1501). In some embodiments, server 1701, user devices 1702, one or more cleaning robots 1501, and/or one or more cameras associated with cleaning robots 1501 may be configured to access database 1705, and obtain data stored from and/or upload data to database 1705 via network 1704. Database 1705 may include a cloud-based database or an on-premises database. Database 1705 may include images captured by one or more cameras, one or more routes for cleaning robot 1501, configuration data, expression data, datasets, model data (e.g., model parameters, training criteria, performance metrics, etc.), and/or other data, consistent with disclosed embodiments.

FIG. 17B illustrates a flowchart of an exemplary process 1710 for navigating cleaning robot 1501 consistent with some embodiments of the present disclosure.

At step 1711, at least one processor of server 1701 may be programmed to receive an indication of at least one store shelf of a retail store. An indication of a store shelf may include at least one of an identity of the store shelf (e.g., a shelf number, an aisle number of the aisle associated with the store shelf, etc.), an identity of the shelves unit where the store shelf is located, the location of the store shelf in the retail store, the location of the shelving unit, or the like, or a combination thereof. Alternatively or additionally, an indication of a store shelf may include a request for checking a particular store shelf and/or an area associated with the store shelf. For example, server 1701 may receive a request from a worker for checking one or more items placed on a store shelf, which may include an indication of the store shelf. As another example, server 1701 may receive a request from a worker or a customer to clean an area, which may be associated with one or more store shelves.

In some embodiments, the location of a store shelf may include the position of the store shelf relative to an object (e.g., a product). For example, the location of the store shelf may include a distance (e.g., a height) of the store shelf relative to an object. By way of example, the height of the store shelf may include a height of the store shelf relative to the ground, the ceiling, another store shelf (e.g., a store shelf below or above the store shelf, a store shelf on the other side of the aisle), a side of a store shelves unit (e.g., the top, the bottom, etc.), a product of a first product type, or the like. In some embodiments, the store shelf may be indicated to hold (or support) one or more particular types of products (e.g., sodas, cereals, etc.). As another example, the location of the store shelf may be indicated by a direction (e.g., above, below, opposed, etc.) relative to another store shelf, relative to a fixture in a retail store (e.g., a lighting fixture), a cash register, a check-out lane, a particular product type, or the like, or a combination thereof. For example, the location of the store shelf may be above (or below) products of the first product type and products of the second product type or across an aisle from products of the first product type and products of the second product type.

In some embodiments, server 1701 may determine a product type (e.g., a soda) and one or more store shelves associated with the product type. For example, server 1701 may receive a request for checking the stocking of a particular soda and access a database (e.g., database 1705) to identify a store shelf associated with the soda. In some embodiments, server 1701 may also determine the location of the store shelf as described elsewhere in this disclosure.

In some embodiments, server 1701 may receive an indication of two or more store shelves (e.g., store shelf 1531, store shelf 1532, store shelf 1533 illustrated in FIG. 16). Server 1701 may also determine the locations of the store shelves.

In some embodiments, the at least one processor may obtain a store plan or a store map, and determine the location of the store shelf based on the store plan. A store plan may include a planogram, a realogram, a three-dimensional (3D) model of the retail store, or the like, or a combination thereof. A realogram may be a virtual copy of shelves in a store. In some embodiments, the store plan may be determined based on an analysis of images captured from the retail store to identify store shelves and products placed on the store shelves. For example, one or more cameras may be configured to capture images of one or more store shelves and products placed on the store shelves (e.g., images captured using a 3D camera (such as a stereo camera, an active stereo camera, a time-of-flight camera, a LiDAR camera, etc.)). The images may be used to construct a store plan representing at least one product characteristic relative to a display structure associated with a retail environment (such as a store shelf or area of one or more shelves). Exemplary product characteristics may include quantities of products with respect to areas of the shelves, product configurations or product shapes with respect to areas of the shelves, product arrangements with respect to areas of the shelves, product density with respect to areas of the shelves, product combinations with respect to areas of the shelves, etc. The at least one processor may determine a location of a particular store shelf based on the store plan (e.g., a height of the store shelf relative to products of a product type).

At step 1712, at least one processor of server 1701 may cause a first adjustment to a route of cleaning robot 1501 within the retail store based on at least one location within the retail store corresponding to the at least one store shelf. The first adjustment may be configured to enable a camera (e.g., camera 1502) associated with cleaning robot 1501 to capture one or more images of at least one portion of the at least one store shelf. For example, as illustrated in FIG. 15, cleaning robot 1501 may initially navigate along a route 1511 through aisle 1521, aisle 1522, and aisle 1523, to clean areas along route 1511. Cleaning robot 1501 may receive information relating to route 1511 from server 1701 and/or user device 1702. The server may determine the first adjustment to route 1511 to cover store shelf 1531 or to a position in proximity of store shelf 1531. By way of example, as illustrated in FIG. 15, the server may determine a modified route 1512, which may include a detour to store shelf 1531 along aisle 1524 and then to aisle 1523. The server may also transmit the first adjustment to route 1511 (and/or modified route 1512) to cleaning robot 1501. Cleaning robot 1501 may follow modified route 1512 instead of original route 1511. In some embodiments, the cleaning robot route prior to the first adjustment (e.g., route 1511) may not include a path passing the at least one store shelf, and the cleaning robot route after the first adjustment (e.g., route 1512) may include a path passing the at least one store shelf. In another example, the cleaning robot route prior to the first adjustment may include a path passing the at least one store shelf at a first portion of the route, and the cleaning robot route after the first adjustment may include a path passing the at least one store shelf at a second portion of the route, and the cleaning robot may pass the second portion of the route before passing the first portion of the route. In some embodiments, before the first adjustment to the route, cleaning robot 1501 may be configured not to clean a particular portion of the retail store (such as aisle 1524), and after (and/or as a result of) the first adjustment to the route, cleaning robot 1501 may be configured to clean the particular portion of the retail store. In one example, server 1701 may be further configured to cause an adjustment to a route of a second cleaning robot, for example to exclude the particular portion of the retail store from the route of the second cleaning robot. In another example, server 1701 may be further configured to provide instructions to a second cleaning robot, for example to cause the second cleaning robot to forgo cleaning the particular portion of the retail store. For example, the second cleaning robot may include no camera, or a camera incompatible to the desired image capturing.

In some embodiments, the at least one location within the retail store corresponding to the at least one store shelf for determining the first adjustment may include a location of the at least one store shelf and/or a location from which camera 1502 may be configured to capture the one or more images of the at least one portion of the at least one store shelf.

In some embodiments, the at least one processor may select one of a plurality of alternative cleaning robots 1501 within the retail store (e.g., cleaning robot 1501A, cleaning robot 1501B, etc.) based on planned routes associated with the plurality of the alternative cleaning robots. For example, the at least one processor may select a cleaning robot that is currently closest to the location of the store shelf. As another example, the at least one processor may select a cleaning robot that has the shortest detour from its current route. Alternatively or additionally, the at least one processor may select a cleaning robot based on the power status of the plurality of alternative cleaning robots and/or levels of cleaning provisions of the plurality of alternative cleaning robots. Alternatively or additionally, the at least one processor may select a cleaning robot based on one or more parameters of cameras corresponding to the plurality of alternative cleaning robots. The at least one processor may also cause a first adjustment to the route of the selected cleaning robot as described elsewhere in this disclosure.

At step 1713, at least one processor of server 1701 may receive a first image acquired by camera 1502 associated with cleaning robot 1501. The first image may include a representation of the at least one portion of the at least one store shelf. By way of example, as illustrated in FIG. 16, camera 1502 may be configured to capture one or more images of one or more objects in FOV 1631, which may include a representation of at least one portion of store shelf 1531. Camera 1502 may transmit (directly or via cleaning robot 1501) one or more captured images to server 1701.

In some embodiments, camera 1502 may be configured to capture one or more images according to one or more coverage parameters corresponding to the store shelf and/or one or more product types placed on the store shelf. One or more coverage parameters may be received from server 1701 and/or user device 1702. By way of example, a coverage parameter corresponding to a product type may include at least one of a depth within a shelf on which a plurality of products of the product type are planned to be placed, a percentage of the plurality of products of the product type that have been to be captured in an image to enable recognition, a percentage of the captured portion of one product in an image to enable recognition, a capturing resolution, or a capturing frequency. In some embodiments, the at least one processor may determine a product type and determine a coverage parameter based on the product type. For example, the at least one processor may determine a particular product type based on a store plan, a store map, a planogram, a realogram, user input, one or more images of the store shelf supporting the products of the product type, or the like, or a combination thereof. The at least one processor may also determine a coverage parameter based on the product type by, for example, consulting a lookup table including a plurality of coverage parameters corresponding to a plurality of product types. Server 1701 may be configured to transmit the coverage parameter to camera 1502.

In some embodiments, the at least one processor may transmit an instruction to cleaning robot 1501 to clean an area associated with the at least one store shelf.

At step 1714, at least one processor of server 1701 may analyze the first image to determine a need for a second image of the at least one portion of the at least one store shelf. For example, the at least one processor may analyze the first image and determine an occlusion of at least a part of the at least one store shelf and/or an occlusion of one or more items placed on the store shelf. By way of example, the at least one processor may analyze the first image and determine that the at least one store shelf was blocked by an object (e.g., a person, a shopping cart, etc.) from the view of camera 1502 when the first image was captured. In response to the determined occlusion, the at least one processor may determine the need for the second image of the at least one portion of the at least one store shelf. Alternatively or additionally, the at least one processor may be configured to analyze the first image to attempt to recognize a product. The at least one processor may determine the need to capture second image of the at least one portion of the at least one store shelf in response to a failure to recognize the product. Alternatively or additionally, the at least one processor may analyze the first image and determine a need for an image of the at least one portion of the at least one store shelf at a resolution higher than a resolution of the first image. Alternatively or additionally, the at least one processor may analyze the first image and determine a need for a second image of the at least one portion of the at least one store shelf captured by the image sensor from a different position and/or a different orientation. Alternatively or additionally, the at least one processor may analyze the first image and determine the quantity of items of a product type placed on the store shelf based on the analysis of the first image. The at least one processor may also be configured to determine a need for capturing a second image based on the determined quantity. For example, the at least one processor may determine the quantity of soda cans placed on the store shelf based on the analysis of the first image. The at least one processor may determine that although there is no need for an immediate restocking of the soda, but probably needs restocking after a time period (e.g., an hour) based on the current quantity of soda cans. The at least one processor may also be configured to determine a need for capturing a second image of the store shelf in an hour to determine whether a restocking is needed. In some embodiments, the at least one processor may determine the time period after which a second image is to be taken based on the determined quantity of the items of the product type. Alternatively or additionally, the at least one processor may analyze the first image to calculate at least one convolution of at least part of the first image. The at least one processor may also be configured to determine a need for a second image based on the calculated at least one convolution of at least a portion of the first image. For example, in response to a first value of a particular calculated convolution of the at least part of the first image, the at least one processor may determine a second image is needed. As another example, in response to a second value of the particular calculated convolution of the at least part of the first image, the at least one processor may determine that a second image is not needed. By way of example, the first value of the particular calculated convolution may be indicative of an inadequate sharpness of the first image, and the at least one processor may determine that a second image is needed based on the first value of the particular calculated convolution. The second value of the particular calculated convolution may be indicative of an adequate sharpness of the first image, and the at least one processor may determine that a second image is not needed based on the second value of the particular calculated convolution. In another example, the first value of the particular calculated convolution may indicate that the first image does not include a depiction of a particular item, and the at least one processor may determine that a second image is needed based on the first value of the particular calculated convolution. The second value of the particular calculated convolution may indicate that the first image includes a depiction of the particular item, and the at least one processor may determine that a second image is not needed based on the second value of the particular calculated convolution. In some embodiments, a machine learning model may be trained using training samples from previously captured images (by the same camera that captured the image for analysis, or one or more different cameras) to determine a need for one or more additional images. The at least one processor may use the trained machine learning model to analyze the first image and determine a need for a second image of the at least one portion of the at least one store shelf. A training sample may include a sample image and a label indicating whether an additional image is needed in addition to the sample image.

In some embodiments, the at least one processor may analyze the first image to determine an action associated with the at least one portion of the at least one store shelf to be performed. The determined action may include at least one of restocking one or more products of a particular product type, re-arranging one or more items on the at least one store shelf, or removing one or more items on the at least one store shelf. The at least one processor may also be configured to transmit to user device 1702 an instruction relating to the determined action. Alternatively or additionally, at least one processor may be configured to transmit to a store management system information related to the determined action.

At step 1715, at least one processor of server 1701 may cause a second adjustment to the route of cleaning robot 1501 within the retail store in response to the determined need. The second adjustment may be configured to enable camera 1502 to capture the second image of the at least one portion of the at least one store shelf. For example, the at least one processor may determine a new position for cleaning robot 1501 from where camera 1502 may be configured to capture one or more second images. The at least one processor may also cause a second adjustment to the route of cleaning robot 1501 such that cleaning robot 1501 may be configured to move the new position according to the second adjustment. Camera 1502 may be configured to capture one or more second images at the new position. Alternatively or additionally, the at least one processor may determine a new orientation of camera 1502 at the old position or a new position. For example, the at least one processor may determine a new orientation of camera 1502 (for example, tilting a lens of camera 1502 upwards). The at least one processor may also be configured to transmit information relating to the new orientation to camera 1502, which may be configured to capture one or more second images with the new orientation.

In some embodiments, the at least one processor may analyze the second image to determine an action associated with the at least one portion of the at least one store shelf to be performed. The determined action may include at least one of restocking one or more products of a particular product type, re-arranging one or more items on the at least one store shelf, or removing one or more items on the at least one store shelf. The at least one processor may also be configured to transmit to user device 1702 an instruction relating to the determined action. Alternatively or additionally, at least one processor may be configured to transmit to a store management system information related to the determined action.

In some embodiments, cleaning robot 1501 may be configured to clean an area prior to, when, or after camera 1502 captures the first image (or the second image). For example, cleaning robot 1501 may be configured to clean a first area of the retail store before capturing of the first image. Alternatively or additionally, cleaning robot 1501 may be configured to clean a second area of the retail store after the capturing of the second image.

In some embodiments, the first adjustment (and/or the second adjustment) to the route of cleaning robot 1501 may skip (and/or add) one or more areas to be cleaned by cleaning robot 1501 prior to the first adjustment (and/or the second adjustment). For example, the original route of cleaning robot 1501 may pass an aisle, and cleaning robot 1501 may be configured to clean an area associated with the aisle. The first adjustment to the route of cleaning robot 1501 may skip that aisle, and cleaning robot 1501 may not clean the area associated with the aisle after the first adjustment. Server 1701 may select and direct another cleaning robot to clean the area. For example, server 1701 may determine an adjustment to the route of the selected cleaning robot and cause the selected cleaning robot to clean the area based on the adjustment. Alternatively or additionally, the first adjustment (and/or the second adjustment) to the route of cleaning robot 1501 may add one or more particular areas for cleaning robot 1501 to clean. For example, server 1701 may be configured to cause an adjustment to a second cleaning robot that is to clean one of the one or more particular areas such that the second cleaning robot may skip the one of the one or more particular areas. By way of example, the route of the second cleaning robot prior to the adjustment may include a path passing the at least one store shelf (which may be covered by the route of cleaning robot 1501 after the first adjustment). Server 1701 may cause an adjustment to the second cleaning robot route such that the adjusted route may not include a path passing the at least one store shelf.

While the description of process 1710 is provided using server 1701 as an example, one having ordinary skill in art would understand that user device 1702 may be configured to perform one or more steps of process 1710. the description of process 1710 is provided using one or more cleaning robots as an example, one having ordinary skill in art would understand that other types of moving devices, such as vehicles, unmanned aerial vehicles, drones, robots, or the like, may also be configured to perform one or more functions of a cleaning robot described herein.

In embodiments consistent with the present disclosure, the described "store shelf" or "shelf" may also include one or more pegboards each providing multiple peg-hooks for hanging products for display. For example, retail store 105 (as shown in FIG. 1) may display products on a pegboard that has multiple holes arranged in a matrix with multiple rows and columns or in another arrangement. A peg-hook may be inserted to each of the holes, and one or more items may be hung on the peg-hook for display. It is contemplated that the above-described methods and systems regarding the "store shelf" or "shelf" may also be used to monitor and detect changes of the items hanging on the pegboards and peg-hooks, wherever applicable.

FIG. 18A is an illustration of an example pegboard 1800, consistent with the present disclosure. Retail store 105 may have more than one such pegboard 1800 for displaying products. As shown in FIG. 18A, pegboard 1800 has a plurality of peg-hooks 1810 for hanging items 1820. Peg-hooks 1810 may be connected to pegboard 1800 in any suitable way. For example, peg-hooks 1810 may be made as an integral part of and thus may not be detachable from pegboard 1800. As another example, peg-hooks 1810 may be made as separate modules that may be inserted into holes on pegboard 1800 and, when not needed, detached from pegboard 1800. As yet another example, peg-hooks 1810 may be retractable, such that they may be extended or pulled out from pegboard 1800 when they are used for hanging items 1820, and folded or pushed into pegboard 1800 when they are not used.

The items 1820 hanging on a peg-hook 1810 may be of a single or multiple product types. For example, as shown in FIG. 18A, a peg-hook 1810 may be used to hang items 1820A of product type A (e.g., pouches of chips), another peg-hook 1810 may be used to hang items 1820B of product type B (e.g., pouches of crackers), and yet another peg-hook 1810 may be used to hang items 1820C of product type C (e.g., bags of candies).

Figure 18B:
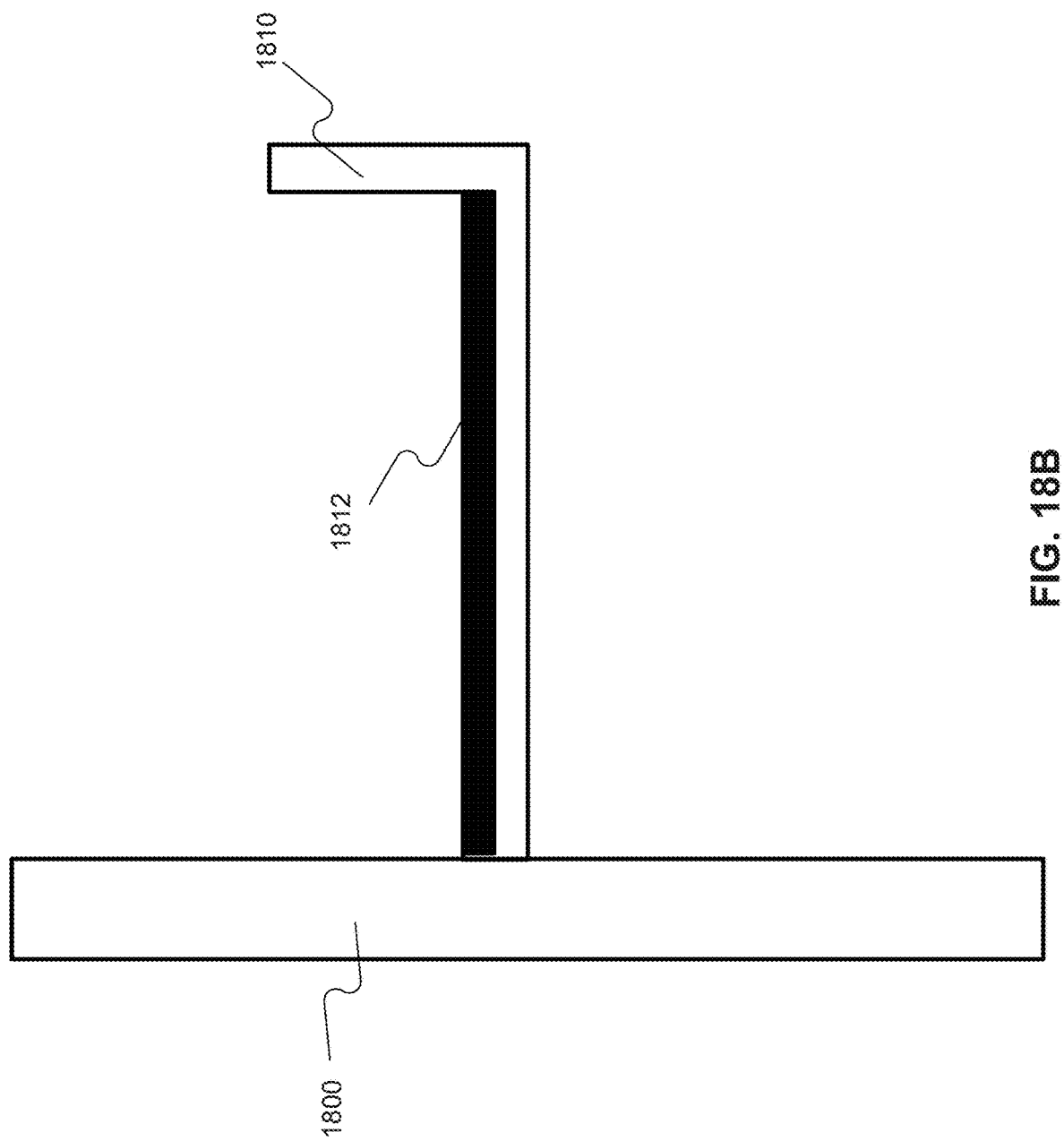
FIG. 18B is an illustration of an example sensor for sensing items hanging on a peg-hook, consistent with the present disclosure.

Pegboard 1800 and/or peg-hooks 1810 may include sensors 1812 that may sense whether there are items hanging on each peg-hook 1810, and/or sense the change of items hanging on each peg-hook 1810 (e.g., addition or removal of one or more items) and/or may capture data related to items hanging on each peg-hook 1810 (such as total weight, change in weight, pressure applied by the items, and so forth). Sensors 1812 may be connected to pegboard 1800 and/or peg-hooks 1810, and configured to sense a parameter (e.g., weight, pressure, force, etc.) reflecting the status or change in status of the items hanging on each peg-hook 1810. For example, FIG. 18B shows an exemplary sensor 1812 attached to the top surface of a peg-hook 1810 or embedded in the upper part of the peg-hook 1810, according to some disclosed embodiments. As shown in FIG. 18B, sensor 1812 may be configured to sense a weight of the items hanging on peg-hook 1810, or sense a pressure applied by the items on peg-hook 1810. Increase of the weight and/or pressure may indicate that one or more items have been added to peg-hook 1810, while decrease of the weight and/or pressure may indicate that one or more items have been removed from peg-hook 1810.

Figure 18C:
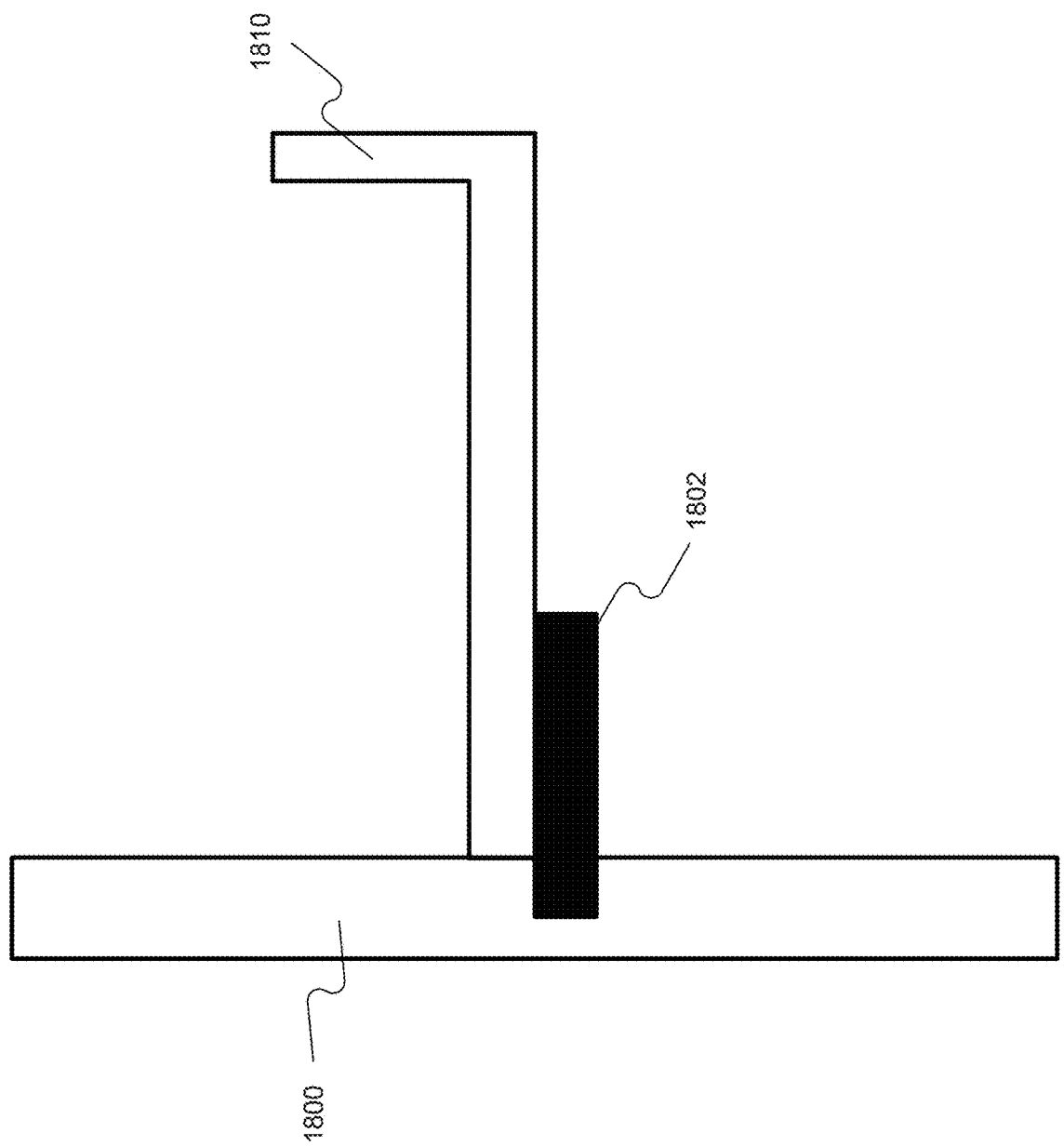
FIG. 18C is an illustration of another example sensor for sensing items hanging on a peg-hook, consistent with the present disclosure.

As another example, FIG. 18C shows an exemplary sensor 1812 attached to the bottom surface of a peg-hook 1810 or embedded in the lower part of the peg-hook 1810. As shown in FIG. 18C, sensor 1812 may be configured to sense a pressure applied by peg-hook 1810 to the sensor 1812. Increase of the pressure may indicate that one or more items have been added to peg-hook 1810, while decrease of the pressure may indicate that one or more items have been removed from peg-hook 1810.

As another example, FIG. 18D shows an exemplary sensor 1812 disposed between a peg-hook 1810 and a pegboard 1800. As shown in FIG. 18D, sensor 1812 may be a piezoelectric film that may generate a voltage signal with an amplitude proportional to a pressure applied to the film. Increase of the voltage (i.e., sensed pressure) may indicate that one or more items have been added to peg-hook 1810, while decrease of the voltage (i.e., sensed pressure) may indicate that one or more items have been removed from peg-hook 1810.

As yet another example, FIG. 18E shows an exemplary sensor 1812 (e.g., a spring) connecting a peg-hook 1810 to a pegboard 1800. As shown in FIG. 18D, sensor 1810 may be configured to sense a force applied by peg-hook 1810. Increase of the force may indicate that one or more items have been added to peg-hook 1810, while decrease of the force may indicate that one or more items have been removed from peg-hook 1810.

It is contemplated that the examples in FIGS. 18B, 18C, 18D, and 18E are for illustrative purpose only, and are not the only possible types, configurations, shapes, and locations of sensors 1812 that may be used in the disclosed embodiments.

Figure 18F:
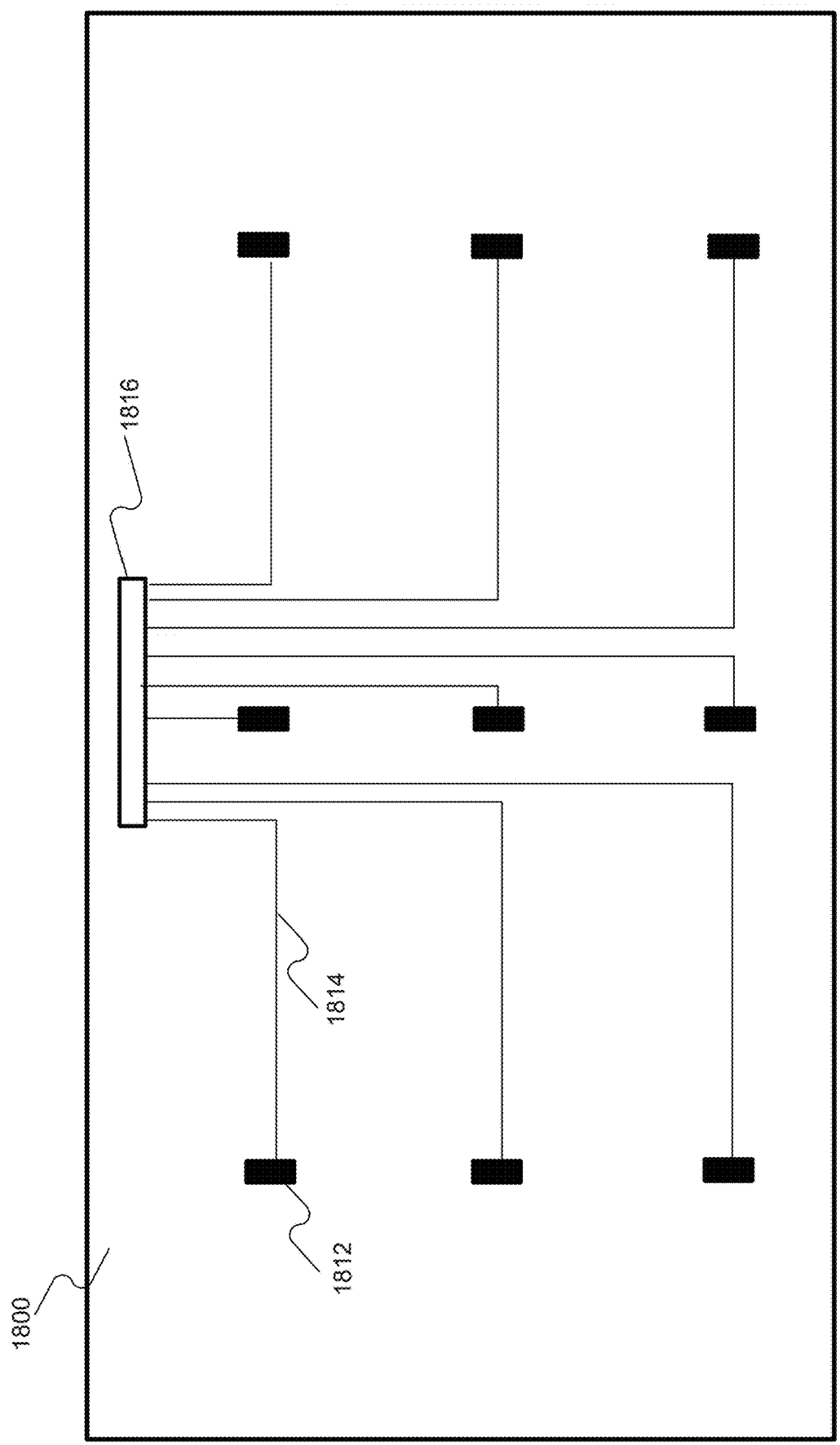
FIG. 18F is an illustration of an example for transmitting signals generated by peg-hook sensors to a computer for processing, consistent with the present disclosure.

As described above, in response to a change in items hanging on a peg-hook 1810, the corresponding sensor 1812 may generate a signal indicating the change. In the disclosed embodiments, peg-hook sensors 1812 may transmit the signals to a computer for further processing. According to some embodiments, the computer may be connected to peg-hook sensors 1812 via a wired or wireless network. For example, each peg-hook sensor 1812 may carry a wireless communication module and may transmit a signal wirelessly to the remote computer for further processing. As another example, shown in FIG. 18F, peg-hook sensors 1812 on a pegboard 1800 may be connected and transmit signals, via communication cables 1814 or through wireless communication, to a communication module 1816 located on the pegboard 1800 or in another location. Communication module 1816 may then transmit the signals to the remote computer via a wired or wireless network (not shown).

According to some embodiments, the computer for processing the sensor signals may be located on the pegboard 1800 on which peg-hooks 1810 are located or in another location. For example, communication module 1816 in FIG. 18F may have computing power and act as a processor for processing the signals generated by sensors 1812 on pegboard 1800. Communication module 1816 may also send, via a wired or wireless network, the processing result to a remote computer (e.g., a remote server, not shown in FIG. 18F) for further analysis or use.

Figure 19:
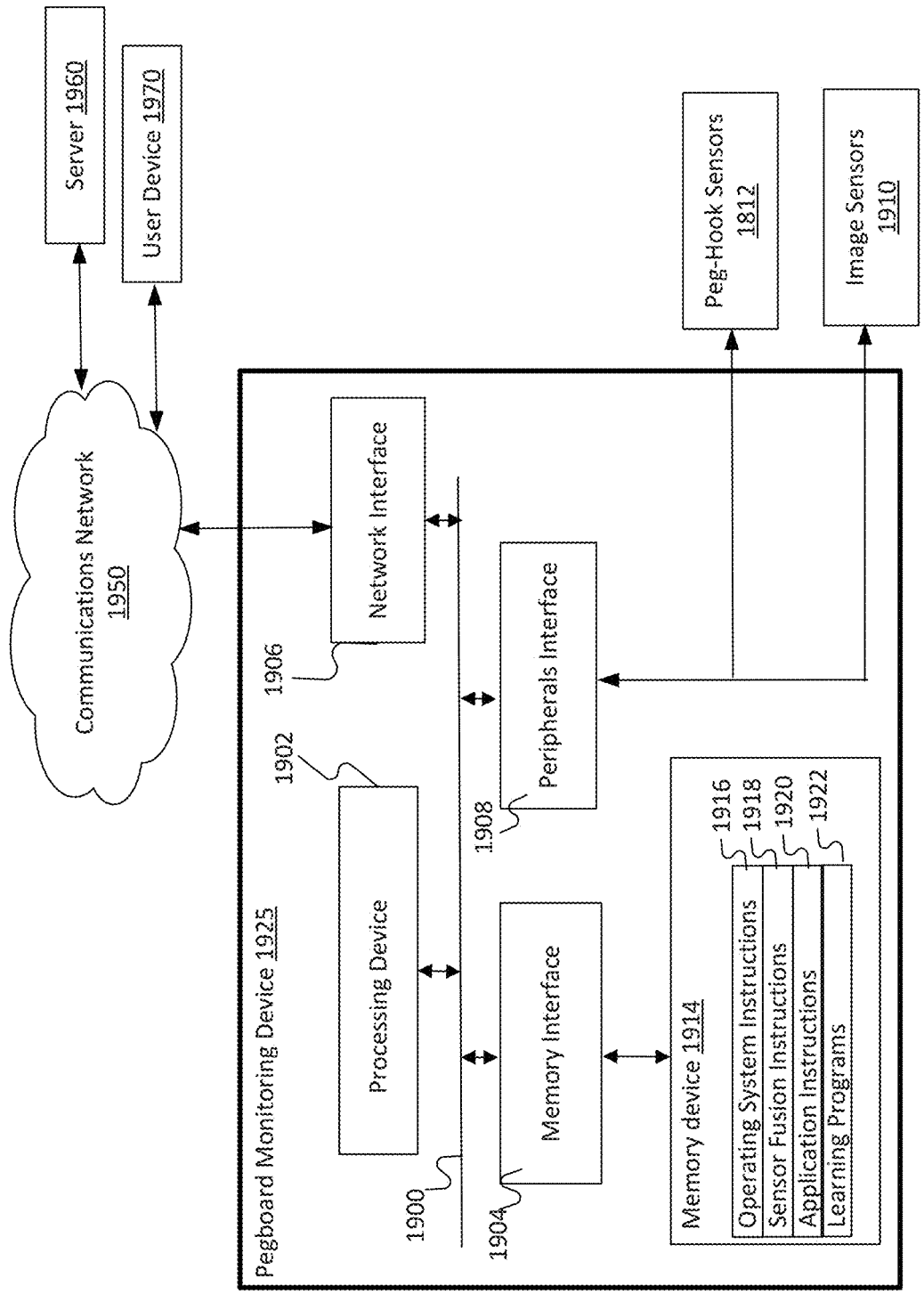
FIG. 19 is an illustration of an example system for monitoring changes of items hanging on peg-hooks connected to a pegboard, consistent with the present disclosure.

Example details regarding the computer for processing the signals generated by peg-hook sensors 1812 are described in connection with FIG. 19, which is a block diagram representation of an example system for monitoring changes of items hanging on peg-hooks connected to a pegboard, consistent with the present disclosure. As shown in FIG. 19, the system may include a pegboard monitoring device 1925, which further may include a processing device 1902, a memory interface 1904, a network interface 1906, and a peripherals interface 1908. Peripherals interface 1908 may be connected, via communication cables or a wireless network, to peg-hook sensors 1812 on a pegboard 1800 (FIG. 18A). In some embodiments, retail store 105 may use a plurality of pegboards 1800, and one or more pegboard monitoring devices 1925 may be used to process sensor signals collected from the plurality of pegboards 1800. For example, a pegboard monitoring device 1925 may mounted on each pegboard 1800 and analyze sensor signals captured from the pegboard. Alternatively, in some embodiments, one pegboard monitoring device 1925 may be used to process the sensor signals collected from two or more pegboards 1800. In another embodiment, two or more pegboard monitoring devices 1925 may be used to analyze sensor signals captured from a single pegboard.

Still referring to FIG. 19, processing device 1902, memory interface 1904, network interface 1906, and peripherals interface 1908 may be separate or may be integrated in one or more integrated circuits. These components in pegboard monitoring device 1925 may be coupled by one or more communication buses or signal lines (e.g., bus 1900). It is to be understood that pegboard monitoring device 1925 is merely exemplary implementation. For example, any operation described in relation to pegboard monitoring device 1925 or processing device 1902 may be performed by one or more other computing devices. In another example, any component stored in memory device 1914 may be stored in one or more other memory devices.

According to some embodiments, network interface 1906 may be used to facilitate communication with server(s) 1960 and/or user device(s) 1970 and/or a cloud platform and/or other external devices. By way of example, server 1960 may be operated by retail store 105 to analyze the data generated by pegboard monitoring device 1925. User device 1970 may be a terminal (e.g., smart phone, personal computer, mobile device, augmented reality system, virtual reality system, etc.) used by a shopper or store associate to receive information from pegboard monitoring device 1925. Network interface 1906 may be an Ethernet port connected to radio frequency receivers and transmitters and/or optical receivers and transmitters. The specific design and implementation of network interface 1906 may depend on the communications network(s) over which pegboard monitoring device 1925 is intended to operate. For example, in some embodiments, pegboard monitoring device 1925 may include a network interface 1906 designed to operate over a GSM network, a GPRS network, an EDGE network, a Wi-Fi or WiMax network, a Bluetooth® network, etc.

In the example illustrated in FIG. 19, in addition to being connected to peg-hook sensors 1812, peripherals interface 1908 of pegboard monitoring device 1925 may also be connected to at least one image sensor 1910 that may be configured to capture image data showing the condition of the pegboard(s) 1800 or items placed on the pegboard(s) associated with pegboard monitoring device 1925. According to some embodiments, peripherals interface 1908 may also be connected to other sensors (not shown), such as a motion sensor, a light sensor, infrared sensor, sound sensor, a proximity sensor, a temperature sensor, a biometric sensor, or other sensing devices to facilitate related functionalities.

Consistent with the present disclosure, pegboard monitoring device 1925 may include digital components that collect data from peg-hook sensors 1812, and store the data on a memory device 1914 and/or transmit the data using network interface 1906.

Consistent with the present disclosure, pegboard monitoring device 1925 may use memory interface 1904 to access memory device 1914. Memory device 1914 may include high-speed, random access memory and/or non-volatile memory such as one or more magnetic disk storage devices, one or more optical storage devices, and/or flash memory (e.g., NAND, NOR) to store data collected from peg-hook sensors 1812 and/or image sensor(s) 1910. Memory device 1914 may store operating system instructions 1916, such as DARWIN, RTXC, LINUX, iOS, UNIX, LINUX, OS X, WINDOWS, or an embedded operating system such as VXWorkS. Operating system 1916 may include instructions for handling basic system services and for performing hardware dependent tasks. In some implementations, operating system 1916 may include a kernel (e.g., UNIX kernel, LINUX kernel, etc.). In addition, memory device 1914 may include sensor fusion instructions 1918 to facilitate processes and functions related to integrating and analyzing data collected from peg-hook sensors 1812; and application instructions 1920 to perform processes/functions (e.g., monitoring compliance of product placement on pegboard 1800) in response to the analysis of the data collected from peg-hook sensors 1812.

The components and arrangements shown in FIG. 19 are examples and are not intended to limit the disclosed embodiments. As will be appreciated by a person skilled in the art having the benefit of this disclosure, numerous variations and/or modifications may be made to the depicted configuration of pegboard monitoring device 1925. For example, not all components are needed for the operation of pegboard monitoring device 1925 in all cases. Any component may be located in any appropriate part of pegboard monitoring device 1925, and the components may be rearranged into a variety of configurations while providing the functionality of the disclosed embodiments.

In some embodiments, peg-hook sensors 1812 may generate signals indicating a change of items hanging on the corresponding peg-hooks 1810. Specifically, when the items on pegboard 1800 changes (for example, when a store associate of retail store 105 rearranges or replenishes the items hanging on pegboard 1800, when a shopper 120 takes items from or put items back to pegboard 1800, etc.) peg-hook sensors 1812 may generate signals indicating these changes. By way of example, processing device 1902 may receive, from a first peg-hook sensor 1812, a first signal indicating an increase of pressure applied on a first peg-hook 1810. In response to receiving the first signal indicating the pressure/weight increase, processing device 1902 may determine that one or more items have been added to first peg-hook 1810. Processing device 1902 may further determine the quantity of the items added to first peg-hook 1810, the product type of the newly added items, and/or the total quantity of the items hanging on first peg-hook 1810 after the addition. Processing device 1902 may also perform other actions related to the detected addition, as described in more detail below. As another example, processing device 1902 may receive, from a second peg-hook sensor 1812, a second signal indicating a decrease of pressure applied on a second peg-hook 1810. In response to receiving the second signal indicating the pressure decrease, processing device 1902 may determine that one or more items have been removed from second peg-hook 1810. Processing device 1902 may further determine the quantity of the items removed from second peg-hook 1810, the product type of the removed items, and/or the total quantity of the items remaining on second peg-hook 1810 after the removal. Processing device 1902 may also perform other actions related to the detected removal, as described in more detail below. In the embodiments consistent with the present disclosure, peg-hook sensors 1812 are not limited to the pressure or weight sensors described in these examples. For example, peg-hook sensors 1812 may also be weight sensors, and processing device 1902 may make similar determinations and/or actions based on the increase or decrease of the sensed weight change. In some examples, signal indicating a short term changes (for example, shorter than a selected time period) in the pressure applied on peg-hook 1810 (or in another physical quantity measured in relation to peg-hook 1810) may be ignored. In another example, processing device 1902 may interpret signal indicating a short term changes as an indication of an interaction of a user with peg-hook 1810 or items thereon, and may interpret signal indicating a long term changes as an indication of a change to the items on peg-hook 1810. In some examples, signals from one or more peg-hooks 1810 connected to pegboard 1800 may be used to preprocess signals from a particular peg-hook 1810 connected to pegboard 1800, for example to remove noise, to cancel effects of movements external to the particular peg-hook (such as movement due to interaction with the one or more peg-hooks 1810, due to interaction with pegboard 1800, etc.) on the particular peg-hook.

According to some embodiments, processing device 1902 may use various techniques to determine the product types of the items hanging on peg-hooks 1810. In one exemplary embodiment, memory device 1914 may store product recognition models describing the characteristics of each product type (e.g., 1.75 oz. chip pouch, 1.84 oz. candy bar, 1.7 oz. face cream bottle, earphones, etc.) For example, a product recognition model corresponding to a particular product type may include parameters describing the product weight, amount of pressure sensed by a peg-hook 1810 when an item of the product type is hanging on peg-hook 1810, standard deviation of the weight, standard deviation of the pressure, location of the peg-hooks 1810 designated for hanging the items of the product type, image features associated with the product type, etc. Based on the product recognition models and the signals generated by peg-hook sensors 1812, processing device 1902 may determine the product types of the items hanging on peg-hooks 1810. For example, when a peg-hook sensor 1812 senses a change of weight or pressure, processing device 1902 may compare the change to the stored product recognition models. Based on the comparison, processing device 1902 may determine the product type associated with the items added to or removed from the peg-hook 1810 associated with the peg-hook sensor 1812.

Additionally or alternatively, signals generated by sensors other than peg-hook sensors 1812 may also be used to determine the product types associated with the items hanging on peg-hooks 1810. For example, as described above, processing device 1902 may also be connected to at least one image sensor 1910, via peripherals interface 1908 (FIG. 19). Image sensor 1910 may be mounted (for example, to store shelves, walls, ceilings, floors, refrigerators, checkout stations, displays, dispensers, rods which may be connected to other objects in the retail store, and so forth) and configured to take images of the items hanging on peg-hooks 1810. Processing device 1902 may extract features from the image data generated by image sensor 1910, and recognize the product types of the items hanging on peg-hooks 1810, by comparing the extracted features to a product image model. In some cases, processing device 1902 may also perform a sensor fusion technique to compare the product recognition results based on the peg-hook sensors 1812 and image sensor(s) 1910, and determine the product types based on the comparison. For example, processing device 1902 may use the image data to cross-check the product type results determined based on the peg-hook sensor data, and assign confidence values to the determined product types.

In one exemplary embodiment, different peg-hooks 1810 may be pre-assigned to and reserved for hanging different product types. For example, a particular pegboard 1800 may be designated by retail store 105 for hanging cosmetics products. As another example, peg-hooks 1810 in a particular area of a pegboard 1800 may be reserved for hanging a particular brand of chips. In this embodiment, memory device 1914 may store a predetermined peg-hook map indicating which peg-hooks 1810 are used for hanging what product types (i.e., corresponding relationship between peg-hooks 1810 and the product types). Based on the peg-hook map, processing device 1902 may determine the product type of the items hanging on each peg-hook.

According to some embodiments, processing device 1902 may cause various actions based on the signals generated by peg-hook sensors 1812. In one exemplary embodiment, in response to a signal indicating a change of items hanging on a peg-hook 1810, processing device 1902 may determine a quantity of the items remaining in the peg-hook 1810. For example, if a peg-hook sensor 1812 generates a signal indicating a pressure increase, processing device 1902 may compare the amount of pressure increase to a product recognition model associated with the product type hanging on peg-hook sensor 1812, and determine the number of items added to peg-hook 1810 or the total number of items remaining on peg-hook 1810 after the addition. If the product recognition model indicates a unit pressure corresponding to one item of this product type, processing device 1902 may determine the number of items newly added to peg-hook 1810 by dividing the amount of pressure increase with the unit pressure, and/or determine the total number of items on peg-hook 1810 after the addition by dividing the total pressure sensed by peg-hook sensor 1812 with the unit pressure. As another example, if a peg-hook sensor 1812 generates a signal indicating a weight decrease, processing device 1902 may compare the amount of weight decrease to a product recognition model associated with the product type hanging on peg-hook sensor 1812, and determine the number of items removed from peg-hook 1810 or the number of items remaining on peg-hook 1810 after the removal. In particular, if the product recognition model indicates a unit weight corresponding to one item of this product type, processing device 1902 may determine the number of items removed from peg-hook 1810 by dividing the amount of weight decrease with the unit weight, and/or determine the number of items remaining on peg-hook 1810 after the removal by dividing the total weight sensed by peg-hook sensor 1812 with the unit weight. In some examples, a convolution of a signal generated by peg-hook sensors 1812 may be calculated, in response to a first value of the calculated signal, a first action may be caused, and in response to a second value of the calculated signal, a second action may be caused, the second action may differ from a first action.

According to some embodiments, based on the product type associated with the items added to or removed from a peg-hook 1810, processing device 1902 may cause different actions. In one exemplary embodiment, when the signal generated by a peg-hook sensor 1812 indicates that one or more items are added to the peg-hook 1810 associated with the peg-hook sensor 1812, processing device 1902 may determine whether the product type of the newly added items is the same as the product type associated with the peg-hook 1810. For example, processing device 1902 may determine the product type associated with the peg-hook 1810 based on the peg-hook map (i.e., the corresponding relationship between peg-hooks 1810 and the product types) stored in memory device 1914, or based on a comparison of the product recognition models with the peg-hook condition (e.g., pressure or weight) sensed by peg-hook sensor 1812 before the items are added. If it is determined that the product type of the newly added items matches the product type associated with the peg-hook 1810, processing device 1902 may determine the number of the items hanging on peg-hook 1810 after the addition, and/or transmit the determined number, via communications network 1950, to server 1960 and/or user device 1970 for further processing. If, however, it is determined that the product type of the newly added items does not match the product type associated with the peg-hook 1810, processing device 1902 may transmit a notification, via communications network 1950, to server 1960 and/or user device 1970. The notification may alert a user (e.g., a store associate of retail store 105) about the mismatch of product types and/or prompt the user to reorganize the items to ensure that items of the correct product type are hanging on a peg-hook 1810.

In one exemplary embodiment, when the signal generated by a peg-hook sensor 1812 indicates that one or more items have been removed from a peg-hook 1810 associated with the peg-hook sensor 1812, processing device 1902 may determine the product type of the removed items. For example, processing device 1902 may determine the product type of the removed items based on the peg-hook map (showing the corresponding relationship between peg-hooks 1810 and the product types), or based on a comparison of the change sensed by peg-hook sensor 1812 (e.g., pressure or weight decrease) with the product recognition models. Processing device 1902 may further determine the quantity of the product type remaining on a peg-hook 1810 or pegboard 1800 after the removal. If it is determined that the remaining quantity is below a preset threshold, processing device 1902 may transmit a notification, via communications network 1950, to server 1960 and/or user device 1970. The notification may prompt a user (e.g., a store associate of retail store 105) to restock the determined product type to peg-hook 1810 or pegboard 1800. Additionally or alternatively, the notification may prompt the user to rearrange the items hanging on pegboard 1800. For example, the detected removal of items may suggest the associated product type is popular among customers. Accordingly, the notification may prompt the user to hang the determined product type at more prominent locations on pegboard 1800 (e.g., hanging the product type on peg-hooks 1810 close to the average height of the customers).

According to some embodiments, processing device 1902 may cause an action based on the conditions of multiple peg-hook sensors 1812. In one exemplary embodiment, processing device 1902 may receive, from a first peg-hook sensor 1812, a signal indicating that one or more items are removed from a first peg-hook 1810, and receive, from a second peg-hook sensor 1812, a signal indicating that one or more items are added to a second peg-hook 1810. If it is determined that the removed items and added items are the same product type, processing device 1902 may generate an alert prompting a user (e.g., an employee of retail store 105) to move some items from the second peg-hook 1810 to the first peg-hook 1810.

Figure 18G:
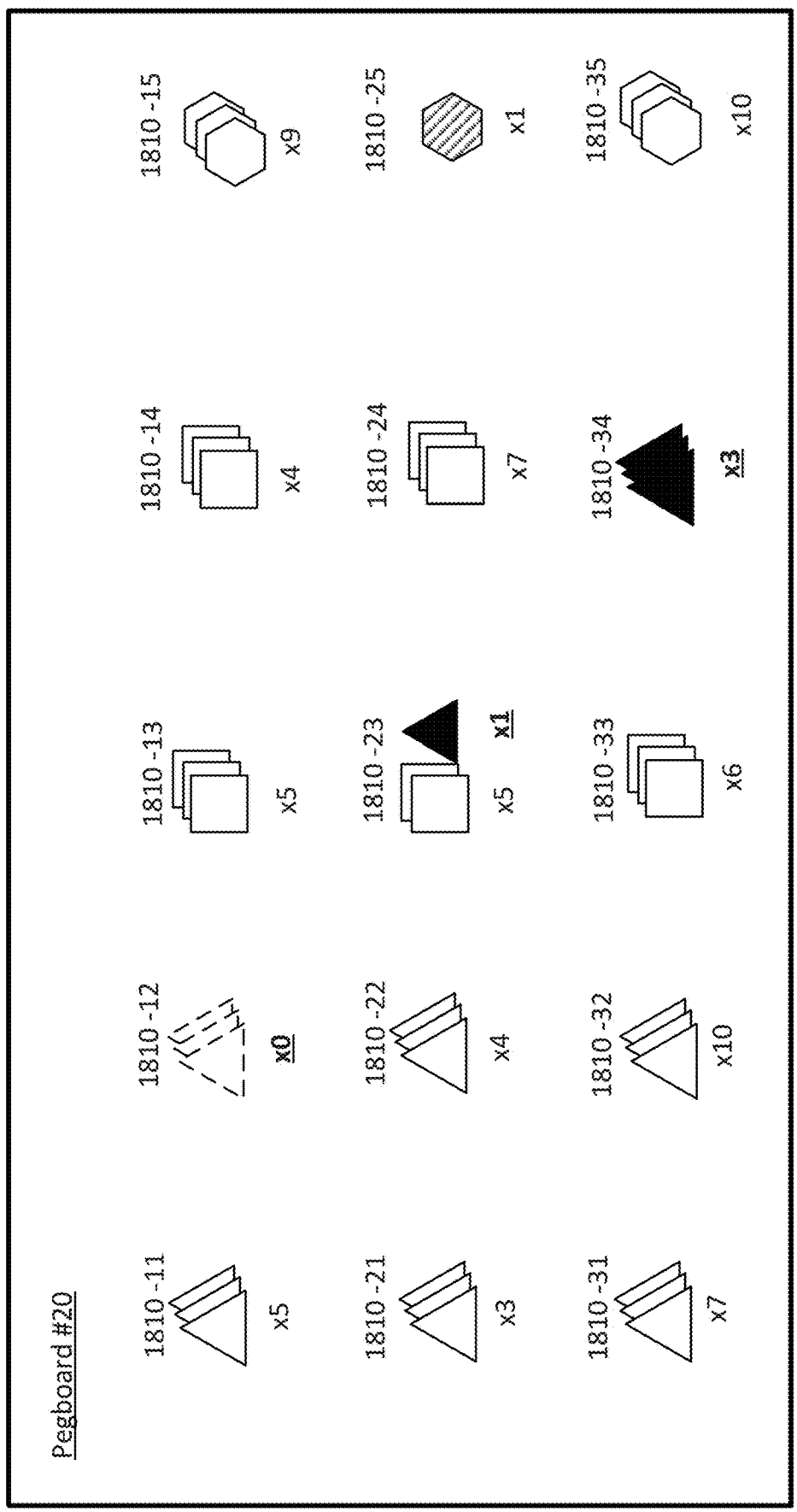
FIG. 18G is an illustration of an example distribution map of items hanging on a pegboard, consistent with the present disclosure.

According to some embodiments, based on the signals generated by peg-hook sensors 1812, processing device 1902 may generate a distribution map of the items hanging on a pegboard 1800. In one exemplary embodiment, the distribution map may include information showing the quantities and product types of the items hanging on peg-hooks 1810. FIG. 18G shows an exemplary distribution map of the items hanging on pegboard #20 in retail store 105. Processing device 1902 may generate the distribution map based on the product type and item quantity determined for each peg-hook 1810. Processing device 1902 may further cause the distribution map to be displayed on a display device, e.g., a display device connected to pegboard monitoring device 1925 via peripherals interface 1908, or server 1960 or user device 1970 connected to pegboard monitoring device 1925 via communications network 1950. As shown in FIG. 18G, the distribution map may use various symbols or shapes to represent different product types, and highlight the peg-hooks 1810 that need a user's attention. For example, the distribution map in FIG. 18G uses dash lines to show that peg-hook 1810-12 (i.e., peg-hook 1810 at row 1, column 2) is empty, which alerts a user to restock peg-hook 1810-12. The distribution map also uses hatched symbols to indicate that the quantity of the items hanging on peg-hook 1810-25 is low, and alerts the user to restock peg-hook 1810-25.

Still referring to FIG. 18G, processing device 1902 may also determine, based on the distribution map, whether the items hanging on pegboard #20 comply with a planogram. Processing device 1902 may highlight violations of the planogram on the distribution map. For example, as shown in FIG. 18G, processing device 1902 may determine that peg-hook 1810-23 violates the planogram by having two different product types hanging on it, and highlight the wrong product type (shown in solid black triangle) that needs to be removed from peg-hook 1810-23. As another example, processing device 1902 may determine that the items hanging on peg-hook 1810-34 are a wrong product type according to the planogram, and highlight the items hanging on peg-hook 1810-34 to indicate that they need to be moved to a different peg-hook 1810. As described above, processing device 1902 may cause the distribution map to be displayed on a display device (e.g., server 1960 or user device 1970), such that a user (e.g., an employee of retail store 105) may view whether peg-hook #20 complies with the planogram.

According to some embodiments, in response to the signal generated by peg-hook sensors 1812, processing device 1902 may cause other types of sensors to be activated to capture conditions of pegboard 1800. For example, referring to FIG. 19, when it is determined that the product type or quantity of the items added to or removed from a peg-hook 1810 cannot be determined based on the output of peg-hook sensors 1812, processing device 1902 may activate an image sensor 1910 associated with the peg-hook 1810 (e.g., a camera facing an area including the peg-hook 1810) and cause image sensor 1910 to capture one or more images showing a scene including the peg-hook 1810. Processing device 1902 may analyze the one or more captured images, for example the processing device may extract features from the captured images, compare the extracted features to the product recognition models, and may determine the product type or quantity based on the comparison. Processing device 1902 may further determine whether the product type or quantity complies with the planogram (e.g., whether the item added to the peg-hook 1810 have the correct product type, or whether the quantity of the items remaining on the peg-hook 1810 is too low). If a planogram violation is detected, processing device 1902 may cause a captured image to be displayed on a display device (e.g., server 1960 or user device 1970), such that a user (e.g., an employee of retail store 105) may view the items hanging on pegboard 1800 and take appropriate actions.

According to some embodiments, processing device 1902 may determine whether a shopper qualifies for frictionless checkout. For example, in response to a change detected by peg-hook sensors 1812, processing device 1902 may activate image sensors 1910 to capture one or more images showing the customers who are shopping the items hanging on pegboard 1800. If the identities of the customers, as well as the product types and quantities of the items taken by the customers from pegboard 1800 may be determined based on the data generated by peg-hook sensors 1812 and image sensors 1910, processing device 1902 may determine that the customers qualify for frictionless checkout. However, if the customer identities, product types, or item quantities cannot be determined, of if no bank account linked to the customers may be found, processing device 1902 may determine that the customers do not qualify for frictionless checkout, and may provide an alert to the customers or retail store 105. For example, processing device 1902 may transmit an alert to a user device 1970 associated with a customer, indicating that the customer is not eligible for frictionless checkout. Additionally or alternatively, processing device 1902 may transmit the alert to a server 1960 operated by retail store 105. Server 1960 may determine the number of customers not qualified for frictionless checkout at a given time, and deploy sufficient resources to handle the checkout process (e.g., activate more checkout terminals, or call for more store employee to help with the checkout line).

According to some embodiments, when a person or a robot in retail store 105 hangs new product types on pegboard 1800 that do not have associated product recognition models, processing device 1902 may execute various learning programs 1922 stored in memory device 1914 (FIG. 19) to develop the product recognition models for the new product types. Specifically, processing device 1902 may determine that the output of a peg-hook sensor 1812 (e.g., a pressure or weight change) does not match any existing product recognition models. In response, processing device 1902 may determine that the items added to the peg-hook 1810 associated with the peg-hook sensor 1812 has a new product type. Processing device 1902 may further execute learning programs 1922 to extract features from the output of the peg-hook sensor 1812, as well as the output of other types of sensor (e.g., image data showing the condition of the associated peg-hook 1810), and train a new product recognition model using the extracted features. In one exemplary embodiment, the new product recognition module may be a mathematical function that assigns a weight to each of the extracted features. During the training process, the weights may be determined based on a training data set which includes training features and training product types associated with the training features. In some embodiments, learning programs 1922 may include a convolutional neural network (CNN) with a plurality of convolutional layers for iteratively extracting the features and training the new product recognition model, According to some embodiments, processing device 1902 may use the output of peg-hook sensors 1812 to determine a shopping pattern and assist retail store 105 in optimizing the planogram for pegboard 1800. For example, the shopping pattern may indicate the locations of "popular" peg-hooks 1810 on which the hanging items are more often taken by the shoppers. The shopping pattern may also indicate the popularity of different product types according to how fast the product types are sold out. Processing device 1902 may generate, based on the shopping pattern, a decision model for arranging the product types on pegboard 1800. For example, the decision model may prompt retail store 105 to hang high-value product types on the "popular" peg-hooks 1810. As another example, the decision model may suggest to retail store 105 that more peg-hooks 1810 should be used to hang popular product types, or the product types on promotion should be moved to more prominent locations on pegboard 1800.

Consistent with the disclosed embodiments, as shown in FIG. 19, processing device 1902 may perform the above-described operations by executing the instructions and programs stored in the memory device 1914. For example, sensor fusion instructions 1918, when executed by processing device 1902, may cause processing device 1902 to compare the data generated by different peg-hook sensors 1812 and other types of sensors (e.g., image sensors 1910) and determine the condition associated with pegboard 1800 and/or peg-hooks 1810. As another example, application instructions 1920, when executed by processing device 1902, may cause processing device 1902 to cause various actions (e.g., generating the distribution map, generating a notification or alert, etc.) based on the condition associated with pegboard 1800 and/or peg-hooks 1810. As another example, learning programs 1922, when executed by processing device 1902, may cause processing device 1902 to train new product recognition models based on the output of peg-hook sensors 1812 and other types of sensors (e.g., image sensors 1910).

Figure 20:
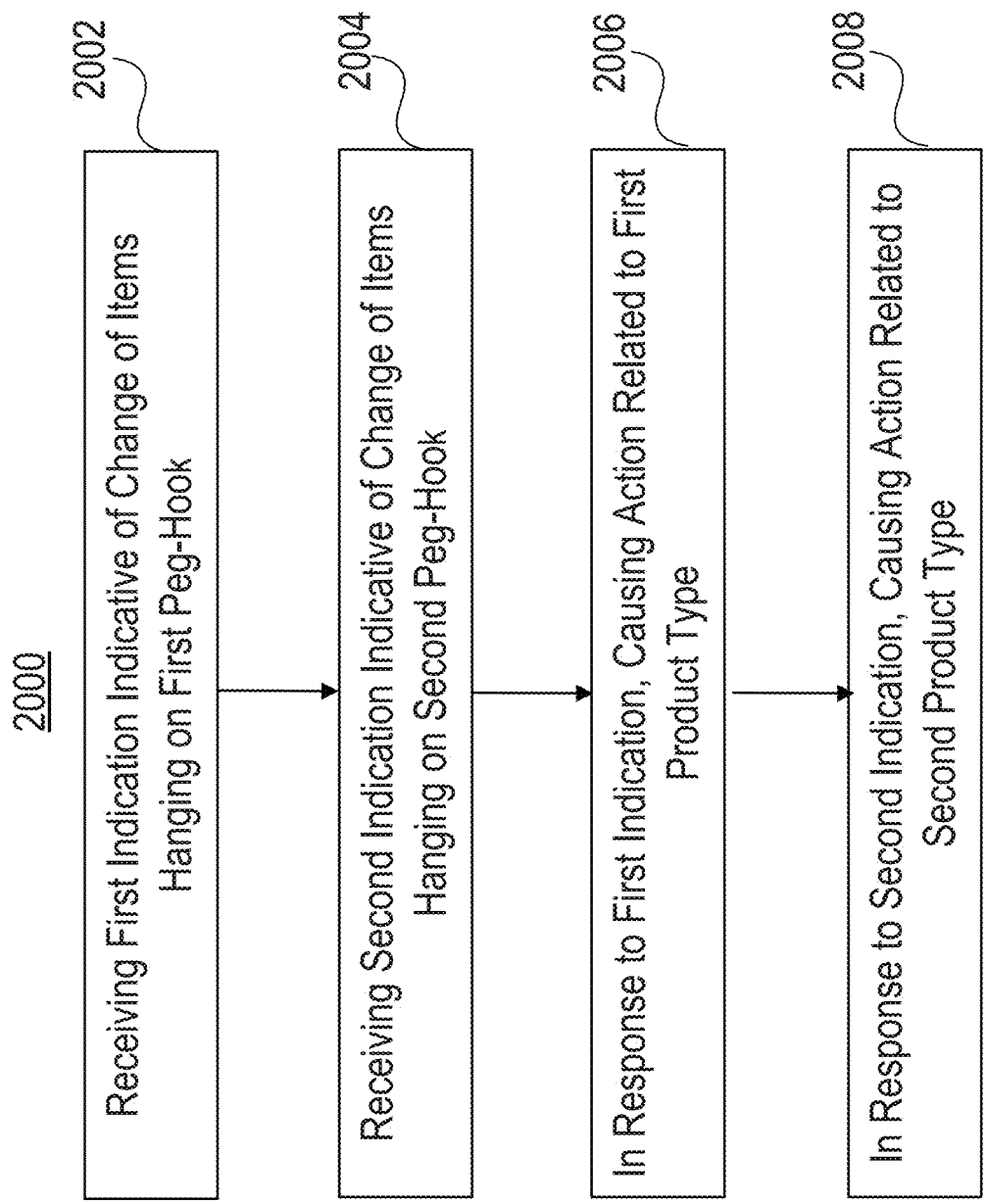
FIG. 20 provides a flowchart of an exemplary method for detecting changes of items hanging on peg-hooks connected to a pegboard, consistent with the present disclosure.

FIG. 20 provides a flowchart of an exemplary method 2000 for detecting changes of items hanging on peg-hooks connected to a pegboard, consistent with the present disclosure. In one exemplary embodiment, memory device 1914 may store one or more computer programs corresponding to method 2000. When executed by processing device 1902, the one or more computer programs may cause processing device 1902 to perform some or all of the operations in method 2000. As shown in FIG. 20, method may include the following steps 2002-2008.

At step 2002, method 2000 includes receiving, from a first peg-hook 1810 connected to a pegboard 1800, a first indication indicative of a change of items hanging on first peg-hook 1810. For example, processing device 1902 may receive the first indication from first peg-hook 1810. The first indication may include an indication of a weight change caused by the items hanging on first peg-hook 1810. As another example, the first indication may include an indication of a pressure changed caused by the items hanging on first peg-hook 1810.

At step 2004, method 2000 includes receiving, from a second peg-hook 1810 connected to pegboard 1800, a second indication indicative of a change of items hanging on second peg-hook 1810. For example, processing device 1902 may receive the second indication from second peg-hook 1810. Similarly, the second indication may include an indication of a weight or pressure change caused by the items hanging on second peg-hook 1810.

At step 2006, method 2000 includes, in response to the first indication, causing an action related to a first product type. For example, based on the first indication, processing device 1902 may determine that one or more items are added to or removed from first peg-hook 1810. Processing device 1902 may determine the product type of the added or removed items. Processing device 1902 may also determine the quantity of the added or removed items. Processing device 1902 may further cause one or more other actions based on the determined quantity and/or product type. For example, if it is determined that the quantity of the items hanging on first peg-hook 1810 is low, processing device 1902 may generate a notification indicating a need to restock first peg-hook 1810. As another example, if it is determined that the items added to first peg-hook 1810 are not the product type designated for first peg-hook 1810, processing device 1902 may provide a warning regarding the mismatch and prompt a user to move the items to other peg-hooks 1810 that are associated with the correct product type.

At step 2008, method 2000 includes, in response to the second indication, causing an action related to a second product type. For example, similar to step 2006, processing device 1902 may determine the product type and/or quantity of the items added to or removed from second peg-hook 1810. Based on the determined product type and/or quantity, processing device 1902 may further cause other actions in a manner similar to that described in step 2006.

According to method 2000, actions may also be caused based on an analysis of both the first and second indications. For example, processing device 1902 may use the first and second indications to generate a distribution map (e.g., FIG. 18G) showing the product types and quantities of the items hanging on each peg-hook 1810 connected to pegboard 1800. Based on the distribution map, processing device 1902 may determine whether the items hanging on pegboard 1800 complies with a planogram, and generate a warning if a possible planogram violation is detected. Based on the distribution map, processing device 1902 may also generate a notification for rearranging items hanging on pegboard 1800 (e.g., notification indicating a need to move items from over crowed peg-hooks 1810 to empty peg-hooks 1810).

As described above, cameras may be installed off shelf to capture pictures depicting the products displayed on a retail shelf. In addition, various types of on-shelf sensors may be used to detect the condition of the products on the shelf. These sensors may generate non-picture or non-visual sensor data which, combined with the visual data produced by the off-shelf cameras, may be used to identify the presence (or absence) of a product and/or determine the product type associated with the product. As used herein, "identifying a product" refers to the operations for determining the condition of one or more products on a retail shelf, such as detecting the presence of a product, determining the product type associated with the product, determining the quality (e.g., freshness) of the product, determining the quantity of the products with the same product type, determining the arrangement of the products on the retail shelf, etc.

Specifically, as described in connection with FIGS. 4A-4C and 6A-6C, various cameras may be used to capture visual data about a retail shelf. The cameras may be installed on an adjacent shelf, a ceiling, a wall, a hand-held device used by a store associate, a customer or a visitor of the store, a store patrolling robot, etc. Moreover, as described in connection with FIGS. 8A and 8B, the retail shelf may include a plurality of on-shelf sensors (e.g., detection elements 801A and 801B shown in FIG. 8A and detection elements 851A and 851B shown in FIG. 8B) for detecting conditions of the products on the retail shelf. It is contemplated that the above description about the cameras and on-shelf sensors also applies to the present embodiment and is incorporated herein.

Figure 21:
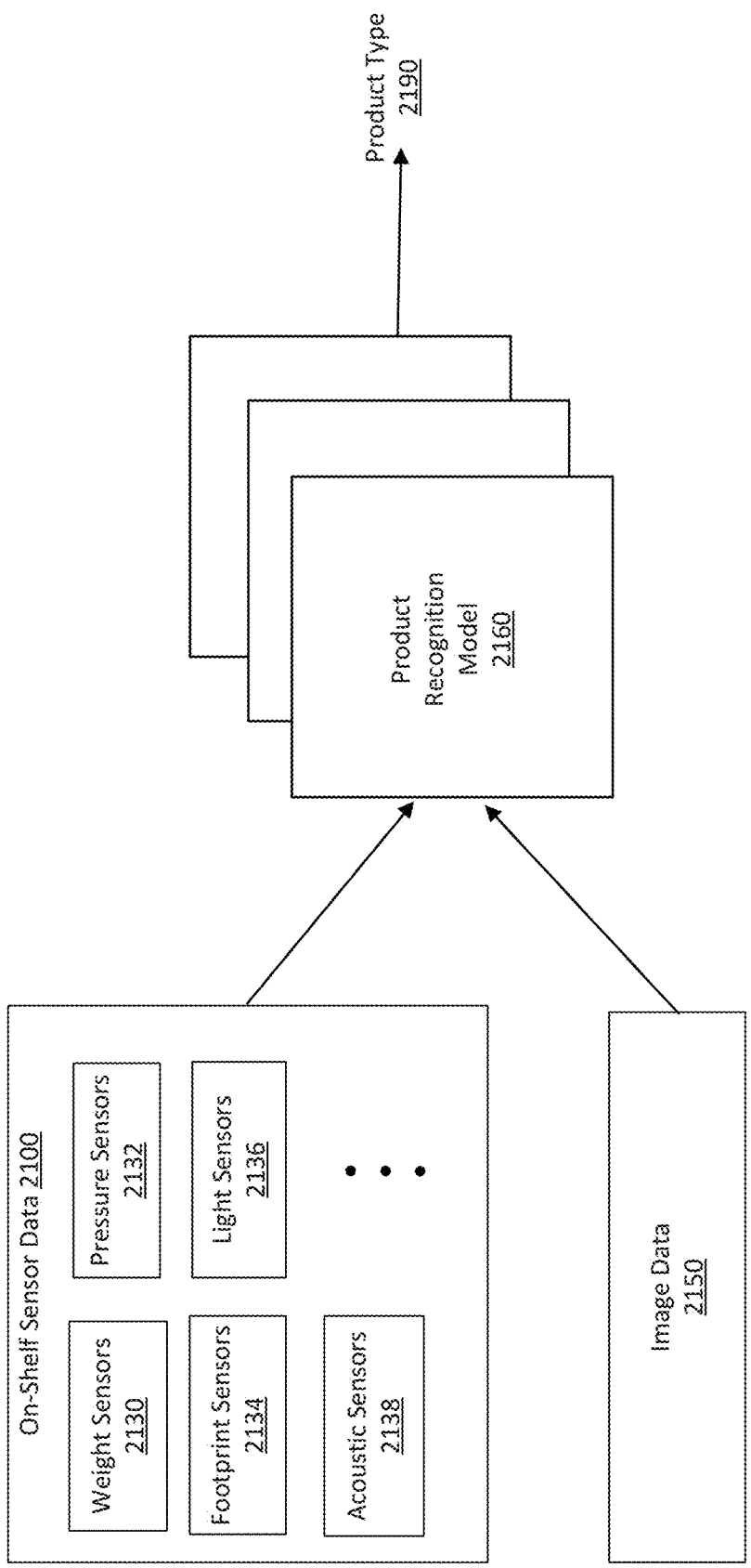
FIG. 21 is an illustration of a sensor fusion technique for determining product type, consistent with the present disclosure.

FIG. 21 is a schematic diagram illustrating a sensor fusion technique for identifying the products on a retail shelf, consistent with the present disclosure. As shown in FIG. 21, on-shelf sensor data 2100 and image data 2150 may be input to one or more product recognition models 2160. The output of product recognition models 2160 may include product type information 2190 regarding the products displayed on the retail shelf, and other information related to at least part of the products displayed on the retail shelf (such as the condition of the products, the quality (e.g., freshness) of the products, the quantity of the products, the arrangement of the products, etc.). In some examples, on-shelf sensor data 2100 may include data captured using sensors configured to be positioned between a shelf and products placed on the shelf.

In one exemplary embodiment, on-shelf sensor data 2100 may include data generated by one or more weight sensors 2130. The sensor data (e.g., one or more weight signals) generated by weight sensors 2130 may indicate weights that match profiles of particular products (e.g., certain brand of coffee mugs or a particular type of pre-packaged spinach). The weight signals may also be representative of actual weight values associated with a particular product type or, alternatively, may be associated with a relative weight value sufficient to identify the product and/or to identify the presence of a product.

In one exemplary embodiment, on-shelf sensor data 2100 may include data generated by one or more pressure sensors 2132. The sensor data (e.g., one or more pressure signals) generated by pressure sensors 2132 may indicate a pressure caused by a product on the retail shelf. The pressure signals may indicate an average pressure caused by the product. The average pressure is represented by a single numerical value. Alternatively or additionally, the pressure signals may indicate a pressure distribution showing the shelf surface areas where pressure is sensed (e.g., the contact surface between the product and the shelf). In one example, the pressure distribution may further show the magnitude of the pressure at each point or at selected points of the contact surface.

In one exemplary embodiment, on-shelf sensor data 2100 may include data generated by one or more footprint sensors 2134. The sensor data generated by footprint sensors 2134 may indicate the impression made and/or left by a product on a shelf surface. For example, footprint sensors 2134 may include one or more touch sensors that may sense the touch points or touch surfaces at which a product contact a retail shelf. As another example, footprint sensors 2134 may include one or more of the above-described pressure sensors 2132 for detecting a pressure distribution caused by the product. The pressure distribution may not only show where the product contacts the shelf surface (i.e., where non-zero pressure is detected), but also the magnitude of the pressure at each point of the contact surface. Items of different product types may differ on their centers of mass, structures, shapes, states (solid, liquid, or gas), etc., and thus may cause different pressure distributions on the shelf. As such, the pressure distributions may represent "footprints" that are characteristic of the different product types.

In one exemplary embodiment, on-shelf sensor data 2100 may include data generated by one or more light sensors 2136 capable of detecting ambient light. The sensor data (e.g., one or more light information signals) generated by light sensors 2136 may be indicative of ambient light being blocked by particular products, which correspond to shadows caused by the products. The light signals may also be representative of actual light patterns associated with a particular product type or, alternatively, may be associated with light patterns sufficient to identify the product and/or to identify the presence of a product.

In one exemplary embodiment, on-shelf sensor data may include data generated by one or more acoustic sensors 2138. The sensor data generated by acoustic sensors 2138 may include sound signals that match profiles of particular products. For example, the sound signals may indicate the vibrations of the products that are characteristic of the material composition in different product types.

It is contemplated that the disclosed on-shelf sensor data 2100 is not limited to above-described types of sensor data. For example, on-shelf sensor data 2100 may also include data generated by one or more motion sensors, proximity sensors, capacitive sensors, resistive sensors, inductive sensors, infrared sensors, ultrasonic sensors, temperature sensors, etc.

Figure 22:
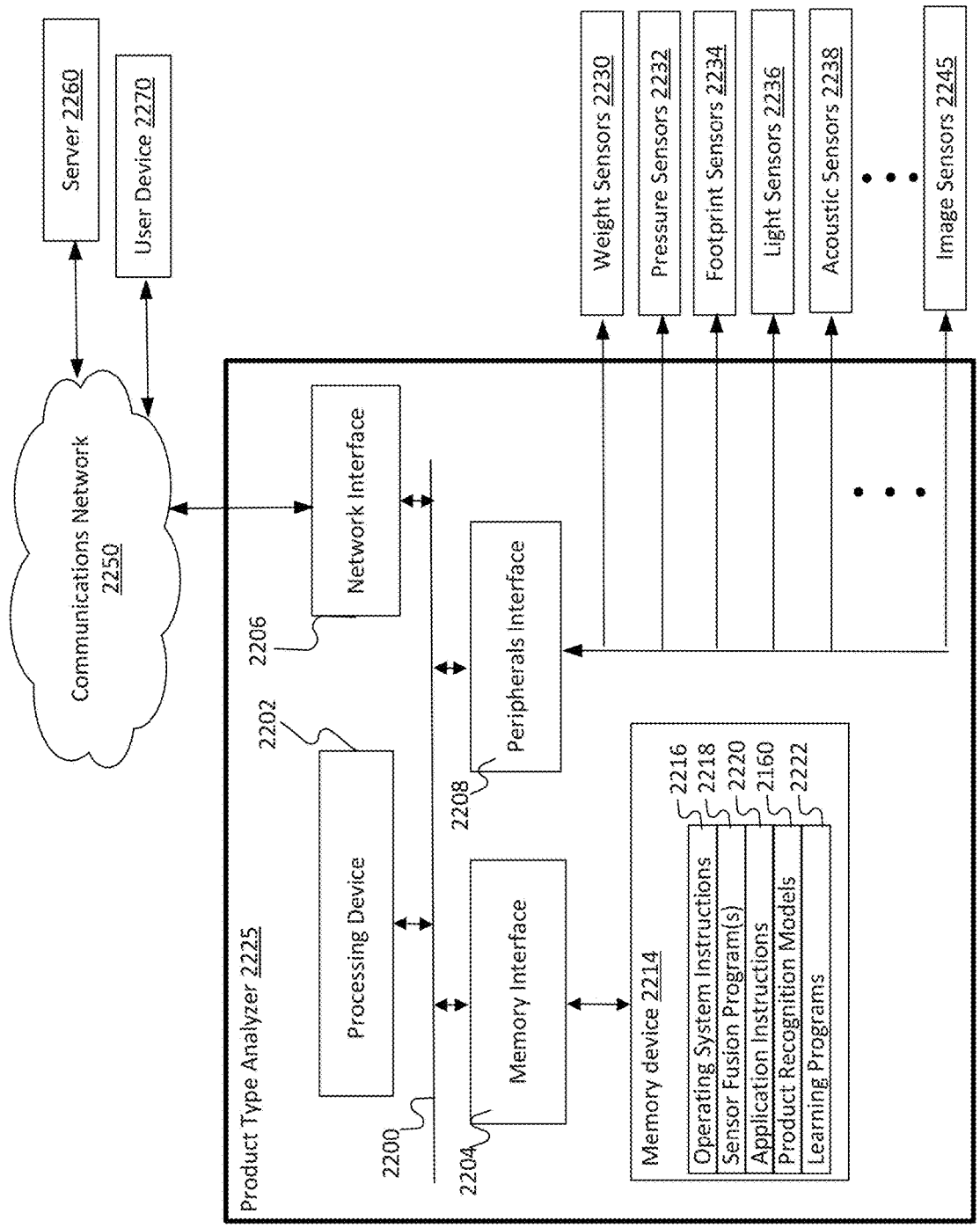
FIG. 22 is an illustration of an example system for identifying products on a retail shelf, consistent with the present disclosure.

FIG. 22 is a block diagram representation of an example system for identifying products on a retail shelf based on on-shelf sensor data and camera-generated visual data, consistent with the present disclosure. As shown in FIG. 22, the system may include a product type analyzer 2225, which further may include a processing device 2202, a memory interface 2204, a network interface 2206, and a peripherals interface 2208. Peripherals interface 2208 may be connected, via communication cables or a wireless communication, to various on-shelf sensors, such as one or more weight sensors 2230, pressure sensors 2232, footprint sensors 2234, light sensors 2236, acoustic sensors 2238, etc. The on-shelf sensors may generate non-picture or non-visual on-shelf sensor data 2100 indicating status and/or condition of the products displayed on a store shelf. Peripherals interface 2208 may also be connected, via communication cables or a wireless communication, to one or more image sensors 2245 that generate image data 2150 depicting the condition of the products displayed on the retail shelf.

Processing device 2202, memory interface 2204, network interface 2206, and peripherals interface 2208 may be separate or may be integrated in one or more integrated circuits. These components in product type analyzer 2225 may be coupled by one or more communication buses or signal lines (e.g., bus 2200).

According to some embodiments, network interface 2206 may be used to facilitate communication with server(s) 2260 and/or user device(s) 2270. By way of example, server 2260 may be operated by retail store 105 to analyze the data generated by product type analyzer 2225. User device 2270 may be a terminal (e.g., smart phone, smart watch, tablet, personal computer, mobile device, wearable device, virtual reality system, augmented reality system, etc.) used by a shopper or store employee to receive information from product type analyzer 2225. Network interface 2206 may be a port (e.g., an Ethernet port) connected to radio frequency receivers and transmitters and/or optical receivers and transmitters. The specific design and implementation of network interface 2206 may depend on the communications network(s) over which product type analyzer 2225 is intended to operate. For example, in some embodiments, product type analyzer 2225 may include a network interface 2206 designed to operate over a GSM network, a GPRS network, an EDGE network, a Wi-Fi or WiMax network, a Bluetooth® network, etc.

Consistent with the present disclosure, product type analyzer 2225 may include digital components that collect data from on-shelf sensors (e.g., weight sensors 2230, pressure sensors 2232, footprint sensors 2234, light sensors 2236, acoustic sensors 2238, etc.) and image sensors 2245, and store the data on a memory device 2214 and/or transmit the data using network interface 2206. Additionally or alternatively, product type analyzer 2225 may preprocess the data collected from the on-shelf sensors and image sensors to obtain preprocessed data, and may store the preprocessed data on a memory device 2214 and/or transmit the preprocessed data using network interface 2206. Additionally or alternatively, product type analyzer 2225 may analyze the data collected from the on-shelf sensors and image sensors to an analysis result, and may store the analysis result on a memory device 2214 and/or transmit the analysis result using network interface 2206. Additionally or alternatively, product type analyzer 2225 may analyze the data collected from the on-shelf sensors and image sensors to an analysis result, and may cause an action based on the analysis result. For example, in response to a first analysis result, product type analyzer 2225 may cause a particular action, and in response to a second analysis result, product type analyzer 2225 may forgo or withhold causing the particular action. In another example, in response to a first analysis result, product type analyzer 2225 may cause a first action, and in response to a second analysis result, product type analyzer 2225 may cause a second action, the second action may differ from the first action. Some non-limiting examples of such actions may include capturing of additional data (such as additional image data, additional data from the on-shelf sensors, additional data from other sensors, etc.), providing notifications, transmitting information, storing information, turning a device on or off, and so forth.

Consistent with the present disclosure, product type analyzer 2225 may use memory interface 2204 to access memory device 2214. Memory device 2214 may include high-speed, random access memory and/or non-volatile memory such as one or more magnetic disk storage devices, one or more optical storage devices, and/or flash memory (e.g., NAND, NOR) to store data collected from on-shelf sensors (e.g., weight sensors 2230, pressure sensors 2232, footprint sensors 2234, light sensors 2236, acoustic sensors 2238, etc.) and image sensors 2245. Memory device 2214 may store operating system instructions 2216, such as DARWIN, RTXC, LINUX, iOS, UNIX, LINUX, OS X, WINDOWS, or an embedded operating system such as VXWorkS. Operating system 2216 may include instructions for handling basic system services and for performing hardware dependent tasks. In some implementations, operating system 2216 may include a kernel (e.g., UNIX kernel, LINUX kernel, etc.). In addition, memory device 2214 may include sensor fusion programs 2218 to facilitate processes and functions related to integrating and analyzing data collected from on-shelf sensors (e.g., weight sensors 2230, pressure sensors 2232, footprint sensors 2234, light sensors 2236, acoustic sensors 2238, etc.) and image sensors 2245. Memory device 2214 may also include application instructions 2220 to perform processes/functions (e.g., monitoring compliance of product placement on a retail shelf or monitoring the inventory level of certain product types) in response to the analysis of the data collected from the on-shelf sensors and image sensors. Memory device 2214 may also include learning programs 2222, described below.

The components and arrangements shown in FIG. 22 are examples and are not intended to limit the disclosed embodiments. As will be appreciated by a person skilled in the art having the benefit of this disclosure, numerous variations and/or modifications may be made to the depicted configuration of product type analyzer 2225. For example, not all components are needed for the operation of product type analyzer 2225 in all cases. Any component may be located in any appropriate part of product type analyzer 2225, and the components may be rearranged into a variety of configurations while providing the functionality of the disclosed embodiments.

Still referring to FIG. 22, processing device 2202 may use the data generated by the on-shelf sensors and image sensors to identify the products displayed on a retail shelf. In particular, processing device 2202 may receive, via bus 2200 and peripherals interface 2208, data captured by the on-shelf sensors, such as weight sensors 2230, pressure sensors 2232, footprint sensors 2234, light sensors 2236, acoustic sensors 2238, etc. The on-shelf sensors may be positioned between at least part of a retail shelf and one or more products placed on the at least part of the retail shelf. Processing device 2202 may also receive, via bus 2200 and peripherals interface 2208, one or more images captured by image sensors 2245. The images may include a representation of at least part of the retail shelf and at least one of the one or more products. Processing device 2202 may then analyze the data (i.e., on-shelf sensor data 2100 shown in FIG. 21) captured by the on-shelf sensors and the images (i.e., image data 2150 shown in FIG. 21) captured by image sensors 2245 to determine the presence (or absence) of one or more products on the retail shelf, the product type associated with the one or more products, and other information related to the one or more products.

Consistent with the disclosed embodiments, on-shelf sensor data 2100 and image data 2150 do not have to cover the same part of the retail shelf. For example, the image sensors' line of sight may be blocked by certain obstructions (e.g., a product may be occluded by its surrounding products, or the products placed on a lower shelf may be blocked by upper shelves). In contrast, the on-shelf sensors may capture data regarding the products that are not capable of being captured by the image sensors. As described below in more detail, by combining the on-shelf sensory data with the images, processing device 2202 may infer the condition (e.g., product type, quantity, quality, etc.) of the products not shown in the images, by using one or more product recognition models 2160.

According to some embodiments, processing device 2202 may use various ways to determine the product types of the products displayed on a retail shelf. In one exemplary embodiment, memory device 2214 may store product recognition models 2160 describing the characteristics of each product type (e.g., 1.75 oz. chip pouch, 1.84 oz. candy bar, 1.7 oz. face cream bottle, earphones, etc.). For example, a product recognition model 2160 corresponding to a particular product type may include parameters describing the product weight, amount of pressure caused by an item of the product type on a retail shelf, footprint of an item of the product type, ambient light pattern associated with an item of the product type, acoustic pattern associated with an item of the product type, image features associated with the product type, etc. Based on product recognition models 2160 and the signals generated by the on-shelf sensor and/or image sensors, processing device 2202 may determine the product types of the products displayed on a retail shelf.

For example, in one embodiment, product recognition models 2160 may include the unit weights associated with a plurality of product types respectively. The unit weight is the weight of a single item (e.g., a box of tissues, a pouch of snacks, a bottle of wine, etc.). The data generated by weight sensors 2130 may indicate the weights of one or more products placed on a retail shelf. Processing device 2202 may compare the sensed weights to the unit weights in product recognition models 2160, to determine one or more matched product types.

In one exemplary embodiment, product recognition models 2160 may include the average pressures associated with a plurality of product types respectively, or pressure distributions that are characteristic of the plurality of product types respectively. The data generated by pressure sensors 2132 may indicate the average pressures or pressure distributions caused by one or more products placed on a retail shelf. Processing device 2202 may compare the sensed average pressures or pressure distributions to the pressure information in product recognition models 2160, to determine one or more matched product types.

In one exemplary embodiment, product recognition models 2160 may include the typical footprints associated with a plurality of product types respectively. The data generated by footprint sensors 2134 may indicate the footprints of one or more products placed on a retail shelf. Processing device 2202 may compare the sensed footprints to the footprint information in product recognition models 2160, to determine one or more matched product types.

In one exemplary embodiment, product recognition models 2160 may include the characteristic ambient light patterns (or shadows) associated with a plurality of product types respectively. The data generated by light sensors 2136 may indicate the ambient light patterns or shadow patterns of one or more products placed on a retail shelf. Processing device 2202 may compare the sensed ambient light or shadows to the ambient light or shadow information in product recognition models 2160, to determine one or more matched product types.

In one exemplary embodiment, product recognition models 2160 may include the typical acoustic wave information associated with a plurality of product types respectively. The data generated by acoustic sensors 2138 may indicate the changes caused to an acoustic wave by one or more products placed on a retail shelf. Processing device 2202 may compare the sensed changes to the acoustic wave to the acoustic information in product recognition models 2160, to determine one or more matched product types.

In one exemplary embodiment, product recognition models 2160 may include characteristic visual features (e.g., shape, color, brightness, etc.) associated with a plurality of product types respectively. The images generated by image sensors 2245 may include depth information, color information, brightness information, etc., that can be extracted to determine the shape, color, brightness, etc., of the objects in the images. Processing device 2202 may compare the extracted image features to the corresponding image features in product recognition models 2160, to determine one or more matched product types.

The above-described on-shelf sensor data 2100 and image data 2150 are for illustrative purpose only, and are not the only sensor data or image data that can be used in the disclosed embodiments. A single parameter or feature (e.g., weight, pressure, footprint, ambient light, sound, image, etc.) extracted from on-shelf sensor data 2100 and image data 2150 may only be able to provide a crude description of the product type, but not enough to distinguish between different product types. For example, a box of cereal and a box of cake powder may have the same weight; thus, weight alone may not be sufficient to distinguish them. Similarly, a can of tomato sauce and a bottle of olive oil may both have a cylindrical shape or leave a round-shaped footprint on the retail shelf, and thus the shape or footprint alone may not be enough to distinguish them. However, by integrating the multiple parameters and features extracted from on-shelf sensor data 2100 and image data 2150, processing device 2202 may determine the product type accurately. For example, using a combination of two or more of weight, pressure, footprint, ambient light, shape, sound, color, and brightness, processing device 2202 may accurately distinguish the product type associated with a product.

Processing device 2202 may execute one or more sensor fusion programs 2218 to compare and analyze on-shelf sensor data 2100 and image data 2150. Specifically, in one exemplary embodiment, processing device 2202 may analyze on-shelf sensor data 2100 to determine a plurality of alternative candidate product types (e.g., multiple candidate product types having the same unit weight) that could be present on a retail shelf. Processing device 2202 may then analyze image data 2150 depicting the retail shelf to select a correct product type from the plurality of candidate product types. For example, processing device 2202 may determine, based on image data 2150, the shape and color of the products on the retail shelf, and select, based on product recognition models 2160, a candidate product type that matches the determined shape and color.

In one exemplary embodiment, processing device 2202 may analyze image data 2150 of a retail shelf to determine a plurality of alternative candidate product types that could be present on the retail shelf. Processing device 2202 may further analyze on-shelf sensor 2100 to select a correct product type from the plurality of candidate product types. For example, based on image data 2150, processing device 2202 may determine that the items displayed on the retail shelf are coffee mugs, but may not be able to further distinguish the logos or surface textures on different brands of coffee mugs. However, by analyzing the footprints of the coffee mugs, processing device 2202 may determine that they are a particular coffee mugs that have a square (rather than round or oval) bottom. In another example, based on image data 2150, processing device 2202 may determine that the items displayed on the retail shelf are of a specific kind, but be unable to determine (or unable to determine in sufficient confidence) a size and/or a weight and/or a volume of the items (for example, determine that the items are bottles of a particular type of beverage but unable to determine a size, a weight or a volume of a bottle). However, by analyzing the weight of and/or footprints of and/or pressure caused by the items, processing device 2202 may determine that the size and/or weight and/or volume of the items.

In one exemplary embodiment, processing device 2202 may analyze image data 2150 of a retail shelf and determine that the products on the shelf belong to a first product type. Moreover, processing device 2202 may analyze on-shelf sensor data 2100 associated with the retail shelf to determine that the items on the shelf belong to a second product type. Processing device 2202 may then compare the first and second product types. If the first product type (determined based on image data 2150) is the same as the second product type (determined based on on-shelf sensor data 2100), processing device 2202 may assign a high confidence value to the determined product type. If the first product type differs from the second product type, processing device 2200 may analyze additional information (i.e., information other than on-shelf sensor data 2100 and image data 2150) to determine the product type associated with the products. The additional information may include, but is not limited to, historic information regarding the retail shelf (e.g., the product types previously displayed on the retail shelf), place of the retail shelf in a retail store (e.g., whether the retail shelf is located in an aisle for condiments or in a section of the store for home cleaning products), planogram information, product types of nearby products, shelf labels, height of the retail shelf, 3D images, depth images, stereo images, scans of a visual code (such as bar codes), images of higher quality or that are captured using a different capturing settings, and so forth. In one example, processing device 2202 may query a person (such as a store associate, a customer, a visitor, etc.) or a robot for the additional information. Based on the analysis of the additional information, processing device 2202 may determine which of the first and second product types is the correct one. Alternatively, processing device 2202 may determine, based on the analysis of the additional information, that the products on the shelf belong to a third product type that differs from both the first and second product types. For example, the first product type (determined based on image data 2150) may be a salad bowl, while the second product type (determined based on on-shelf sensor data 2100) may be a cooking pot. However, if the additional information indicates that the retail shelf is located in a children's toy section and a height of the retail shelf makes it reachable by children, processing device 2202 may determine that the correct product type is a children's beach sand bucket.

In one exemplary embodiment, product recognition models 2160 may be implemented using a convolutional network (CNN). In performing the disclosed sensor fusion technique, processing device 2202 may execute the CNN to extract features from on-shelf sensor data 2100 and image data 2150. Each product recognition model 2160 may be a mathematical function that assigns a weight to each of the extracted features. During the inference of product recognition models 2160, processing device 2202 may iteratively refine the weights associated with the extracted features. The output of product recognition models 2160 may include, for example, a plurality of possible product types and their probability sores. Processing device 2202 may determine a product type based on the output, e.g., selecting the product type with the highest probability score.

In one exemplary embodiment, processing device 2202 may extract the features of an image by calculating at least one convolution of at least part of the image. For example, processing device 2202 may apply a first kernel to image data 2150 to extract features associated with the images. Moreover, processing device 2202 may convert on-shelf sensor data 2100 to an array of values, and extract features of on-shelf sensor data 2100 by calculating at least one convolution of at least part of the array of values. For example, processing device 2202 may convert on-shelf sensor data 2100 into a plurality of variables describing the detected weight, pressure, footprint, ambient light, sound, etc., and then organize the variables in one or more data arrays. Processing device 2202 may apply a second kernel to the one or more data arrays to extract features associated with on-shelf sensor data 2100. In some examples, processing device 2202 may determine the product type based on the calculated at least one convolution of the at least part of the image and the on-shelf sensor data 2100, may determine the product type based on the calculated at least one convolution of at least part of the array of values and the image, may determine the product type based on the calculated at least one convolution of the at least part of the image and the calculated at least one convolution of at least part of the array of values and the image, and so forth.

In one exemplary embodiment, processing device 2202 may further execute learning programs 2222 to train product recognition models 2160. During the training process, the parameters of product recognition models 2160 may be determined based on a training data set which includes a training image of at least one training product on a training shelf, on-shelf sensor data associated with the at least one training product and/or the training shelf, and a product type associated with the at least one training product. In some embodiments, learning programs 2222 may include a CNN with a plurality of convolutional layers for iteratively extracting the features and training product recognition models 2160. In some embodiments, learning programs 2222 may include other machine learning algorithms, as described above.

According to some disclosed embodiments, in addition to determining the product types, processing device 2202 may also use on-shelf sensor data 2100 and/or image data 2150 to determine other conditions associated with the products displayed on a retail shelf, such as the quantity, quality, or facing directions of the displayed products. In one exemplary embodiment, processing device 2202 may determine the quantity of the products displayed on a retail shelf by determining the number of products shown in an image of the shelf. If, however, the image does not cover the entirety of the shelf, processing device 2202 may rely on-shelf sensor data 2100 (e.g., pressure data, weight data, footprint data, etc.) to determining the number of products in the part of the shelf not shown in the image. This way, by combining image data 2150 and on-shelf sensor data 2100, processing device 2202 may accurately determine the total number of products displayed on the retail shelf.

In one exemplary embodiment, processing device 2202 may determine the quality of the products on a retail shelf by using on-shelf sensor data 2100 and/or image data 2150. For example, if an image of a retail shelf shows the spinach thereon has become yellowish and the acoustic sensor data also indicates the water content in the spinach has decreased to certain level, processing device 2202 may determine that the spinach is no longer fresh. As another example, if image data 2150 shows a milk container has changed its shape or the light sensor data shows that the ambient light pattern associated with the milk has changed, processing device 2202 may determine that the milk has gone bad.

In one exemplary embodiment, processing device 2202 may determine the facing directions of the products on a retail shelf by using on-shelf sensor data 2100 and/or image data 2150. For example, the image data may indicate that a product on a shelf has a different orientation from the rest of the products on the shelf, and the footprint sensor data may also indicate that the product has its front side facing to an inward direction of the shelf. In this case, processing device 2202 may determine that the product is displayed with a wrong facing direction.

According to some embodiments, processing device 2202 may execute application instructions 2220 to cause various actions based on on-shelf sensor data 2100 and/or image data 2150. Specifically, the execution of application instructions 2222 may cause processing device 2202 to determine an action associated with the retail shelf. Some non-limiting examples of such actions may include restocking of the retail shelf, removing products from the retail shelf, rearranging products on the retail shelf, replacing products on the retail shelf, ordering products associated with the retail shelf, etc. The execution of application instructions 2220 may also cause processing device 2202 to generate and provide information configured to cause the performance of the actions. For example, processing device 2202 may transmit a report regarding the product condition on a shelf to server 2260 and/or user device 2270 via communications network 2250. Server 2260 may run various programs to monitor and manage the store inventory. After receiving the report from processing device 2202, server 2260 may automatically place an order for product types that have a low inventory level. As another example, user device 2270 may be a hand-held device (e.g., smart phone, tablet computer, laptop computer, etc.) used by a store employee. Based on the report from processing device 2202, user device 2270 may display a message prompting the store employee to perform various actions, such as restocking the retail shelf, removing products from the retail shelf, rearranging products on the retail shelf, replacing products on the retail shelf, etc.

According to some embodiments, to improve the system efficiency and reduce operation cost, image data 2150 regarding a retail shelf may be captured and processed when it is needed. Specifically, processing device 2202 may analyze on-shelf sensor data 2100 to determine whether there is a need to capture image data 2150 regarding the retail shelf In response to the determination that it is needed to capture image data 2150, processing device 2202 may trigger the capture of image data 2150. For example, when it is determined that on-shelf sensor data 2100 alone is not enough to determine the product type or detect a product condition on the retail shelf, processing device 2202 may cause an image sensor mounted to another retail shelf to capture the image, cause a dome camera to move and capture the image, cause a mobile robot to navigate to a location corresponding to the retail shelf and capture the image, cause a store associate to use a hand-held camera to capture the image, and so forth.

Consistent with the disclosed embodiments, as shown in FIG. 22, processing device 2202 may perform the above-described operations by executing the instructions and programs stored in the memory device 2214. For example, sensor fusion programs 2218, when executed by processing device 2202, may cause processing device 2202 to compare on-shelf sensor data 2100 with image data 2150, and determine the condition of the products displayed on a retail shelf. As another example, application instructions 2220, when executed by processing device 2202, may cause processing device 2202 to cause various actions (e.g., generating a notification regarding the need for restocking a retail shelf, generating a report regarding the condition of the products displayed on the retail shelf, etc.) based on on-shelf sensor data 2100 and/or image data 2150. As another example, learning programs 2222, when executed by processing device 2202, may cause processing device 2202 to train product recognition models 2160 based on training on-shelf sensor data and training image data.

Figure 23:
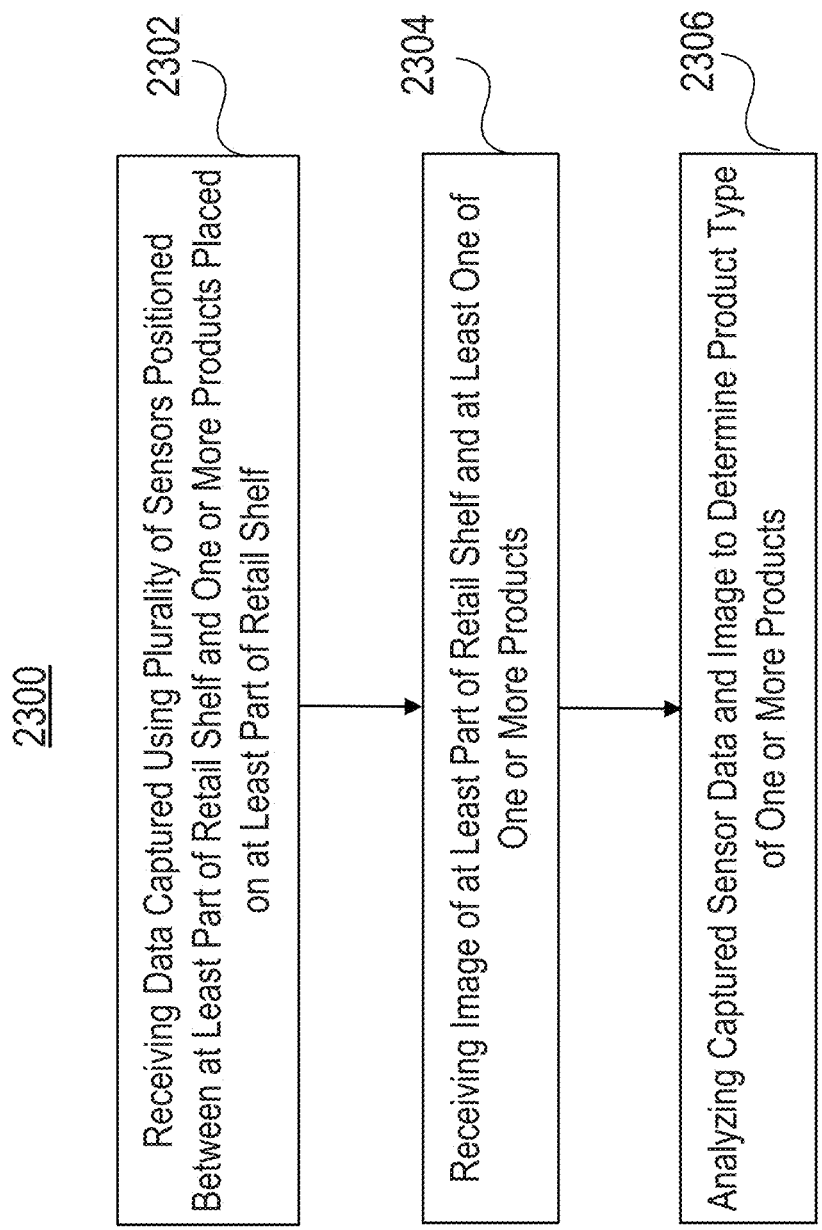
FIG. 23 provides a flowchart of an exemplary method for identifying products on a retail shelf, consistent with the present disclosure.

FIG. 23 provides a flowchart of an exemplary method 2300 for identifying products on a store shelf, consistent with the present disclosure. In one exemplary embodiment, memory device 2214 may store one or more computer programs corresponding to method 2300. When executed by at least one processor (e.g., processing device 2202), the one or more computer programs may cause the at least one processor to perform some or all of the operations in method 2300. As shown in FIG. 23, method may include the following steps 2302-2306.

At step 2302, method 2300 includes receiving on-shelf sensor data 2100 captured using a plurality of sensors positioned between at least part of a retail shelf and one or more products placed on the at least part of the retail shelf. For example, on-shelf sensor data 2100 may include, but are not limited to, data captured by one or more weight sensors 2130, pressure sensors 2132, footprint sensors 2134, light sensors 2136, acoustic sensors 2138, etc. for example, processing device 2202 may be communicatively connected to these sensors and receive on-shelf sensor data 2100 from these sensors via peripherals interface 2208.

At step 2304, method 2300 includes receiving image data 2150 of the at least part of the retail shelf and at least one of the one or more products. For example, image data 2150 may be generated by one or more image sensors 2145, which may include an image sensor mounted to another retail shelf, a dome camera above the retail shelf, an image sensor of a mobile robot, a hand-held camera, and so forth. Processing device 2202 may be communicatively connected to image sensors 2145 and receive image data 2150 from image sensors 2145 via peripherals interface 2208.

At step 2306, method 2300 includes analyzing the captured on-shelf sensor data 2100 and image data 2150 to determine a product type of the one or more products. For example, processing device 2202 may run a sensor fusion program 2218 to extract features from on-shelf sensor data 2100 and image data 2150, and analyze the extracted features using one or more product recognition models 2160. Based on the output of the one or more product recognition models 2160, processing device 2202 may determine a product type of the one or more products. In some examples, a machine learning model may be trained using training examples to determine information related to products placed on shelf from image data and captured on-shelf sensor data, and step 2306 may use the trained machine learning model to analyze the captured on-shelf sensor data 2100 (e.g., the data received by step 2302) and image data 2150 (e.g., the image received by step 2304) to determine a product type of the one or more products and/or other information related to the one or more products. An example of such training example may include a sample image and a sample on-shelf sensor data corresponding to a sample shelf, together with a label indicative of information related to products placed on at least part of the sample shelf (such as product type, condition, quantity, quality, arrangement, facings, and so forth).

According to method 2300, in addition or alternatively to the product type information, other aspects of the product condition on the retail shelf may also be determined based on on-shelf sensor data 2100 and/or image data 2150. For example, processing device 2202 may determine the quantity, quality, and/or facing directions of the products displayed on the retail shelf. Moreover, besides on-shelf sensor data 2100 and image data 2150, additional information may also be analyzed to cross-check or supplement the analysis result of on-shelf sensor data 2100 and image data 2150. For example, the additional information may include historic information regarding the products displayed on the retail shelf, place of the retail shelf in a retail store, planogram information, product types of nearby products, shelf labels, height of the retail shelf, and so forth. Further, actions may also be caused based on the determined product type and other aspects of the product condition. For example, processing device 2202 may cause the restocking of the retail shelf, removing products from the retail shelf, rearranging products on the retail shelf, replacing products on the retail shelf, ordering products associated with the retail shelf, and so forth.

The data generated by method 2300 and/or product type analyzer 2225 may be used to facilitate further analysis. For example, time series of the generated data (e.g., product type data, quantity data, quality data, condition data, arrangement data, facings data, planogram compliance data, etc.) may be aggregated or constructed, and the time series may be analyzed to provide additional information or to select actions. In one example, the generated data and/or the time series data may be used to validate information arriving from other sources. For example, a system facilitating frictionless shopping may provide an indication of one or more products picked by a shopper, and the generated data and/or the time series data may be used to validate the indicated one or more products.

In some situations, a person may use an application, such as on a smartphone, to navigate a walkable environment, such as a retail store. In these situations, when a user is far away from a destination in the store, it can be advantageous to provide the user with a map-like view interface to help the person with self-orientation and navigation within the store. As the person approaches the destination in the store, a map-like view interface may become less helpful, and it may be more advantageous to provide the user with an augmented reality view interface to help the person with self-orientation and navigation in a smaller space, such as an aisle, to identify, for example, a particular shelf. The embodiments described below, operable with other embodiments disclosed herein, discuss these interfaces and how they may be implemented to provide meaningful navigational assistance to a person.

Figure 24:
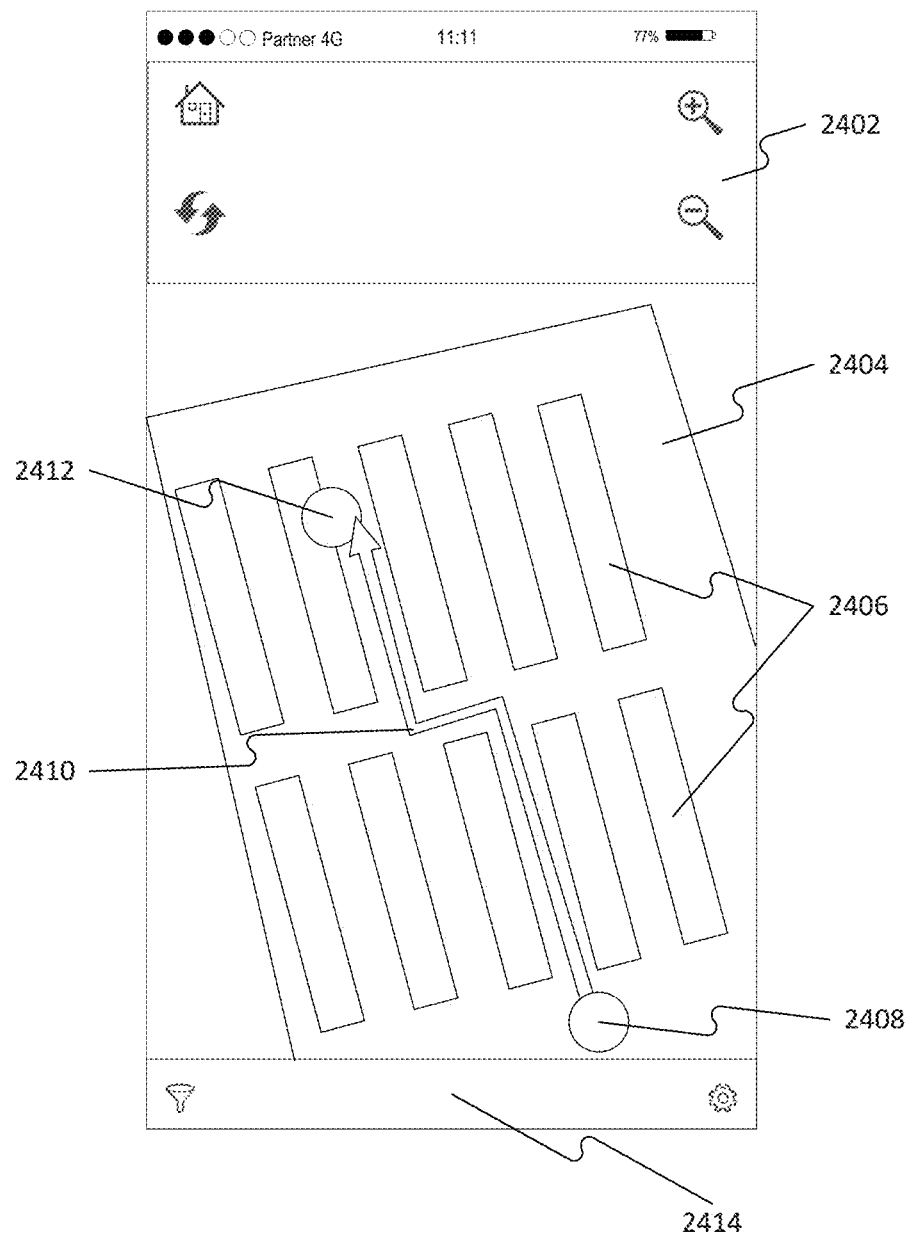
FIG. 24 is a visual depiction of an exemplary navigation assistance map-view user interface, consistent with the present disclosure.

FIG. 24 depicts an exemplary navigation assistance map-view user interface 2400. In some embodiments, capturing device 125, output device 145, or any other device may display user interface 2400. For example, user interface 2400 may be displayed on a touchscreen, and a user may interact with graphical elements in user interface 2400 by touching one or more of the graphical elements.

User interface 2400 may include a first function selection area 2402, which may include at least one button or other graphical element, which may be selectable by a user. For example, first function selection area 2402 may include one or more buttons that, when selected, may: present a different user interface on a display, refresh a map, zoom into a portion of the map, zoom out of a portion of the map, or cause another change to the visual elements displayed (e.g., transition to a product selection interface, transition to navigation assistance augmented-reality-view user interface 2500, etc.)

User interface 2400 may also include a map 2404, which may be a map of a retail store or other environment (e.g., a scaled visual depiction of an area within a retail store). Map 2404 may also include one or more shelf indicators 2406, which may indicate and/or correspond to physical shelving units or other product display structures within a retail store. In some embodiments, map 2404 may include information associated with obstacles (e.g., display stands), walkable areas, non-walkable areas, employee-only areas, and so forth, which may also have associated indicators to assist a user in navigating a retail store or other environment. For example, map 2404 may include information associated with a size and/or position of an obstacle that may block a line of sight (e.g., between a user and a target destination). In some embodiments, map 2404 may also include visual indicators for objects not necessarily associated with a product, such as a support pillar for the retail store, a checkout counter, and the like. In some embodiments, map 2404 may include a user location indicator 2408, which may indicate or correspond to a location of a user or user device (e.g., a mobile device) within a retail store associated with map 2404. For example, a user device may determine its location within a retail store by using electromagnetic signals, such as GPS signals, Wi-Fi signals, or signals from an indoor localization system. In some embodiments, map 2404 may also include a route indicator 2410, which may indicate a route (e.g., a walking route) through a portion of the retail store. For example, route indicator 2410 may include one or more lines that visually connect user location indicator 2408 to a destination indicator 2412. In some embodiments, route indicator 2410 may include distance information, such as text that denotes a distance between two points along a user's route (e.g., 5 meters, 50 meters, etc.). A destination indicator 2412 may indicate or correspond to a user's destination, which may be particular shelf and/or product location within the retail store. In some embodiments, a device displaying user interface 2400 may determine a product location corresponding to a product identified by a user at another user interface, and may place destination indicator 2412 at a place on map 2404 corresponding to the real-world location of the identified product. In some embodiments, destination indicator 2412 may include information related to a product or a shelf. For example, destination indicator 2412 may include a product name, a product identifier, a shelf height, a relative shelf placement (e.g., "second shelf from the floor-level shelf"), or the like. In some embodiments, map 2404 may be an augmented reality map including one or more images or other visual imagery of an in-store environment to provide to a user for augmented reality navigation. An augmented reality map may be separate from, or integrated with, an overhead view map (e.g., as shown in FIG. 24). For example, map 2404 may include location data (e.g., coordinate data) linked to a map location and one or more images.

User interface 2400 may include a second function selection area 2414, which may include at least one button or other graphical element, which may be selectable by a user. For example, second function selection area 2414 may include one or more buttons that, when selected, may present a user interface including device options, center map 2404 around a user's location, or center map 2404 around a product location. Other types of device functions are possible and the preceding are exemplary. In some examples, first function selection area 2402 and/or second function selection area 2414 may be presented as an overlay over map 2404.

Figure 25:
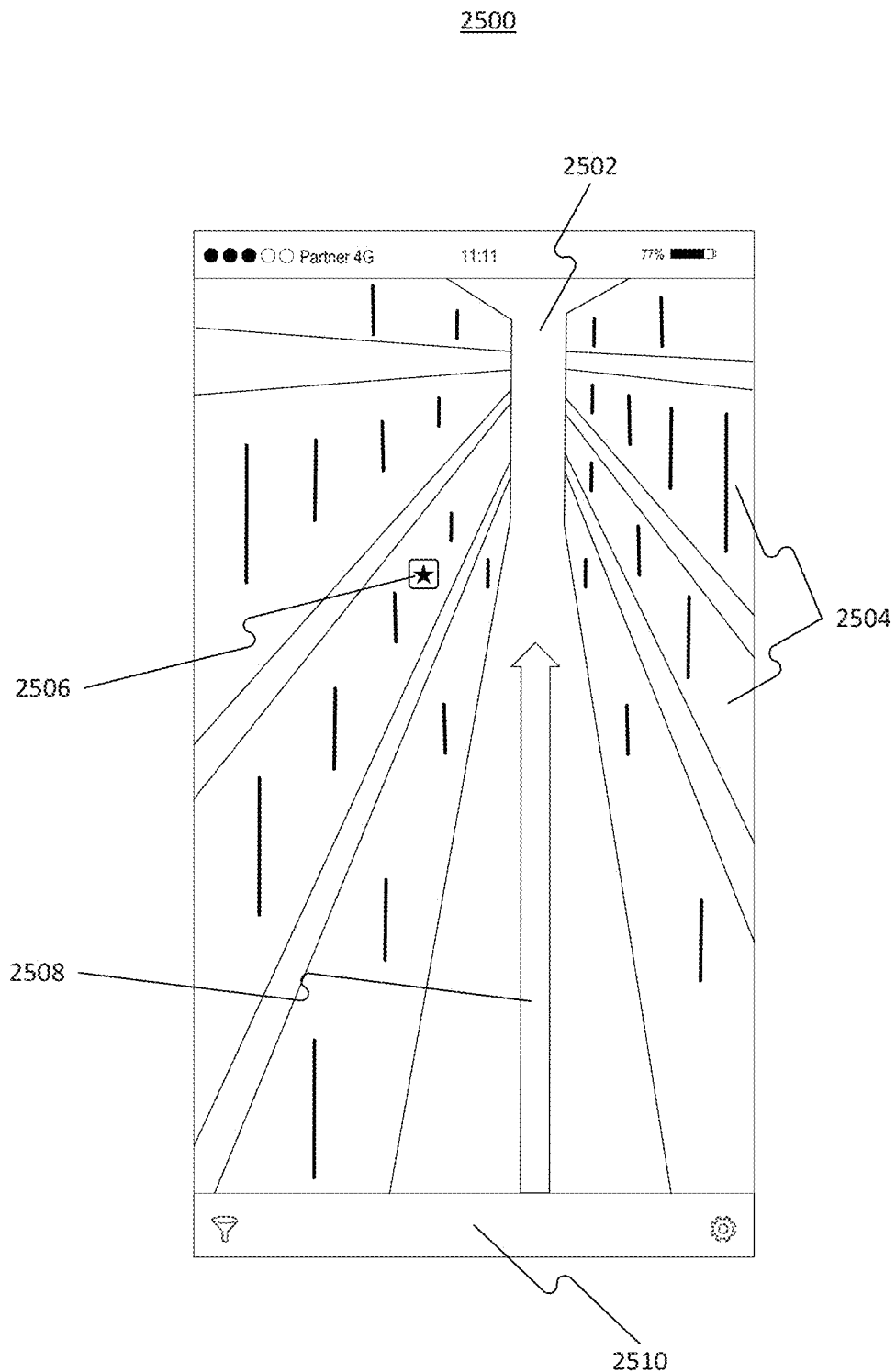
FIG. 25 is a visual depiction of an exemplary navigation assistance augmented-reality-view user interface, consistent with the present disclosure.

FIG. 25 depicts an exemplary navigation assistance augmented-reality-view user interface 2500. In some embodiments, capturing device 125, output device 145, or any other device may display user interface 2500. For example, user interface 2500 may be displayed on a touchscreen, and a user may interact with graphical elements in user interface 2500 by touching one or more graphical elements. In some embodiments, user interface 2500 may display image data captured by a camera or other imaging device (e.g., a camera connected to a device displaying user interface 2500).

User interface 2500 may include an augmented reality display area 2502, which may include an image (e.g., from a video stream) of a user's environment and/or visual overlays. For example, a device, such as capturing device 125 or output device 145, may capture one or more images using a camera, and may integrate at least portions of the one or more images into augmented reality display area 2502, such as by displaying an image and placing one or more visual overlays on the image. In some embodiments, augmented reality display area 2502 may include a number of shelves 2504 or other objects in an environment of a user. For example, shelves 2504 may be shelves within a retail environment, and may correspond to shelf indicators 2406.

As mentioned above, in some embodiments, user interface 2500 may include one or more visual overlays placed upon an image of a user's environment. For example, augmented reality display area 2502 may include a destination overlay indicator 2506, which may be a symbol, icon, outline, color, image distortion, or other visual indicator associated with a user's destination. In some embodiments, destination overlay indicator 2506 may correspond to a shelf and/or product. For example, destination overlay indicator 2506 may correspond to a product selected by a user at a user interface other than user interface 2500, to a product from a shopping list corresponding to the user, to a product associated with a coupon corresponding to the user, to an area (e.g., a shelf) and/or a product corresponding to a task assigned to the user, and so forth. In some embodiments, destination overlay indicator 2506 may be overlaid within augmented reality display area 2502 at a location that corresponds to a location of destination indicator 2412. In some embodiments, destination overlay indicator 2506 may be an outline in a shape of a selected product. In some examples, the image in augmented reality display area 2502 may be a display of a live feed captured using an image sensor (for example, an image sensor included in a device displaying user interface 2500), for example together with a display of one or move overlays, such as destination overlay indicator 2506 and/or route overlay indicator 2508. In one example, when the image in augmented reality display area 2502 changes (for example, due to movement of a device displaying user interface 2500, due to movement of a camera capturing the image, etc.), the position of the overlays may change according to the changes in the image. For example, the location of destination overlay indicator 2506 may change to a location adjacent to the location of a selected item (such as a product, a shelf, a label, etc.) in the image, the location of route overlay indicator 2508 may change to a location of the route, and so forth. Additionally or alternatively, destination overlay indicator 2506 may pulse, flash, increase in transparency, decrease in transparency, or otherwise change in visual appearance, which may occur in response to a user's location being within one or more threshold distances of a destination location (e.g., of a product). For example, the destination indicator 2506 may pulse with increasing frequency as a user's location approaches the destination location. User interface 2500 may also include other visual overlays, such as route overlay indicator 2508, which may be a line, arrow, grouping of markers, or other visual indicator of a route for a user (e.g., a walking route within a retail store). In some embodiments, route overlay indicator 2508 may be overlaid within augmented reality display area 2502 across an area corresponding to route indicator 2410. Route overlay indicator 2508 may be overlaid between and/or upon objects, such as shelves 2504. In some embodiments, destination overlay indicator 2506 and/or route overlay indicator 2508 may have a partial degree of transparency, which may allow a user to view a portion of an environment covered by a visual overlay, while still being able to understand information conveyed by the visual overlay. Any number of destination overlay indicators 2506 and/or route overlay indicators 2508, as well as other types of overlay indicators, may be placed within augmented reality display area 2502.

User interface 2500 may also include an augmented-reality-view setting selection area 2510, which may include at least one button or other graphical element, which may be selectable by a user. For example, augmented-reality-view setting selection area 2510 may include one or more buttons that, when selected, may: adjust a transparency of at least one overlay indicator, adjust contrast of an image or indicator, adjust brightness of an image or indicator, alter a color scheme of augmented reality display area 2502, toggle a visual alert option, toggle an auditory alert option, toggle a haptic alert option, or otherwise adjust how information is shown within user interface 2500. In some examples, augmented-reality-view setting selection area 2510 may be presented as an overlay over augmented reality display area 2502.

Additionally or alternatively to user interface 2400, map 2404 may be presented using an augmented reality system (such as augmented reality glasses), for example with a high opacity parameter. Additionally or alternatively to user interface 2500, destination overlay indicator 2506 and/or route overlay indicator 2508 may be presented using an augmented reality system (such as augmented reality glasses). For example, destination overlay indicator 2506 may be presented in a location adjacent to or over the location of a selected item (such as a product, a shelf, a label, etc.), route overlay indicator 2508 may be presented in a location indicative of the route, and so forth. In some examples, when a head of a user wearing augmented reality glasses moves (or other part of a user associated with angling an augmented reality device), the location of the destination overlay indicator 2506 and/or route overlay indicator 2508 moves to maintain the relative location of the overlays to selected items in the environment of the user, for example to maintain the location of destination overlay indicator 2506 in a location adjacent to or over the location of the selected item, to keep the location of route overlay indicator 2508 in the location indicative of the route. In some examples, when the head of the user wearing the augmented reality glasses moves, the location of map 2404 in the display(s) within the augmented reality glasses may stay the same (or substantially the same, for example within a selected number of pixels of the original locations, where the selected number of pixels may be less than 2, less than 5, less than 10, less than 50, less than 100, more than 100, and so forth).

Figure 26:
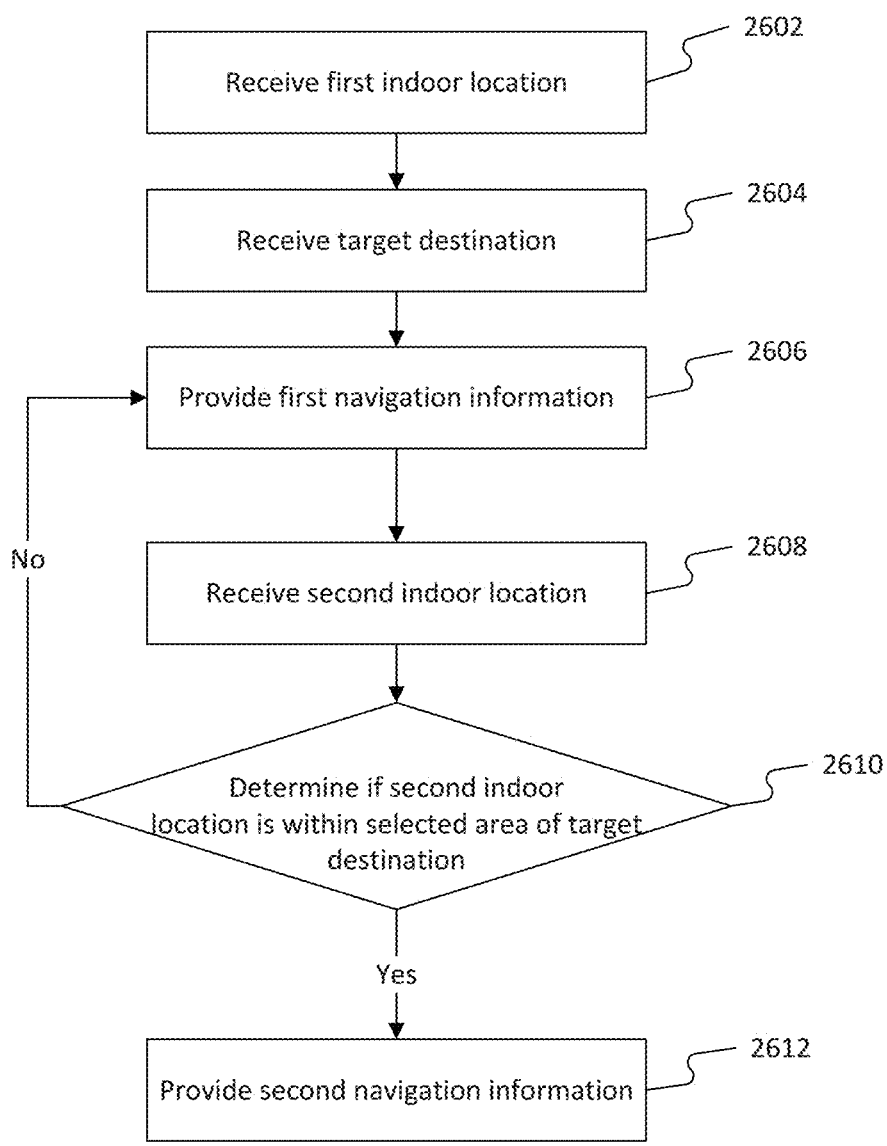
FIG. 26 is a flowchart of exemplary process for providing visual navigation assistance in retail stores, consistent with the present disclosure.

FIG. 26 depicts a flowchart of exemplary process 2600 for providing visual navigation assistance in retail stores. For purposes of illustration, in the following description, reference is made to certain components of system 100. For example, any combination of steps of process 2600 may be performed by at least one processor of a device such a handheld device (e.g., a smartphone, a tablet, a mobile station, a personal digital assistant, a laptop, and more), a wearable device (e.g., smart glasses, a smartwatch, a clip-on camera), and/or server. Examples of such devices (e.g., capturing device 125, server 135) are described above. It will be appreciated, however, that other implementations are possible and that other components may be utilized to implement the exemplary process 2600. It will also be readily appreciated that the illustrated method can be altered to modify the order of steps, repeat steps, delete steps, or further include additional steps. While certain aspects are described in the context of a retail store, it is appreciated that any or all of the steps described could be implemented in other environments, such as a warehouse, fulfillment center, stockpile, or other place where a user may attempt to navigate to locate an item.

At step 2602, at least one processor may receive a first indoor location, which may be a first indoor location of a user within a retail store. For example, the first indoor location may be read from a memory, may be received from an external device, may be determined based on analysis of data (such as an analysis of image data determined using an image sensor to determine a location of the image sensor), may be determined using an indoor positioning system, and so forth. In some embodiments, the first indoor location may be determined using position data of a device (e.g., a device having at least one processor performing process 2600), which may include GPS location data and/or indoor positioning data. In some embodiments, such as where position data, image data, and the like are exchanged between devices, process 2600 may include establishing a wireless connection with a mobile device of the user (e.g., a wireless connection between a device and image processing unit 130, a wireless connection between a device and a satellite, etc.).

At step 2604, at least one processor may receive a target destination, which may be a target destination within a retail store. For example, the target destination may be read from a memory, may be received from an external device, may be determined based on analysis of data (for example, based on an analysis of a shopping list, based on an analysis of a task, etc.). In some embodiments, a target destination may be associated with a product selected at a mobile device of the user (e.g., selected from a shopping list, selected from a list of search results, etc.). By way of example and without limitation, a user may select a can of peas (or other item) at the mobile device, and the mobile device may determine a location of the can of peas within a retail store and designate that location as the target destination. In some embodiments, the mobile device may determine a location of a product by retrieving the location from a data structure associating product identifiers with product locations, which may be maintained in a number of places, such as at database 140 or locally at the mobile device.

At step 2606, at least one processor may provide first navigation information, which may be first navigation data provided to a user through a first visual interface. In some embodiments, the first visual interface may include at least one of an aisle identifier, a retail area identifier (e.g., "produce", "household items", etc.), a shelf identifier, or a product identifier. For example, the second visual interface may include aspects of navigation assistance map-view user interface 2400. Additionally or alternatively, the first visual interface may include an image of a product, which may be a product that a user selected at a user interface of a mobile device.

At step 2608, at least one processor may receive a second indoor location, which may be a second indoor location of a user within a retail store. For example, the second indoor location may be read from a memory, may be received from an external device, may be determined based on analysis of data (such as an analysis of image data captured using an image sensor to determine a location of the image sensor), may be determined using an indoor positioning system, and so forth. In some embodiments, the second indoor location may be determined using position data of a device implementing part or all of process 2600, which may include GPS location data and/or indoor positioning data. In some embodiments, the at least one processor may receive the second indoor location after providing the first navigation data. In some embodiments, at least one of the first or second indoor locations may be based on position data determined by a position sensor of a mobile device of the user. For example, the mobile device may have an accelerometer, a geomagnetic field sensor, a camera, an infrared sensor, or other sensor for detecting environmental context of the mobile device to determine its position in an environment. In some embodiments, the position data may include position data determined at least in part based on a strength of a signal received at the mobile device from a network device placed in the retail store. In one example, a signal may be a radio wave, Wi-Fi signal, or other wireless electromagnetic wave. In some embodiments, the position data may include position data determined at least in part based on a time difference between two signals received at the mobile device from two network devices (e.g., wireless access points, routers, etc.) placed in the retail store. Additionally or alternatively, the position data may include position data determined based on a positioning system that uses multiple signals to triangulate a position of a device (e.g., a Wi-Fi positioning system).

At step 2610, at least one processor may determine whether the second indoor location is within a selected area around the target destination. For example, at least one processor may determine whether the second indoor location is within a selected area that is within a threshold distance from the target destination, within a selected area having a particular radius from the target destination, etc. A selected area may be selected by a user and/or determined according to a program or application (e.g., a program or application implementing process 2600). For example, in some embodiments, a user may select an area of 25 meters from a target destination (e.g., at a user interface). Any appropriate distance may be selected. In some embodiments, the selected area may be based on a radius from a target destination (e.g., within a 20-meter radius of the target destination). In other embodiments, the selected area may be based on a navigable distance between a user and a target destination (e.g., within a 20-meter navigable distance from the target destination). In some embodiments, if the at least one processor determines that the second indoor location is not within a selected area around the target destination, it may provide, or continue to provide, first navigation data (e.g., at step 2606). If the at least one processor determines that the second indoor location is within a selected area around the target destination, the at least one processor may proceed to step 2612. In some embodiments, process 2600 may also include activating a camera sensor of a mobile device of the user, and the activating may be in response to the determination that the second indoor location is within a selected area around the target destination.

In some embodiments, the selected area around the target destination may be selected based on an aisle including the target destination. For example, the selected area may include one or more distances across a walkable area through at least part of an aisle between the target destination and a location of a user. In another example, the selected area may include an area in which there is a direct line of sight to the target destination and/or to an object corresponding to the target destination (such as a product, a shelf, a label, etc.). For example, the at least one processor may analyze map data (e.g., of map 2404) to determine at least one area having a direct line of sight to the target destination (e.g., based on the location of the user). In some embodiments, the selected area around the target destination may be selected based on at least one of a store shelf associated with the target destination or a product associated with the target destination. For example, a user may designate a product and/or store shelf at a mobile device, which the mobile device may designate as the target destination. Based on the location of the target destination, the mobile device may determine the selected area as an area centered around the target destination (e.g., a 30-meter radius around the target destination) or as a maximum walkable distance from the target destination (e.g., an area including all walkable distances from the target destination equal to or less than 30 meters). In some embodiments, the selected area may not include the first indoor location.

At step 2612, the at least one processor may provide second navigation information, which may be second navigation data provided to a user through a second visual interface (e.g., displayable at a mobile device, at an augmented reality system, etc.). In some embodiments, the at least one processor may provide second navigation data in response to a determination that the second indoor location is within the selected area around the target destination. In some embodiments, the first visual interface and/or the second visual interface may be provided to a user via a mobile device, such as a mobile phone. In some embodiments, the second visual interface may include a visual indication of at least one of a product, a store shelf, an aisle, the target destination, a direction to follow, or a route to follow. For example, the second visual interface may include aspects of navigation assistance augmented-reality-view user interface 2500.

In some embodiments, the second visual interface may differ from the first visual interface. For example, the second visual interface may be an augmented reality visual interface, which may provide local navigation assistance information to a user (e.g., navigation assistance augmented-reality-view user interface 2500) and the first visual interface may be a map view of the retail store, which may provide a map-like view of an area to a user (e.g., navigation assistance map-view user interface 2400). In some embodiments, process 2600 may include receiving, from a mobile device of the user, at least one image of a physical environment of the user. The physical environment may correspond to a retail store, such that the image may include an aisle, a shelving unit, a product, or any other store structure or item.

In some embodiments, process 2600 may include receiving an image captured by a camera of a mobile device of the user. In some embodiments, process 2600 may also include calculating at least one convolution of the image. For example, process 2600 may include representing the image as a matrix of values or a tensor of values (e.g., values corresponding to pixel information, such as color, saturation, hue, brightness, value, etc.) and applying a kernel to the matrix or the tensor to calculate a convolution (which may be used to perform edge detection in the image, sharpen portions of the image, etc.). In some embodiments, process 2600 may also include using the calculated at least one convolution to determine at least one of the first or second indoor locations. For example, image processing unit 130 may compare a convolution of an image (or images) or a function of the convolution of the image to convolutions of another image (or other images) or to a threshold, which may be associated with known locations, and which may be stored at database 140. Image processing unit 130 may determine that the convolution of the captured image matches (e.g., pixel values being within a threshold amount) a convolution of an image associated with a known location, and determine that the known location corresponds to the first or second indoor location. In some embodiments, the convolutions or images associated with known locations or the thresholds may have been generated as part of a visual mapping process (e.g., a process to generate all or part of a map 2404). of an area (e.g., retail store). In one example, in response to a first value of a calculated convolution of at least part of the image, a first location may be determined, and in response to a second value of the calculated convolution of the at least part of the image, a second location may be determined. In some embodiments, the second location may differ from the first location.

In some embodiments, at least a portion of the second visual interface may be generated based on data captured by a camera of a mobile device of a user (e.g., by a mobile phone, by capturing device 125, etc.). In one example, the captured data may be visual data. In some embodiments, the second visual interface may include a presentation of at least part of an image (e.g., visual data) captured by the camera of the mobile device of a user.

Process 2600 may also include determining at least one location in the at least one image, such as a location of a product, target destination, or other location for presenting to a user. In some embodiments, determining the location in the at least one image may include analyzing a distance, analyzing a color, analyzing a color gradient, shape detection, edge detection, or other image analysis technique (e.g., using convolutions, as discussed above). In some embodiments, determining at least one location in the at least one image may involve determining one or more distances in the at least one image based on location data, position data, edge detection, etc. For example, a mobile device may access map information describing distances or dimensions of open spaces and/or objects in an environment (e.g., a retail store) and may access position data indicating a current position of the mobile device and/or a current orientation of the mobile device. A mobile device may identify, such as through edge detection, an end of a shelving unit in an image, or, based on a current position and/or orientation of the mobile device, a point along the shelving unit between the mobile device and the end of the shelving unit where a target destination (e.g., a product) is present. The mobile device may then cause a visual indicator to display at that point within the image (e.g., within an augmented reality image).

In some embodiments, the at least one processor may determine at least one location in the at least one image based on at least one of: a location of the mobile device, an orientation of the mobile device, or a product selected at the mobile device. In some embodiments, at least one location in an image may also be determined based on information from at least one sensor, such as an image sensor, weight sensor, pressure sensor, light sensor, or a device networked with a mobile device performing process 2600 (e.g., using a signal strength between a wireless access point and a mobile device). Process 2600 may also include placing a visual indicator on the determined at least one location in the at least one image. For example, a mobile device may determine that its location (e.g., a user's location) is near a first end of an aisle, that a selected product location is near a second end of the aisle, and that the camera of the mobile device is oriented to face the second end of the aisle. Then, the mobile device may determine an image location in the image corresponding to a real-world location of the selected product, and may place a visual indicator (e.g., destination overlay indicator 2506) at that image location.

As discussed above, a retail store may place products on store shelves according to a planogram, which may indicate how and where specific retail products should be placed on shelves or displays. Occasionally, a retail store or other entity may modify or alter these planograms, which may trigger a need to rearrange products on store shelves. For example, contractual obligations may change, seasonal products may be introduced, a layout of a store may change, or various other events affecting placement of products may occur. In other examples, products on store shelves that are not placed according to a planogram (for example, due to negligence, due to a lack of planogram) may need to be rearranged to comply with an existing or a new planogram. Accordingly, store associates of the retail store or other workers may need to reposition, add, remove, and/or replace products on the shelves.

While relatively minor modifications or changes to a planogram are generally manageable, a complete remodel of a planogram can be a significant undertaking. In particular, removing and replacing all (or a substantial percentage) of the products on a retail shelf may take several hours to complete and such a large task may deter or discourage the workforce responsible for carrying out the change. A complete remodeling may also render the shelving unit out of service for a long period of time, thereby negatively affecting sales and customer experience at the retail store. Large remodels may also have a cascading effect on other display spaces within the store if products in the remodeled planogram must be moved to or from other spaces. Moreover, adhering to an entirely new planogram may be challenging for retail store associates, which may negatively affect planogram compliance and/or sales figures for the store.

In view of these and other challenges, techniques for effectively and efficiently managing planogram remodeling are needed. In particular, where a target planogram is known in advance, the disclosed systems and methods may break a large planogram remodeling task into small manageable tasks. In some embodiments, this may include using regular store operations, such as restocking operations, to complete at least some of these small tasks, thereby reducing the overall cost and level of effort. The disclosed embodiments may further allow a retail workforce to become gradually accustomed to parts of the new planograms and may avoid long out-of-service periods. The disclosed embodiments therefore provide, among other advantages, improved efficiency, convenience, and functionality over prior art planogram compliance and inventory management systems.

Figure 27A:
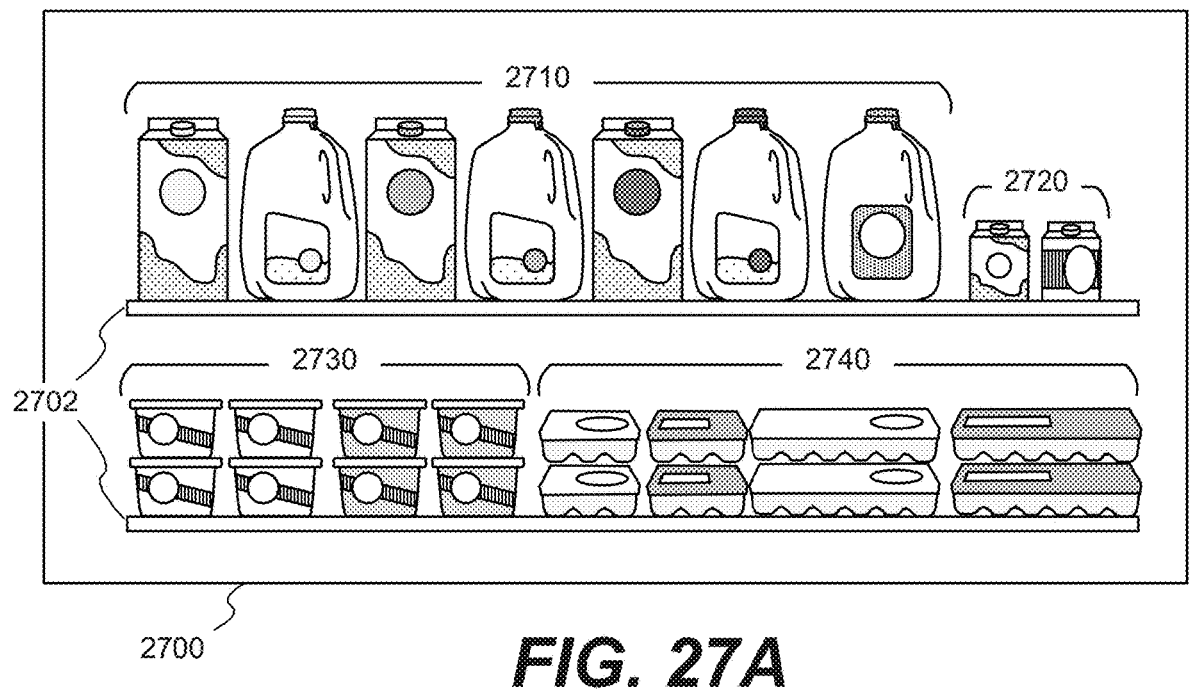
FIG. 27A illustrates an example image including at least part of a shelf, consistent with the present disclosure.

As described in detail throughout the present disclosure, the disclosed embodiments may include receiving images of at least part of a shelf. As noted above, a shelf may refer to any structure used for displaying products in a retail environment. FIG. 27A illustrates an example image 2700 including at least part of a shelf 2702, consistent with the present disclosure. Image 2700 may be acquired by an image sensor included in the retail store, such as image sensor 310 included in capturing device 125. The capturing device may take various forms or may be mounted in various locations, as described throughout the present disclosure. In some embodiments, the capturing device may be mounted adjacent to the shelf on an additional shelf. For example, the additional shelf may be placed above the shelf and the image sensor may be mounted below the additional shelf. As another example, the additional shelf may be placed across an aisle from the shelf. Accordingly, image 2700 may be captured using an image sensor such as image capturing devices 125A, 125B, and/or 125C. In some embodiments, image 2700 may be captured by a handheld device, such as a personal mobile device. For example, the handheld device may be carried by a store associate of a retail store in which the shelf is included (e.g., device 125D), a customer of a retail store in which the shelf is included, a visitor to a retail store in which the shelf is included, a participant in a crowdsourcing platform, a secret shopper, or any other individuals that may capture images in a retail store. As another example, image 2700 may be captured by a robotic device, such as a robot on a track (e.g., capturing device 125E), a drone (e.g., capturing device 125F), and/or a robot that may move on the floor of the retail store (e.g., capturing device 125G).

As shown in FIG. 27A, image 2700 may include at least part of a shelf 2702. In the example shown, shelf 2702 may be a shelving unit at least partially dedicated to dairy products within a retail store. For example, shelf 2702 may include milk products 2710, cream products 2720, butter products 2730, and egg products 2740. Shelf 2702 and products 2710, 2720, 2730, and 2740 are provided by way of example, and the disclosed embodiment are not limited to any particular type of display or product. In some embodiments, server 135 may be configured to analyze image to determine a placement of products on the shelf (or part of the shelf). For example, image processing unit 130 may use various image analysis techniques to detect products 2710, 2720, 2730, and 2740 on shelf 2702. In some embodiments, the image analysis may include calculating one or more convolutions of the image, which may facilitate determining the placement of products. This may include transposed convolutions, dilated convolutions, separable convolutions, flattened convolutions, grouped convolutions, shuffled group convolutions, pointwise grouped convolutions, or any other form of convolution and may be performed in single or multiple channels. In one example, at least one convolution of the first image may be calculated, and the calculated at least one convolution may be used to determine the first placement of products.

In some embodiments, server 135 may determine that one or more images that are received are insufficient to determine a placement of products on a shelf. For example, some or all of a representation of the shelf may be obscured in the image. This may be due to a customer, store associate, or other individual standing or walking in front of the shelf, a finger of a user appearing the image, an insect on the lens, dust or dirt on the lens, a product or other object blocking the camera, or the like. As another example, the image quality may be insufficient for detecting at least some of the products. For example, the image may be too dark or bright, of poor resolution, out of focus, or may have other characteristics preventing accurate detection of products. Based on the determination that the image is insufficient, server 135 may cause another image to be captured, which may be analyzed to determine the placement of products. In some embodiments, this may include generating a prompt for an individual, such as a store associate, a customer, a visitor to the store, a manager, or other individuals to capture an image. This may include transmitting information to cause a notification to be displayed on a computing device such as devices 145A, 145B, 145C and 145D. In some embodiments, this may include generating instructions for an image capture device to capture an image or images. For example, this may include generating instructions for one or more capturing devices 125 associated with a retail store.

Based on the determined placement of objects, server 135 may determine a planned adjustment to the placement of products on the shelf. For example, the adjustment may include removing a particular product from a shelf, adding a new product to a shelf, changing a placement location of one or more products from the shelf, rotating one or more products, changing a size of a portion of the shelf dedicated to a particular product, or any other modifications to product placement or orientation. In some embodiments, planned adjustments may be in reference to a target planogram, which may be received by server 135. A target planogram refers to a planogram that defines a desired or required future placement for products on a display structure. For example, the target planogram may reflect an updated contractual obligation, a retailer or supplier preference, a change in seasonal product placements, a remodel or partial remodel of a store or shelving unit, discontinuation of one or more products, addition of one or more new products, or various other events that may affect placement of products on a shelf. As noted above, in some instances, the target planogram may differ significantly from the current product placement on a shelf, such that reaching the target product placements may be a significant undertaking for store associates. Accordingly, the adjustments to the placement of products on the shelf determined by system 100 may include smaller, more manageable, steps toward reaching the target planogram.

Figure 27B:
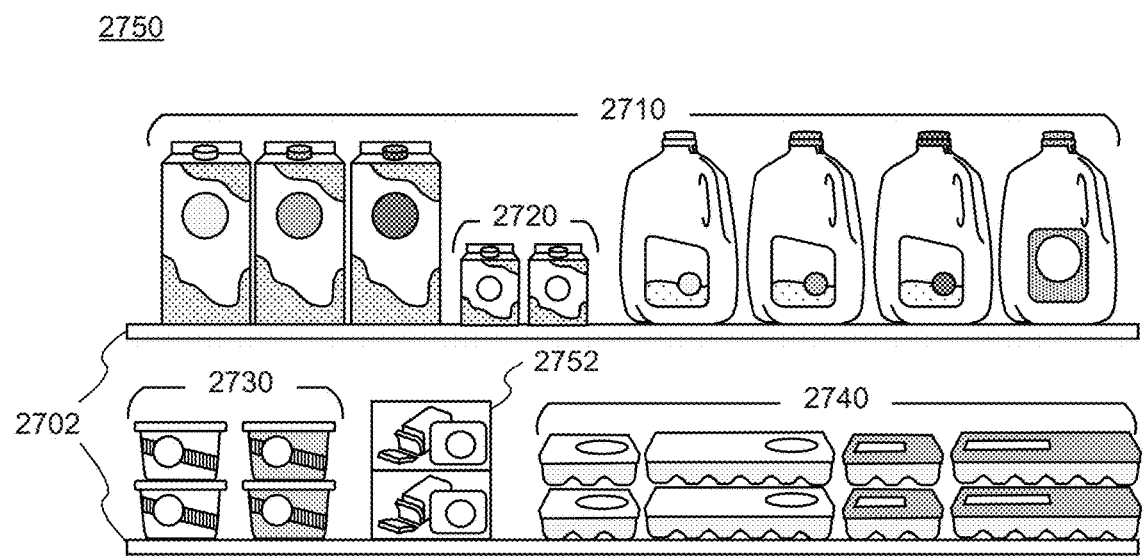
FIG. 27B illustrates a target planogram that may be received, consistent with the present disclosure.

FIG. 27B illustrates a target planogram 2750 that may be received, consistent with the present disclosure. Target planogram 2750 may be accessed by server 135 in any suitable manner. In some embodiments, planogram 2750 may be accessed from an external source, such as a supplier, a retail store associated with another retail store, a management entity (e.g., a corporate headquarters, a third-party management company, etc.), or any other entities that may provide instructions regarding product placement. Accordingly, server 135 may access target planogram 2750 through communications network 150 using network interface 206. In some embodiments, target planogram 2750 may be accessed from a memory device, such as memory device 226. For example, target planogram may be stored in database 140 or another data structure and may be accessed through memory interface 204. As another example, target planogram 2750 may be accessed through a user interface, such as I/O system 210. For example, a store associate, manager, or other entity may input a target planogram via a graphical user interface such as through touch screen 218. In some embodiments the target planogram may be determined at least in part by server 135. For example, server 135 may be configured to optimize product placement on shelves based on sales data or other information accessed by server 135. The methods above are provided by way of example, and the present disclosure is not limited to any particular means of accessing target planograms.

As illustrated in FIGS. 27A and 27B, target planogram 2750 may represent a significant departure from the current placement of products on shelf 2702 indicated in image 2700. For example, milk products 2710 may be grouped differently and placed in different locations on shelf 2702, creamer products 2720 may be moved to a different location and reduced in variety, a portion of shelf 2702 dedicated to butter products 2730 may be reduced, an additional product 2752 may be added, and egg products 2740 may be reorganized. While any one of these changes may be easily managed by store associates or other workers tasked with making the change, collectively these changes may be more daunting. It is to be understood that the remodel of shelf 2702 depicted in FIGS. 27A and 27B is a relatively simplified remodeling task for purposes of illustration. For example, one would recognize that target planograms affecting larger portions of shelving units, or multiple shelving units (and therefore a larger numbers of displayed products) would present increasingly arduous tasks for workers.

Figure 28A:
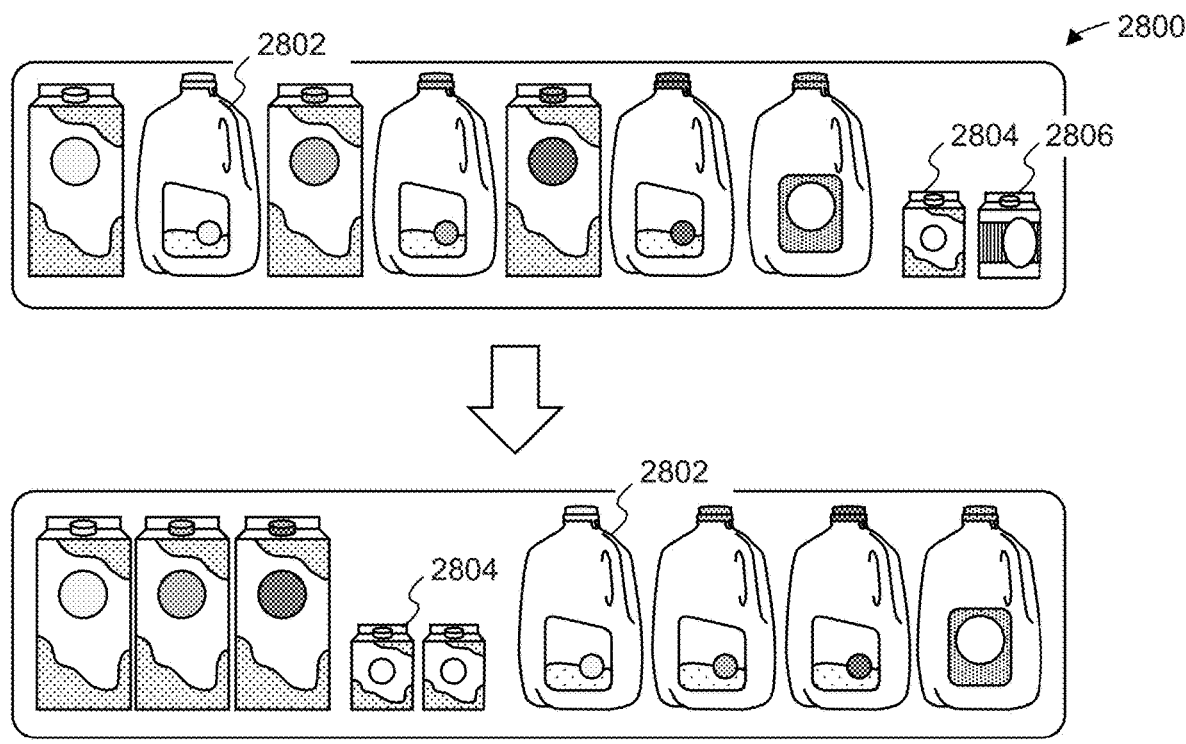
FIGS. 28A and 28B illustrate example adjustments to product placements, consistent with the present disclosure.
Figure 28B:
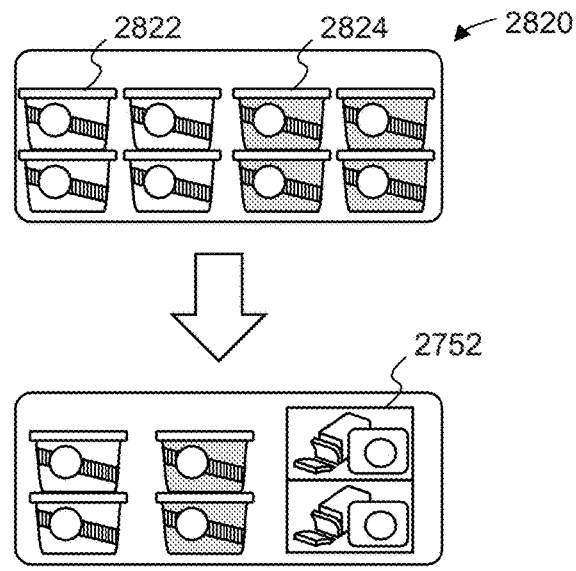

Server 135 may determine a plurality of adjustments to the placement of products on shelf 2702, which may be configured to achieve compliance with target planogram 2750. Accordingly, the adjustments may be a series of steps that, if carried out correctly, would result in shelf 2702 being in compliance with planogram 2750. For example, the adjustments may focus on particular regions of shelf 2702, particular products or product types, particular tasks or types of tasks (e.g., product relocations, product removals, product additions, changes in size of areas dedicated for particular products), or any other forms of gradual adjustments. FIGS. 28A and 28B illustrate example adjustments to product placements, consistent with the present disclosure. For example, FIG. 28A illustrates an example adjustment 2800 that may focus on rearrangement of the top portion of shelf 2702. In particular, adjustment 2800 may be an adjustment of the placement of products 2710 and 2720 to conform with target planogram 2750. For example, adjustment 2800 may include changing the position of milk product 2802 and creamer product 2804. Adjustment 2800 may further include removal of creamer product 2806 from shelf 2702.

FIG. 28B illustrates another example adjustment 2820 that may focus on placement of products on another portion of shelf 2702. In particular, adjustment 2820 may be an adjustment to the placement of butter products 2730 to conform with target planogram 2750. Adjustment 2820 may include a decrease in size of the portion of shelf 2702 dedicated to products 2822 and 2824. Further, adjustment 2820 may include the addition of a new product 2752, as described above. It is to be understood that adjustments 2800 and 2820 are provided by way of example and various other forms of adjustments may be determined by server 135. In some embodiments, the adjustments may be smaller or larger in scope than adjustments 2800 or 2820, depending on the particular implementation of system 100 and/or the specific requirements of the retail store.

Consistent with the disclosed embodiments, server 135 may further provide information configured to cause the adjustments to be implemented. For example, server 135 may generate instructions or other forms of information that may indicate that the adjustment is to be performed. The information may include any combination of alphanumerical text, symbols, images, graphical representations, and/or other elements for indicating the adjustment. In some embodiments, the information may be one or more text-based instructions to implement the adjustment. For example, the information for adjustment 2800 may include text such as "move product SKU #02802 to from position 2 to position 5" (assuming shelf 2702 has a series of designated position numbers and product 2802 is associated with a Stock Keeping Unit code of 02802). Various other example instructions may be provided depending on a stocking scheme for the retail environment. In some embodiments, the information may be an intermediate target planogram. For example, adjustment 2800 may be a representation of a planogram with the updated locations of products 2710 and 2720 as shown in FIG. 28A but with products 2730 and 2740 in the positions shown in FIG. 27A. Accordingly, server 135 may generate a series of intermediate planograms for reaching target planogram 2750. As another example, the information may include a diagrammatic representation of an adjustment, similar to FIG. 28A, 28B, or 28D (described in further detail below). The information may include various other forms of representing adjustments, including combination of two or more forms of instructions.

The information may be provided in any manner that would result in implementation of the planned adjustment. In some embodiments, the information may be presented to store associates of the retail store. For example, server 135 may transmit the information to an associate device, such as devices 145C and/or 145D, which may present the information to a store associate. In some embodiments, this may include displaying the information on a user interface of the device. This may include providing a notification indicating the planned adjustment, displaying images indicating the planned adjustment (e.g., diagrams, planograms, etc.), adding a task associated with the planned adjustment to a list of tasks to be completed by the associate, adding a calendar entry or other scheduling entry associated with the planned adjustment, or any other manner of presenting the information. The information may be presented consistent with other example outputs for an employee or associate of a retail store as described throughout the present disclosure (e.g., as shown in FIG. 11D). Additionally or alternatively, the information may be presented audibly to the store associate. For example, the device may provide spoken instructions to the associate indicating the planned adjustment. In some embodiments, the indication may be an alert indicating that a planogram, list of tasks, or other stored data has changed, which may prompt the store associate to view the data.

As another example, the information may be presented to a manager of the retail store. For example, server 135 may transmit the information to a store management computing device, which may be used to manage planogram compliance, restocking tasks, or other operations of the retail store. The management device may in turn provide instructions to a store associate, for example, by providing instructions via an associate device such as devices 145C and/or 145D as described above. In some embodiments, the information may be presented to a manager of the retail store via the management device and the manager may provide the instructions to the store associates. For example, the information may be displayed as part of GUI 1120, as described above with respect to FIG. 11C. In some embodiments, the information may be provided to other entities associated with the retail store or the displayed products. For example, server 135 may transmit the information to a supplier (e.g., supplier 115A, 115B, or 115c), to market research entity 110, to another retail store, or various other entities.

In some embodiments, planned adjustments may be determined such that they coincide with or otherwise correspond with other tasks associated with shelf 2702. As an example, an adjustment may be planned to coincide with a restocking task associated with the shelf. If some or all of a product needs to be restocked, there may be more space available on the shelf for shifting products around, replacing products, foregoing restocking of certain products, or other tasks that may be used to carry out a planned adjustment. For example, referring to FIG. 28B, adjustment 2820 may be designed to coincide with restocking of products 2822 and/or 2824. If the number of products 2822 and 2824 are relatively low, it may be easier to reduce the size of the portion of shelf 2702 dedicated to products 1822 and 2824 and to introduce new product 2752. Further, if a store associate can combine tasks to be completed at the same time, this may improve efficiency for the associate and the retail store generally.

In some embodiments, the information indicating the planned adjustment may be provided based on a timing of a restocking event. For example, server 135 may wait to provide the information until the restocking is needed. This may be determined based on analyzing the placement of products on shelf 2702 (e.g., by monitoring and analyzing images of shelf 2702) to detect when a quantity of a product is low. Alternatively or additionally, the information indicating the planned adjustments may be presented prior to the restocking event but may indicate that the adjustment should be performed during the next restocking event. The planned adjustments may be coordinated with various other events, such as promotional events, seasonal events, maintenance tasks, cleaning tasks, periods with less customer traffic, or any other events that may enable the planned adjustment to be carried out more effectively. Integrating the planned adjustments with other events in this manner may minimize the level of effort required by managers or store associates.

As described above, adjustments 2800 and 2820 may be part of an overall procedure determined by server 135 for reaching compliance with target planogram 2750. In some embodiments, server 135 may determine the overall procedure initially and may gradually present the adjustments. For example, server 135 may outline a series of planned adjustments for compliance with target planogram 2750 and may provide information configured to cause the planned adjustments to be implemented individually or in subgroups of planned adjustments. In some embodiments, the planned adjustments may be associated with target or required completion times. For example, the series of planned adjustments may be scheduled to reach compliance with target planogram 2750 by a specified date. The specified target date may be defined based on contractual obligations (e.g., for planogram compliance, etc.), supplier or retailer preferences, based on predefined deadlines (e.g., the beginning of summer, the end of a promotion, beginning or end of a product being available, etc.), default timelines of the system, or other dates that may affect the placement of products on shelfs. Accordingly, server 135 may provide alerts or reminders for completing the planned adjustments by the scheduled date. In some embodiments, the presentation of information indicating the planned adjustments may also be scheduled. For example, the incremental planned adjustments may be presented to store managers or associates at set intervals (e.g., daily, weekly, monthly, etc.), at intervals based on an expected level of effort to accomplish the adjustment, or other intervals. In some embodiments, server 135 may await confirmation of completion of a previous planned adjustment before providing information for a subsequent planned adjustment within the overall plan of adjustments. For example, server 135 may monitor images of shelf 2702, receive confirmation information from a manager or associate, or receive sensor data, or otherwise access information that may indicate the adjustment has been completed.

In some embodiments, the planned adjustments may be determined and/or modified dynamically. For example, sever 135 may analyze a first image to provide information regarding a first adjustment as described above. Then, after the information regarding the first adjustment was provided, subsequent images may be captured and analyzed to determine additional planned adjustments. Accordingly, the planned adjustments may not reflect an overall plan determined at one time, but may be determined progressively. In some embodiments, this may be based on a status of an execution of the first adjustment indicated in subsequent images. For example, server 135 may receive a second image including a representation of shelf 2702 and may determine a second planned adjustment based on the placement of products indicated in the second image. This process may be repeated for subsequent images until an overall reconfiguration of the shelf is complete (e.g., to comply with target planogram 2750). For example, after providing information indicating adjustment 2800, server 135 may analyze subsequent images to verify that products 2710 and 2720 have been rearranged as indicated by adjustment 2800. If a subsequent image indicates a successful execution of adjustment 2800, server 135 may determine another adjustment based on the updated placement of products on shelf 2702, such as adjustment 2820.

Figure 28C:
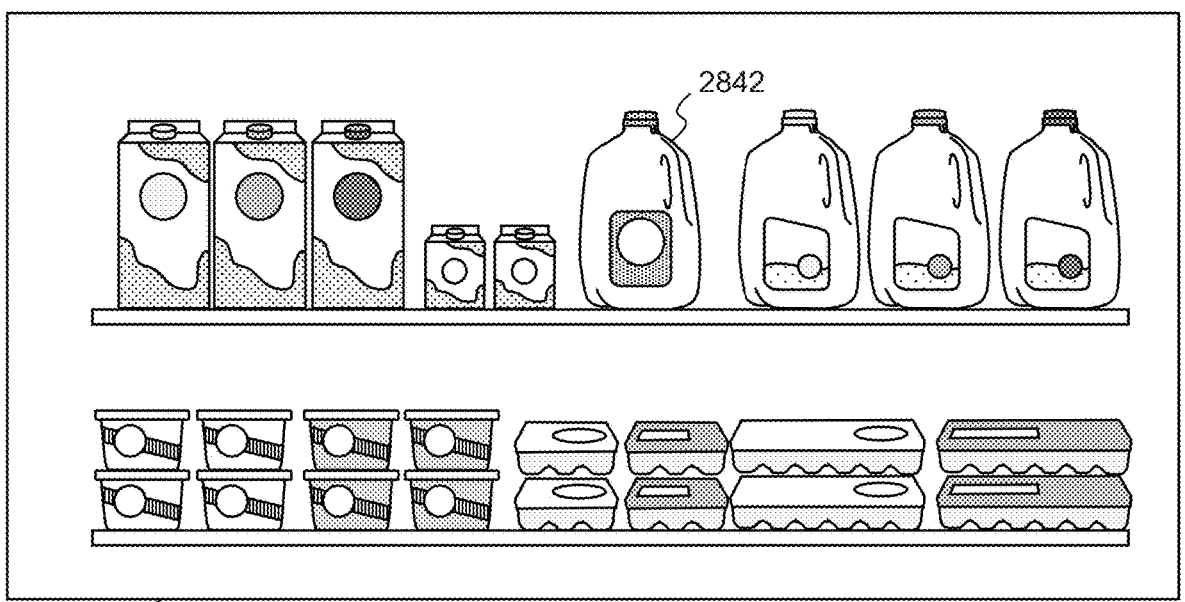
FIG. 28C illustrates an example image showing a failed execution of a planned adjustment, consistent with the present disclosure.

Conversely, the subsequent image may indicate a failed execution of previous planned adjustments. A failed execution refers to any product placement that does not comply with the planned product placement after the adjustment. For example, a failed execution may include a failure to attempt to implement the planned adjustment if the products are in the same position the planned adjustment was based on. As another example, the failed execution may include an incorrect implementation of a planned adjustment. In this example, a subsequent image may indicate that products have been repositioned based on the planned adjustment, but at least one product position is incorrect. In some other examples, the subsequent image may indicate a product placement that does not comply with the planned product placement even after successful execution of adjustment 2800, for example due to actions of customers in the retail store. FIG. 28C illustrates an example image 2840 showing a failed execution of a planned adjustment, or a deviation from the desired product placement after the planned adjustment due to any other reason, consistent with the present disclosure. Image 2840 may be an image captured after adjustment 2800 was determined and provided as described above. Image 2840 may indicate that adjustment 2800 was executed incorrectly, or deviated from the desired product placement after the planned adjustment due to any other reason. For example, most of products 2710 and 2720 may be positioned correctly, however, product 2842 may be in the wrong position on shelf 2702.

Server 135 may take one or more actions in response to a failed execution identified in a subsequent image or in response to a deviation from the desired product placement after the planned adjustment due to any other reason. In some embodiments, this may include generating a notification or other indication of the failed execution. For example, this may include generating a reminder that the planned adjustment still needs to be completed, which may be presented to the same entity or person as the information indicating the planned adjustment (e.g., to the store manager or store associate). As another example, server 135 may cause a notification to be generated for another entity. For example, if the original information was presented to a store associate, a notification may be provided to a manager indicating the planned adjustment has not been completed correctly. The notification may be provided to other entities, such as another retail store, a supplier, or a market research entity.

In some embodiments, the failed execution or the deviation from the desired product placement after the planned adjustment due to any other reason may be used for determining subsequent planned adjustments. For example, based on image 2840, server 135 may determine an additional planned adjustment to correct the deviation or the failed execution of adjustment 2800. This may include a planned adjustment to move product 2842 to the end of shelf 2702, as shown in FIG. 28A. In some embodiments, the failed execution may be used as feedback regarding the determined adjustments. For example, the failure of store associates to implement planned adjustment 2800 within an expected timeframe or to implement it correctly may indicate that planned 2800 was too complex or difficult, was too large in scope, was presented at an inconvenient time, or other forms of feedback. Accordingly, server 135 may adjust future planned actions that are determined. For example, rather than presenting planned adjustment 2820, server 135 may present a series of smaller, more manageable adjustments.

Figure 28D:
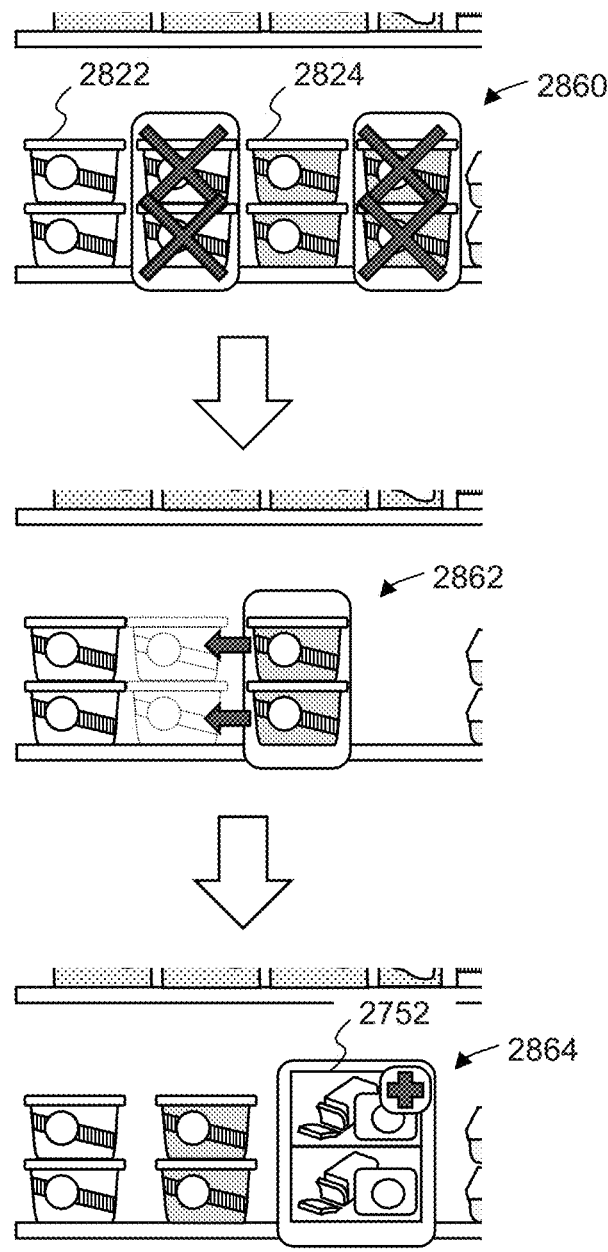
FIG. 28D illustrates example modified adjustments that may be determined based on subsequent images, consistent with the present disclosure.

FIG. 28D illustrates example modified adjustments 2860, 2862, and 2864 that may be determined based on subsequent images, consistent with the present disclosure. For example, rather than presenting planned adjustment 2820, server 135 may present planned adjustment 2860, which may include reducing the size of the portion of shelf 2702 dedicated to products 2822 and 2824, as shown. Planned adjustment 2820 may further be broken down into adjustment 2862 of relocating the display of product 2824 and adjustment 2864 of introducing new product 2752. Server 135 may evaluate images captured between adjustments 2860, 2862, and 2864 to determine whether further tuning of the gradual adjustments is needed. Adjustments 2820, 2860, 2862, and 2864 are provided by way of example, and it is to be understood that various other forms of adjustments may be used, including adjustments with varying degrees of complexity.

Various other forms of feedback may be used by server 135 for tuning or refining planned adjustments. In some embodiments, the feedback may be feedback provided by a user of system 100, such as user 120. For example, a store associate, manager, supplier, market research entity, customer, or other entity associated with system 100 may provide feedback that may indicate one or more properties of the planned adjustments should be modified. For example, a manager or store associate may enter information indicating that a planned adjustment is too difficult. Accordingly, server 135 may reconfigure the planned adjustment and/or future planned adjustments to reduce the scope, coincide better with other tasks (e.g., restocking tasks), provide more time for completing the adjustment, or the like. In some embodiments, the feedback may be indirect. For example, a customer may provide information indicating that a product is difficult to find or not in the correct location, which may indicate that store associated are having trouble keeping up with the planned adjustments.

As another example, feedback may be based on performance metrics associated with the retail store, the shelf, or products on the shelf. In some embodiments, server 135 may receive an indication of an impact of a planned adjustment. An impact may include any form of measurable result of the planned adjustment being implemented. In some embodiments the impact may include an impact on sales based on the adjustment. For example, server 135 may receive information indicating whether an increase or decrease in sales occurred for a particular product, for products on a shelf or portion of a shelf, for products on other shelves, for products in a retail store generally, for products in other associated retail stores, or the like. As another example, the impact may include an engagement of customers with the shelf. For example, this may include a number of customers that look at or take products from the shelf, a number of customers that purchase products on the shelf, a number of customers that pass by the shelf, or other forms of interaction. Various other metrics may be used, such as movement of products on the shelf (e.g., restocking rates, reorder rates, etc.), overall store execution efficiency, customer satisfaction scores, employee satisfaction scores, employee turnover, or any other metric that may be associated with a retail store's performance.

Figure 29:
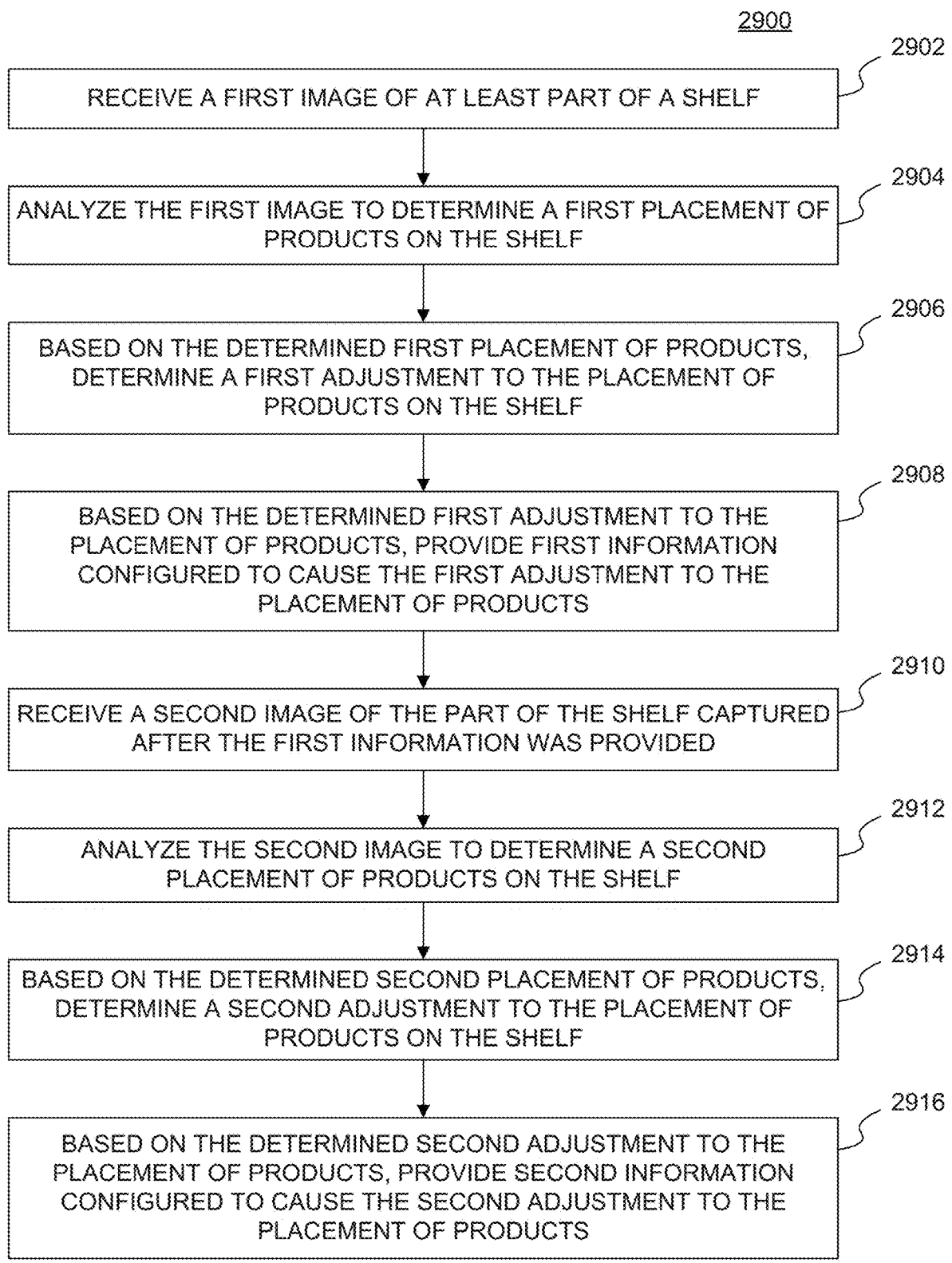
FIG. 29 provides a flowchart of an exemplary method for making gradual adjustments to planograms, consistent with the present disclosure.

FIG. 29 provides a flowchart of an exemplary method for making gradual adjustments to planograms, consistent with the present disclosure. Process 2900 may be performed by at least one processing device of server, such as processing device 302, as described above. In some embodiments, some or all of process 2900 may be performed by a different device associated with system 100. In some embodiments, a non-transitory computer readable medium may contain instructions that when executed by a processor cause the processor to perform process 2900. Further, process 2900 is not necessarily limited to the steps shown in FIG. 29, and any steps or processes of the various embodiments described throughout the present disclosure may also be included in process 2900, including those described above with respect to FIGS. 27A, 27B, 28A, 28B, 28C, and/or 28D.

In step 2902, process 2900 may include receiving a first image of at least part of a shelf. For example, step 2902 may include receiving image 2700, which may include at least a portion of shelf 2702, as described above. The first image may be captured by at least one image sensor associated with a retail environment in which the shelf is included. For example, the first image may be acquired by at least one image sensor mounted adjacent to the shelf on an additional shelf. As another example, the first image may be acquired by at least one image sensor of a personal mobile device. The personal mobile device may be held by a store associate, customer, visitor, manger, crowdsourcing participant, or other individuals as described above. In some embodiments, the first image may be acquired by at least one image sensor of a robotic device.

In step 2904, process 2900 may include analyzing the first image to determine a first placement of products on the at least part of the shelf. For example, image 2700 may be analyzed to determine a placement of products 2710, 2720, 2730, and/or 2740. The first placement of products may be determined based on one or more image analysis techniques as described throughout the present disclosure. In one example, Step 2904 may include calculating at least one convolution of the first image, and may use the calculated at least one convolution to determine the first placement of products. For example, in response to a first value of a calculated convolution, step 2904 may include determining one placement of products, and in response to a second value of the calculated convolution, step 2904 may include determining another placement of products. In some embodiments, step 2904 may include determining that the first image is insufficient to determine the first placement. For example, the first image may include an obstruction or may be of poor quality (e.g., blurry, out of focus, pixelated, over- or under-exposed, incomplete or erroneous, etc.) Accordingly, in response to the determination that the first image is insufficient to determine the first placement, step 2904 may include causing at least one of a store associate and a robot to capture an additional image of at least a portion of the at least part of the shelf and analyzing the additional image to determine the first placement. For example, this may include generating instructions for an image capture device to capture the additional image, or prompting a store associate, customer, manager, or other individual to capture the additional image.

In some embodiments, a machine learning model may be trained using training examples to determine placement of products on at least part of a shelf from images. An example of such training example may include a sample image of a sample shelf, together with a label indicating the placement of products on the sample shelf. In one example, step 2904 may include using the trained machine learning model to analyze the first image received in step 2902 and determining the first placement of products on the at least part of the shelf. In another example, step 2912 (described below) may include using the trained machine learning model to analyze the second image received in step 2910 and determining the second placement of products on the at least part of the shelf. Similar processes may be used in steps 3202 and 3212 as described below with respect to FIG. 32. In yet another example, Step 3204 (described below) may use the trained machine learning model to analyze the first image received by Step 3202 and determine the first placement of products on the at least part of the shelf. In an additional example, Step 3212 (described below) may use the trained machine learning model to analyze the second image received by Step 3210 and determine the second placement of products on the at least part of the shelf. In some examples, one or more sensors (such as weight sensors, pressure sensors touch sensors, etc.) may be positioned between at least part of the shelf and products placed on the at least part of the shelf. In some examples, data captured using the one or more sensors positioned between the at least part of the shelf and products placed on the at least part of the shelf may be analyzed to determine placement of products on the at least part of the shelf. In one example, a machine learning model may be trained using training examples to determine placement of products on at least part of a shelf from data captured using one or more sensors positioned between the at least part of the shelf and products placed on the at least part of the shelf. An example of such training example may include a sample data captured using one or more sensors positioned between a sample shelf and products placed on the sample shelf, together with a label indicating the placement of products on the sample shelf Additionally or alternatively to the usage of image analysis, step 2904 may analyze data captured using one or more sensors positioned between the at least part of the shelf and products placed on the at least part of the shelf to determine the first placement of products on the at least part of the shelf Additionally or alternatively to the usage of image analysis, Step 2912 (described below) may analyze data captured using one or more sensors positioned between the at least part of the shelf and products placed on the at least part of the shelf after the first information was provided to determine the second placement of products on the at least part of the shelf. Similar processes may be used in steps 3202 and 3212 as described below with respect to FIG. 32. Additionally or alternatively to the usage of image analysis, Step 3204 (described below) may analyze data captured using one or more sensors positioned between the at least part of the shelf and products placed on the at least part of the shelf to determine the first placement of products on the at least part of the shelf. Additionally or alternatively to the usage of image analysis, Step 3212 (described below) may analyze data captured using one or more sensors positioned between the at least part of the shelf and products placed on the at least part of the shelf after the first instructions were provided to determine the second placement of products on the at least part of the shelf.

In step 2906, process 2900 may include determining, based on the determined first placement of products, a planned first adjustment to the determined first placement of products on the at least part of the shelf. For example, this may include determining planned adjustment 2800, as described above. In one example, in response to one placement of products determined in step 2904, step 2906 may include determining one planned adjustment, and in response to another placement of products determined in step 2904, step 2906 may include determining another planned adjustment. The planned first adjustment may include various actions affecting the position, quantity, orientation, or other properties of the physical placement of products on the shelf. For example, this may include removing a particular product type from the shelf, adding a new product type to the shelf, changing a placement location of a particular product type on the shelf, changing a size of a portion of the shelf dedicated to a particular product type, or similar actions. In some embodiments, the planned first adjustment may be configured to coincide with other events. For example, the planned first adjustment may be configured to be performed as part of a restocking task.

In step 2908, process 2900 may include providing, based on the planned first adjustment to the determined first placement of products, first information configured to cause the planned first adjustment to the determined first placement of products. In some embodiments, providing the first information may include transmitting instructions to a store associate of a retail store in which the shelf is included. For example, this may include transmitting instructions to a computing device of the retail store, such as devices 145C and/or 145D.

In step 2910, process 2900 may include receiving a second image of the at least part of the shelf captured after the first information was provided. As with the first image, the second image may be captured by at least one image sensor associated with the retail environment in which the shelf is included. For example, the second image may be acquired by at least one image sensor mounted adjacent to the shelf on an additional shelf, at least one image sensor of a personal mobile device, or at least one image sensor of a robotic device. In some embodiments, the second image may not necessarily be acquired by the same device as the first image and may be acquired by a different device.

In step 2912, process 2900 may include analyzing the second image to determine a second placement of products on the at least part of the shelf. As with the first placement of products, the second placement of products may be determined based on one or more image analysis techniques as described throughout the present disclosure. In one example, step 2912 may include calculating at least one convolution of the second image, and using the calculated at least one convolution to determine the second placement of products. Further, step 2912 may include determining that the second image is insufficient to determine the second placement, causing at least one of a store associate and a robot to capture an additional image of at least a portion of the at least part of the shelf and analyzing the additional image to determine the second placement.

In step 2914, process 2900 may include determining, based on the second placement of products, a planned second adjustment to the determined second placement of products on the at least part of the shelf. For example, this may include determining planned adjustment 2820, as described above. The planned second adjustment may include removing a particular product type from the shelf, adding a new product type to the shelf, changing a placement location of a particular product type on the shelf, changing a size of a portion of the shelf dedicated to a particular product type, or similar actions. As with the planned first adjustment, the planned second adjustment may be configured to be performed as part of a restocking task or other event.

In some embodiments, the second image may be used to evaluate completion of the planned first adjustment. For example, process 2900 may include analyzing the second image to determine a status of an execution of the planned first adjustment and based on the status of the execution of the planned first adjustment, determining the planned second adjustment to the determined second placement of products on the at least part of the shelf. In some embodiments, the status of the execution of the planned first adjustment may include a determined failure of the execution of the planned first adjustment. For example, the determined failure may be based on an incorrect product placement detected in the second image. In response to a determined failure of the execution of the planned first adjustment, the planned second adjustment may be a smaller adjustment than the planned first adjustment and/or to correct the determined failure.

According to some embodiments, the planned second adjustment may be determined based on feedback from the planned first adjustment. For example, process 2900 may further include receiving an indication of an impact of the planned first adjustment to the determined first placement of products. Accordingly, step 2914 may include determining the planned second adjustment to the determined second placement of products on the at least part of the shelf based on the determined second placement of products and the indication of the impact of the planned first adjustment. For example, the impact may include an impact on sales, impact on engagement of customers with the shelf, impact on movement of products on the shelf, impact on store execution efficiency, or other metrics as described above. In one example, in response to a first feedback, step 2914 may include determining one adjustment, and in response to a second feedback, step 2914 may include determining another adjustment.

In step 2916, process 2900 may include providing, based on the determined planned second adjustment to the determined second placement of products, second information configured to cause the planned second adjustment to the determined second placement of products. As with the first information, providing the second information may include transmitting instructions to a store associate of a retail store in which the shelf is included. This may include providing the information to the same device as the first information, or may include providing the information to a different device.

In some embodiments, process 2900 may include one or more steps in addition to those shown in FIG. 29. For example, as described above, process 2900 may be performed to reach compliance with a target planogram. Accordingly, process 2900 may further include receiving a target planogram, such as target planogram 2750. Accordingly, determining the planned first adjustment to the determined first placement of products on the at least part of the shelf may be based on the target planogram and the planned first adjustment may be configured to be a step in changing the determined first placement of products on the at least part of the shelf towards the target planogram. Similarly, determining the planned second adjustment to the determined second placement of products on the at least part of the shelf may be based on the target planogram and the planned second adjustment may be configured to be an additional step in changing the determined second placement of products on the at least part of the shelf towards the target planogram. In some embodiments, process 2900 may further include confirming compliance with the target planogram has been met. For example, process 2900 may include receiving a third image of the at least part of the shelf captured after the second information was provided and analyzing the third image to determine compliance with the target planogram.

As discussed above, the disclosed systems may be used for managing modifications to planograms. For example, when a target planogram is known in advance, the disclosed systems may break a large planogram remodeling task into small manageable tasks, thereby reducing the burden on store associates. In some embodiments, the disclosed systems may be used to optimize the resulting planogram. For example, the system may suggest an incremental planogram update, as described above, and may assess a result or effect of the incremental update. This assessment may provide insight for later incremental updates. In some embodiments, a target planogram may not be identified in advance, and through assessing incremental updates, an optimized target planogram may be achieved. Alternatively, or additionally, even when a target planogram is established, the target planogram may be altered or adjusted through the optimization process. The disclosed embodiments therefore provide, among other advantages, improved efficiency, convenience, and functionality over prior art planogram compliance and inventory management systems.

Figure 30A:
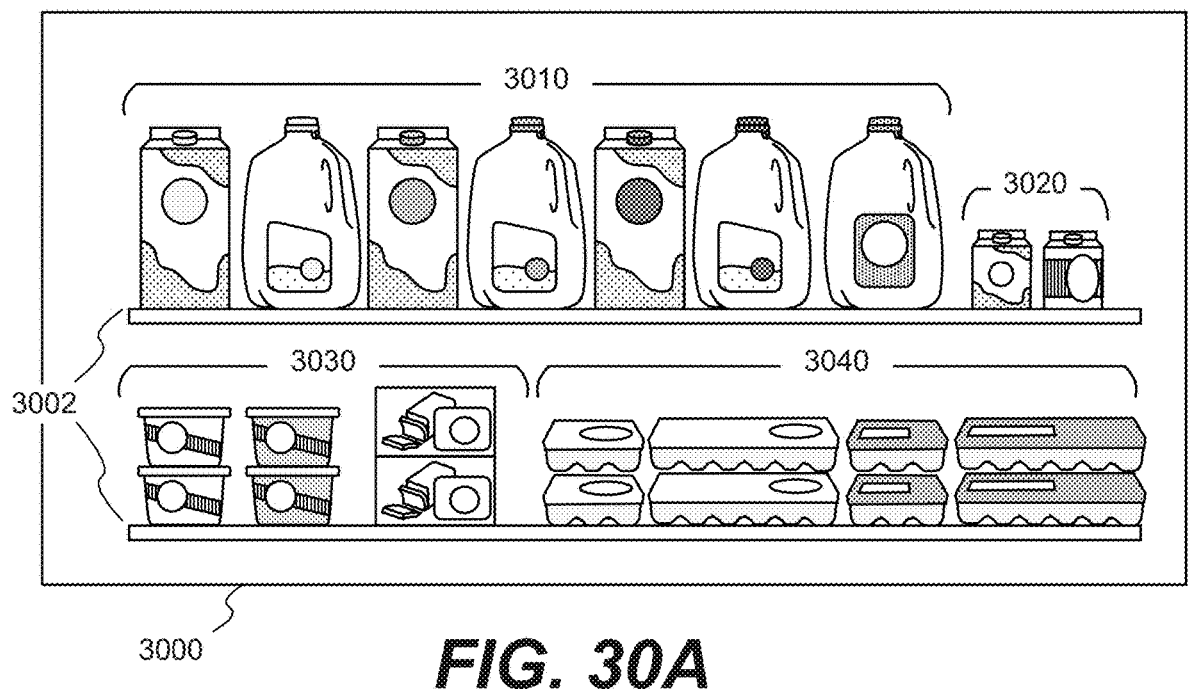
FIG. 30A illustrates an example image including at least part of a shelf, consistent with the present disclosure.

As described above, the disclosed embodiments may include receiving images of at least part of a shelf. FIG. 30A illustrates an example image 3000 including at least part of a shelf 3002, consistent with the present disclosure. Consistent with the present disclosure, shelf 3002 may be the same as shelf 2702 described above. Accordingly, any of the methods or features described above with respect to FIGS. 27A, 27B, 28A, 28B, 28C, 28D and/or 29 may also apply to shelf 3002. Image 3000 may be acquired by an image sensor included in the retail store, such as image sensor 310 included in capturing device 125. The capturing device may take various forms or may be mounted in various locations, as described throughout the present disclosure. As described above with respect to image 2700, image 3000 may be captured by a capturing device mounted adjacent to shelf 3002, by a handheld device, by a robotic device, or any other form of capturing device described herein.

Image 3000 may include at least part of shelf 3002, as shown. In this example, shelf 3002 may be a shelving unit at least partially dedicated to dairy products within a retail store. For example, shelf 3002 may include milk products 3010, cream products 3020, butter products 3030, and egg products 3040. Shelf 3002 and products 3010, 3020, 3030, and 3040 are provided by way of example, and the disclosed embodiment are not limited to any particular type of display or product. In some embodiments, server 135 may be configured to analyze an image to determine a placement of products on the shelf (or part of the shelf), as described above. For example, image processing unit 130 may use various image analysis techniques to detect products 3010, 3020, 3030, and 3040 on shelf 3002. In some embodiments, the image analysis may include calculating one or more convolutions of the image, which may facilitate determining the placement of products. For example, in response to a first value of a calculated convolution of at least part of the image, one placement of products on shelf 3002 may be determined, and in response to a second value of the calculated convolution, another placement of products on shelf 3002 may be determined. This may include transposed convolutions, dilated convolutions, separable convolutions, flattened convolutions, grouped convolutions, shuffled group convolutions, pointwise grouped convolutions, or any other form of convolution and may be performed in single or multiple channels.

As described above, server 135 may determine a planned adjustment to the placement of products on the shelf. For example, the adjustment may include removing a particular product from a shelf, adding a new product to a shelf, changing a placement location of one or more products from the shelf, rotating one or more products, changing a size of a portion of the shelf dedicated to a particular product, or any other modifications to product placement or orientation.

Figure 30B:
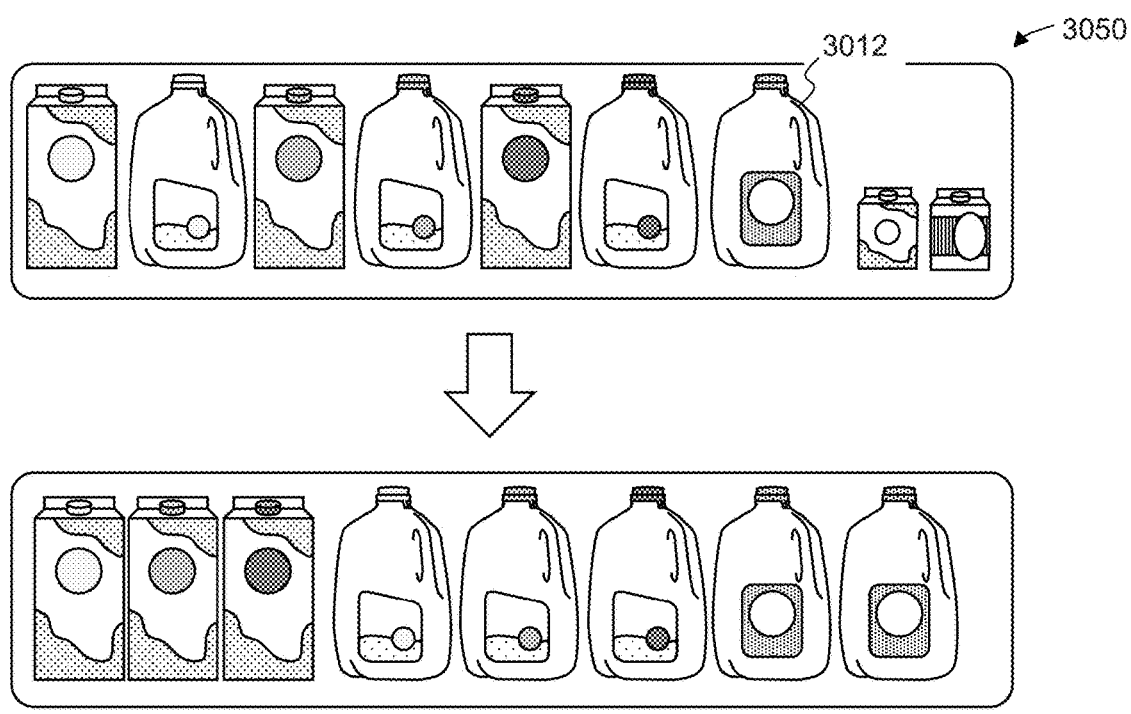
FIG. 30B illustrates an example adjustment that may focus on rearrangement of the top portion of shelf, consistent with the present disclosure.

FIG. 30B illustrates an example adjustment 3050 that may focus on rearrangement of the top portion of shelf 3002, consistent with the present disclosure. In particular, adjustment 3050 may be an adjustment of the placement of products 3010 and 3020. For example, adjustment 3050 may include rearranging the positions of products 3010 and removing products 3020 from the shelf. Adjustment 3050 may further include expanding the portion of shelf 3002 dedicated to product 3012. In some embodiments, adjustment 3050 may be determined in reference to a target planogram. For example, the target planogram may dictate that products 3010 and 3020 be arranged as would result from implementing adjustment 3050.

Alternatively, or additionally, adjustment 3050 may be determined without reference to a particular planogram. In these embodiments, the adjustments may be determined in various ways. In some embodiments, adjustment 3050 may be determined based on one or more rules. For example, a rule may be defined to perform actions on particular product types, such as group like products together, move products of a particular type to a certain location, increase or decrease space dedicated to particular product types, or the like. As used herein, a product type refers to any form of classification or category of products. In some embodiments, the rule may be based on sales data, inventory data, or other forms data. Accordingly, the particular product type may refer to products having a certain popularity, products in certain price ranges, products with certain inventory levels, or the like. Therefore, a rule may be defined to move popular products to an average eye level for customers, or to decrease the portion of a shelf dedicated to items for which an inventory amount is relatively low. The rules described herein are provided by way of example, and one skilled in the art would recognize that many other types of rules could be defined.

Various other methods for determining adjustment 3050 may be used. In some embodiments, adjustment 3050 may be determined at least partially based on an input from a user. For example, a store associate, manager, customer, secret shopper, or other entity may provide input that may suggest an adjustment to be implemented. The input may be a suggestion defining adjustment 3050 (e.g., a request to make a particular product adjustment), or may be information from which adjustment 3050 is derivable (e.g., a survey result, a customer complaint, an employee request, etc.). In some embodiments, adjustment 3050 may be random or semi-random. For example, server 135 may suggest random incremental adjustments and may gauge an effect of the adjustment, as described in greater detail below. In some embodiments, the adjustment may be based on other data, such as results from other products, adjustments made in other retail locations, or the like.

Instructions to implement adjustment 3050 may be provided, consistent with the embodiments disclosed above. For example, server 135 may generate instructions or other forms of information that may indicate that the adjustment is to be performed. The information may include any combination of alphanumerical text, symbols, images, graphical representations, and/or other elements for indicating the adjustment. For example, the information may include text-based instructions, an intermediate target planogram, a diagrammatic representation of an adjustment, or various other means for representing adjustments, including combination of two or more forms of instructions.

Further, as described above, the information may be provided in any manner that would result in implementation of the planned adjustment. In some embodiments, the information may be presented to store associates of the retail store. For example, server 135 may transmit the information to an associate device, such as devices 145C and/or 145D, which may present the information to a store associate. This may include displaying providing a notification indicating the planned adjustment, displaying images indicating the planned adjustment (e.g., diagrams, planograms, etc.), adding a task associated with the planned adjustment to a list of tasks to be completed by the associate, adding a calendar entry or other scheduling entry associated with the planned adjustment, or any other manner of presenting the information. Additionally or alternatively, the device information may be presented audibly to the store associate. As another example, the information may be presented to a manager of the retail store. For example, server 135 may transmit the information to a store management computing device, which may be used to manage planogram compliance, restocking tasks, or other operations of the retail store. The management device may in turn provide instructions to a store associate. In some embodiments, the information may be presented to a manager of the retail store via the management device and the manager may provide the instructions to the store associates (e.g., through associate devices).

Figure 31A:
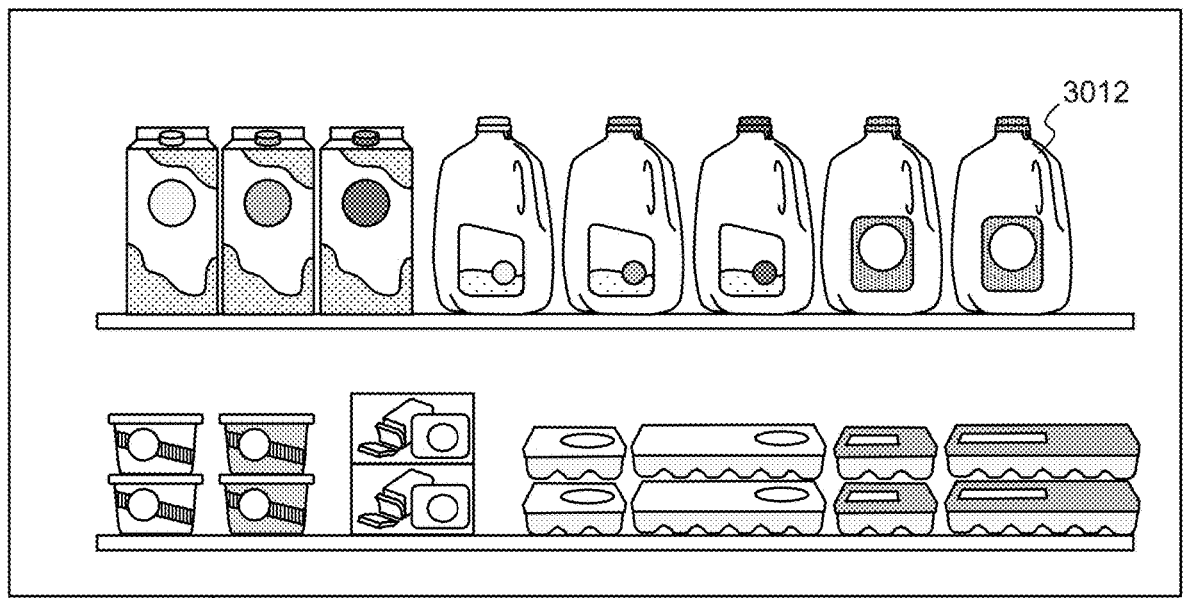
FIG. 31A illustrates an additional example image captured after instructions for implementing an adjustment were generated, consistent with the present disclosure.

In some embodiments, the disclosed embodiments may further include receiving an additional image to assess or confirm implementation of an adjustment. FIG. 31A illustrates an additional example image 3100 captured after instructions for implementing an adjustment were generated, consistent with the present disclosure. Similar to image 3000, image 3100 may be acquired by an image sensor included in the retail store, such as image sensor 310 included in capturing device 125. Image 3100 may include at least a portion of shelf 3002, as shown. In this example, image 3100 may be captured after instructions to implement adjustment 3050 have been provided. Accordingly, image 3100 may be used to verify whether adjustment 3050 has been implemented yet or has been implemented correctly. Using one or more of the various image processing techniques described herein (e.g., with respect to images 2700, 2800, and/or 3000), server 135 may identify products in image 3100 and determine their placements relative to shelf 3002. The placement of products in image 3100 may be compared to the target placement defined by adjustment 3050 to determine whether adjustment 3050 was properly executed. In some embodiments, server 135 may generate further instructions to perform an adjustment to the placement of products on shelf 3002 until the target placement of products defined in adjustment 3050 is reached. Alternatively, or additionally, server 135 may take other actions such as generating an alert or notification that adjustment 3050 has not been implemented. Server 135 may continue to capture images periodically until adjustment 3050 has been performed. In some embodiments, server 135 may proceed with further analysis described below despite the placement of products not matching with adjustment 3050. In the example shown in FIG. 31A, the product placements are consistent with adjustment 3050.

Server 135 may analyze an impact of the resulting placement of products identified in an image, such as image 3100. As noted above, this placement may reflect adjustment 3050 having been performed or may be different than the target positions defined by adjustment 3050. Server 135 may receive data indicative of an impact of the placement of products shown in image 3100 and may analyze this data to determine the impact. This impact may be used to determine subsequent planned adjustments for the products. As used herein, an impact refers to any effect or result that may be attributable to placement of products on a shelf. As described in further detail below, the impact may be reflected in product or store sales performance, customer satisfaction, employee morale, employee or store efficiency, or any other metrics related to a product or retail environment that may be affected.

Figure 31B:
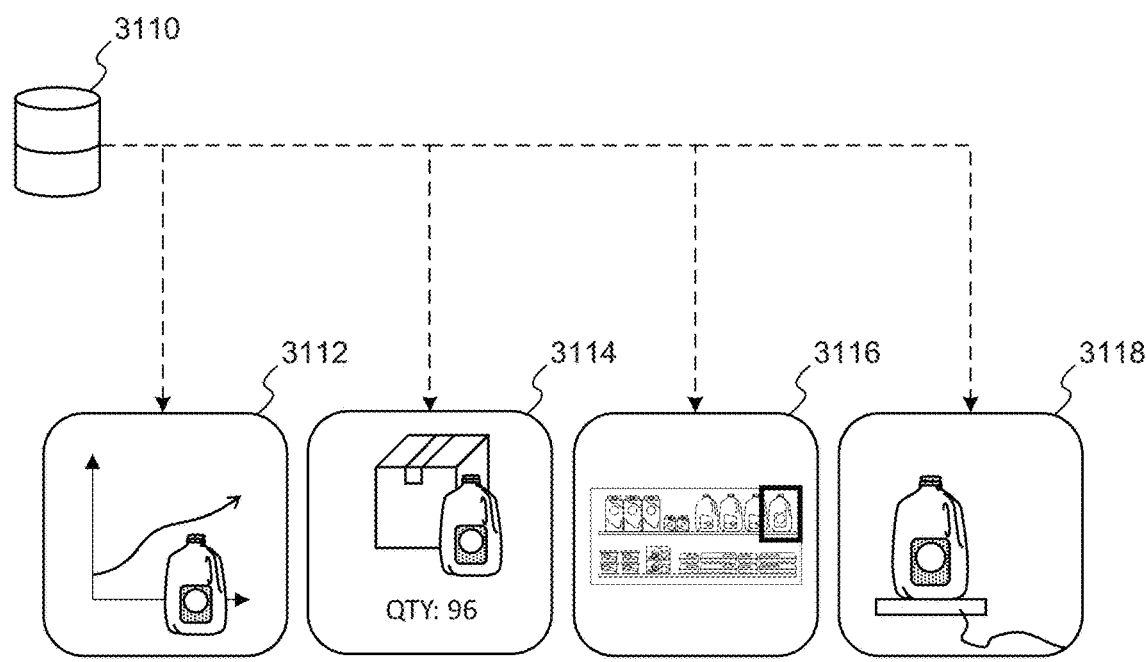
FIG. 31B illustrates example data that may indicate an impact of an adjusted product placement, consistent with the present disclosure.

FIG. 31B illustrates example data that may indicate an impact of an adjusted product placement, consistent with the present disclosure. In particular, server 135 may access data such as sales data 3112, inventory data 3114, image data 3116, and/or sensor data 3118. The various forms of data may be received or accessed from a data source 3110. In some embodiments, data source 3110 may be a database (such as database 140, an external database, a cloud-based data structure, etc.), as shown in FIG. 31B. Alternatively, or additionally, data source 3110 may be a device included or in communication with server 135. For example, data source 3110 may include a sensor positioned in the store, an image capture device (e.g., capturing device 125), a computing device (e.g., device 145A, 145B, 145C, and/or 145D), or the like. In some embodiments data source 3110 may include multiple data sources. The configuration of data source 3110 may depend on the particular implementation of the disclosed embodiments and the type of data being analyzed.

Sales data 3112 may include any data associated with the sale of products. For example, sales data 3112 may include monetary sales information (e.g., revenue or profit data, product pricing), sales volume (e.g., a number of products sold, sales growth, etc.), customer reviews, customer traffic (e.g., a number of customers visiting a store, a number of customers visiting shelf 3002, a number of customers looking at a particular product, etc.), or any other data related to product sales. Sales data 3112 may be data pertaining to a particular store, such as the retail store in which shelf 3002 is located. For example, server 135 may analyze sales data 3112 to determine whether reorganizing products 3010 as suggested in adjustment 3050 resulted in an increase in sales volume for these products. Server 135 may also analyze the sale of other products (e.g., products not directly repositioned or adjusted in adjustment 3050) to determine whether adjustment 3050 had a positive or negative impact on sales for the other products. Additionally, or alternatively, sales data 3112 may include data from other stores, such as a global sales data for an organization, sales data for nearby stores, competitor sales data, or other data. Accordingly, sales data associated with shelf 3002 (e.g., for products on shelf 3002, the retail store including shelf 3002, etc.) may be compared with other sales data to determine an effect of adjustment 3050. For example, even if sales of a particular product decrease for the store that includes shelf 3002, the decrease may be less than a global decrease in sales for the product indicated by sales data 3112, which may indicate a relatively positive effect of adjustment 3050. The sales data and types of analysis are provided by way of example, and one skilled in the art would recognize many other forms of sales data and analysis of the data could be used.

Inventory data 3114 may include any form of data associated with an inventory of products. In some embodiments, inventory data 3114 may include a number of products stored in a store room or other storage area associated with a retail store. For example, inventory data 3114 may refer to an inventory of products 3010, 3020, 3030, and/or 3040 included in a storage area of the retail store including shelf 3002. In this context, a storage area may refer to any location in which a plurality of products may be stored. The storage area may be a storage room, a portion of a shelving unit within the retail store dedicated to storage (e.g., a top shelf, etc.), or any other suitable storage location. In other embodiments, inventory data 3114 may refer to off-site storage, for example, in a warehouse, in a delivery truck, or the like. In some embodiments, inventory data 3114 may include data pertaining to inventory management. For example, this may include a speed or efficiency at which products are restocked by store associates. This inventory data may provide insight into an impact of adjustment 3050. For example, server 135 may determine how the adjusted product placement affects how quickly items are restocked, a frequency at which products are re-ordered, an amount of a particular product in inventory, or the like.

Image data 3116 may include any information that may be attained from images. For example, this may include images of shelf 3002, such as image 3100 described above. In some embodiments, server 135 may monitor shelf 3002 to assess an impact of adjustment 3050. For example, this may include periodically analyzing captured images, analyzing a video stream, generating requests to capture images, or any other way in which an impact may be determined from image data. The images may be captured by the same image capture device that captured image 3100, or may be a different device. For example, server 135 may prompt a store associate to capture an image of shelf 3002, or a customer may capture an image of shelf 3002 using output device 145D.

Various types of information may be obtained from the images. In some embodiments, server 135 may determine placement or movement of items on the shelf. For example, if items are frequently taken from the shelf (or returned to the shelf) it may indicate an effect on the customer's impression of or desire for the products. Other examples may include how long a particular item stays on the shelf, planogram compliance (e.g., how accurately items are restocked according to the current planogram), how often products are restocked, whether customers return the product to the same location they took it from, how long a portion of a shelf is empty, or other information that may be gathered about placement of products on the shelf. The images may also detect an interaction between customers and the shelf or products. For example, the images may be used to detect, customers touching the products, customers looking at the products (e.g., which portion of shelf 3002 customers look at, etc.), customers walking by the products, customer traffic or movement through a store, or other interactions. Server 135 may similarly detect interactions with other entities, such as managers, store associates, secret shoppers, third party vendors, or the like. In some embodiments, the images may not include shelf 3002 but may be images of other relevant areas. For example, this may include an entrance to a retail store (e.g., detecting customer traffic), a stock room (e.g., for tracking inventory and/or product movement), a break room (e.g., detecting employee morale through facial expressions), or various other image data.

Sensor data 3118 may include any information that may be gathered using sensors. In this context, sensors may include any form of device or instrument for measuring data associated with products. In on example, such sensors may be configured to be placed between a shelf and products placed on the shelf. In some examples, embodiments may use one or more of pressure sensors, weight sensors, light sensors, resistive sensors, capacitive sensors, inductive sensors, vacuum pressure sensors, high pressure sensors, conductive pressure sensors, infrared sensors, photo-resistor sensors, photo-transistor sensors, photo-diodes sensors, ultrasonic sensors, microphones, motion sensors, or the like, as described throughout the present disclosure. These sensors may be used to detect placement of products on a shelf, products being removed or returned from the shelf, customer traffic near a shelf, customer or employee speech (indicating customer experience, employee morale, etc.), restocking events, or other events or characteristics that may be detected through sensors. While various events or characteristics may be described as being determined from one type of data, it is understood that they may be similarly obtained from other types of data, including sales data 3112, inventory data 3114, image data 3116, and sensor data 3118. For example, a rearrangement event (i.e., products being rearranged on a shelf) may be determined from captured images but may also be determined from sensor data, such as weight or pressure sensors indicating products have been removed and/or added to the shelf. Further, while sales data 3112, inventory data 3114, image data 3116, and sensor data 3118, are provided by way of example, various other data may be analyzed, including customer experience data (e.g., online reviews, survey results, etc.), employee feedback, manager feedback, or various other forms of data.

Figure 31C:
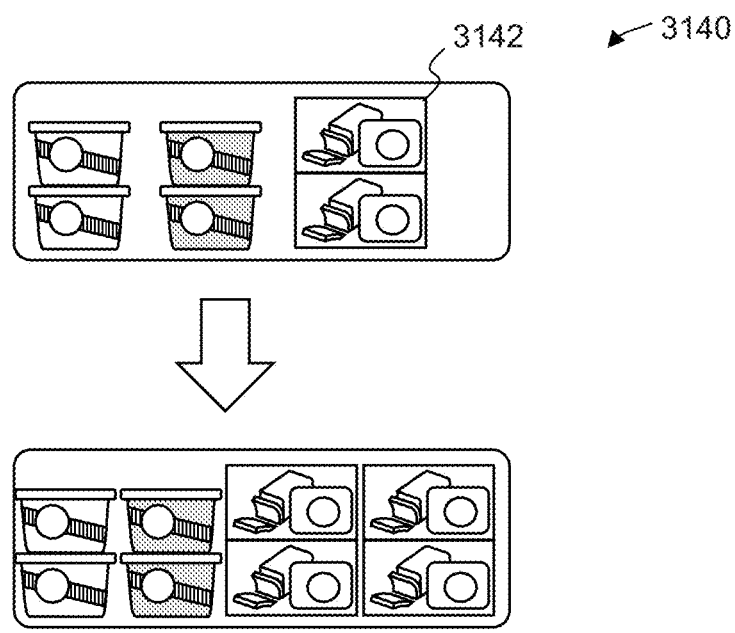
FIG. 31C illustrates another example adjustment that may be generated based on a determined impact, consistent with the present disclosure.

Consistent with the disclosed embodiments, server 135 may determine subsequent adjustments to the placement of products on shelf 3002 based on the determined impact (or an absence of an impact). FIG. 31C illustrates another example adjustment 3140 that may be generated based on a determined impact, consistent with the disclosed embodiments. As shown in FIG. 31C, adjustment 3140 may include a recommendation to increase a portion of shelf 3002 dedicated to product 3142. This may be based on an impact detected in response to adjustment 3050, as described above. For example, server 135 may determine a positive impact resulting from increasing a portion of shelf 3002 dedicated to product 3012 as implemented in adjustment 3050. Accordingly, adjustment 3140 may attempt to obtain similar positive results with respect to product 3142. Adjustment 3140 may be determined based on the impact of adjustment 3050 in various other ways, such as avoiding a negative impact from adjustment 3050, trying an alternative approach for achieving a result arising from or sought out by adjustment 3050, counteracting an impact from adjustment 3050, augmenting an impact of adjustment 3050, or the like.

In some embodiments, one or more of the steps described above may be repeated to reach an optimized placement of products on the shelf. For example, server 135 may iterate this process multiple times by determining an adjustment, analyzing an impact of the adjustment, and generating subsequent adjustments based on the determined impact. Accordingly, this iterative process may be used to test incremental changes to a planogram and adjust subsequent changes to reach an optimized planogram (or to make continuous or periodic improvements over time). As a result, store associates may be tasked with making relatively small modifications to the placement of products on the shelf that are tailored toward achieving a desired result. This may avoid having store associates make large changes to the placement of products that may or may not be effective.

Further, in some embodiments, resulting impacts from multiple adjustments may be used to generate a target planogram. For example, impacts resulting from two or more adjustments may be analyzed together to determine an overall desired or target planogram. Accordingly, a sample of impacts resulting from adjustments to planograms may be analyzed and extrapolated into an overall planogram. This desired planogram may be output as a result of the optimization process. In some embodiments, the desired planogram may be determined using an optimization algorithm. For example, the impacts from a series of adjustments may be input into a greedy algorithm such that an optimal solution may be reached. In some embodiments, server 135 may access determined impacts from multiple products, shelves, or stores over time, which may be input into an optimization algorithm to achieve a more robust solution.

Figure 32:
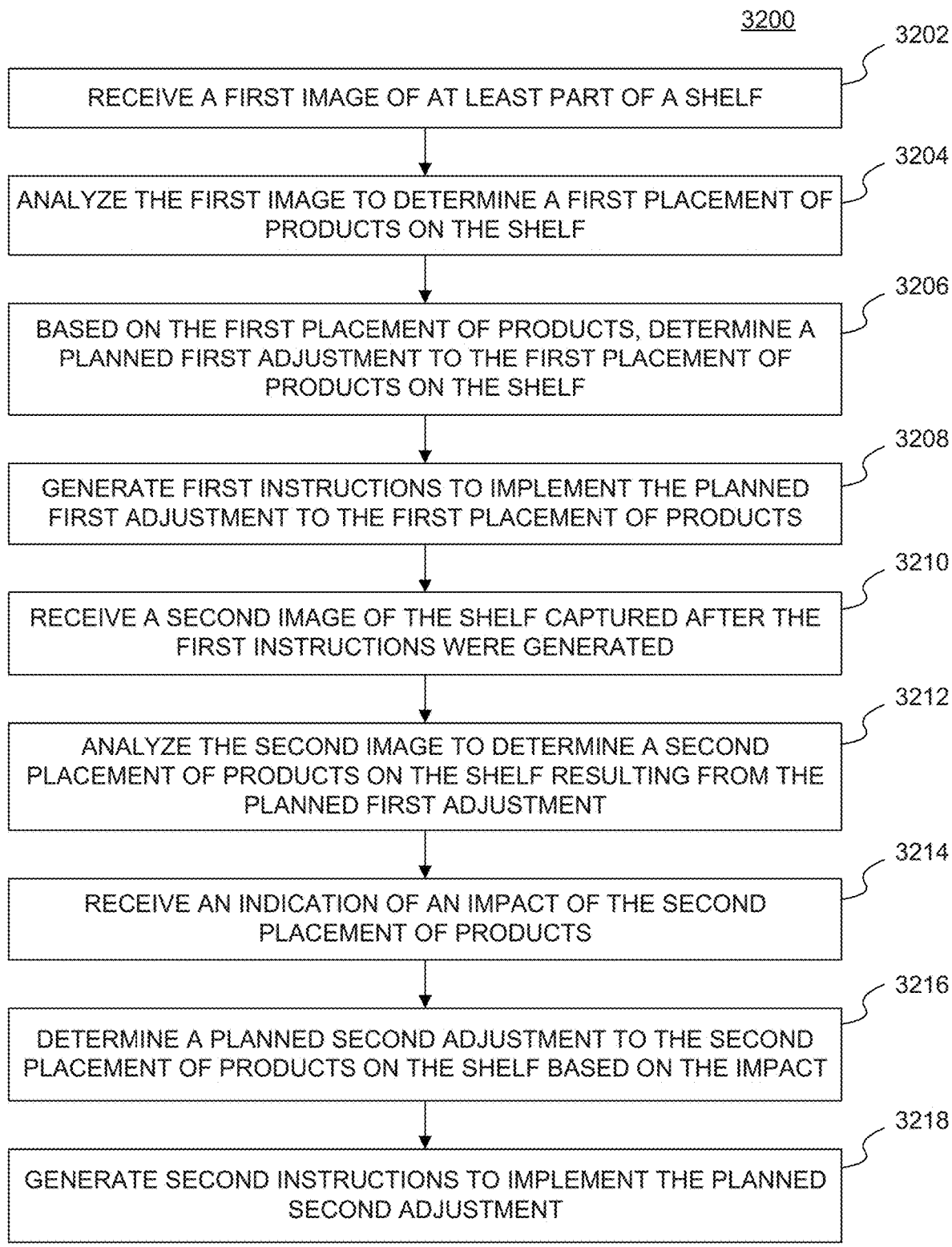
FIG. 32 provides a flowchart of an exemplary method for testing of planograms, consistent with the present disclosure.

FIG. 32 provides a flowchart of an exemplary method for testing of planograms, consistent with the present disclosure. Process 3200 may be performed by at least one processing device of a server, such as processing device 302, as described above. In some embodiments, some or all of process 3200 may be performed by a different device associated with system 100. In some embodiments, a non-transitory computer readable medium may contain instructions that when executed by a processor cause the processor to perform process 3200. Further, process 3200 is not necessarily limited to the steps shown in FIG. 32, and any steps or processes of the various embodiments described throughout the present disclosure may also be included in process 3200, including those described above with respect to FIGS. 30A, 30B, 31A, 31B, and 31C.

In step 3202, process 3200 may include receiving a first image of at least part of a shelf. For example, step 3202 may include receiving image 3000, which may include at least a portion of shelf 3002, as described above. The first image may be captured by at least one image sensor associated with a retail environment in which the shelf is included. For example, the first image may be acquired by at least one image sensor mounted adjacent to the shelf on an additional shelf. As another example, the first image may be acquired by at least one image sensor of a personal mobile device. The personal mobile device may be held by a store associate, customer, visitor, manger, crowdsourcing participant, or other individuals as described above. In some embodiments, the first image may be acquired by at least one image sensor of a robotic device.

In step 3204, process 3200 may include analyzing the first image to determine a first placement of products on the at least part of the shelf. For example, image 3000 may be analyzed to determine a placement of products 3010, 3020, 3030, and/or 3040. The first placement of products may be determined based on one or more image analysis techniques as described throughout the present disclosure. In some embodiments, step 3204 may include determining that the first image is insufficient to determine the first placement and causing a store associate, manager, robot, or other entity to capture an additional image of at least a portion of the at least part of the shelf. In some embodiments, some or all of process 3200 may be performed in conjunction with process 2900 described above. For example, step 3204 may use the analysis of step 2904 described above to analyze the first image and determine the first placement of products.

In some embodiments, a machine learning model may be trained using training examples to determine placement of products on at least part of a shelf from images, as described above with respect to FIG. 29. For example, step 3204 may include using the trained machine learning model to analyze the first image received in step 3202 and determining the first placement of products on the at least part of the shelf. As another additional example, step 3212 (described below) may include using the trained machine learning model to analyze the second image received in step 3210 and determining the second placement of products on the at least part of the shelf. In some embodiments data captured using one or more sensors positioned between the at least part of the shelf and products placed on the at least part of the shelf may be analyzed to determine placement of products on the at least part of the shelf. For example, in addition to or as an alternative to the usage of image analysis, step 3204 may include analyzing data captured using one or more sensors positioned between the at least part of the shelf and products placed on the at least part of the shelf to determine the first placement of products on the at least part of the shelf. Further, in addition to or as an alternative to the usage of image analysis, step 3212 (described below) may include analyzing data captured using one or more sensors positioned between the at least part of the shelf and products placed on the at least part of the shelf after the first instructions were provided to determine the second placement of products on the at least part of the shelf.

In step 3206, process 3200 may include determining, based on the determined first placement of products, a planned first adjustment to the determined first placement of products on the at least part of the shelf. For example, this may include determining adjustment 3050, as described above. The planned first adjustment may include various actions affecting the position, quantity, orientation, or other properties of the physical placement of products on the shelf. For example, this may include removing a particular product type from the shelf, adding a new product type to the shelf, changing a placement location of a particular product type on the shelf, changing a size of a portion of the shelf dedicated to a particular product type, or similar actions. In some embodiments, the planned first adjustment may be configured to coincide with other events, as described in further detail above. For example, the planned first adjustment may be configured to be performed as part of a restocking task or similar operational task. In one example, in response to one placement of products determined in step 3204, step 3206 may include determining one adjustment, and in response to another placement of products determined in step 3204, step 3206 may include determining another adjustment.

In step 3208, process 3200 may include generating first instructions to implement the planned first adjustment. For example, step 3208 may include generating instructions to implement adjustment 3050, as described above. In some embodiments, providing the first instructions may include transmitting instructions to a store associate of a retail store in which the shelf is included. For example, this may include transmitting instructions to a computing device of the retail store, such as devices 145C and/or 145D.

In step 3210, process 3200 may include receiving a second image of the at least part of the shelf captured after the first instructions were generated. For example, step 3210 may include receiving image 3100, which may be captured after instructions to implement adjustment 3050 were generated. As with the first image, the second image may be captured by at least one image sensor associated with the retail environment in which the shelf is included. For example, the second image may be acquired by at least one image sensor mounted adjacent to the shelf on an additional shelf, at least one image sensor of a personal mobile device, or at least one image sensor of a robotic device. In some embodiments, the second image may not necessarily be acquired by the same device as the first image and may be acquired by a different device.

In step 3212, process 3200 may include analyzing the second image to determine a second placement of products on the at least part of the shelf. As with the first placement of products, the second placement of products may be determined based on one or more image analysis techniques as described throughout the present disclosure. Further, step 3212 may include determining that the second image reflects a failed execution of the planned first adjustment, as described above. Accordingly, step 3212 may include generating additional instructions to implement the planned first adjustment to the first placement of products. In some embodiments, step 3212 may use step 2912 (described above with respect to FIG. 29) to analyze the second image and determine the second placement of products.

In step 3214, process 3200 may include receiving an indication of an impact of the second placement of products. The indication of the impact may be received in various ways. For example, the indication of the impact may be based on sensor data, such as an analysis of input from a pressure sensor positioned on the at least part of the shelf, a weight sensor connected to the at least part of the shelf, a touch sensor positioned on the at least part of the shelf, a proximity sensor positioned on or near the at least part of the shelf, or various other forms of sensors. In some embodiments, the sensor may be an image sensor. Accordingly, the impact of the second placement of products may be based on an analysis of images of the at least part of the shelf Based on the sensor data, various events or characteristics of the products on the shelf may be determined, which may indicate the impact. For example, the impact of the second placement of products may be based on a product being at least one of returned to or taken from the at least part of the shelf, a restocking event associated with the at least part of the shelf, a rearrangement event of the at least part of the shelf, or the like. As another example, the indication of the impact of the second placement of products may be based on an analysis of sales data, as described above.

In step 3216, process 3200 may include determining a planned second adjustment to the second placement of products on the at least part of the shelf. The planned second adjustment may be determined based on the impact determined in step 3214. For example, step 3216 may include determining adjustment 3140, which may be based on an impact of adjustment 3050 as described above. The planned second adjustment may be determined to achieve a similar impact, avoid a similar impact, augment the impact, counteract or reduce the impact, determine whether other adjustments result in similar impacts, or other desired results that may be informed by the impact. Step 3216 may include the use of any form of optimization algorithm to determine a planned second adjustment to the second placement of products on the at least part of the shelf, such as genetic algorithms, gradient descent algorithms, and so forth. In one example, a gradient of the impact in a mathematical space of planograms may be estimated based on the first placement of products determined in step 3204, the second placement of products determine in step 3212, and the impact of step 3214. Step 3216 may include using the estimated gradient to determine the planned second adjustment to the second placement of products on the at least part of the shelf. In some examples, the second adjustment may be expected to cause a positive impact, for example based on the impact of the second placement of products.

In step 3218, process 3200 may include generating second instructions to implement the planned second adjustment. For example, as with the first adjustment, step 3218 may include transmitting instructions to a store associate of a retail store in which the shelf is included. For example, this may include transmitting instructions to a computing device of the retail store, such as devices 145C and/or 145D.

In some embodiments, process 3200 may further include various optimization steps for optimizing product placement on the shelf. In some embodiments, this may include repeating one or more steps described above as an iterative process. For example, process 3200 may include receiving a third image of the at least part of the shelf captured after the second instructions were generated and analyzing the third image to determine a third placement of products on the at least part of the shelf, the third placement of products resulting from the planned second adjustment. Process 3200 may then include receiving an indication of an impact of the third placement of products. Further, a planned third adjustment may be determined based on the impact of the third placement of products, and so on.

In some embodiments, multiple impacts may be analyzed together to determine a desired planogram, as described above. For example, process 3200 may include using the second placement of products, the indication of the impact of the second placement of products, the third placement of products and the indication of the impact of the third placement of products to determine a desired planogram. In some embodiments, determining the desired planogram includes using an optimization algorithm, such as a greedy algorithm. Process 3200 may further include generating information related to the desired planogram. For example, the information related to the desired planogram may include a recommendation to implement the desired planogram and process 3200 may further include transmitting the recommendation to a store associate of a retail store in which the shelf is included. In some embodiments, the information related to the desired planogram includes an expected impact of the desired planogram. For example, the information related to the desired planogram may indicate the desired planogram is optimized to improve sales for a retail store, improve sales for a particular product or product type, improve efficiency for restocking products, increase planogram compliance, increase or reduce inventory of a product in storage, or other desired outcomes. In some embodiments, process 3200 may include generating multiple desired planograms with different desired outcomes. For example, the determined impacts may be input into multiple optimization algorithms (or a single optimization algorithm designed to provide multiple solutions) to generate multiple optimization outcomes. Accordingly, a manager, store associate, or other entity may be presented with multiple options for planograms with different outcomes or benefits.

In some situations, a person may use an application, such as on a smartphone, to perform a task in a retail store or other environment, such as restocking an item, rearranging items, adjusting a price, and other tasks described herein. In some situations, the possibility of a reward may be offered to the person to incentivize performance of the task, and performance to a certain degree of quality. In some cases, a person may accept a task at a user device, and may transmit confirmation of task completion to another device, allowing for remote tracking of task performance. In these scenarios, it can also be advantageous to use image processing techniques to determine whether a task has been performed, and whether the task has been performed to a certain degree of quality. Information determined through image analysis may then be used to determine an appropriate reward for performance of the task, which may be awarded to the person the user device. The embodiments described below, operable with other embodiments disclosed herein, discuss these techniques and how they may be implemented to provide task tracking and reward correlation.

Figure 33:
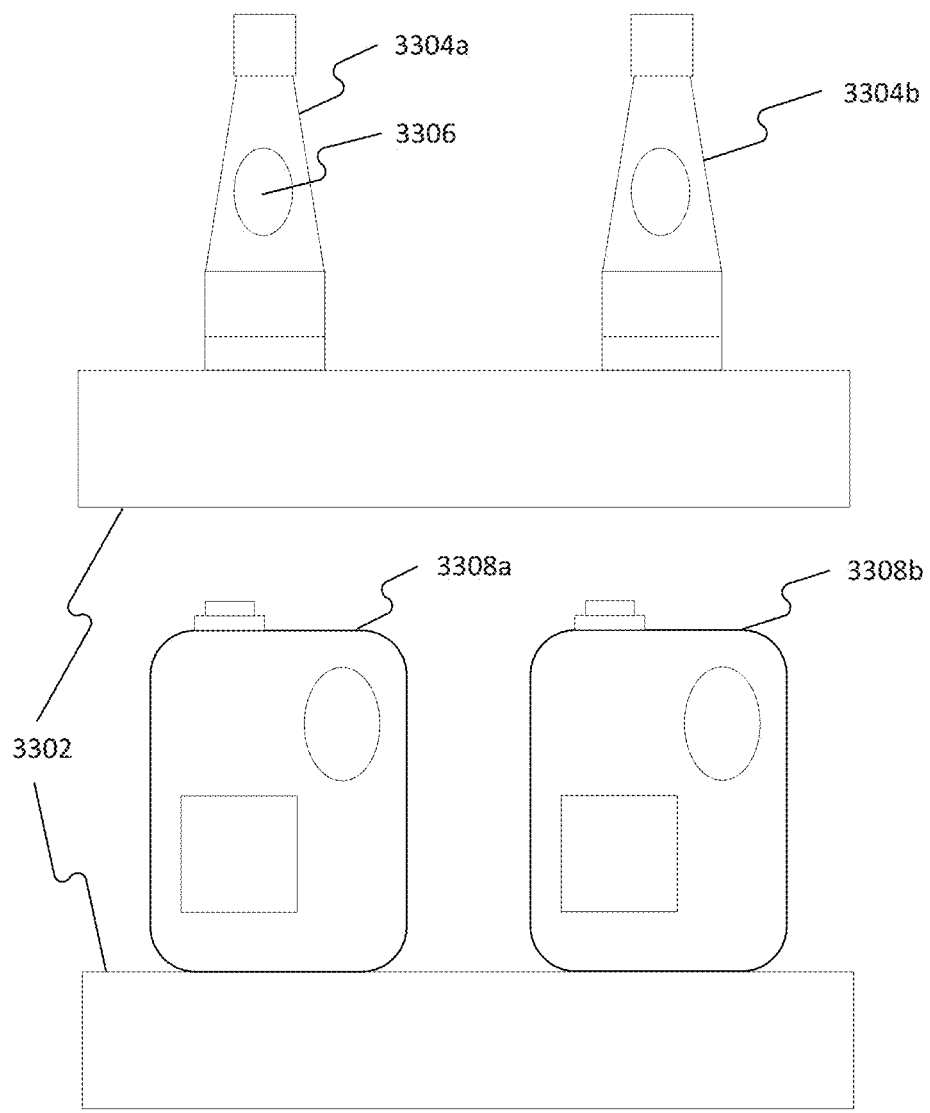
FIG. 33 is a visual depiction of an exemplary shelf view, consistent with the present disclosure.

FIG. 33 depicts an exemplary shelf view 3300, which may be represented in a captured image (for example, in an image captured in response to a reward offering). In some embodiments, shelf view 3300, or another similar shelf view, may be represented by one or more images, which may have been captured by a capturing device 125, output device 145, or any other device connected to or including an image sensor. In some embodiments, an image of shelf view 3300 may be captured by an image sensor after a notification of a task request (which may indicate a potential for a reward) was delivered to the device, or after at least a selected time passed since such notification was delivered to the device. In one example, the selected time may be selected based on one or more of a type of the task, a parameter of the task, a product corresponding to the task, a location corresponding to the task, a current time, a person corresponding to the device, and so forth. Additionally or alternatively, an image of shelf view 3300 may be captured by an image sensor after a determination that a device having the image sensor is within a predetermined distance of, and/or is beyond a predetermined distance of (e.g., to capture a full shelf or product grouping), at least one shelf and/or at least one product. Additionally or alternatively, an image of shelf view 3300 may be captured after an indication of a completeness of the task is received (for example, from the device, from a different device, from a user, and so forth). Any object, structure, or other physical thing in exemplary shelf view 3300 may be captured in an image and analyzed, as described below, such as with respect to processes 3400 and/or 3500.

Shelf view 3300 may include one or more shelves 3302, which may be affixed to a shelving unit, wall, or other structure. While shelves 3302 are shown here as an example, it is appreciated that other structures for holding products may be shown instead, such as displays, containers, drawer units, bin units, baskets, pegboards, etc. For example, shelves 3302 may hold a product that may be associated with a task for which a reward is being offered. In some embodiments, the product and/or task may be associated with a retail store. In some embodiments, shelves 3302 may be situated behind a door (e.g., a refrigerator or freezer door) or other barrier. In some embodiments, shelves 3302 may support one or more products, which may be products of a same or different type.

Shelf view 3300 may include a number of products, such as product 3304a, product 3304b, product 3308a, and/or product 3308b. In some embodiments, some products in shelf view 3300 may be associated with a task (e.g., for which a reward is offered), and others may not be associated with the task (and may or may not be associated with other tasks). For example, product 3304a and product 3304b may be associated with a task, but products 3308a and 3308b may not be associated with the task. Any combination of products in a retail store is possible. In some embodiments, a shelf 3302 may support products of a same type. For example, product 3304a and product 3304b may be of a same product type, and product 3308a and product 3308b may be of a same product type. A same product type may be considered any combination of commonalities between products, such as a same product identifier (e.g., Universal Product Code, or UPC, International Article Number, or IAN, European Article Number, or EAN, etc.), a same brand, a same product category (e.g., cosmetics, food, electronics, etc.), and/or a same purpose (e.g., electrical cord for charging a USB device, a cake mix, a wrench, etc.).

In some embodiments, a product, such as product 3304a, may have a product label 3306, which may be associated with a task (e.g., for which a reward is offered). In the example of FIG. 33, product label 3306 may be attached to the product. In other examples, product label 3306 may be attached to a part of a shelf or to other objects (such as displays, containers, etc.) in the retail store that is associated with the product (e.g., stocks the product). A product label may include any information that may distinguish one product from another, which a device having at least one processor may use to differentiate between relevant and irrelevant information (as discussed below). For example, a product label may include any combination of a logo, a barcode, a quick response (QR) code, a word, a character, a shape, a color, a placement location of the label relative to the product, or any other information detectable by an image sensor.

Figure 34:
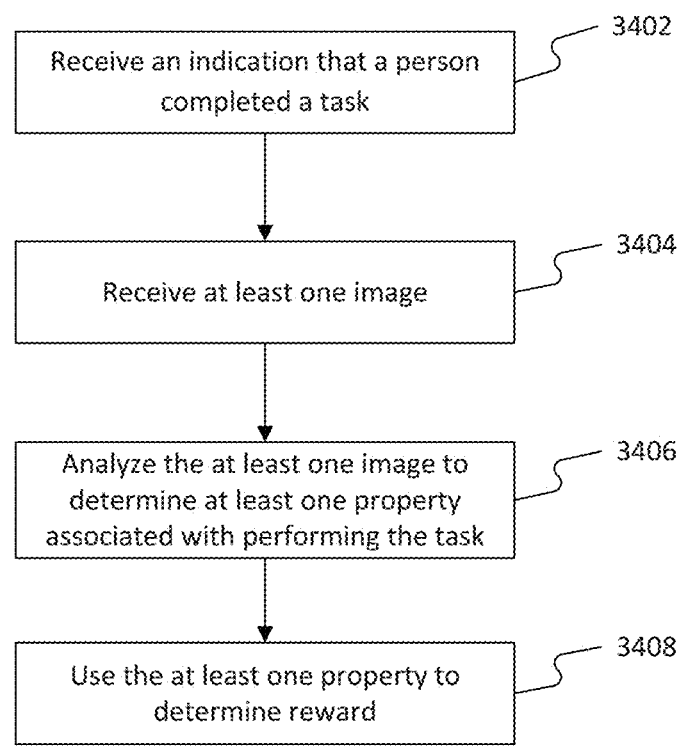
FIG. 34 is a flowchart of an exemplary process for providing a reward based on image analysis, consistent with the present disclosure.

FIG. 34 depicts a flowchart of exemplary process 3400 for providing a reward based on image analysis. For purposes of illustration, in the following description, reference is made to certain components of system 100. For example, any combination of steps of process 3400 may be performed by at least one processor of a device such a handheld device (e.g., a smartphone, a tablet, a mobile station, a personal digital assistant, a laptop, and more), a wearable device (e.g., smart glasses, a smartwatch, a clip-on camera), and/or server. Examples of such devices (e.g., capturing device 125, server 135) are described above. It will be appreciated, however, that other implementations are possible and that other components may be utilized to implement the exemplary process 3400. It will also be readily appreciated that the illustrated method can be altered to modify the order of steps, repeat steps, delete steps, or further include additional steps. While certain aspects are described in the context of a retail store, it is appreciated that any or all of the steps described could be implemented in other environments, such as a warehouse, fulfillment center, stockpile, or other place where a user may attempt to complete a task related to a product.

At step 3402, at least one processor (e.g., a processor of an image processing unit 130) may receive an indication that a person completed a task corresponding to at least one shelf in a retail store. In some embodiments, an indication may be transmitted from a user device (e.g., capturing device 125) in response to an image captured by the user device and/or a user input (e.g., a user interface selection) received at the user device. For example, the indication may be based on an input from the person. In some embodiments, the person may be an employee of the retail store, may be a non-employee of the retail store, may be a customer of the retail store, may be a store associate of the retail store, may be a visitor of the retail store, and so forth. The person may perform any number of tasks (only one task, two tasks, less than five tasks, etc.).

In some embodiments, a task may include, without limitation, at least one of: a restocking of a product associated with the at least one shelf, a correction of product facings at the at least one shelf, removing a product from the at least one shelf, changing a price of at least one product, or changing an orientation of at least one product on the at least one shelf (e.g., to create a planogram of products). A task may also include, without limitation, at least one of positioning or removing a promotional sign from at least one shelf (or from a vicinity of a shelf). Other non-limiting examples of tasks are described herein. In some embodiments, information associated with a task may be transmitted to a user device, such as one or more locations, aisle identifiers, products, shelf levels, shelf heights, product identifiers, product images, product sizes, product placements, and the like. For example, the at least one processor may transmit a location and product identifier associated with a first task and a location and product identifier associated with a second task to a user device. Of course, any number of tasks and combinations of task information may be transmitted to a user device, including tasks that may have overlapping task information (e.g., a same shelf location, a same aisle identifier, etc.).

In some embodiments, the indication that a person completed a task (e.g., a task received at step 3402) may be based on an analysis of the at least one image. For example, the at least one processor may analyze at least one image to determine whether a threshold amount of information is derivable from the at least one image. Continuing this example, the at least one processor may determine whether at least one shelf, at least one product, at least one product placement, at least one product orientation; at least one sign placement, at least one sign orientation, and/or other product information may be derived from the at least one image (e.g., according to an image analysis). Additionally or alternatively, the at least one processor may determine if the at least one image has an orientation, focus, resolution, brightness, contrast, and/or the like, which may be conditions for further image analysis (e.g., at step 3406). In some examples, the at least one processor may determine that the person is leaving an area of the retail store corresponding to the task (e.g., according to image analysis to identify a representation of the person in an image and then further image analysis revealing an absence of the person in one or more subsequently captured images, and the indication that the person completed the task received at step 3402 may be based on the determination that the person is leaving the area. Alternatively or additionally, location data from a device associated with the person indicate whether the person has left the retail store.

In some examples, a machine learning model may be trained using training examples to determine whether tasks are complete from images, and the trained machine learning model may be used to analyze the at least one image and determine whether the person completed the task. For example, a training example may include an image showing a completed task, a partially complete task, an uncomplete task, etc. By way of further example, a training example may include a sample image and an indication of a particular task, together with a label indicating whether the particular task is completed.

In some examples, a convolution of at least part of the at least one image may be calculated, and the indication that the person completed the task received at step 3402 may be based on the calculated convolution. For example, in response to a first value of the convolution, the indication may be provided, and in response to a second value of the convolution, providing the indication may be withheld and/or forwent. Alternatively, the indication that a person completed a task received at step 3402 may be based on receiving at least one image (e.g., on receiving at least one image from a user device, not based on image analysis).

At step 3404, the at least one processor may receive at least one image of the at least one shelf. For example, the at least one image may be read from memory, may be received from an external device, may be captured using an image sensor, and so forth. In some embodiments, the at least one image of the at least one shelf may be captured using an image sensor after the completion of a task (e.g., the task indicated at step 3402). In some embodiments, the at least one image may be at least one image captured by at least one of a person (e.g., a person using a device having an image sensor, the person of step 3402, etc.), by an image sensor mounted to a shelf (e.g., an image sensor mounted on one shelf such that it faces another shelf), by an image capturing robot, by an indoor drone, and so forth.

At step 3406, the at least one processor may analyze at least one image (such as the at least one image received at step 3404) to determine at least one property associated with performing a task (e.g., the task indicated at step 3402). In some embodiments, the at least one property associated with performing the task may include a quality indication of at least one aspect of performing the task. In some embodiments, analyzing the at least one image may include one or more of the steps of process 3500, discussed further below, and/or aspects discussed above. For example, analyzing at least one image to determine the at least one property associated with performing the task may comprise identifying at least one visual indicator in the at least one image. In some embodiments, at step 3406, process 3400 may include analyzing the at least one image received at step 3404 to determine that the person (e.g., the person that completed the task) performed a positive action corresponding to the at least one shelf in the retail store. The positive action may or may not be included in the task. For example, the task may have included adjusting a facing of a first product on the at least one shelf, but the person may also have performed a positive action of pulling forward a second product and thereby improved facings at the at least one shelf. In some embodiments, the at least one processor may determine or change the quality indication of the at least one aspect of performing the task based on a received input (e.g., an input received from sensors configured to be positioned between a shelf and product placed on the shelf, from a pressure sensor, from a touch sensor, from a weight sensor, from a light sensor, etc.). In some embodiments, the at least one property associated with performing the task may be based on a calculated at least one convolution of at least part of the at least one image received at step 3404 (discussed further below). For example, in response to a first value of a convolution of the at least part of the at least one image, a first value of a property associated with performing the task may be determined. Also, in response to a second value of the convolution of the at least part of the at least one image, a second value of the property associated with performing the task may be determined. In some embodiments, the second value of the property may differ from the first value of the property. In some embodiments, the at least one processor may differentiate between image aspects relevant and irrelevant to a task. For example, the at least one processor may identify at least one product and/or shelf relevant to a task, and at least one product and/or shelf irrelevant to a task. In some embodiments, the at least one processor may ignore the irrelevant image aspects and perform particular image processing steps on the relevant image aspects, consistent with disclosed embodiments.

In some embodiments, a machine learning model may be trained using training examples to determine properties associated with performance of tasks from images, and step 3406 may use the trained machine learning model to analyze the at least one image and determine the property associated with performing a task. For example, a training example may include an image showing a completed task, a partially complete task, an uncomplete task, a task property (e.g., a quality indication), etc. By way of further example, a training example may include a sample image related to a sample task together with a label indicating a property associated with performing the sample task. In some embodiments, the at least one image may be analyzed to determine placement of products on at least part of a shelf, and the at least one property associated with performing the task may be determined based on the determined placement of products on the at least part of a shelf. In some embodiments, the at least one image may be analyzed to determine planogram compliance indicators (or other product facing indicators), and the at least one property associated with performing the task may be determined based on the determined planogram compliance indicators.

In some embodiments, process 3400 may also include analyzing the at least one image (for example, the at least one image received at step 3404) to determine a property of the person. A property of the person may include a historical degree of task performance quality associated with the person (e.g., a quality level of task-related images from the person, a quality level associated with historical tasks performed by the person, an experience level of the person, and so on). For example, a face recognition algorithm may be used to analyze the at least one image and identify the person, and the determined identity may be used to determine the property of the person. For example, the determined identity may be used to access a database including the property of the person. In another example, the determined identity may be compared with an expected identity of the person, to validate that the task is performed by the user. In some embodiments, process 3400 may include analyzing the at least one image (for example, the at least one image received at step 3404) to determine at least one additional available task corresponding to the at least one shelf in the retail store and providing an indication of the additional available task to the person. For example, the at least one processor may provide an indication of the additional available task, which may include a first indication of a first reward for performing the task, and a second indication of a second reward for performing the task and the additional available task. For example, the analysis of the image may indicate an issue related to the at least one shelf (such as a misplaced product on the at least one shelf, a need to restock the at least one shelf, a need to correct facings at the at least one shelf, a need to remove products from the at least one shelf, a need to remove label from the at least one shelf, a need to improve planogram compliance of the at least one shelf, and so forth), and the at least one additional available task may include a remedy to the issue. In some embodiments, process 3400 may include determining an impact of the performed task. For example, the at least one processor may determine an impact on sales, an impact on future tasks corresponding to the at least one shelf in the retail store, an impact on engagement of customers, an impact on product facing compliance, an impact on planogram compliance, an impact determined by analyzing the at least one image, etc.

In some embodiments, the at least one processor may analyze the at least one image (for example, the at least one image received at step 3404) to determine at least one aspect lacking in the performance of the task. For example, the at least one processor may determine, based on image analysis, that one or more products on a shelf are not part of a planogram, that a price number is obscured from view, that less than a tasked number of products have been restocked, etc. In some embodiments, process 3400 may include providing an indication of the at least one aspect to the person (e.g., to a device associated with the person). In some embodiments, process 3400 may include receiving at least one additional image of the at least one shelf, and the at least one image may be captured using the image sensor after the indication of the at least one aspect is provided.

In addition to, or instead of, analyzing images, the at least one processor may also receive other kinds of information. For example, process 3400 may include receiving input from at least one pressure sensor positioned on the at least one shelf. In some embodiments, the at least one processor may use the input to confirm whether information determined from image analysis is correct. Additionally or alternatively, process 3400 may include using received information to determine the at least one property associated with performing the task (e.g., the task indicated at step 3402). For example, a machine learning model may be trained using training examples to determine properties of performance of tasks from one or more kinds of information, and the trained machine learning model may be used to analyze the information to determine the at least one property associated with performing the task. Examples of the kinds of information that process 3400 may receive as input and/or analyze (including information that may be used by a trained machine learning model) include information captured using pressure sensors, information captured using touch sensors, information captured using weight sensors, light sensors, information captured using sensors configured to be positioned between a shelf and product placed on the shelf, etc.) related to a sample task, together with a label indicating a property associated with performing the sample task. For example, the at least one processor may compare a pressure detected by the at least one pressure sensor and compare the pressure to an estimated pressure based on a number of products detected in an image. Additionally, or alternatively, process 3400 may include receiving an input from at least one touch sensor positioned on the at least one shelf. Additionally, or alternatively, process 3400 may include receiving an input from at least one weight sensor positioned on the at least one shelf. Additionally, or alternatively, process 3400 may include receiving an input from at least one light sensor positioned on the at least one shelf. For example, the at least one processor may compare an amount of light detected by the at least one light sensor and compare the amount of light to an estimated amount of light based on a number of products detected in an image (e.g., products which may cover the at least one light sensor to reduce the amount of light detected).

At step 3408, the at least one processor may use the at least one property (e.g., determined at step 3406) to determine a reward for performing a task. In some embodiments, the reward may include a monetary reward, and the determination of the reward may include a determination of an amount associated with the monetary reward. A reward may include money, a gift card, a promotional benefit (e.g., a percent discount off a purchase at the retail store), a coupon, a bonus, credit points, increase to a reputation score, and/or any other form of compensation. In some embodiments, the at least one processor may also cause a reward information to be delivered to a person and/or device (e.g., a person and/or device associated with completing a task). For example, information configured to cause the reward to be transmitted to an external system, stored in memory, provided to a user (e.g., at a user device), the like, and/or any combination thereof. By way of further example, the at least one processor (or other device) may transmit information to cause an electronic transfer of funds from a first account not associated with the person to a second account associated with the person. In some embodiments, a notification of the transfer may be transmitted to a device associated with the user (which may or may not be a device associated with completion of the task).

In some embodiments, the determination of the reward may be based on the quality indication (described above with respect to step 3406). Additionally or alternatively, process 3400 may include basing the determination of the reward on a property of the person (described above). Additionally or alternatively, process 3400 may include basing the determination of the reward on a positive action (discussed above). Additionally or alternatively, process 3400 may include basing the determination of the reward on the impact (discussed above). In some embodiments, process 3400 may include analyzing at least one additional image to determine the reward for performing the task (e.g., an additional image received in response to notifying a person about an aspect lacking in the performance of an initial task). For example, an indication of the at least one aspect may include an indication of a first reward for performing the task without addressing the at least one aspect, and an indication of a second reward for performing the task and addressing the at least one aspect. Additionally or alternatively, process 3400 may include basing the determination of the at least one property on an analysis of a received input (e.g., an input received from a pressure sensor, a touch sensor, a weight sensor, a light sensor, etc.). In some embodiments, a reward may be determined in response to an indication that a user has completed a threshold number of tasks. For example, after an indication is received that a person has completed three tasks in the retail store, a discount coupon code may be transmitted to a device associated with the person.

Figure 35:
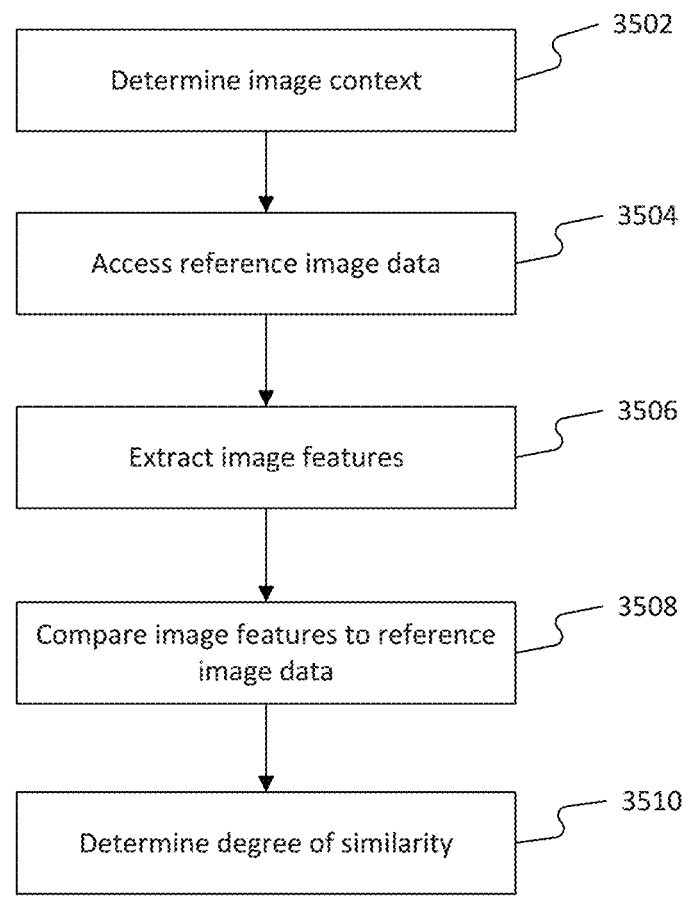
FIG. 35 is a flowchart of exemplary process for performing image analysis, consistent with the present disclosure.

FIG. 35 depicts a flowchart of exemplary process 3500 for performing image analysis. In some embodiments, process 3500 may be used to help determine task performance information and/or a reward for performance of a task. For example, all or part of process 3500 may be performed as part of step 3406 of process 3400. For purposes of illustration, in the following description, reference is made to certain components of system 100. For example, any combination of steps of process 3500 may be performed by at least one processor of a device such a handheld device (e.g., a smartphone, a tablet, a mobile station, a personal digital assistant, a laptop, and more), a wearable device (e.g., smart glasses, a smartwatch, a clip-on camera), and/or server. Examples of such devices (e.g., capturing device 125, server 135) are described above. It will be appreciated, however, that other implementations are possible and that other components may be utilized to implement the exemplary process 3500. It will also be readily appreciated that the illustrated method can be altered to modify the order of steps, repeat steps, delete steps, or further include additional steps. While certain aspects are described in the context of a retail store, it is appreciated that any or all of the steps described could be implemented in other environments, such as a warehouse, fulfillment center, stockpile, or other place where a user may attempt to complete a task related to a product.

At step 3502, at least one processor (e.g., a processor of an image processing unit 130) may determine image context. Image context may include a location (e.g., an aisle within a retail store, a coordinate position of a user device, etc.), a task (described above), product information (described above), a directionality (e.g., a direction an image sensor was facing when an image was captured), or any other information associated with a task or image. Determining image context may include receiving image context from a user device (e.g., a device associated with a person associated with performing a task) and/or receiving image context from stored information (e.g., image data stored at database 140, which may have been received from a user device).

At step 3504, the at least one processor may access reference image data. In some embodiments, reference image data may include an image (e.g., an image of a previous shelf view), a number of objects, a layout of objects, a shape outline, a color value (e.g., a red-green-blue, or RGB value, a hue value, a saturation value, a light value, etc.), a color distribution, a color gradient, a contrast level, a logo, a letter, a word, a phrase, or any other criterion to which image data may be compared. In some embodiments, reference data may be stored at a database (e.g., database 140). In some embodiments, reference image data may be accessed based on image context. For example, if image context includes a task (e.g., changing a price display), image data associated with that task may be accessed (e.g., an image of a changed price display). In some embodiments, accessing reference image data may include generating reference image data. For example, if image context includes a task associated with restocking four rows of a product on a shelf and arranging the front product in each row to form a planogram, the at least one processor may access an image of the product and multiply the image four times, to create an artificial form of what the planogram may look like in a real-world environment. In some embodiments, reference image data may be part of all of a product model (discussed above).

At step 3506, the at least one processor may extract image features, which may be extracted from a received image (e.g., received from a device associated with a person associated with performing a task). For example, the at least one processor may extract a shape, a color value, an object, a character, a word, or any other visual indicator related to a product from at least one image. The visual indicator may comprise at least one of: a color, a brightness, a character, or a shape. Additionally or alternatively, the at least one processor may change a color value of at least one pixel, change a color value of an image (e.g., contrast, brightness, etc.), rotate an image, crop an image, expand an image, shrink an image, or perform any other image manipulation, which may make the image data more suitable for comparison (e.g., at step 3508). For example, at least one convolution of at least part of at least one image may be calculated (e.g., by image processing unit 130). For example, the at least one processor may apply a matrix to image data to alter pixel values (e.g., increase a brightness of any pixel below a threshold brightness level), which may improve the image data for comparison.

At step 3508, the at least one processor may compare image features (e.g., extracted at step 3506) to reference image data (e.g., accessed at step 3504). For example, the at least one processor may compare the at least one visual indicator (e.g., extracted at step 3506) to a reference visual indicator. Comparing image features to reference image data may comprise comparing two or more shapes, two or more color values, two or more color value distributions, etc. In some embodiments, the at least one processor may compare an image (e.g., with or without any feature extraction), which may be received from a user device, to reference image data (e.g., another image).

At step 3510, the at least one processor may determine a degree of similarity, which may be a degree of similarity between at least one image feature and reference image data (e.g., based on the comparison at step 3508). For example, the at least one processor may determine a degree of similarity between an identified at least one visual indicator and at least one reference visual indicator (e.g., a percent match). In some embodiments, a quality indication may be based on the degree of similarity. For example, a quality level, which may influence a reward, may increase for (e.g., be correlated with) higher degrees of similarity. By way of example and without limitation, a planogram extracted from a received image that is a 95% match with reference image data may be associated with a better reward (e.g., a higher monetary amount) than a planogram extracted from a received image that is a 70% match with reference image data. In some embodiments, a determination of a percent match below a threshold level may be associated with no reward, and may cause an indication (e.g., an indication of no reward, an indication of a lacking aspect, etc.) to be transmitted to a device (e.g., a user device associated with a person associated with performing a task).

As discussed previously, in embodiments of the present disclosure, server 135 may receive image data acquired by crowd sourcing. For example, in some situations, cameras placed throughout a location may not be positioned with a proper angle to view an area. Further, a market research entity or a product supplier may desire information of product placement within a retail location, but lack access to images captured by cameras that are operated by a retailer. Further still, a retailer may find it easier and more cost effective to forego at least some cameras and other monitoring systems, and instead rely upon crowd sourced images. Crowd sourcing may also provide dynamic monitoring capability. For example, a retailer may be unable to anticipate what monitoring capabilities are needed and where, or may routinely change product placement and wish to avoid reconfiguring installed monitoring hardware. Rather than placing excess cameras throughout a location and later discovering that some cameras are not needed or have low use rates, or acquiring multiple robotic monitoring units, a retailer may prefer the flexibility of tasking humans to perform monitoring tasks. In some examples, a supplier, a retailer or an operator of a retail store may find it easier and more cost effective to perform some tasks in a retail store through crowd sourcing. Some non-limiting examples of such tasks may include restocking, removing products from a shelf or a display, adding products to a shelf or a display, rearranging products on a shelf or a display, placing a label, removing a label, modifying a label, changing price of a product, placing promotional material, removing promotional material, rearranging promotional material, promoting a product, communicating with employees or other store associates of the retail store, capturing images and/or videos from the retail store, cleaning the retail store, scanning barcodes (or other visual codes) in the retail store, and so forth.

Figure 36:
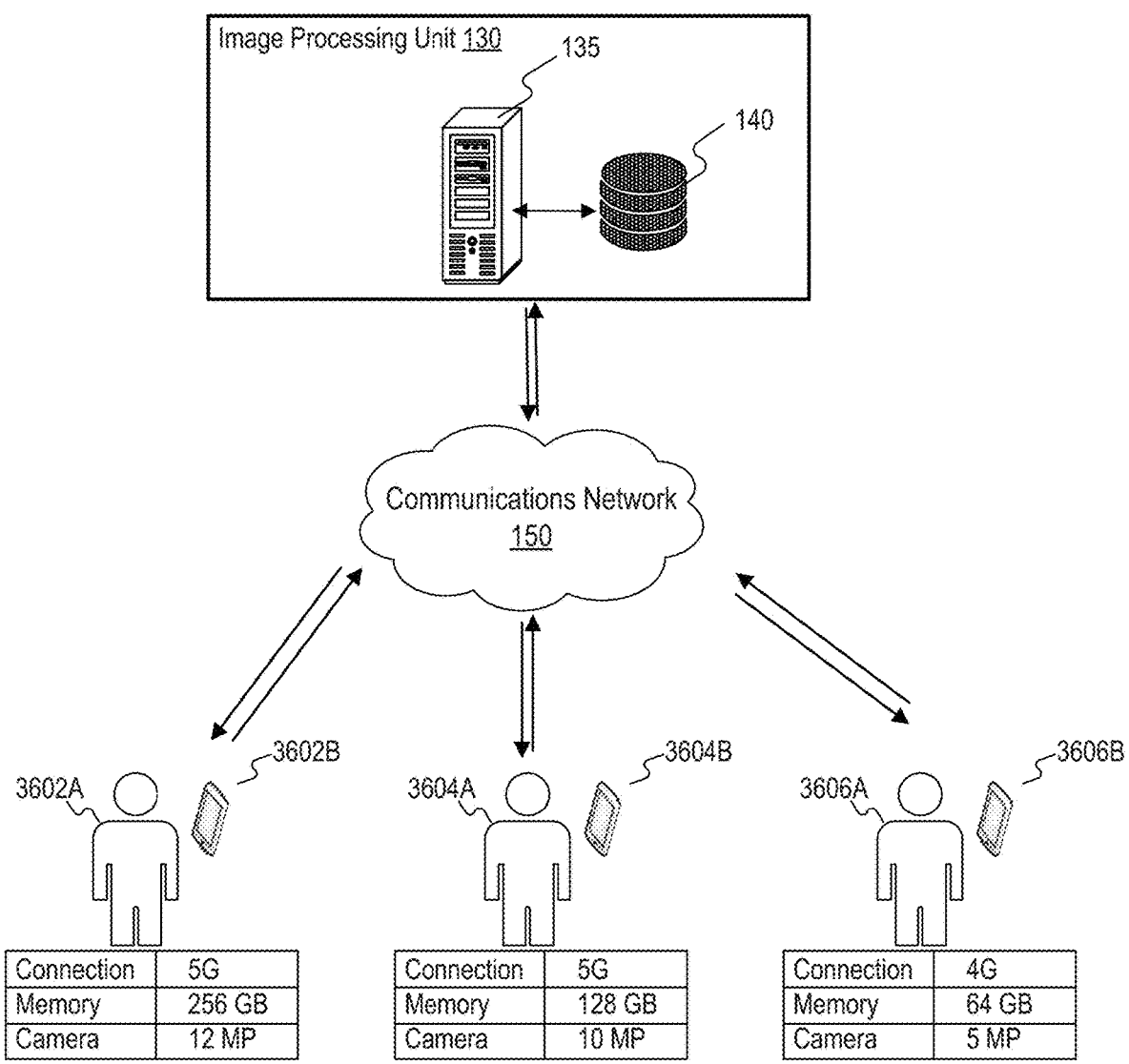
FIG. 36 is a schematic illustration a communications network supporting multiple users, consistent with the present disclosure.

FIG. 36 is a schematic illustration of a communications network supporting multiple users, consistent with the present disclosure. The communications network illustrated in FIG. 36 may be used to support crowd sourced image and data capture of places within a retail store. As illustrated in FIG. 36, server 135 of image processing unit 130 may be connected to communications network 150. Further, individual user devices 3602B, 3604B, and 3606B associated, respectively, with users 3602A, 3604A, and 3606A, may communicate via communications network 150 with server 135. Server 135 may receive assignments (e.g., from a retailer, from a supplier, from an operator of a retail store, etc.), select an assignment, and transmit the assignment to a user device via communications network 150. Users 3602A, 3604A, and 3606A may perform a received assignment using respective user devices, and user devices 3602B, 3604B, and 3606B may then relay data collected while performing an assignment to server 135 via communications network 150. For example, network 150 may include or be part of the Internet, a Local Area Network, wireless network (e.g., a Wi-Fi/302.11 network, a 4G or 5G cellular network), or other suitable connections.

As shown in FIG. 36, user devices 3602B, 3604B, and 3606B may be associated with differing device capabilities. For example, user device 3602B may be a phone with a 5G connection, 256 GB of memory, and a 12 MP camera. Other user devices may have different capabilities. For instance, in comparison with user device 3602B, user device 3606B may have a slower connection (4G rather than 5G), less memory (64 GB rather than 256 GB), and a lower resolution camera (5 MP rather than 12 MP).

In some scenarios, assignments processed by server 135 may make use of or necessitate differing device capabilities. For instance, an assignment may involve uploading a large, high resolution video, in which case, a user device with high connection speed and camera resolution may be necessary. A different assignment may require an image with only a low resolution, such that a device with lesser capabilities may be sufficient. Accordingly, server 135 may determine device requirements based on assignment needs. Server 135 may also determine device requirements based on capabilities of server 135. For example, server 135 may be configured to perform image enhancement functions, such as improving resolution in order to perform optical character recognition. Thus, for example, server 135 may determine that devices with a lower resolution camera are sufficient, as a low resolution image may be enhanced by server 135 and still satisfy an assignment.

Server 135 may also determine environmental conditions of user devices in addition to hardware capabilities. For example, if a user has selected to connect a phone to a store's WiFi network, server 135 may detect a connection to WiFi and provide assignments to the phone that require large amounts of data transfer, while refraining from sending large data transfer assignments to user devices only connected to a cellular network.

As discussed above, users may receive incentives in exchange for performing an assignment. Server 135 may calculate an incentive value based on, for example, savings that a retailer may realize by opting for crowd sourced monitoring rather than installing monitors or using robotic monitors. The incentive may alternatively or additionally take into account a likelihood of a user performing an assignment, the assignment's value to a market analysis, and/or the difficulty of the assignment. Server 135 may provide information to user devices regarding the assignment and incentive, and the user devices may display the assignment as an offer in a graphical user interface for the user to accept or decline.

Figure 37:
FIG. 37 is a schematic illustration of a user interface, consistent with the present disclosure.

FIG. 37 is a schematic illustration of a user interface, consistent with the present disclosure. User interface 3702 may be displayed on a user device 3602B, such as a phone, to a user, such as user 3602A. User interface 3702 may provide a description of the task and an incentive. For example, user interface 3702 may offer a user a $1 coupon in exchange for taking a picture, which user device 3602B may send to server 135. The incentive may be related to the assignment, as shown (e.g., the coupon shown is for detergent in exchange for a picture of the laundry aisle), or may be unrelated. User interface 3702 may also provide a user an option to accept the offer or decline the offer. In some embodiments, user interface 3702 may display when a user opens an app. User interface 3702 may also display as a text message, pop up message, and the like. In some embodiments, server 135 may send a set of assignments to user device 3602B, which user device 3602 may display when the user is capable of performing the assignment or when the user is likely to accept the assignment (such as being within a certain radius of a task area, or logging into a WiFi network). Further, user device 3702 may report conditions to server 135 in real time, and server 135 may cause a user interface to display based on the real time reporting. The assignment shown in FIG. 37 is an example, and assignments may involve multiple tasks and/or more specific directions (e.g., take a picture of a specific shelf and/or a specific product).

Figure 38:
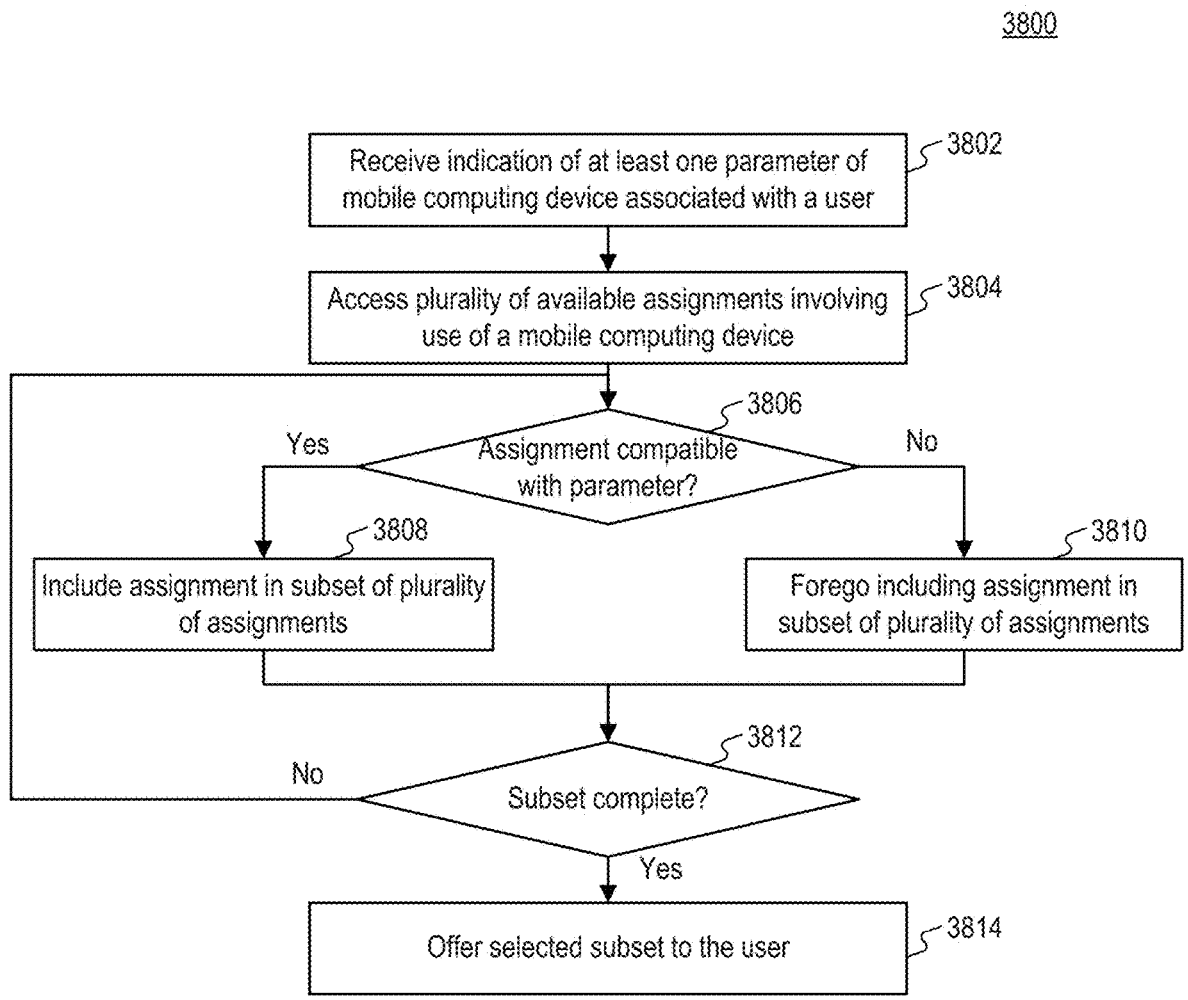
FIG. 38 provides a flowchart of an exemplary method for providing assignments to users, consistent with the present disclosure.

FIG. 38 provides a flowchart of an exemplary method for providing assignments to users, consistent with the present disclosure. Server 135 may include at least one processor programmed to perform the steps of process 3800 illustrated in FIG. 38.

At step 3802, server 135 may receive an indication of at least one parameter of a mobile computing device associated with a user. A mobile computing device may include, for example, a cellular phone (e.g., a smartphone with a built-in camera), a tablet, a smartwatch, a wearable computing device, an augmented reality system, a virtual reality system, etc. A mobile computing device may push at least one indication of parameters or status, for instance periodically, or server 135 may request indications. Parameters may be related to an image sensor, computing power, and/or memory capacity of the mobile computing device.

For example, the at least one parameter of the mobile computing device may be at least one parameter of an image sensor of the mobile computing device associated with the user. The at least one parameter of the image sensor may comprise at least one of a maximal pixel resolution, maximal frame rate, type of sensor, and zoom capability. Other non-limiting examples of such parameters of the image sensor may include size, pixel size, color parameters, range of focal lengths, maximal field of view, sensitivity to light, any indicator of quality of the image sensor, and so forth. Some non-limiting examples of types of sensors may include digital, non-digital, Charge-Coupled Device (CCD), Complementary Metal Oxide Semiconductor (CMOS), 2D, 3D, mono, stereo, depth, active stereo, time-of-flight, Light Detection and Ranging (LIDAR), and so forth. In some embodiments, the mobile computing device may indicate a camera type or mobile computing device type, and server 135 may look up camera capabilities based on the camera type or mobile computing device type.

Further, the at least one parameter of the mobile computing device may be at least one parameter of a computing power of the mobile computing device associated with the user. The at least one parameter of the computing power may comprise at least one of an existence of a GPU, a number of computing cores, a type of processor, and a number of instructions per time unit. The mobile computing device may indicate a device type, and server 135 may look up computing parameters in a database for instance. In some embodiments, server 135 may determine a computing power by providing a computational task to the mobile computing device. For example, server 135 may provide a nonce task, such as adding numbers repeatedly until a sum exceeds a threshold, and determine the number of operations the mobile computational device performs in a time unit. This may have an advantage of providing real-time computing power, reflecting other tasks simultaneously being performed by the mobile computing device, rather than a notional computing power based on device specifications.

Further still, the at least one parameter of the mobile computing device may include at least one parameter of a memory of the mobile computing device associated with the user. For example, the at least one parameter of a memory may comprise at least one of a memory size (such as total size of memory, size of free available memory, etc.), type of memory, and speed of memory. The mobile computing device may indicate a device type, and server 135 may look up memory parameters in a database stored as part of server 125 or accessible to server 135 over a wired and/or wireless network. In some embodiments, server 135 may determine memory parameters by providing a memory task to the mobile computing device, such as sending a file to the mobile computing device and timing how long the mobile computing device requires to store and recall the file.

At step 3804, server 135 may access a plurality of available assignments, each assignment of the plurality of available assignments involving use of at least one mobile computing device. Retailers, operators of retail stores, market researchers, and/or suppliers may provide possible assignments to server 135, and server 135 may track which of the possible assignments have been completed, which of the possible assignments are assigned to users, and which have not yet been completed and are not assigned to users and are thus available. Possible assignments may involve a number of iterations. For instance, a market researcher may request 10 pictures of a product in a grocery store (e.g., in order to obtain images of a desired quality and/or perspective). Server 135 may also determine if an assignment is available based on a completion criteria. For example, an assignment may involve capturing an image of a price of an item on a shelf. A first mobile computing device user may attempt to complete the assignment, but the image may be of too low quality for server 135 to determine the price. Server 135 may continue marking the assignment as being available until an image is captured with sufficient quality for server 135 to extract a price (e.g., via optical character recognition techniques). Server 135 may then remove the assignment from the plurality of available assignments.

Other assignments may use other aspects of at least one mobile computing device, such as recording audio in a retail location, recording a video of a customer interaction, real-time video and/or audio analysis capabilities, or recording WiFi or cellular signal strength. An assignment may involve the use of multiple mobile computing devices, such as using a microphone of one device and a camera of another device, either in sequence or simultaneously.

At step 3806, server 135 may begin selecting a subset of the plurality of available assignments, based on the at least one parameter of the mobile computing device associated with the user. Server 135 may review each of the available assignments, and select a subset of the plurality of available assignments.

For instance, server 135 may determine whether a particular assignment of the plurality of available assignments is compatible with the at least one parameter of the mobile computing device associated with the user. Compatibility may indicate that the mobile computing device is capable of performing the selected assignment. For instance, the mobile computing device computational power may exceed a computing power required to perform the assignment.

In response to a determination that the particular assignment of the plurality of available assignments is compatible with the at least one parameter of the mobile computing device associated with the user, server 135 may include the particular assignment in the selected subset. In other words, step 3806 is YES, and server 135 proceeds to include the assignment in the selected subset at step 3808.

However, in response to a determination that the particular assignment of the plurality of available assignments is incompatible with the at least one parameter of the mobile computing device associated with the user, server 135 may forgo including the particular assignment in the selected subset. Thus, step 3806 is NO, and server 135 proceeds to include the assignment in the selected subset at step 3810.

In some embodiments, server 135 may also determine compatibility based on historical assignments provided to a mobile computing device. For example, server 135 may, at step 3806, identify an historic assignment matching the particular assignment. The historic assignment and the particular assignment may have a matching category, such as image capture, or a common mobile computing device requirement, such as camera resolution. Server 135 may also identify a particular mobile computing device matching the mobile computing device associated with the user. The particular mobile computing device may be the same type of mobile computing device, such as a phone model, or may be the same phone itself. Further, server 135 may access a success indication corresponding to a historic allocation of the assignment to the particular mobile computing device. Server 135 may then use the success indication to determine whether the particular assignment of the plurality of available assignments is compatible with the at least one parameter of the mobile computing device associated with the user. Accordingly, server 135 may avoid including assignments in the subset that are similar to assignments previously excluded from subsets for a particular device, or that are similar to assignments that the particular device has previously failed to accomplish. In some examples, server 135 may analyze one or more images captured by the mobile computing device of the user (for example, as part of historical assignments provided to the mobile computing device), and may determine whether to include a particular assignment in the subset of the plurality of assignments based on a result of the analysis. For example, a convolution of at least part of an image captured by the mobile computing device of the user may be calculated, in response to a first value of the calculated convolution, the particular assignment may be included in the subset of the plurality of assignments, and in response to a second value of the calculated convolution, the particular assignment may be excluded from the subset of the plurality of assignments.

Server 135 may proceed to step 3812 and determine whether the subset is complete. Step 3812 may therefore include determining if there are any remaining available assignments that have not been compared to the at least one parameter. Step 3812 may also or alternatively include comparing a number of assignments in the subset to a threshold, such that the subset does not exceed a predetermined size. In one example, if there are remaining available assignments or the subset is smaller than a threshold size, the subset is not complete and step 3812 is NO, and server 132 may return to step 3806 and compare an additional assignment with the at least one parameter. Otherwise, if the subset is complete (in this example, all assignments have been compared to the at least one parameter and/or the subset has reached the predetermined size), step 3812 is YES, and server 132 proceeds to step 3814. Step 3812 may use other rules for determining the completeness of the subset.

Server 135 may then proceed to step 3814, and offer the selected subset of the plurality of available assignments to the user. In some cases, the subset may include one assignment, as discussed herein in an example embodiment, or the subset may include a plurality of assignments that may, for instance, have a common assignment type (i.e., taking a picture, being located in a particular store, and the like). The mobile computing device associated with the user may display the offer, such as by a graphical user interface as shown in FIG. 37 and may include offering the user a coupon in exchange for accepting at least one assignment in the selected subset. Server 135 may receive an indication of accepting or declining the assignment from the mobile computing device.

In some scenarios, even if a mobile computing device is compatible with an assignment, and the user has accepted the assignment, the user and/or the mobile computing device may still fail to perform the assignment.

For instance, if the user accepts the assignment, server 135 may provide additional data required to perform the assignment, such as further instructions for display to the user, or instructions to be performed by the mobile computing device. Thus, a particular assignment of the selected subset may include a precondition, a first instruction to perform the particular assignment if the precondition is satisfied, and a second instruction to forego performing the particular assignment if the precondition is not satisfied. To further illustrate, an assignment may involve taking a picture of a product in a store. However, for the picture to be usable by a requesting party, the picture may need to be bright enough to analyze, that an object size in the image is sufficient, etc., and server 135 may therefore include a precondition of at least one of a brightness level or a proximity to an object in an image. The mobile computing device may, in some embodiments, perform instructions to test the precondition, such as measuring a brightness level (for example, with a light sensor, by analyzing the image, etc.), measuring a distance from a target object (for example, using a proximity sensor, by analyzing the image, etc.), and so forth. Thus, even though a mobile computing device may be compatible with the assignment, compatibility alone may be insufficient to perform the assignment. Further, determining if an assignment is compatible with the mobile computing device at step 3806 may include determining if the mobile computing device is able to perform the precondition, in addition to the assignment.

In some embodiments, a user may be provided with a guide or instructions to perform the assignment. For instance, one or more assignments of the selected subset may further include respective remediation instructions, the remediation instructions instructing the user to change a position of the mobile computing device associated with the user in relation to an object in response to the precondition not being satisfied. For example, a user of a mobile computing device may be presented with an instruction to move the mobile computing device closer to an item in order to take a clearer picture.

Server 135 may also provide a quality requirement, which may be used by a mobile computing device to determine if the precondition is satisfied. For example a particular assignment of the selected subset may include a quality requirement. The mobile computing device may compare captured data to the quality requirement. Server 135 may receive, from the mobile computing device associated with the user, a failure indication in response to the mobile computing device associated with the user performing the particular assignment of the selected subset and failing one or more criteria of the quality requirement. In one example, the mobile computing device associated with the user may have a camera compatible to the particular assignment, but due to unforeseen condition of the mobile computing device associated with the user (such as a scratched lens, an unclean lens, etc.), the quality of captured images may be insufficient. In this example, server 135 may also provide a remediation instruction to the user to clean the lens. In another example, the mobile computing device associated with the user may have a camera compatible to the particular assignment, but due to execution problems (such as trembles, incorrect position or aim, etc.), the quality of captured images may be insufficient. For example, the captured image may be analyzed to determine that the sharpness of the image is sufficient, that a size of a particular object (such as a product, a label, etc.) is sufficient, and so forth. In case the analysis determines an insufficiency, server 135 may also provide appropriate remediation instruction to the user.

A user, however, may not wish to perform remediation instructions. For example, a user may become frustrated with repeated or difficult instructions, and may cease performing assignments. Further, a precondition may fail due to circumstances that cannot be remedied by a user, such as poor or slow connection, store conditions, weather conditions, and the like. Accordingly, in some embodiments, server 135 may provide an instruction to the mobile computing device associated with the user to complete a second assignment of the selected subset in response to not satisfying a precondition of a first assignment.

A mobile computing device may have sufficient hardware to perform an assignment, but may not have sufficient unallocated capacity to perform the assignment. For example, as discussed previously, a mobile computing device may have 64 GB of memory installed, but only 10 MB of memory free. Accordingly, an assignment that requires 500 MB may be incompatible with the mobile computing device. However, server 135 may not have information of the free memory when determining compatibility at step 3806. Alternatively, a mobile computing device may have 500 MB of memory free when server 135 determines assignment compatibility, but may only have 300 MB of memory free when the mobile computing device actually performs an assignment. Thus, server 135 may receive an indication from the mobile computing device associated with the user that the mobile computing device associated with the user lacks at least one resource to perform at least one assignment of the selected subset. Server 135 may change a status of the at least one assignment from unavailable to available, provide a second assignment of the subset to the user device, remove similar assignments from the subset of the plurality of available assignments, and/or may store an indication that the particular mobile computing device is incompatible with assignments of the same type.

Further, a user may not grant adequate permissions for the mobile computing device to perform an assignment. In such embodiments, server 135 may receive an indication from the mobile computing device associated with the user that the mobile computing device associated with the user does not have permission to perform an assignment of the selected subset. As discussed previously, server 135 may change a status of the at least one assignment from unavailable to available, provide a second assignment of the subset to the user device, remove similar assignments from the subset of the plurality of available assignments, and/or may store an indication that the particular mobile computing device is incompatible with assignments of the same type.

In some cases, a user may decline an assignment due to time constraints, disinterest, or an inadequate incentive. In response, server 135 may attempt to provide the user an alternate assignment, and may tailor assignments based on user preferences indicated by the user declining an assignment. For instance, server 135 may receive a response indication that the user has declined the offered selected subset of assignments. Server 135 may also determine a category of the selected subset of assignments. For example, a user may decline a subset of assignments requiring the user to record conversations with customer service representatives, and the category of the selected subset may be "audio recording assignments." Server 135 may proceed to select a new subset of the plurality of available assignments, and the new subset may exclude assignments of the determined category. For instance, server 135 may perform process 3800, and eliminate assignments of the determined category at step 3806 as incompatible with the mobile computing device and/or user specifications. Server 135 may then offer the new subset to the user. In this manner, server 135 may avoid annoyance and missed productivity of a particular user.

As discussed previously, in embodiments of the present disclosure, server 135 may receive image data acquired by crowd sourcing through assignments distributed to users. In addition to managing crowd sourcing assignments within retail stores, disclosed systems and methods may also be adapted to manage assignments that take place external to retail stores, or mix a retail store assignment with an assignment external to retail stores. This may provide benefits of increased efficiency in performing assignments, increased assignment opportunities for users, and optimization of a user's time through merging assignment types and minimizing down time. For example, if a driver for hire provides someone a ride to a store or to a location near the store, the driver may be able to perform an additional assignment inside the store, which may provide an additional benefit to the driver and increase the value of driving the person to the store. This may help satisfy assignments for a rural store, as well, and make trips to rural or remote locations more profitable for a user. As used herein, an assignment in a retail store may refer to a task wherein a user enters a store, such as to take a picture of a display, purchase an item, or drop off an item, or may refer to a task wherein the user visits a store, such as going through a drive-through, takes a picture of the outside of the store, or drops off an item in a receptacle. Some non-limiting examples of such assignments may include entering the retail store, restocking a shelf or a display, removing products from a shelf or a display, adding products to a shelf or a display, rearranging products on a shelf or a display, placing a label, removing a label, modifying a label, changing price of a product, placing promotional material, removing promotional material, rearranging promotional material, promoting a product, communicating with employees or other store associates of the retail store, capturing images and/or videos from the retail store, cleaning the retail store, scanning barcodes (or other visual codes) in the retail store, purchasing an item, and so forth.

Figure 39:
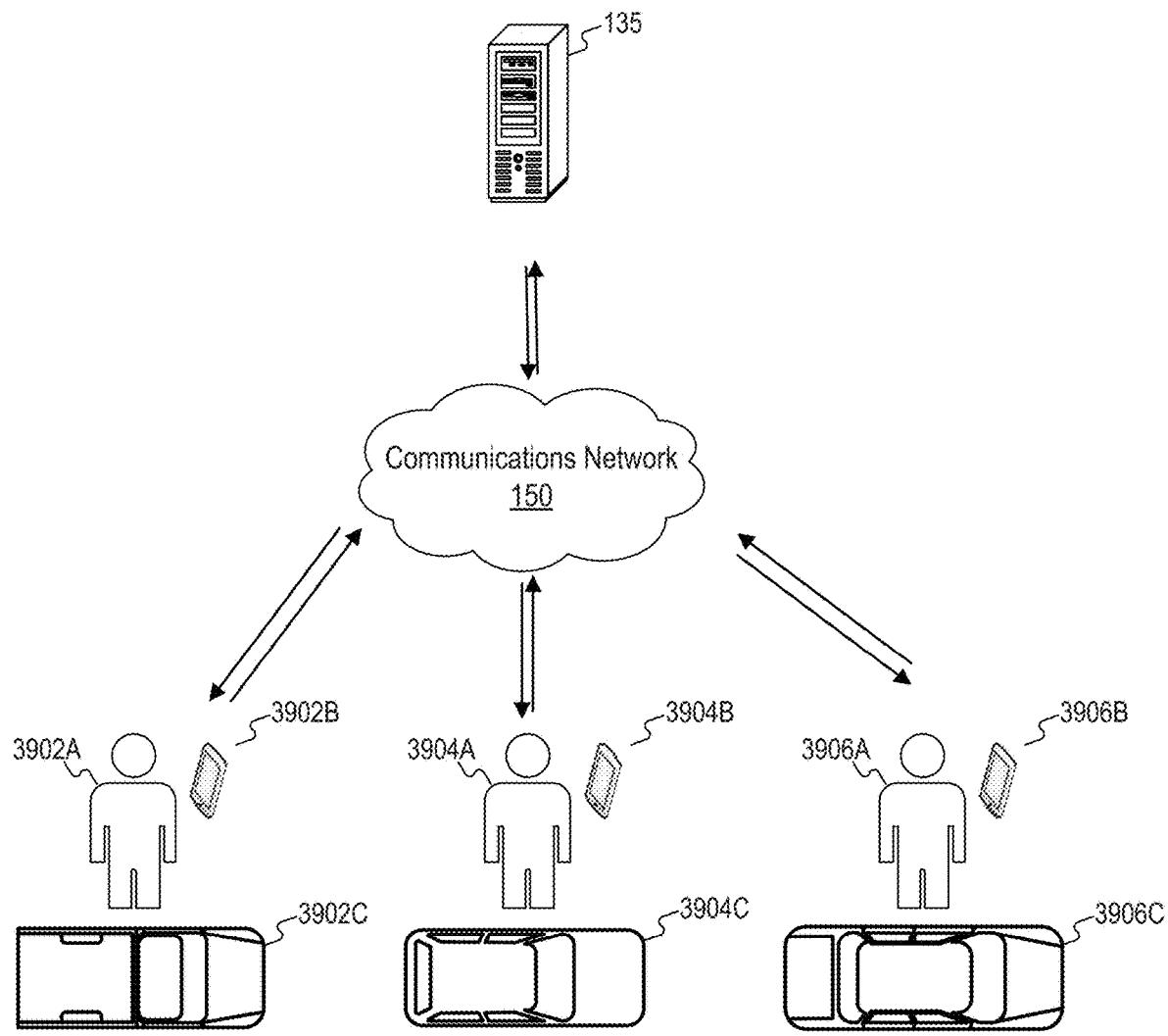
FIG. 39 is a schematic illustration a communications network supporting multiple users, consistent with the present disclosure.

FIG. 39 is a schematic illustration of a communications network supporting multiple users, consistent with the present disclosure. The communications network illustrated in FIG. 39 may be used to support assignments for users both internal and external to a retail store. As illustrated in FIG. 39, server 135 may be connected to communications network 150. Further, individual user devices 3902B, 3904B, and 3906B associated, respectively, with users 3902A, 3904A, and 3906A, may communicate via communications network 150 with server 135. Server 135 may receive assignments (e.g., from a retailer, from a supplier, from an operator of a retail store, etc.) or generate assignments, select an assignment, and transmit the assignment to a user device via communications network 150. Users 3902A, 3904A, and 3906A may perform a received assignment using respective user devices. User devices 3902B, 3904B, and 3906B may relay data collected while performing an assignment to server 135 via communications network 150. For example, network 150 may include or be part of the Internet, a Local Area Network, wireless network (e.g., a Wi-Fi/302.11 network, a 4G or 5G cellular network), or other suitable connections. Some non-limiting examples of individual user devices 3902B, 3904B, and 3906B may include smartphones, smartwatches, tablets, personal computing devices, personal communication devices, wearable computing devices, augmented reality systems, virtual reality systems, and so forth.

As shown in FIG. 39, users 3902A, 3904A, and 3906A may be associated with different vehicles and/or equipment. For example, user 3902A may drive a truck 3902C, capable of transporting large items. User 3904A may be associated with a van 3904C which could provide climate-controlled transportation of large items. User 3906A may be associated with a sedan 3906C, which may be suitable for driving in a congested city and parking in small parking lots. Users may be associated with other equipment or capabilities, as well, such as a towing capability, dolly, hand truck, high horsepower or torque engines, storage space, and the like. Further, users may also have personal attributes (e.g., ability to lift, knowledge of an area or store, ability to drive with a trailer, or access passes to certain areas).

In some scenarios, assignments processed by server 135 may make use of or necessitate differing personal, equipment, or vehicle capabilities. For instance, an assignment may include an assignment external to a retail store involving delivering a large flower bouquet to an apartment, followed by picking up a bag of mulch from a retail store. This assignment may make use of a user's van for climate control to protect the bouquet, the user's ability to climb stairs, the user's ability to carry heavy items, and the user's van for moving messy items. Accordingly, server 135 may determine user and/or equipment requirements based on assignment needs. Server 135 may also determine device requirements based on assignment needs (such as the ability to take high resolution pictures), for example as described above in relation to FIGS. 36, 37 and 38.

Server 135 may also calculate incentives, such as a payments, rewards, bonuses, coupons, credit points, etc., for the user in exchange for performing an assignment. The incentive may be based on an amount of time, gas consumption, or assignment difficulty. The incentive may alternatively or additionally take into account a likelihood of a user performing an assignment and/or the assignment's value. In some scenarios, a consumer may define assignments, such as picking up dry cleaning and bringing it to the consumer's office. A business may also define assignments, such as transporting a part for a car repair from one shop to another. The consumer or business may submit assignment requests to server 135 via a smartphone app or website for instance. The consumer or business may also set an offer value associated with the assignment, or server 135 may suggest or set a value based on the assignment details.

Server 135 may provide information to user devices regarding the assignment and incentive, and the user devices may display the assignment as an offer in a graphical user interface for the user to accept or decline.

Figure 40A:
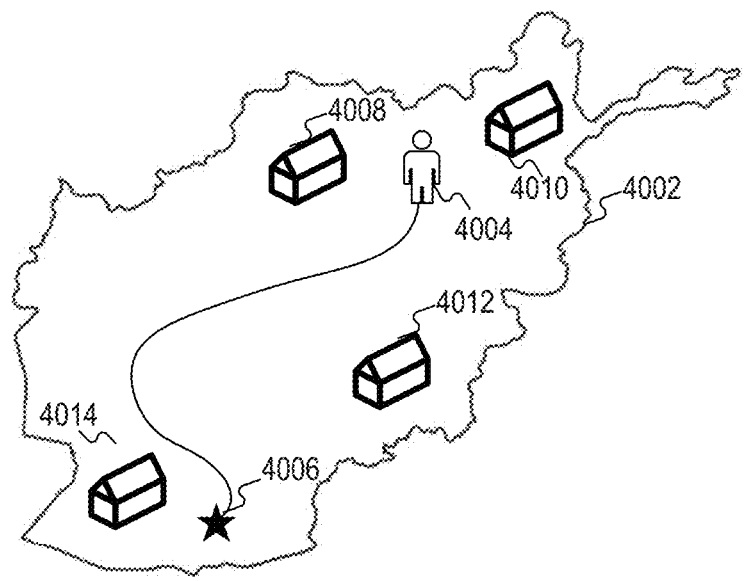
FIGS. 40A and 40B are illustrations of selecting retail stores based on a route, consistent with the present disclosure.
Figure 40B:
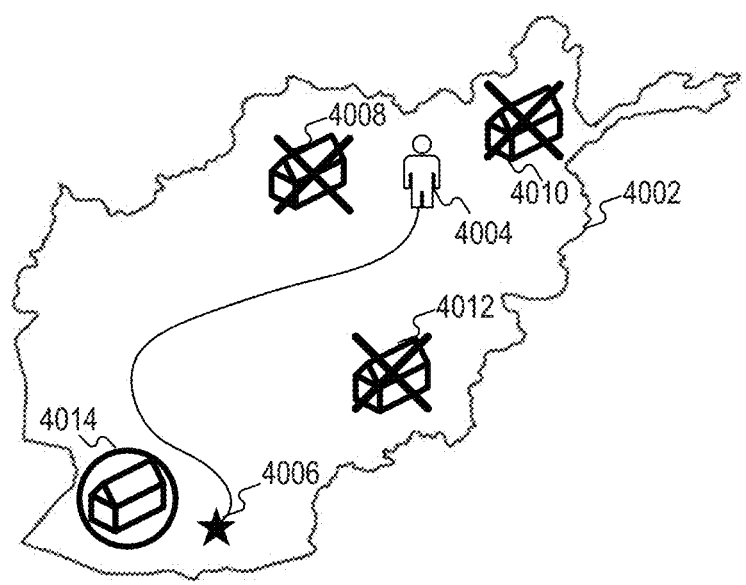

FIGS. 40A and 40B are illustrations of selecting retail stores based on a route, consistent with the present disclosure. For example, a selection of an assignment in a retail store may be based on an assignment external to a retail store, such that the assignment external to a retail store precedes, succeeds, concurs, or overlaps an assignment internal to a retail store. For instance, a user may be a driver taking a passenger to a location (i.e., an assignment external to a retail store), and the user may then be given an assignment to visit a store near the location (i.e., an assignment internal to a retail store). Alternatively, an assignment external to a retail store may be based on an assignment internal to a retail store. In this case, a user may have an assignment to return a rental item at a home improvement store (i.e., an assignment internal to a retail store), and receive an assignment to drive someone from the home improvement store to a work site (i.e., an assignment external to a retail store). Further, in some scenarios, a retail store may refer to any business, including stores that sell items as well as business locations that provide services. Additionally, assignments may also be related to residences, public spaces, public buildings, and commercial locations.

FIG. 40A shows a user 4004 with a planned route to a location 4006 within an area 4002. For instance, user 4004 may be a driver taking a passenger to location 4006. Retail stores 4008, 4010, 4012, and 4014 may also be within area 4002, and server 135 may have at least one task corresponding with each of retail stores 4008, 4010, 4012, and 4014.

An assignment of user 4004 may be time-sensitive. For example, as stated, user 4004 may be driving a passenger to location 4006, and the passenger may wish to arrive at location 4006 as quickly as possible. Alternatively, user 4004 may be transporting a perishable item, such as groceries, to location 4006. Thus, the assignment of user 4004 involves user 4004 traveling to location 4006, which may be internal or external to a retail store, may be completed prior to user 4004 performing a subsequent assignment.

Accordingly, server 135 may exclude assignments corresponding to retail stores outside of a threshold radius of location 4006, even if the retail stores are near an initial location of user 4004, or near a location along the planned or actual route of user 4004, as is the case in FIGS. 40A and 40B. For instance, as shown in FIG. 40B, server 135 may exclude assignments relating to retail stores 4008, 4010, and 4012 when identifying a new assignment for user 4004 to perform after arriving at location 4006. Further, server 135 may identify an assignment relating to retail store 4014 to provide to user 4004, based on retail store 4014 being the only retail store with an assignment and within a threshold radius of location 4006.

In some scenarios, an assignment external to a retail store may not be time-sensitive. For example, user 4004 may be delivering a non-perishable good to location 4006. Server 135 may then provide user 4004 with assignments relating to retail stores near an initial location of user 4004, such as an assignment relating to any of retail stores 4008, 4010, and 4012. Further, server 135 may provide multiple assignments related to retail stores in a batch, such as an assignment relating to each of retail stores 4008, 4010, and 4012.

In some scenarios, multiple retail stores may be within a threshold radius of a destination. Server 135 may provide an assignment relating to the closest retail store to a destination and within a threshold radius, or may provide multiple assignments within the threshold radius and allow user 4004 to select at least one of the multiple assignments. Additionally, server 135 may also provide assignments relating to retail stores within a threshold distance of the route of user 4004 to location 4006. For example, server 135 may provide an assignment relating to a retail store that requires a detour less than a threshold, for example and without limitation, detours requiring less than 10 minutes, less than 2 miles, etc.

Figure 41:
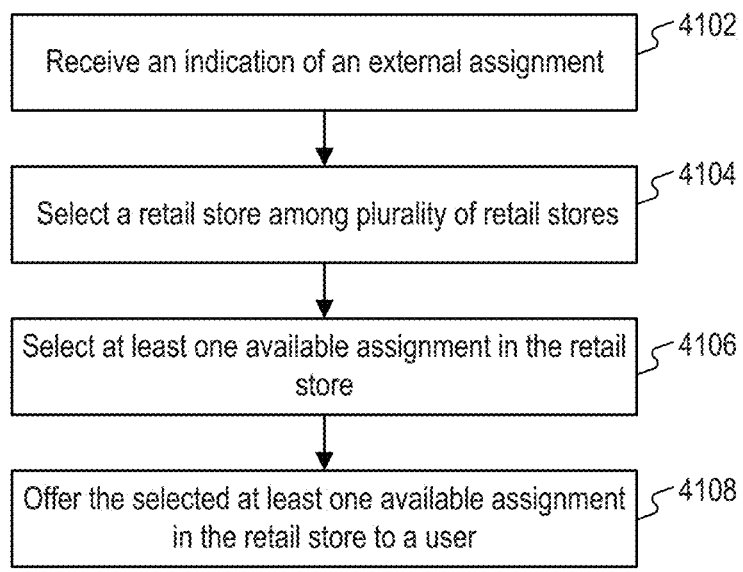
FIG. 41 provides a flowchart of an exemplary method for selecting available assignments, consistent with the present disclosure.

FIG. 41 provides a flowchart of an exemplary method for selecting available assignments, consistent with the present disclosure. Server 135 may include at least one processor programmed to perform the steps of process 4100 illustrated in FIG. 41.

At step 4102, server 135 may receive an indication of an external assignment, wherein the external assignment may be associated with one or more locations external to a plurality of retail stores. The indication of an external assignment may be provided by a mobile computing device of a user, including, for example, a cellular phone (e.g., a smartphone with a built-in camera), a tablet, a smartwatch, a personal computing device, a personal communication device, a wearable computing device, an augmented reality system, a virtual reality system, and so forth. A mobile computing device may push the indication of an external assignment, for instance periodically or at initiation of the external assignment, or server 135 may request indications. The indication of an external assignment may also be provided by a separate server which selects and provides external assignments to users. In some embodiments, server 135 may also provide the external assignment. In another example, server 135 may access a database or an external device to receive the indication of the external assignment.

Further, the external assignment may be associated with multiple locations, such as an assignment to visit each chain restaurant in an area to capture images of the restaurant storefronts for quality assurance purposes. In some embodiments, the external assignment may be associated with a retail store that is not among the plurality of retail stores. For instance, a company may operate a plurality of retail stores, and the external assignment may be related to a retail store operated by a different company.

The external assignment may include an available assignment offered to the user. Server 135, or another server, may store a list of external assignments, and may also record which assignments are available, in progress, or complete. Server 135 may send an indication, such as via communications network 150, to a user device of a user with details of the available assignment, or details of multiple assignments, which may include, e.g., location, reward or incentive, task, and/or deadline. A user may select one or more of the available assignments, and the user's device may send an indication to server 135 or another server that the selected one or more assignments should be updated to have an "in progress" status.

The external assignment may include an assignment selected for the user based on one or more preferences of the user. Assignments in retail stores may also be selected based on one or more preferences of the user. User preferences may be stored in the user's device, and the user's device may select assignments from a list that match the one or more preferences. Alternatively, server 135 or another server may store the user preferences in association with a device or user identifier and select assignments corresponding to the one or more preferences. A user may provide indications of preferences to a user interface of a user device, and the user device may transmit indications of the preferences to server 135 via communications network 150. The user's preferences may indicate that the user prefers tasks that allow the user to stay in a vehicle, involve transporting people, involve going through drive throughs, or involve taking images of building exteriors. A user may also indicate a preference for tasks that do not involve entering a building, or tasks that involve being in a vehicle with goods rather than people. Further, users may prefer assignments that may be completed with one stop, such as taking a picture of an aisle in a grocery store, rather than multiple stops, such as picking up an item from one location and transporting it to another location.

The external assignment may also or alternatively be determined based on a type of equipment available to the user, such as a vehicle type of the user, a type of mobile computing device used by the user, capabilities of the mobile computing device used by the user. Assignments in retail stores may also be determined based on a type of equipment available to the user. For example, as discussed previously, a user may have package handling equipment such as dollies or hand carts. Equipment availability may be stored in the user's device, and the user's device may select assignments from a list that match the equipment availability. Server 135 may also determine equipment availability. For example, a user may provide an indication, via a user interface of a user device, including a vehicle type or VIN, and server 135 may determine the vehicle's capabilities by reference to a database of vehicle types or VINs and vehicle characteristics. Server 135 may also determine mobile computing device capabilities based on device type, which may be reported by the mobile computing device or retrieved by server 135. The mobile computing device may indicate a device type, and server 135 may look up memory parameters in a database for instance stored as part of server 135 or accessible to server 135 over a wired and/or wireless network. Server 135 may also provide test assignments to the user or user device, such as a test assignment asking a user to take and transmit a picture with a user device, and server 135 may determine image resolution or data transfer speed. When an assignment is submitted to server 135, the assignment may include a description reflecting the need for certain equipment, and server 135 may match assignments to users based on stored assignment descriptions.

In some embodiments, a user may try to earn money or other rewards by performing assignments during or between tasks associated with an employer of the user. The employer may be unassociated with the plurality of retail stores. For example, the user may be a realtor with appointments from a real estate agency employer to show houses to potential buyers throughout a day. The realtor may have extra time between appointments, which may allow the realtor to perform an assignment related to a retail store. Similarly, a user may be sent by an employee to an area near a retail store for a meeting or other task, and server 135 may provide the user with an assignment to perform a task associated with a retail store in conjunction with or in addition to the employer's task.

Returning to FIG. 41, at step 4104, server 135 may select a retail store among the plurality of retail stores based on the indication of the external assignment. The indication of the external assignment may include a transportation assignment associated with a particular location, and the selected retail store may be determined based on the particular location, as discussed previously by reference to FIGS. 40A and 40B. For instance, the selected retail store may be determined based on a distance from the particular location to the selected retail store. The distance may be measured in length, such as kilometers, miles, or time, such as minutes. For example, the selected retail store may be within a ten minute drive of the particular location.

Additionally, the indication of the external assignment may also provide a planned travel route for a transportation assignment from a first location to a second location. Server 135 may analyze the travel route and select the retail store based on a measure of a detour to the selected retail store when traveling from the first location to the second location. Server 135 may iteratively, for each of the plurality of retail stores, determine an optimal route and measure an expected detour time or distance to each of the plurality of retail stores. Server 135 may select the retail store with the shortest detour. Server 135 may include an expected assignment duration in the detour calculation. For instance, server 135 may, based on expected assignment duration, select an assignment to take a picture at a retail store with a large detour instead of an assignment to purchase ten items at a retail store with a short detour.

In some embodiments, the external assignment may include being at a particular location at an estimated time period, and the selected retail store may be determined based on the estimated time period. The indication of the external assignment may include an expected time of arrival, and server 135 may select a retail store among the plurality of retail stores based on the expected time, such as by comparing the retail store open hours to the expected time of arrival. A retail store assignment may also be based on a time of day. For instance, a retail store manager may want pictures of checkout lines at 5:00 PM, and server 135 may provide an assignment to take pictures of checkout lines a user anticipated to be near the retail store at 5:00 PM.

In some embodiments, server 135 may select retail stores based on desired earning rates of users. Users may be unwilling to perform tasks that do not provide sufficient incentives for an amount of time invested. Accordingly, server 135 may receive, from the user, a desired earning rate. The desired earning rate may be used to determine a minimum total incentive for performing an assignment. For example, a user may desire to earn $10 per hour, thereby indicating that the user desires to earn $2.50 for a 15 minute assignment. If assignments at a retail store anticipated to require 15 minutes do not provide at least $2.50 in incentives, server 135 may not select the retail store.

Server 135 may further base expected earning rate on travel time. Accordingly, server 135 may determine a travel time to a location associated with each of a plurality of alternative retail stores, for instance as a detour or as an additional destination after completing an external assignment. Based on the respective travel times, assignment completion times, and incentives, server 135 may obtain a predicted earning rate for each of the plurality of alternative retail stores. Server 135 may determine the selected retail store based on the predicted earning rate equaling or exceeding the desired earning rate. In some embodiments, users may desire an earning rate greater than any available assignments offer. Server 135 may provide an indication causing user devices associated with these users to display that no available assignments exist, along with information of available earning rates of available assignments.

Further, users may desire to deduct travel expenses, such as fuel, tolls, vehicle depreciation, or public transit fees, from expected earnings to reflect a net earning rate. Accordingly, server 135 may receive, from the user, an estimated gas mileage of a vehicle associated with the user and a cost per quantity of gas. Server 135 may also retrieve estimated gas mileage based on a reported vehicle type or VIN from a database, and retrieve a cost per quantity of gas from a database of average gas prices in an area. Server 135 may estimate, based on the estimated gas mileage and cost per quantity of gas, a total fuel price associated with each of the plurality of retail stores. The total fuel price may be a product of a distance to each of the retail stores, the gas mileage, and the cost per quantity of gas. Server 135 may also determine expected toll fees based on a planned route to a retail store, and vehicle depreciation by reference to a database. Server 135 may deduct the total fuel price from the predicted earnings and determine a predicted earning rate for an assignment for use in selecting a retail store in step 4104.

Returning to FIG. 41, at step 4106, server 135 may, based on the selected retail store, select at least one available assignment in the selected retail store. Assignments may be selected randomly from a list of assignments, or selected based on user preferences and/or capabilities. In some embodiments, such as if retail store selection was not performed based on earning rate, server 135 may, at step 4106, determine an amount of time estimated to complete the selected at least one available assignment, and select assignments based on the amount of time estimated being less than an amount of available time provided by the user via a user device to server 135. The selected at least one available assignment may include, for example, purchasing an item at the selected retail store, taking a picture of a display at a store, checking inventory of an item at a store, interacting with store employees, or returning an item to a store. Some non-limiting examples of such assignment may include entering the retail store, restocking a shelf or a display, removing products from a shelf or a display, adding products to a shelf or a display, rearranging products on a shelf or a display, placing a label, removing a label, modifying a label, changing price of a product, placing promotional material, removing promotional material, rearranging promotional material, promoting a product, communicating with employees or other store associates of the retail store, capturing images and/or videos from the retail store, cleaning the retail store, scanning barcodes (or other visual codes) in the retail store, purchasing an item, and so forth. In some embodiments, the selected at least one available assignment may include obtaining or leaving an item at a drive through or other drop off of a store.

At step 4108, server 135 may offer the selected at least one available assignment in the selected retail store to a user. Step 4108 may include sending an indication of an offer to a user device for display, including assignment details such as location and instructions, an amount of time estimated to complete the task (which may include transit time and time at the retail store), and an incentive to perform the selected at least one available assignment. In some cases, a retail store may be associated with multiple available assignments. For instance, a retail store may be associated with a task to take a picture of a display, check inventory of an item, and purchase a different item. Server 135 may bundle assignments associated with a retail store and offer the user an additional incentive to complete multiple assignments. Further, server 135 may offer to the user a bundle of the external assignment and the selected at least one available assignment in the selected retail store. The bundle may include an additional incentive in exchange for performing the external assignment and the at least one available assignment in the selected retail store.

Step 4108 may also include determining a reward corresponding to the selected at least one available assignment based on a property of the external assignment, and providing to the user an indication of the determined reward. The reward may be a token provided in an app, for instance, or may be monetary. For example, the reward may be a badge indicating that the user has performed a task at each retail store of a company in an area. The reward may be a monetary award based on the user transporting a passenger to the retail store or delivering an item to the retail store. The reward may also be based on an external assignment or selected at least one available assignment including difficult tasks, such as lifting heavy items, performing a long duration task, or performing many assignments within a retail store in a single stop.

The reward may be provided prior to the user accepting an assignment. For instance, server 135 may provide to the user an indication of a reward corresponding to the external assignment without the selected at least one available assignment and an indication of a reward corresponding to a bundle of the external assignment and the selected at least one available assignment. In this way, the reward may incentivize the user to accept the offered bundle of the external assignment and the selected at least one available assignment.

In some embodiments, retail stores may submit assignments to server 135 for distribution to users. Additionally or alternatively, server 135 may generate assignments based, for instance, on images captured from within a retail store. For example, cameras in a retail store may indicate that a particular item is not displayed according to a planogram. A marketing manager may desire to have a human take a picture of the items in the retail store to record what a human views, as opposed to installed cameras, thereby providing additional data to remediate the improper display.

Accordingly, server 135 may receive one or more images captured from the selected retail store, such as from users, installed cameras, and/or mobile cameras. Server 135 may also analyze the one or more images to select at least one available assignment. For example, at least one convolution of at least part of the one or more images may be calculated, and the at least one available assignment may be selected based on the calculated at least one convolution. For instance, in response to a first value of a convolution of the at least part of the one or more images, server 135 may select a first at least one available assignment. Further, in response to a second value of the convolution of the at least part of the one or more images, server 135 may select a second at least one available assignment, and the second at least one available assignment may differ from the first at least one available assignment.

To further illustrate, server 135 may store an image of a partially empty shelf of a grocery store. A camera in the grocery store may capture an image of the shelf, and server 135 may convolve the captured image with the image of the partially empty shelf. Based on a value of the convolution, server 135 may generate an assignment to take a picture of the shelf, and offer the assignment to a user through process 4100.

In some embodiments, server 135 may also determine compatibility based on historical assignments provided to a user. The historical assignments and an assignment in the selected retail store may have a matching category, such as image capture, or a common location, such as a particular store. Further, server 135 may access a success indication corresponding to a historical assignments of a user. Server 135 may then use the success indication to determine whether a new assignment should be offered to the user. Accordingly, server 135 may avoid offering assignments to a user that are similar to assignments previously failed by the user.

In some cases, a user may decline an assignment due to time constraints, disinterest, or an inadequate incentive. Accordingly, server 135 may receive an indication that the user has declined the selected at least one available assignment. The indication may also provide a reason that the user declined the selected at least one available assignment, such as a dangerous location of the retail store, or the retail store requiring the user to walk farther than the user desires. Server 135 may also select an alternate retail store of among the plurality of retail stores, and, based on the selected alternate retail store, select at least one alternate available assignment in the selected alternate retail store. Further, server 135 may offer the selected at least one alternate available assignment in the selected alternate retail store to the user. In some embodiments, an incentive or payment for the alternate retail store may be decreased to disincentive a user from declining offered assignments.

Server 135 may also determine a category of a declined assignment and offer alternative assignments of a different category. For example, a user may decline picking up goods from a drive through, and server 135 may proceed to select a new assignment that does not require accessing a drive through. In this manner, server 135 may avoid annoyance and missed productivity of a particular user.

The foregoing description has been presented for purposes of illustration. It is not exhaustive and is not limited to the precise forms or embodiments disclosed. Modifications and adaptations will be apparent to those skilled in the art from consideration of the specification and practice of the disclosed embodiments. Additionally, although aspects of the disclosed embodiments are described as being stored in memory, one skilled in the art will appreciate that these aspects can also be stored on other types of computer readable media, such as secondary storage devices, for example, hard disks or CD ROM, or other forms of RAM or ROM, USB media, DVD, Blu-ray, 4K Ultra HD Blu-ray, or other optical drive media.

Computer programs based on the written description and disclosed methods are within the skill of an experienced developer. The various programs or program modules can be created using any of the techniques known to one skilled in the art or can be designed in connection with existing software. For example, program sections or program modules can be designed in or by means of .Net Framework, .Net Compact Framework (and related languages, such as Visual Basic, C, etc.), Java, C++, Objective-C, HTML, HTML/AJAX combinations, XML, or HTML with included Java applets.

Moreover, while illustrative embodiments have been described herein, the scope of any and all embodiments having equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application. The examples are to be construed as non-exclusive. Furthermore, the steps of the disclosed methods may be modified in any manner, including by reordering steps and/or inserting or deleting steps. It is intended, therefore, that the specification and examples be considered as illustrative only, with a true scope and spirit being indicated by the following claims and their full scope of equivalents.

What is claimed is:

1. A non-transitory computer-readable medium including instructions that when executed by a processor cause the processor to perform a method for selecting available assignments for users based on mobile computing devices of the users, the method comprising:

receiving an indication of at least one parameter of a mobile computing device associated with a user;

accessing a plurality of available assignments, each assignment of the plurality of available assignments involving use of at least one mobile computing device;

based on the at least one parameter of the mobile computing device associated with the user, selecting a subset of the plurality of available assignments;

offering the selected subset of the plurality of available assignments to the user;

determining whether a particular assignment of the plurality of available assignments is compatible with the at least one parameter of the mobile computing device associated with the user;

in response to a determination that the particular assignment of the plurality of available assignments is compatible with the at least one parameter of the mobile computing device associated with the user, including the particular assignment in the selected subset; and in response to a determination that the particular assignment of the plurality of available assignments is incompatible with the at least one parameter of the mobile computing device associated with the user, forgoing including the particular assignment in the selected subset.

2. The non-transitory computer-readable medium of claim 1, wherein the at least one parameter of the mobile computing device is at least one parameter of an image sensor of the mobile computing device associated with the user.

3. The non-transitory computer-readable medium of claim 2, wherein the at least one parameter of the image sensor comprises at least one of a maximal pixel resolution, maximal frame rate, type of sensor, and zoom capability.

4. The non-transitory computer-readable medium of claim 1, wherein the at least one parameter of the mobile computing device is at least one parameter of a computing power of the mobile computing device associated with the user.

5. The non-transitory computer-readable medium of claim 4, wherein the at least one parameter of the computing power comprises at least one of an existence of a GPU, a number of computing cores, a type of processor, and a number of instructions per time unit.

6. The non-transitory computer-readable medium of claim 1, wherein the at least one parameter of the mobile computing device is at least one parameter of a memory of the mobile computing device associated with the user.

7. The non-transitory computer-readable medium of claim 6, wherein the at least one parameter of the memory comprises at least one of a memory size, type of memory, and speed of memory.

8. The non-transitory computer-readable medium of claim 1, wherein the method further comprises:
identifying an historic assignment matching the particular assignment;
identifying a particular mobile computing device matching the mobile computing device associated with the user;
accessing a success indication corresponding to historic allocation of the historic assignment to the particular mobile computing device; and
using the success indication to determine whether the particular assignment of the plurality of available assignments is compatible with the at least one parameter of the mobile computing device associated with the user.

9. The non-transitory computer-readable medium of claim 1, wherein a particular assignment of the selected subset includes a quality requirement, and the method further comprises:
receiving, from the mobile computing device associated with the user, a failure indication in response to the mobile computing device associated with the user performing the particular assignment of the selected subset and failing one or more criteria of the quality requirement.

10. The non-transitory computer-readable medium of claim 1, wherein a particular assignment of the selected subset includes a precondition, a first instruction to perform the particular assignment if the precondition is satisfied, and a second instruction to forego performing the particular assignment if the precondition is not satisfied.

11. The non-transitory computer-readable medium of claim 10, wherein the precondition is at least one of a brightness level or a proximity to an object in an image.

12. The non-transitory computer-readable medium of claim 10, wherein the method further comprises:
providing an instruction to the mobile computing device associated with the user to complete a second assignment of the selected subset in response to not satisfying a precondition of a first assignment.

13. The non-transitory computer-readable medium of claim 10, wherein one or more assignments of the selected subset further include respective remediation instructions, the remediation instructions instructing the user to change a position of the mobile computing device associated with the user in relation to an object in response to the precondition not being satisfied.

14. The non-transitory computer-readable medium of claim 1, wherein the method further comprises:
offering the user a coupon in exchange for accepting at least one assignment in the selected subset.

15. The non-transitory computer-readable medium of claim 1, wherein the method further comprises:
receiving an indication from the mobile computing device associated with the user that the mobile computing device associated with the user lacks at least one resource to perform at least one assignment of the selected subset.

16. The non-transitory computer-readable medium of claim 1, wherein the method further comprises:
receiving an indication from the mobile computing device associated with the user that the mobile computing device associated with the user does not have permission to perform an assignment of the selected subset.

17. The non-transitory computer-readable medium of claim 1, wherein the method further comprises:
receiving a response indication that the user has declined an assignment of the offered selected subset;
determining a category of the selected subset;
selecting a new subset of the plurality of available assignments, the new subset excluding assignments of the determined category; and
offering the new subset to the user.

18. A method for selecting available assignments for users based on mobile computing devices of the users, the method comprising:
receiving an indication of at least one parameter of a mobile computing device associated with a user;
accessing a plurality of available assignments, each assignment of the plurality of available assignments involving use of at least one mobile computing device;

based on the at least one parameter of the mobile computing device associated with the user, selecting a subset of the plurality of available assignments;

offering the selected subset of the plurality of available assignments to the user;

determining whether a particular assignment of the plurality of available assignments is compatible with the at least one parameter of the mobile computing device associated with the user;

in response to a determination that the particular assignment of the plurality of available assignments is compatible with the at least one parameter of the mobile computing device associated with the user, including the particular assignment in the selected subset; and in response to a determination that the particular assignment of the plurality of available assignments is incompatible with the at least one parameter of the mobile computing device associated with the user, forgoing including the particular assignment in the selected subset.

19. A system for selecting available assignments for users based on mobile computing devices of the users, the system comprising:

at least one processor programmed to:

receive an indication of at least one parameter of a mobile computing device associated with a user;

access a plurality of available assignments, each assignment of the plurality of available assignments involving use of at least one mobile computing device;

based on the at least one parameter of the mobile computing device associated with the user, select a subset of the plurality of available assignments;

offer the selected subset of the plurality of available assignments to the user;

determine whether a particular assignment of the plurality of available assignments is compatible with the at least one parameter of the mobile computing device associated with the user;

in response to a determination that the particular assignment of the plurality of available assignments is compatible with the at least one parameter of the mobile computing device associated with the user, include the particular assignment in the selected subset; and in response to a determination that the particular assignment of the plurality of available assignments is incompatible with the at least one parameter of the mobile computing device associated with the user, forgo including the particular assignment in the selected subset.

* * * * *